US011501389B2

(12) United States Patent
Forbes, Jr. et al.

(10) Patent No.: US 11,501,389 B2
(45) **Date of Patent: *Nov. 15, 2022**

(54) SYSTEMS AND METHODS FOR ADVANCED ENERGY SETTLEMENTS, NETWORK-BASED MESSAGING, AND APPLICATIONS SUPPORTING THE SAME ON A BLOCKCHAIN PLATFORM

(71) Applicant: Causam Enterprises, Inc., Raleigh, NC (US)

(72) Inventors: Joseph W. Forbes, Jr., Raleigh, NC (US); Nathaniel Taylor Brockman, Mt. Pleasant, SC (US); Thomas Marshall Gordon, III, Raleigh, NC (US); JiNan Glasgow George, Durham, NC (US)

(73) Assignee: CAUSAM ENTERPRISES, INC., Raleigh, NC (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/111,071

(22) Filed: Dec. 3, 2020

(65) Prior Publication Data

US 2021/0090185 A1 Mar. 25, 2021

Related U.S. Application Data

(63) Continuation of application No. 15/670,903, filed on Aug. 7, 2017, now Pat. No. 10,861,112, which is a (Continued)

(51) Int. Cl.

*G06Q 50/06* (2012.01)
*G05D 17/00* (2006.01)

(Continued)

(52) U.S. Cl.

CPC ............ *G06Q 50/06* (2013.01); *B60L 53/305* (2019.02); *B60L 53/63* (2019.02); *B60L 53/64* (2019.02);

(Continued)

(58) Field of Classification Search

None

See application file for complete search history.

(56) References Cited

U.S. PATENT DOCUMENTS

| | | | |
|---|---|---|---|
| 3,906,242 | A | 9/1975 | Stevenson |
| 4,023,043 | A | 5/1977 | Stevenson |

(Continued)

FOREIGN PATENT DOCUMENTS

| | | | |
|---|---|---|---|
| EP | 1729223 | A2 | 12/2006 |
| EP | 2159749 | A1 | 3/2010 |

(Continued)

OTHER PUBLICATIONS

Herold, Rebecca. "Smart Meter Data and Privacy ." Data Privacy for the Smart Grid. Auerbach Publications, 2015. 78-97. Web. (Year: 2015).

(Continued)

*Primary Examiner* — Arif Ullah

(74) *Attorney, Agent, or Firm* — Neo IP

(57) ABSTRACT

Systems and methods for financial settlement of transactions within an electric power grid network are disclosed. A multiplicity of active grid elements are constructed and configured for electric connection and network-based communication over a blockchain-based platform. The multiplicity of active grid elements are operable to make peer-to-peer transactions based on their participation within the electric power grid by generating and executing a digital contract. The multiplicity of active grid elements generate messages autonomously and/or automatically within a predetermined time interval. The messages comprise energy related data and settlement related data. The energy related data of the multiplicity of active grid elements are based on measurement and verification. The energy related data and the settlement related data are validated and recorded on a (Continued)

distributed ledger with a time stamp and a geodetic reference.

20 Claims, 116 Drawing Sheets

Related U.S. Application Data continuation-in-part of application No. 15/644,080, filed on Jul. 7, 2017, now Pat. No. 10,497,073, and a continuation-in-part of application No. 15/273,088, filed on Sep. 22, 2016, now Pat. No. 10,475,138, and a continuation-in-part of application No. 14/918,840, filed on Oct. 21, 2015, now Pat. No. 10,311,416, said application No. 15/644,080 is a continuation of application No. 14/610,181, filed on Jan. 30, 2015, now Pat. No. 9,704,206, said application No. 15/670,903 is a continuation-in-part of application No. 14/518,412, filed on Oct. 20, 2014, now Pat. No. 9,740,227, said application No. 14/610,181 is a continuation of application No. 14/292,418, filed on May 30, 2014, now Pat. No. 8,996,419, said application No. 14/518,412 is a continuation of application No. 14/290,598, filed on May 29, 2014, now Pat. No. 8,983,669, said application No. 14/292,418 is a continuation of application No. 14/193,600, filed on Feb. 28, 2014, now Pat. No. 8,775,283, which is a continuation of application No. 14/050,325, filed on Oct. 9, 2013, now Pat. No. 8,706,583, which is a continuation of application No. 13/746,703, filed on Jan. 22, 2013, now Pat. No. 8,583,520, which is a continuation of application No. 13/659,564, filed on Oct. 24, 2012, now Pat. No. 8,849,715, said application No. 14/290,598 is a continuation-in-part of application No. 13/563,535, filed on Jul. 31, 2012, now Pat. No. 9,513,648.

(60) Provisional application No. 62/222,470, filed on Sep. 23, 2015, provisional application No. 62/067,180, filed on Oct. 22, 2014.

(51) Int. Cl.

| | |
|---|---|
| ***H04L 69/22*** | (2022.01) |
| ***G06Q 40/04*** | (2012.01) |
| ***G06Q 30/02*** | (2012.01) |
| ***G06Q 20/14*** | (2012.01) |
| ***G06Q 40/00*** | (2012.01) |
| ***G06Q 20/10*** | (2012.01) |
| ***H02J 13/00*** | (2006.01) |
| ***G06Q 30/04*** | (2012.01) |
| ***H02J 3/00*** | (2006.01) |
| ***G07F 15/00*** | (2006.01) |
| ***G06Q 10/00*** | (2012.01) |
| ***G05D 3/12*** | (2006.01) |
| ***H04L 69/325*** | (2022.01) |
| ***G06Q 30/08*** | (2012.01) |
| ***B60L 53/63*** | (2019.01) |
| ***B60L 53/68*** | (2019.01) |
| ***B60L 55/00*** | (2019.01) |
| ***B60L 53/30*** | (2019.01) |
| ***G06Q 20/02*** | (2012.01) |
| ***B60L 53/64*** | (2019.01) |

(52) U.S. Cl.

CPC ............... *B60L 53/68* (2019.02); *B60L 55/00* (2019.02); *G05D 3/12* (2013.01); *G05D 17/00* (2013.01); *G06Q 10/00* (2013.01); *G06Q 20/02* (2013.01); *G06Q 20/102* (2013.01); *G06Q 20/14* (2013.01); *G06Q 20/145* (2013.01); *G06Q 30/0206* (2013.01); *G06Q 30/0283* (2013.01); *G06Q 30/04* (2013.01); *G06Q 30/08* (2013.01); *G06Q 40/00* (2013.01); *G06Q 40/04* (2013.01); *G07F 15/008* (2013.01); *H02J 3/008* (2013.01); *H02J 13/00* (2013.01); *H02J 13/00001* (2020.01); *H02J 13/0086* (2013.01); *H04L 69/22* (2013.01); *H04L 69/325* (2013.01); *B60L 2240/72* (2013.01); *G06Q 2220/00* (2013.01); *H02J 2203/20* (2020.01); *Y02E 60/00* (2013.01); *Y02P 90/845* (2015.11); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01); *Y04S 40/128* (2013.01); *Y04S 50/10* (2013.01); *Y04S 50/12* (2013.01); *Y04S 50/14* (2013.01)

(56) References Cited

U.S. PATENT DOCUMENTS

| | | | |
|---|---|---|---|
| 4,589,075 | A | 5/1986 | Buennagel |
| 4,799,059 | A | 1/1989 | Grindahl et al. |
| 4,819,180 | A | 4/1989 | Hedman et al. |
| 4,819,229 | A | 4/1989 | Pritty et al. |
| 5,237,507 | A | 8/1993 | Chasek |
| 5,361,982 | A | 11/1994 | Liebl et al. |
| 5,388,101 | A | 2/1995 | Dinkins |
| 5,481,546 | A | 1/1996 | Dinkins |
| 5,502,339 | A | 3/1996 | Hartig |
| 5,544,036 | A | 8/1996 | Brown et al. |
| 5,560,022 | A | 9/1996 | Dunstan et al. |
| 5,570,002 | A | 10/1996 | Castleman |
| 5,592,491 | A | 1/1997 | Dinkins |
| 5,640,153 | A | 6/1997 | Hildebrand et al. |
| 5,644,173 | A | 7/1997 | Elliason et al. |
| 5,675,503 | A | 10/1997 | Moe et al. |
| 5,696,695 | A | 12/1997 | Ehlers et al. |
| 5,721,936 | A | 2/1998 | Kikinis et al. |
| 5,926,776 | A | 7/1999 | Glorioso et al. |
| 5,973,481 | A | 10/1999 | Thompson et al. |
| 6,018,690 | A | 1/2000 | Saito et al. |
| 6,078,785 | A | 6/2000 | Bush |
| 6,102,487 | A | 8/2000 | Oevreboe |
| 6,107,693 | A | 8/2000 | Mongia et al. |
| 6,112,136 | A | 8/2000 | Paul et al. |
| 6,115,580 | A | 9/2000 | Chuprun et al. |
| 6,115,676 | A | 9/2000 | Rector et al. |
| 6,154,859 | A | 11/2000 | Norizuki et al. |
| 6,216,956 | B1 | 4/2001 | Ehlers et al. |
| 6,233,327 | B1 | 5/2001 | Petite |
| 6,254,009 | B1 | 7/2001 | Proffitt et al. |
| 6,286,021 | B1 | 9/2001 | Tran et al. |
| 6,296,612 | B1 | 10/2001 | Mo et al. |
| 6,301,528 | B1 | 10/2001 | Bertram et al. |
| 6,304,552 | B1 | 10/2001 | Chapman et al. |
| 6,327,541 | B1 | 12/2001 | Pitchford et al. |
| 6,366,217 | B1 | 4/2002 | Cunningham et al. |
| 6,374,101 | B1 | 4/2002 | Gelbien |
| 6,437,692 | B1 | 8/2002 | Petite et al. |
| 6,512,966 | B2 | 1/2003 | Lof et al. |
| 6,519,509 | B1 | 2/2003 | Nierlich et al. |
| 6,529,839 | B1 | 3/2003 | Uggerud et al. |
| 6,535,797 | B1 | 3/2003 | Bowles et al. |
| 6,577,962 | B1 | 6/2003 | Afshari |
| 6,583,521 | B1 | 6/2003 | Lagod et al. |
| 6,601,033 | B1 | 7/2003 | Sowinski |
| 6,621,179 | B1 | 9/2003 | Howard |
| 6,622,097 | B2 | 9/2003 | Hunter |
| 6,622,925 | B2 | 9/2003 | Carner et al. |
| 6,633,823 | B2 | 10/2003 | Bartone et al. |
| 6,671,586 | B2 | 12/2003 | Davis et al. |

(56) References Cited

U.S. PATENT DOCUMENTS 6,681,154 B2 1/2004 Nierlich et al.
6,687,574 B2 2/2004 Pietrowicz et al.
6,732,055 B2 5/2004 Bagepalli et al.
6,747,368 B2 6/2004 Jarrett
6,778,882 B2 8/2004 Spool et al.
6,784,807 B2 8/2004 Petite et al.
6,826,267 B2 11/2004 Daum et al.
6,832,135 B2 12/2004 Ying
6,834,811 B1 12/2004 Huberman et al.
6,836,737 B2 12/2004 Petite et al.
6,850,557 B1 2/2005 Gronemeyer
6,862,498 B2 3/2005 Davis et al.
6,865,450 B2 3/2005 Masticola et al.
6,868,293 B1 3/2005 Schurr et al.
6,879,059 B2 4/2005 Sleva
6,891,838 B1 5/2005 Petite et al.
6,897,931 B2 5/2005 Lee et al.
6,900,556 B2 5/2005 Provanzana et al.
6,904,336 B2 6/2005 Raines et al.
6,906,617 B1 6/2005 Van der Meulen
6,909,942 B2 6/2005 Andarawis et al.
6,914,533 B2 7/2005 Petite
6,914,893 B2 7/2005 Petite
6,934,316 B2 8/2005 Cornwall et al.
6,944,555 B2 9/2005 Blackett et al.
6,961,641 B1 11/2005 Forth et al.
6,978,931 B2 12/2005 Brobeck
6,990,593 B2 1/2006 Nakagawa
7,003,640 B2 2/2006 Mayo et al.
7,019,667 B2 3/2006 Petite et al.
7,035,719 B2 4/2006 Howard et al.
7,039,532 B2 5/2006 Hunter
7,053,756 B2 5/2006 Mollenkopf et al.
7,053,767 B2 5/2006 Petite et al.
7,085,739 B1 8/2006 Winter et al.
7,088,014 B2 8/2006 Nierlich et al.
7,103,511 B2 9/2006 Petite
7,111,018 B1 9/2006 Goodrich et al.
7,123,994 B2 10/2006 Weik et al.
7,133,750 B2 11/2006 Raines et al.
7,141,321 B2 11/2006 McArthur et al.
7,142,949 B2 11/2006 Brewster et al.
7,177,728 B2 2/2007 Gardner
7,181,320 B2 2/2007 Whiffen et al.
7,184,861 B2 2/2007 Petite
7,200,134 B2 4/2007 Proctor et al.
7,206,350 B2 4/2007 Korobkov et al.
7,206,670 B2 4/2007 Pimputkar et al.
7,209,804 B2 4/2007 Curt et al.
7,209,840 B2 4/2007 Petite et al.
7,233,843 B2 6/2007 Budhraja et al.
7,263,073 B2 8/2007 Petite et al.
7,263,450 B2 8/2007 Hunter
7,274,975 B2 9/2007 Miller
7,282,921 B2 10/2007 Sela et al.
7,289,887 B2 10/2007 Rodgers
7,295,128 B2 11/2007 Petite
7,305,282 B2 12/2007 Chen
7,313,465 B1 12/2007 O'Donnell
7,337,153 B2 2/2008 Peljto et al.
7,343,341 B2 3/2008 Sandor et al.
7,345,998 B2 3/2008 Cregg et al.
7,346,463 B2 3/2008 Petite et al.
7,366,164 B1 4/2008 Habib et al.
7,397,907 B2 7/2008 Petite
7,406,364 B2 7/2008 Rissanen et al.
7,412,304 B2 8/2008 Uenou
7,424,268 B2 9/2008 Diener et al.
7,424,527 B2 9/2008 Petite
7,440,871 B2 10/2008 McConnell et al.
7,451,019 B2 11/2008 Rodgers
7,468,661 B2 12/2008 Petite et al.
7,480,501 B2 1/2009 Petite
7,486,681 B2 2/2009 Weber
7,502,698 B2 3/2009 Uenou et al.
7,528,503 B2 5/2009 Rognli et al.
7,536,240 B2 5/2009 McIntyre et al.
7,541,941 B2 6/2009 Bogolea et al.
7,565,227 B2 7/2009 Richard et al.
7,609,158 B2 10/2009 Banting et al.
7,650,425 B2 1/2010 Davis et al.
7,697,492 B2 4/2010 Petite
7,711,796 B2 5/2010 Gutt et al.
7,715,951 B2 5/2010 Forbes et al.
7,738,999 B2 6/2010 Petite
7,739,378 B2 6/2010 Petite
7,747,165 B2 6/2010 Emery et al.
7,844,370 B2 11/2010 Pollack et al.
7,890,436 B2 2/2011 Kremen
7,925,552 B2 4/2011 Tarbell et al.
7,940,901 B2 5/2011 Paraskevakos et al.
7,949,435 B2 5/2011 Pollack et al.
8,010,812 B2 8/2011 Forbes et al.
8,032,233 B2 10/2011 Forbes et al.
8,032,461 B2 10/2011 Winter et al.
8,045,660 B1 10/2011 Gupta
8,060,259 B2 11/2011 Budhraja et al.
8,068,938 B2 11/2011 Fujita
8,095,233 B1 1/2012 Shankar et al.
8,145,361 B2 3/2012 Forbes et al.
8,260,468 B2 9/2012 Ippolito et al.
8,260,470 B2 9/2012 Forbes et al.
8,305,215 B2 11/2012 Markhovsky et al.
8,307,225 B2 11/2012 Forbes et al.
8,311,483 B2 11/2012 Tillman et al.
8,315,717 B2 11/2012 Forbes et al.
8,315,743 B2 11/2012 Sackman et al.
8,359,124 B2 1/2013 Zhou et al.
8,359,215 B1 1/2013 Robbins et al.
8,364,609 B2 1/2013 Ozog
8,407,252 B2 3/2013 Bennett et al.
8,417,569 B2 4/2013 Gross
8,428,752 B2 4/2013 Bennett et al.
8,442,917 B1 5/2013 Burke
8,457,802 B1 6/2013 Steven et al.
8,467,353 B2 6/2013 Proctor
8,473,111 B1 6/2013 Shankar et al.
8,521,337 B1 8/2013 Johnson
8,565,811 B2 10/2013 Tan et al.
8,571,930 B1 10/2013 Galperin
8,583,520 B1 11/2013 Forbes
8,583,799 B2 11/2013 Podila
8,588,991 B1 11/2013 Forbes
8,639,392 B2 1/2014 Chassin
8,684,266 B2 4/2014 Bennett et al.
8,704,678 B2 4/2014 Wang et al.
8,761,051 B2 6/2014 Brisebois et al.
8,761,952 B2 6/2014 Forbes
8,818,283 B2 8/2014 McHenry et al.
10,295,969 B2 5/2019 Forbes, Jr.
2001/0030468 A1 10/2001 Anderson et al.
2001/0038343 A1 11/2001 Meyer et al.
2002/0019758 A1 2/2002 Scarpelli
2002/0019802 A1 2/2002 Malme et al.
2002/0035496 A1 3/2002 Fukushima et al.
2002/0036430 A1 3/2002 Welches et al.
2002/0084655 A1 7/2002 Lof et al.
2002/0091626 A1 7/2002 Johnson et al.
2002/0109607 A1 8/2002 Cumeralto et al.
2002/0138176 A1 9/2002 Davis et al.
2002/0143693 A1 10/2002 Soestbergen et al.
2002/0161648 A1 10/2002 Mason et al.
2002/0198629 A1 12/2002 Ellis
2003/0006613 A1 1/2003 Lof et al.
2003/0009401 A1 1/2003 Ellis
2003/0009705 A1 1/2003 Thelander et al.
2003/0036820 A1 2/2003 Yellepeddy et al.
2003/0074244 A1 4/2003 Braxton
2003/0083980 A1 5/2003 Satake
2003/0144864 A1 7/2003 Mazzarella
2003/0149937 A1 8/2003 McElfresh et al.
2003/0160595 A1 8/2003 Provanzana et al.
2003/0167178 A1 9/2003 Jarman et al.
2003/0171851 A1 9/2003 Brickfield et al.

(56) References Cited

U.S. PATENT DOCUMENTS

2003/0176952 A1 9/2003 Collins
2003/0198304 A1 10/2003 Sugar et al.
2003/0204756 A1 10/2003 Ransom et al.
2003/0220864 A1 11/2003 Peljto et al.
2003/0225483 A1 12/2003 Santinato et al.
2003/0229572 A1 12/2003 Raines et al.
2003/0233201 A1 12/2003 Horst et al.
2004/0006439 A1 1/2004 Hunter
2004/0024483 A1 2/2004 Holcombe
2004/0044571 A1 3/2004 Bronnimann et al.
2004/0088083 A1 5/2004 Davis et al.
2004/0095237 A1 5/2004 Chen et al.
2004/0107025 A1 6/2004 Ransom et al.
2004/0117330 A1 6/2004 Ehlers et al.
2004/0128266 A1 7/2004 Yellepeddy et al.
2004/0138834 A1 7/2004 Blackett et al.
2004/0153170 A1 8/2004 Santacatterina et al.
2004/0158417 A1 8/2004 Bonet
2004/0158478 A1 8/2004 Zimmerman
2004/0162793 A1 8/2004 Scott et al.
2004/0193329 A1 9/2004 Ransom et al.
2004/0203826 A1 10/2004 Sugar et al.
2004/0206813 A1 10/2004 Brobeck
2004/0220869 A1 11/2004 Perera
2004/0225514 A1 11/2004 Greenshields et al.
2004/0230533 A1 11/2004 Benco
2005/0021397 A1 1/2005 Cui et al.
2005/0033481 A1 2/2005 Budhraja et al.
2005/0055432 A1 3/2005 Rodgers
2005/0065742 A1 3/2005 Rodgers
2005/0080772 A1 4/2005 Bem
2005/0096856 A1 5/2005 Lubkeman et al.
2005/0096857 A1 5/2005 Hunter
2005/0096979 A1 5/2005 Koningstein
2005/0097204 A1 5/2005 Horowitz et al.
2005/0125243 A1 6/2005 Villalobos
2005/0127680 A1 6/2005 Lof et al.
2005/0131583 A1 6/2005 Ransom
2005/0138432 A1 6/2005 Ransom et al.
2005/0144437 A1 6/2005 Ransom et al.
2005/0192711 A1 9/2005 Raines et al.
2005/0192713 A1 9/2005 Weik et al.
2005/0197742 A1 9/2005 Scott et al.
2005/0216302 A1 9/2005 Raji et al.
2005/0216580 A1 9/2005 Raji et al.
2005/0227625 A1 10/2005 Diener
2005/0234600 A1 10/2005 Boucher et al.
2005/0240314 A1 10/2005 Martinez
2005/0240315 A1 10/2005 Booth et al.
2005/0246190 A1 11/2005 Sandor et al.
2005/0267642 A1 12/2005 Whiffen et al.
2005/0276222 A1 12/2005 Kumar et al.
2005/0288954 A1 12/2005 McCarthy et al.
2006/0020544 A1 1/2006 Kaveski
2006/0020596 A1 1/2006 Liu et al.
2006/0022841 A1 2/2006 Hoiness et al.
2006/0025891 A1 2/2006 Budike
2006/0031934 A1 2/2006 Kriegel
2006/0038672 A1 2/2006 Schoettle
2006/0064205 A1 3/2006 Ying
2006/0069616 A1 3/2006 Bau
2006/0106635 A1 5/2006 Ulrich et al.
2006/0119368 A1 6/2006 Sela et al.
2006/0142900 A1 6/2006 Rothman et al.
2006/0142961 A1 6/2006 Johnson et al.
2006/0161310 A1 7/2006 Lal
2006/0161450 A1 7/2006 Carey et al.
2006/0168191 A1 7/2006 Ives
2006/0190354 A1 8/2006 Meisel et al.
2006/0195334 A1 8/2006 Reeb et al.
2006/0212350 A1 9/2006 Ellis et al.
2006/0224615 A1 10/2006 Korn et al.
2006/0241244 A1 10/2006 Soeda et al.
2006/0241314 A1 10/2006 Sullivan et al.
2006/0271244 A1 11/2006 Cumming et al.
2006/0271314 A1 11/2006 Hayes
2006/0276938 A1 12/2006 Miller
2006/0282328 A1 12/2006 Gerace et al.
2007/0021874 A1 1/2007 Rognli et al.
2007/0026857 A1 2/2007 Kotzin
2007/0038563 A1 2/2007 Ryzerski
2007/0058453 A1 3/2007 Shaffer et al.
2007/0058629 A1 3/2007 Luft
2007/0067132 A1 3/2007 Tziouvaras et al.
2007/0070895 A1 3/2007 Narvaez
2007/0085702 A1 4/2007 Walters et al.
2007/0091900 A1 4/2007 Asthana et al.
2007/0100503 A1 5/2007 Balan et al.
2007/0100961 A1 5/2007 Moore
2007/0124026 A1 5/2007 Troxell et al.
2007/0150353 A1 6/2007 Krassner et al.
2007/0156621 A1 7/2007 Wright et al.
2007/0156887 A1 7/2007 Wright et al.
2007/0174114 A1 7/2007 Bigby et al.
2007/0192333 A1 8/2007 Ali
2007/0203722 A1 8/2007 Richards et al.
2007/0204176 A1 8/2007 Shaffer et al.
2007/0213878 A1 9/2007 Chen
2007/0214118 A1 9/2007 Schoen et al.
2007/0214132 A1 9/2007 Grubb et al.
2007/0255457 A1 11/2007 Whitcomb et al.
2007/0260540 A1 11/2007 Chau et al.
2007/0276547 A1 11/2007 Miller
2007/0286210 A1 12/2007 Gutt et al.
2007/0291644 A1 12/2007 Roberts et al.
2007/0293171 A1 12/2007 Li et al.
2007/0299562 A1 12/2007 Kates
2008/0010212 A1 1/2008 Moore et al.
2008/0015976 A1 1/2008 Sandor et al.
2008/0039979 A1 2/2008 Bridges et al.
2008/0039980 A1 2/2008 Pollack et al.
2008/0039989 A1 2/2008 Pollack et al.
2008/0040223 A1 2/2008 Bridges et al.
2008/0040295 A1 2/2008 Kaplan et al.
2008/0040296 A1 2/2008 Bridges et al.
2008/0040479 A1 2/2008 Bridge et al.
2008/0046387 A1 2/2008 Gopal et al.
2008/0052145 A1 2/2008 Kaplan et al.
2008/0091580 A1 4/2008 Kremen
2008/0091581 A1 4/2008 Kremen
2008/0091590 A1 4/2008 Kremen
2008/0091625 A1 4/2008 Kremen
2008/0091626 A1 4/2008 Kremen
2008/0104026 A1 5/2008 Koran
2008/0109387 A1 5/2008 Deaver et al.
2008/0130673 A1 6/2008 Cregg et al.
2008/0133604 A1 6/2008 Kim
2008/0147465 A1 6/2008 Raines et al.
2008/0154801 A1 6/2008 Fein et al.
2008/0165714 A1 7/2008 Dettinger et al.
2008/0172312 A1 7/2008 Synesiou et al.
2008/0177423 A1 7/2008 Brickfield et al.
2008/0177678 A1 7/2008 Di Martini et al.
2008/0186202 A1 8/2008 Vaswani et al.
2008/0195462 A1 8/2008 Magdon-Ismail et al.
2008/0209117 A1 8/2008 Kajigaya
2008/0224892 A1 9/2008 Bogolea et al.
2008/0231114 A1 9/2008 Tolnar et al.
2008/0238710 A1 10/2008 Tolnar et al.
2008/0249832 A1 10/2008 Richardson et al.
2008/0255899 A1 10/2008 McConnell et al.
2008/0263025 A1 10/2008 Koran
2008/0270223 A1 10/2008 Collins et al.
2008/0272934 A1 11/2008 Wang et al.
2008/0281473 A1 11/2008 Pitt
2008/0306824 A1 12/2008 Parkinson
2008/0306830 A1 12/2008 Lasa et al.
2008/0313632 A1 12/2008 Kumar et al.
2008/0319893 A1 12/2008 Mashinsky et al.
2009/0012996 A1 1/2009 Gupta et al.
2009/0018884 A1 1/2009 McConnell et al.
2009/0024718 A1 1/2009 Anagnostopoulos et al.
2009/0040029 A1 2/2009 Bridges et al.
2009/0043519 A1 2/2009 Bridges et al.

(56) References Cited

U.S. PATENT DOCUMENTS

2009/0043520 A1 2/2009 Pollack et al.
2009/0045804 A1 2/2009 Durling et al.
2009/0046625 A1 2/2009 Diener et al.
2009/0055031 A1 2/2009 Slota et al.
2009/0055032 A1 2/2009 Rodgers
2009/0062970 A1 3/2009 Forbes et al.
2009/0063228 A1 3/2009 Forbes, Jr.
2009/0063680 A1 3/2009 Bridges et al.
2009/0066287 A1 3/2009 Pollack et al.
2009/0088907 A1 4/2009 Lewis et al.
2009/0111463 A1 4/2009 Simms et al.
2009/0112701 A1 4/2009 Turpin
2009/0112758 A1 4/2009 Herzig
2009/0119039 A1 5/2009 Banister et al.
2009/0124241 A1 5/2009 Krishnaswamy et al.
2009/0125462 A1 5/2009 Krishnaswamy et al.
2009/0135836 A1 5/2009 Veillette
2009/0138362 A1 5/2009 Schroedl et al.
2009/0157529 A1 6/2009 Ehlers et al.
2009/0157545 A1 6/2009 Mobley
2009/0177548 A1 7/2009 Eisenlohr
2009/0187284 A1 7/2009 Kreiss et al.
2009/0187344 A1 7/2009 Brancaccio et al.
2009/0187499 A1 7/2009 Mulder et al.
2009/0195349 A1 8/2009 Frader-Thompson et al.
2009/0198384 A1 8/2009 Ahn
2009/0200988 A1 8/2009 Bridges et al.
2009/0207950 A1 8/2009 Tsuruta et al.
2009/0228335 A1 9/2009 Niyogi et al.
2009/0240381 A1 9/2009 Lane
2009/0240677 A1 9/2009 Parekh et al.
2009/0281673 A1 11/2009 Taft
2009/0281674 A1 11/2009 Taft
2009/0313034 A1 12/2009 Ferro et al.
2009/0313103 A1 12/2009 Ambrosio et al.
2009/0319415 A1 12/2009 Stoilov et al.
2009/0326726 A1 12/2009 Ippolito et al.
2010/0023337 A1 1/2010 Case
2010/0076835 A1 3/2010 Silverman
2010/0094981 A1 4/2010 Cordray et al.
2010/0100250 A1 4/2010 Budhraja et al.
2010/0106332 A1 4/2010 Chassin et al.
2010/0106342 A1 4/2010 Ko et al.
2010/0106575 A1 4/2010 Bixby
2010/0106641 A1 4/2010 Chassin et al.
2010/0138452 A1 6/2010 Henkin et al.
2010/0146599 A1 6/2010 Padmanabha et al.
2010/0163634 A1 7/2010 Klein et al.
2010/0164749 A1 7/2010 Hope et al.
2010/0169175 A1 7/2010 Koran
2010/0179862 A1 7/2010 Chassin et al.
2010/0191862 A1 7/2010 Forbes et al.
2010/0198535 A1 8/2010 Brown et al.
2010/0217452 A1 8/2010 McCord et al.
2010/0217549 A1 8/2010 Galvin et al.
2010/0217550 A1 8/2010 Crabtree et al.
2010/0217642 A1 8/2010 Crubtree et al.
2010/0217651 A1 8/2010 Crabtree et al.
2010/0218108 A1 8/2010 Crabtree et al.
2010/0228601 A1 9/2010 Vaswani et al.
2010/0235008 A1 9/2010 Forbes, Jr. et al.
2010/0250590 A1 9/2010 Galvin
2010/0255794 A1 10/2010 Agnew
2010/0259998 A1 10/2010 Kwon et al.
2010/0274407 A1 10/2010 Creed
2010/0293045 A1 11/2010 Burns et al.
2010/0306033 A1 12/2010 Oved et al.
2010/0324748 A1 12/2010 Voysey
2010/0325719 A1 12/2010 Etchegoyen
2010/0328849 A1 12/2010 Ewing et al.
2010/0332373 A1 12/2010 Crabtree et al.
2011/0007824 A1 1/2011 Bridges et al.
2011/0010016 A1 1/2011 Giroti
2011/0015799 A1 1/2011 Pollack et al.
2011/0022242 A1 1/2011 Bukhin et al.
2011/0025556 A1 2/2011 Bridges et al.
2011/0029655 A1 2/2011 Forbes et al.
2011/0035073 A1 2/2011 Ozog
2011/0040666 A1 2/2011 Crabtree et al.
2011/0055036 A1 3/2011 Helfan
2011/0060474 A1 3/2011 Schmiegel et al.
2011/0060476 A1 3/2011 Iino et al.
2011/0080044 A1 4/2011 Schmiegel
2011/0090939 A1 4/2011 Diener et al.
2011/0106321 A1 5/2011 Cherian et al.
2011/0106729 A1 5/2011 Billingsley et al.
2011/0115302 A1 5/2011 Slota et al.
2011/0130982 A1 6/2011 Haag et al.
2011/0133655 A1 6/2011 Recker et al.
2011/0137763 A1 6/2011 Aguilar
2011/0145061 A1 6/2011 Spurr et al.
2011/0161250 A1 6/2011 Koeppel et al.
2011/0172837 A1 7/2011 Forbes, Jr.
2011/0172841 A1 7/2011 Forbes, Jr.
2011/0185303 A1 7/2011 Katagi et al.
2011/0196546 A1 8/2011 Muller et al.
2011/0196547 A1 8/2011 Park et al.
2011/0202418 A1 8/2011 Kempton et al.
2011/0204717 A1 8/2011 Shaffer
2011/0204719 A1 8/2011 Sackman et al.
2011/0208365 A1 8/2011 Miller
2011/0208366 A1 8/2011 Taft
2011/0208367 A1 8/2011 Sackman et al.
2011/0231028 A1 9/2011 Ozog
2011/0235656 A1 9/2011 Pigeon
2011/0251730 A1 10/2011 Pitt
2011/0254269 A1 10/2011 Kaiser
2011/0257809 A1 10/2011 Forbes et al.
2011/0258022 A1 10/2011 Forbes, Jr. et al.
2011/0267202 A1 11/2011 Efthymiou et al.
2011/0270454 A1 11/2011 Kreiss et al.
2011/0270457 A1 11/2011 Kreiss et al.
2011/0270550 A1 11/2011 Kreiss et al.
2011/0270682 A1 11/2011 Valin
2011/0282511 A1 11/2011 Unetich
2011/0288905 A1 11/2011 Mrakas
2012/0004872 A1 1/2012 Oh et al.
2012/0029720 A1 2/2012 Cherian et al.
2012/0029897 A1 2/2012 Cherian et al.
2012/0059532 A1 3/2012 Reifenhaeuser et al.
2012/0078427 A1 3/2012 Jang et al.
2012/0089263 A1 4/2012 Park et al.
2012/0095830 A1 4/2012 Contreras Delpiano et al.
2012/0095841 A1 4/2012 Luckerman et al.
2012/0101652 A1 4/2012 Shin et al.
2012/0131100 A1 5/2012 Van Olst et al.
2012/0146799 A1 6/2012 Bell et al.
2012/0153888 A1 6/2012 Jung
2012/0154171 A1 6/2012 Hurri et al.
2012/0196482 A1 8/2012 Stokoe
2012/0205977 A1 8/2012 Shin et al.
2012/0221162 A1 8/2012 Forbes
2012/0223840 A1 9/2012 Guymon et al.
2012/0226384 A1 9/2012 Forbes
2012/0230214 A1 9/2012 Kozisek et al.
2012/0232816 A1 9/2012 Oh et al.
2012/0239218 A1 9/2012 Forbes
2012/0245753 A1 9/2012 Forbes
2012/0246392 A1 9/2012 Cheon
2012/0253540 A1 10/2012 Coyne et al.
2012/0259760 A1 10/2012 Sgouridis et al.
2012/0282942 A1 11/2012 Uusitalo et al.
2012/0296482 A1 11/2012 Steven et al.
2012/0296799 A1 11/2012 Playfair et al.
2012/0303553 A1 11/2012 LaFrance
2012/0310760 A1 12/2012 Phillips et al.
2012/0310800 A1 12/2012 Xia et al.
2012/0316691 A1 12/2012 Boardman et al.
2012/0316697 A1 12/2012 Boardman et al.
2013/0006435 A1 1/2013 Berrios et al.
2013/0018821 A1 1/2013 Shao
2013/0020992 A1 1/2013 Wu et al.
2013/0023285 A1 1/2013 Markhovsky et al.
2013/0031201 A1 1/2013 Kagan et al.

(56) References Cited

U.S. PATENT DOCUMENTS

| | | | |
|---|---|---|---|
| 2013/0035802 A1 | 2/2013 | Khaitan et al. | |
| 2013/0038468 A1 | 2/2013 | Wang et al. | |
| 2013/0054036 A1 | 2/2013 | Cherian | |
| 2013/0079939 A1 | 3/2013 | Thomas et al. | |
| 2013/0079943 A1 | 3/2013 | Darden | |
| 2013/0110297 A1 | 5/2013 | Reichmuth et al. | |
| 2013/0123998 A1 | 5/2013 | King et al. | |
| 2013/0124320 A1 | 5/2013 | Kamer | |
| 2013/0144768 A1 | 6/2013 | Rohrbaugh | |
| 2013/0173360 A1 | 7/2013 | Thatcher | |
| 2013/0178990 A1 | 7/2013 | Kayton et al. | |
| 2013/0191260 A1 | 7/2013 | Michael | |
| 2013/0231793 A1 | 9/2013 | Elliott et al. | |
| 2013/0242792 A1 | 9/2013 | Woodings | |
| 2014/0018969 A1 | 1/2014 | Forbes | |
| 2014/0025486 A1 | 1/2014 | Bigby et al. | |
| 2014/0039699 A1 | 2/2014 | Forbes, Jr. | |
| 2014/0039701 A1 | 2/2014 | Forbes | |
| 2014/0039703 A1 | 2/2014 | Forbes | |
| 2014/0114829 A1 | 4/2014 | Forbes, Jr. | |
| 2014/0114844 A1 | 4/2014 | Forbes, Jr. | |
| 2014/0163309 A1 | 6/2014 | Bernhard et al. | |
| 2014/0222698 A1 | 8/2014 | Potdar et al. | |
| 2014/0277788 A1 | 9/2014 | Forbes, Jr. | |
| 2014/0278851 A1 | 9/2014 | Kopanati | |
| 2014/0279711 A1 | 9/2014 | Angelis et al. | |
| 2014/0304025 A1 | 10/2014 | Steven et al. | |
| 2014/0351010 A1 | 11/2014 | Kong | |
| 2015/0094968 A1 | 4/2015 | Jia et al. | |
| 2015/0160672 A1 | 6/2015 | Hakim et al. | |
| 2015/0278968 A1 | 10/2015 | Steven et al. | |
| 2016/0055507 A1 | 2/2016 | Patil et al. | |
| 2017/0025893 A1 | 1/2017 | Forbes, Jr. | |
| 2017/0091397 A1* | 3/2017 | Shah | H04L 63/20 |
| 2017/0358041 A1 | 12/2017 | Forbes, Jr. et al. | |
| 2018/0343339 A1 | 11/2018 | Lotter et al. | |

FOREIGN PATENT DOCUMENTS

| | | |
|---|---|---|
| JP | 2000078748 A | 3/2000 |
| JP | 2001306839 A | 11/2001 |
| JP | 2004180412 A | 6/2004 |
| JP | 2004248174 A | 9/2004 |
| JP | 2006060911 A | 3/2006 |
| JP | 2007132553 A | 5/2007 |
| KR | 20050045272 A | 5/2005 |
| KR | 20060036171 A | 4/2006 |
| KR | 20070008321 A | 1/2007 |
| KR | 100701298 B1 | 3/2007 |
| KR | 20070098172 A | 10/2007 |
| KR | 20080112692 A | 12/2008 |
| KR | 20090033299 A | 4/2009 |
| WO | 2007136456 A2 | 11/2007 |
| WO | 2008073477 A2 | 6/2008 |
| WO | 2008125696 A2 | 10/2008 |
| WO | 2011079235 A1 | 6/2011 |
| WO | 2012008979 A2 | 1/2012 |
| WO | 2012015507 A1 | 2/2012 |
| WO | 2012015508 A1 | 2/2012 |
| WO | 2012058114 A2 | 5/2012 |

OTHER PUBLICATIONS

Ibrahim, Michael, and Magdy M.A Salama. "Smart Distribution System volWAR Control Using Distributed Intelligence and Wireless Communication." IET generation, transmission & distribution 9.4 (2015): 307-318. Web. (Year: 2015).

Rashdi, Adnan et al. "Remote Energy Monitoring, Profiling and Control Through GSM Network." Arabian Journal for Science and Engineering 38.11 (2013): 3249-3257. Web. (Year: 2013).

Sarri, S, and N.D Hatziargyriou. "Interdependencies Between Smart Grids and Electricity Markets: European Status Quo." Mediterranean Conference on Power Generation, Transmission, Distribution and Energy Conversion (MEDPOWER 2018). Stevenage, UK: IET, 2018. 75-. Web. (Year: 2018).

"Adika Christopher, Wang Lingfend, Autonomous Appliance Scheduoing for Household Energy Management, Mar. 2014, IEEETransactions on Smart Grid, vol. 1 No. 5" (Year: 2014).

"Aman Saima, Simmhan Yogesh, Prasanna Viktor, Energy Management Systems: State of the Art and Emerging Trends, Jan. 2013, IEEE Communications Magazine" (Year: 2013).

"Molderink Albert, Bakker Vincent, Bosman Maurice, Hurink Johann, Smith Gerard, Sep. 2010, IEEE Transactions on SmartGrid vol. 1 No. 2" (Year: 2010).

Automated power exchange. (2000). Energy Markets, 19. Retrieved from http://search.proquest.com/docview/228731930?accountid=14753.

B.J. Kirby, Spinning Reserve from Responsive Loads, Oak Ridge National Laboratory, United States Dept of Energy, Mar. 2003 (54 pages).

Byers J. Risk Management and Monetizing the Commodity Storage Option. Natural Gas & Electricity [serial online]. Jul. 2005; 21 (12):1-8. Available from: Business Source Complete, Ipswich, MA.

C.W. Gellings and W.M. Smith, Integrating Demand-Side Management into Utility Planning, Proceedings of the IEEE, vol. 77, Issue: 6, Jun. 1989, pp. 908-918 (Abstract only).

Cazalet, E. G. & Samuelson, R. D. 2000, "The power market: E-commerce for all electricity products", Public Utilities Fortnightly, vol. 138, No. 3, pp. 42-47.

Chicco, Gianfranco. Load Pattern-Based Classification of Electricity Customers, May 2004, IEEE Transactions on Power Systems, vol. 19, No. 2 (Year: 2004).

Ercot Settlement Metering Operating Guide. Dec. 2010. http://www.ercot.com/mktrules/guides/settlement/201 0/index.

Eric Hirst and Brendan Kirby, Opportunities for Demand Participation in New England Contingency-Reserve Markets, Mew England Demand Response Initiative, Feb. 2003 (15 pages).

Eric Hirst and Richard Cowart, Demand Side Resources and Reliability, New England Demand Response Initiative, Mar. 20, 2002 (32 pages).

Galvin Electricity Institute: Frequently Asked Questions, printed Apr. 23, 2014, same page available through archive.org unchanged Mar. 1, 2008.

GE Digital Energy Residential Electrical Metering Brochure. Sep. 12, 2012. https://web.archive.org/web/20120912144353/http//www.gedigitalenergry.com/products/brochures/1210-Family.pdf.

IDC Energy I. IDC Energy Insights Forecasts 27% Worldwide Growth in the Commercial Smart Building Systems Market. Business Wire (English) [serial online]. 4: Available from: Regional Business News, Ipswich, MA.

Ilinois General Assembly: Public Act 094-0977, Effective Date: Jun. 30, 2006.

Kamat R., Oren S. Two-Settlement Systems for Electricity Markets under Network Uncertainty and Market Power Journal of Regulatory Economics [serial online]. Jan. 2004; 25(1):5-37.

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Lobsenz G. Maryland Regulators Reject BG&E Smart Grid Proposal. Energy Daily [serial online]. Jun. 23, 2010; (118):3. Available from: Business Source Complete, Ipswich, MA.

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

Michael Ahlheim and Friedrich Schneider; "Allowing for Household Preferences in Emission Trading, A Contribution to the Climate Policy Debate"; Environmental and Resource Economics, vol. 21, pp. 317-342; Kluwer Academic Publishers; The Netherlands; 2002.

Moeller, Mar. 15, 2011, NERC, 116 pages.

(56) References Cited

OTHER PUBLICATIONS

Olivier Rousse; "Environmental and economic benefits resulting from citizens' participation in CO.sub.2 emissions trading: An efficient alternative solution to the voluntary compensation of CO.sub.2 emissions", Energy Policy 36 (2008), pp. 388-397; Oct. 29, 2007 (online).
Pablo A. Ruiz and Peter W. Sauer, Valuation of Reserve Services, IEEE Proceedings of the 41 .sup.st Hawaii International Conference on System Sciences, 2008 (9 pages).
Paul Darbee, Insteon Compared, SmartLabs, Inc., Jan. 2, 2006, 69 pages.
Paul Darbee, Insteon The Details, Smarthome, Inc., Aug. 11, 2005, 68 pages.
Thomas, K. 2000, "Energy e-commerce takes off", Energy Markets, vol. 5, No. 4, pp. 26.
Valero Verdu, Sergio. Classification, Filtering, and Identification of Electrical Customer Load Patterns Through the Use of Self-Organizing Maps, Nov. 2006, IEEE Transactions on Power Systems, vol. 21, No. 4 (Year: 2006).
Woolf, Tim, Demand Response Compensation in Organized Wholesale Energy Markets, May 4, 2010, NARUC, 34 pages.
Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).
Rietveld, Get al. "Metrology for Smart Electrical Grids." CPEM 2010. IEEE, 2010. 529-530. Web. (Year: 2010).
Rietveld, Get al. "Realization of a Smart Grid Metrology Infrastructure in Europe." 2012 Conference on Precision Electromagnetic Measurements. IEEE, 2012. 408-409. Web. (Year: 2012).
Building the smart grid; (Jun. 6, 2009). The Economist, 391, 15-S.17. Retrieved from https://www.proquest.com/magazines/building-smart-grid/docview /223986728/se-2?accountid=14753 (Year: 2009).
Navaratne, Uditha Sudheera."Adapting a Commercial Power System Simulator for Smart Grid Based System Study and Vulnerability Assessment" ProQuest Dissertations Publishing, 2012. Print. (Year: 2012).

* cited by examiner

EnergyNet

- EnergyNet is a secure and dynamic marketplace ecosystem enabling energy consumers, distributed generators, utility service providers, equipment providers and application developers to participate in financial and electrical service transactions
- EnergyNet delivers an "app store," real-time communications, real-time financial transactions and data services to all power grid participants
- Major components in operation in San Antonio, TX and Charleston, SC

EnergyNet is a Market Platform Ecosystem

*with an "arms length" interface to existing OT and IT systems*

Real-time Communication

Increase messaging and telecommunications exchange speed among grid elements, existing grid deployments, and intelligent management systems.

Advanced settlement

Deliver rapid payments to market participants and settle transactions with energy markets in days instead of weeks.

Distributed Generation

Enable distributed energy resources to aggregate capacity, generation, or DR to the market level.

Intelligent Analysis

Make decisions and forecasts based on high-velocity, revenue-grade data captured from grid elements, meters, generators, controls, and distribution networks.

FIG. 3

EnergyNet Data Platform:
- REP to generator settlement;
- Financial routing instructions
- Distributed generation price signaling
- Contractual market aggregation
- Market presentment
- Connect generators and consumers on distributed level
- Creates micro markets
- Market participant clearing house for payments with data forecasting and integration
- Merchant and market integration
- Improves and incentivizes renewable energy uptake EnergyNet Customer Instance:
- Installed locally as a physical rack or cloud deployable energy management system
- Commercial consumer data presentment
- Pre-payment
- Data collaboration
- Retail electric provider (REP)
- Customer recruiting
- Behavior recommendations
- Intelligent purchasing
- Bill Optimization
- Electric vehicle network point of sale
- Buy local
- Export your energy into the market

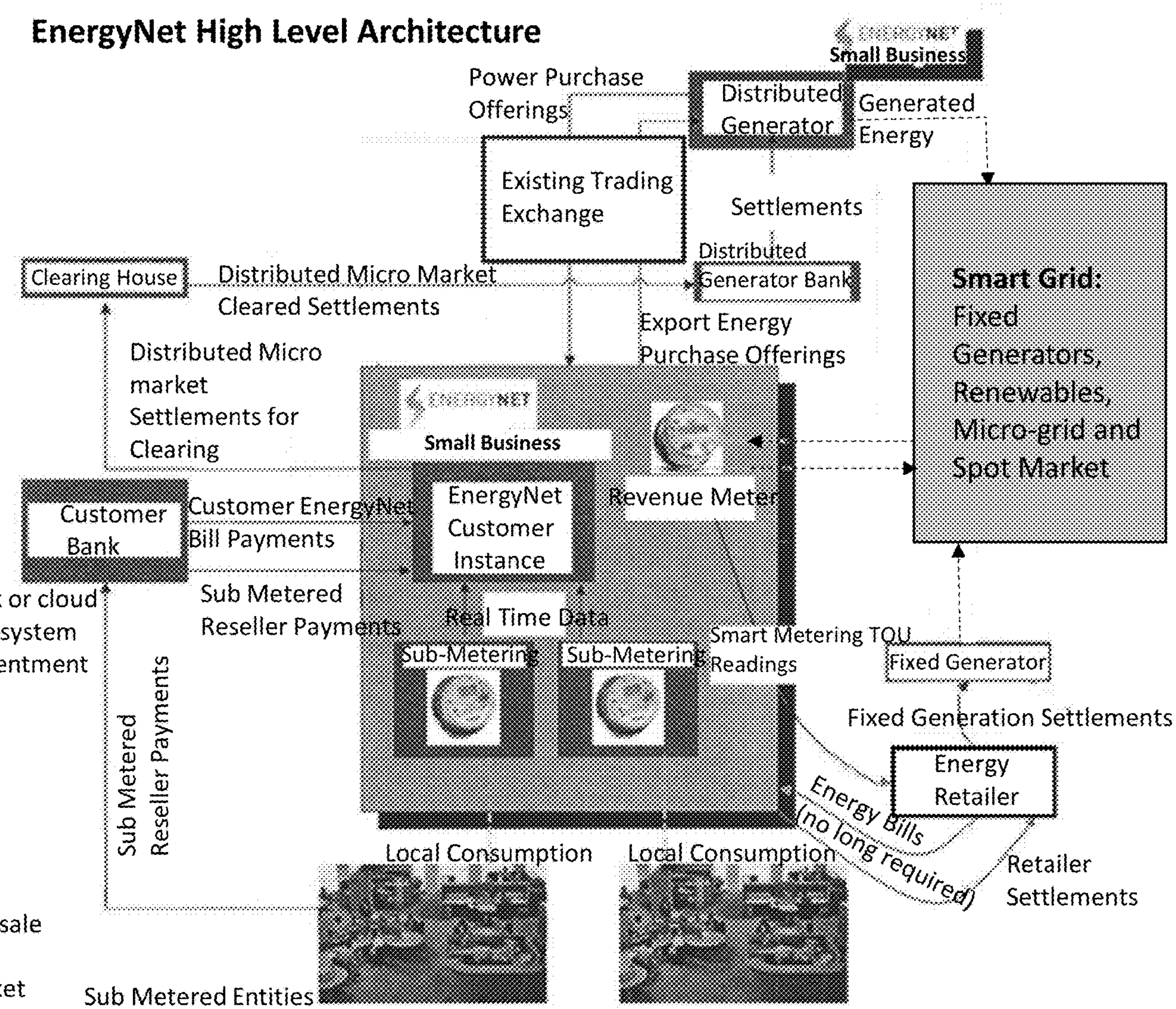

FIG. 15

AMI Head End App

1. Real Time Communication
2. Command and Control
3. Advanced Settlement (Pre-pay)
4. Monitoring and Alarming
5. Distributed PV Generation

Advanced Energy Settlements App

1. Daily Payment and Clearing
2. Bid / Offer pairing between micro generation and consumers
3. Monitoring and Alarming

EnergyNet Application Development Kit

1. Browser Construction and layout, or provide code!
2. Connectivity with all Real Time Communication
3. Connectivity with all Command and Control
4. Connectivity with all Payments and Settlements
5. Connectivity to 3rd Party SOA Services, Enterprises

FIG. 33
Recommendations > Marketplace > Offer
Electric Vehicle Turnkey installation
Your building survey indicated that given the number of occupants & current tax credits in your area, you should investigate installing Electric Vehicle charging spaces. Often times retailers who install EV charging stations often see an increase in traffic. And owners of EV vehicles typically have a high houshold income. Income tax credit equalling 20% of federal credits for PHEVs and BEVs. Additional legislation pending. Source: http://www.pluginamerica.org/incentives
RELATED OFFERS
Self-install your own EnergyNet Gateway
Heating and Air Conditioning Inspection and Tune-Up
Certified Nest installer. Contact us for whole building integration

Find a Station

1. Locate and reserve stations near you now, in advance, or on your GPS itinerary.
2. Target marketing to user profile and priority
3. "Green" app for people focused on recharging
4. "Urban" app for people focused on reserved parking
5. "Healthy" app for people focused on shopping.

Reserve a Station

1. Browse availability, fees, recharge strength, amenities, and nearby services
2. Book your reservation in advance
3. Pre-purchase one time or with subscription.

Arrive at your Station

1. Simply park your car, receive a push notification call to action
2. Purchase via smartphone device or in vehicle dash display
3. New users sign up by GPS Location, QR, RFID, Video, or EV Charger identification.

FIG. 43
Carrier
100% Renewable
Reservation $5.00
-$5.00
$1.26
201457
4:45
Add Time

Enjoy your Parked Time

1. Vehicle recharging status, fees associated, browse offers, order food
2. Easily top-up or extend reservation
3. Discounts and parking validation is automatic by local retailers and marketers
4. Find my car! Video security monitoring. Enjoy your free WiFi videos and games!

Persona: Field Technician

Story: Field Technician installs the EnergyNet Grid Element Photo Capture application on any modern smartphone platform including Apple and Android.

Professional ruggedized devices can be pre-provisioned and shipped to technicians, or techs can use their own commodity equipment available over the counter.

Persona: Field Technician

Story: Field Technician launches the application for the first time and approves the application to record / geotag pictures.

Persona: Field Technician

Story: Field Technician authenticates via single sign-on with cloud service, such as Google, or enterprise service such as Active Directory or SAP.

Persona: Field Technician

Story: Inside the application, the primary function is to take pictures of grid elements, meters, infrastructure, and power bill invoices.

The video camera on the device instantly activates and displays in the view finder the object the smartphone camera is pointed at.

Users press the 'Take Photo' button to capture an image.

Persona: Field Technician

Story: After taking the image, the user is prompted to tag the content with a drop down list of selections, free form text, and optical character recognition review + approval.

Example of this is OCR can be used to automatically detect meter manufacturer brand information, face place data, or LCD real time datapoints.

Persona: Field Technician

Story: After the photo is tagged, the user 'Submits Grid Element' and the image, tagging, description, location, geoTag is all sent to the server side.

FIG. 55
Status
Segment Name
Zip Code
Utility Usage
DERs Sites
Production Potential
Production Use
MicroGrid Configuration
Piermont
Palisades
Blauvelt
Clarkstown
Stony Point
Normal Production
Economic Demand Response
Production Sources
Solar
405
Generators
250
Storage
145
Production vs. Consumption
Production:
Consumption:

FIG. 57
Solar Energy Production
18.80 kW
Current Production
98.53 kWh
Average Daily Production
$14.75
Demand & Use
Real Time Usage
60.28 kW
Current kWh Use
Average kWh Use
25 Flywheel Park: Grid Configuration
Normal Operation
Alternate: Solar
Good
15.86 kW
Utility: Orange & Rockland
Good
$0.320
50.66 kW
Battery Storage
100%
$0.0
0.00 kW

FIG. 58
25 Flywheel Park: Grid Configuration
Normal Operation
Normal Operation
Off-Grid Island
Grid Parallel
Distributed Generation
Demand Response
Black Start Support
Production
Solar Array MircoGrid
$0.150 /kWh
Equipment & Financing
customer cost
profit
1.5 Kw Solar Array
$159.99/mo
23%
Tesla 10 kWh Wall Battery
$49.99/mo
12%
Demand & Use
Real Time Usage
60.28 kW
0
120
0
40
120
Current kWh Use
60.80 kWh
Average kWh Use
58.60 kWh
Current Daily Cost
$112.15
Average Daily Cost
$109.44

Interconnection Processing

- Interconnection Processing: Sales engineer for a DER provider to facilitate interconnection requests / studies

FIG. 60
ENERGYNET
Progress by Site
Address
Production Configuration
Average
Peak
Stage
Time
554 Piermont Ave
20 Panel Solar Array, Storage, Generator
8kW
Tech Review
20 Days
1405 Main St
4 Panel Solar Array
1.5kW
1.5kW
Implementation
65 Days
452 Blauvelt pl, Blauvelt NY
20 Panel Solar Array, 2 Storage
8kW
Tech Review
45 Days
18 Center St, Blauvelt NY
4 Panel Solar Array, storage
1.5kW
Implementation
73 Days
1420 East St, Palisades NY
20 Panel Solar Array, 2 Storage
8kW
Interconnect Review
45 Days
Pre-Approved Production Packages
Solar Packages
Average
Peak
Implemented
Pre-Approved Implemenation Zone
10968

Vendor / Aggregator View

- Vendors can see their portfolio and prospect for new sales

FIG. 65
Service Provider Portal
Top Customer Segments
Search by Zip Code
Status
Segment Name
Zip Code
Buildings
Monthly Production
Utility Usage
Piermont NY
10968
4
Palisades NY
10968
8
Blauvelt NY
10968
Pre-Approved Production Zones
Filter List
Segment Name
Zip Code
Qualified Buildings
Piermont NY
10968
343
Palasades NY
10964
323
Tappan NY
10983
209
Norwood NY
07648
201
Cresskill NY
07626
130
Marketplace: Top Sellers
Item
Total Sales
TED smart meter
212
Digital Energy Audit
145
Backup Generator
23
Marketplace: Top Campaigns
Campaign
Total Opt-ins
Solar Upgrade
2120
Financing
892

Marketplace (Commercial/Industrial/Residential) View

- homeowner or facilities manager to see their energy information, shop for new products/services, manage rate plans, etc

FIG. 71
ENERGYNET
InnoLabs
$0.29 /kWh
$1.33 /SQFT
Compare Buildings
1007 Johnny Dodds
Current Use 68.9 kWh
Average Use 59.3 kWh
134 King St.
Current Use 59.2 kWh
Average Use 61.8 kWh
Drill Analysis: Monthly Cost per SQFT
My Buildings
InnoLabs
134 King St.
Digital Corridor
Raleigh
Recommended Upgrade
Battery Storage
Popular Upgrades
EV Charging Stations
Popular Apps
Usage Predictor

FIG. 72
ENERGYNET
Dashboard | Energy Use | MyGrid | Marketplace | Payments
Add Photos
$0.29 per kWh
$1.33 per SQFT
Current Use
68.9 kWh
Average Use
59.3 kWh
$150.55
Feb Daily Cost
$161.00
March Daily Cost
About 1007 Johnny Dodds Blvd
Size 15,000 SQFT
Type Office Space, Warehouse
1007 Johnny Dodds Blvd, Charleston SC, 20466
Silver LEED Certified, Forced Air HVAC, Backup Generator
My Accounts
1007 Johnny Dodds Blvd
Monitoring Apps
Upgrade Financing: Solar Array
Account Balance $523.68
MyGrid Power Sources
Alternate: Solar Good 15.86 kWh
Utility: SC&G Good 50.66 kWh
Backup Generator Idle 0.00 kWh
There are multiple nearby micro grid producers such as MUSC or McDonald.
EnergyNet Insights
Recommended Upgrade
Battery Storage
Popular Upgrades
EV Charging Stations
Popular Apps
Usage Predictor
See More Upgrades
See More Upgrades
See More Apps

FIG. 73
ENERGYNET
Facility Demand & Energy
68.28 kW
1416.80 kWh
Energy Use
Current Use
Past Use
Compare Buildings
Buildings Similar to Mine
Charleston Digital Corridor
Maritime Center Office
King St. Professional Offices
Meeting St Office
Starbucks - King Street
Weather for Charleston SC
Overcast
68.7° F
87.0%
.2mph
0.00 in
Marketplace Recommendations
Battery Storage
Use by Category
All Other 19.5%
Lighting 10.2%
HVAC 70.3%

FIG. 77
ENERGYNET
Dashboard
Energy Use
MyGrid
Marketplace
Payment
Summary
Upgrades
Alternate Generation
Building Information
Details
Digital Corridor
SE Regional Average
Usage
Average kWh Use
Cost per SQFT
Cost per Occupant
Upgrades & Differences
Smart Thermostats
Backup Generator
Electric Vehicle Station
LEED Certified
Energy Use
Current Use
Past Use
Compare Buildings
Buildings Similar to Mine
Charleston Digital Corridor
Maritime Center Office
King St. Professional Offices
Meeting St Office
Starbucks - King Street

FIG. 83
ENERGYNET
Home
Upgrades
Apps
Services
My Apps
My Account
My Payments
Create an App
Questions? Let's Chat
What's your question?
Energy Choice: Rate Plan Selector
Recommended Plan
SC&G
TOU Rate Plan 11
SC&G
TOU Rate Plan 12
$160.32
Other plans
Cost
All
Renewable
Fixed
Variable
kWh
CARRIER
PLAN NAME
SIMPLIFIED RATE
EST. DAILY COST
SC&G
TOU Rate Plan 10
$160.32
TriEagle
Simple Plan with 40% Renewable
$187.14
Duke Energy
20% Renewable Wind power
$301.68
SC&G
Business Plan 1
$321.59
Duke Energy
Business Plan 3
$356.58
Your Usage Profile
MON
TUE
WED
THU
FRI
SAT
SUN

Financial Settlement View

- Utility back office staff can see a view of revenue streams from EnergyNet platform to utility

ENERGYNET®

DUKE ENERGY PROGRESS

[redacted]
107 DORIC CT
CARY NC 27519-5038

Customer Report
Duke Energy Progress page 1 of 1

| | |
|---|---|
| Account number | [redacted] |
| **Total charges** | **$13.16** |
| **Current charges past due after** | **Apr 7** |
| Previous draft payment | $13.16 |
| Usage period | Feb 10 - Mar 11 |
| This bill was mailed on | March 14, 2016 |

Your account will be drafted for this bill on April 7, 2016. Do not send a check.

Thank you for paying by draft!

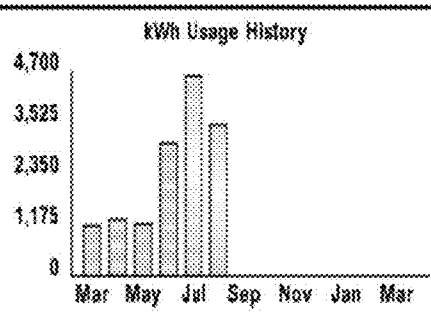

Usage

| | | |
|---|---|---|
| Meter number | | D21177 |
| Readings: Mar 11 | | 56458 |
| Feb 10 | - | 56458 |
| **kWh usage** | | **0** |
| Days in period 30 | Average kWh per day | 0.00 |

Billing
Residential Service rate

| | |
|---|---|
| 10/15 HOUSE - 30 Days | |
| Electric service | 11.13 |
| REPS Adjustment | 1.17 |
| 7% North Carolina sales tax | 0.86 |
| Total charges | $13.16 |

This bill is subject to a 1% per month late payment charge after 04/07/2016.

For your information PIN: [redacted]

FIG. 90A

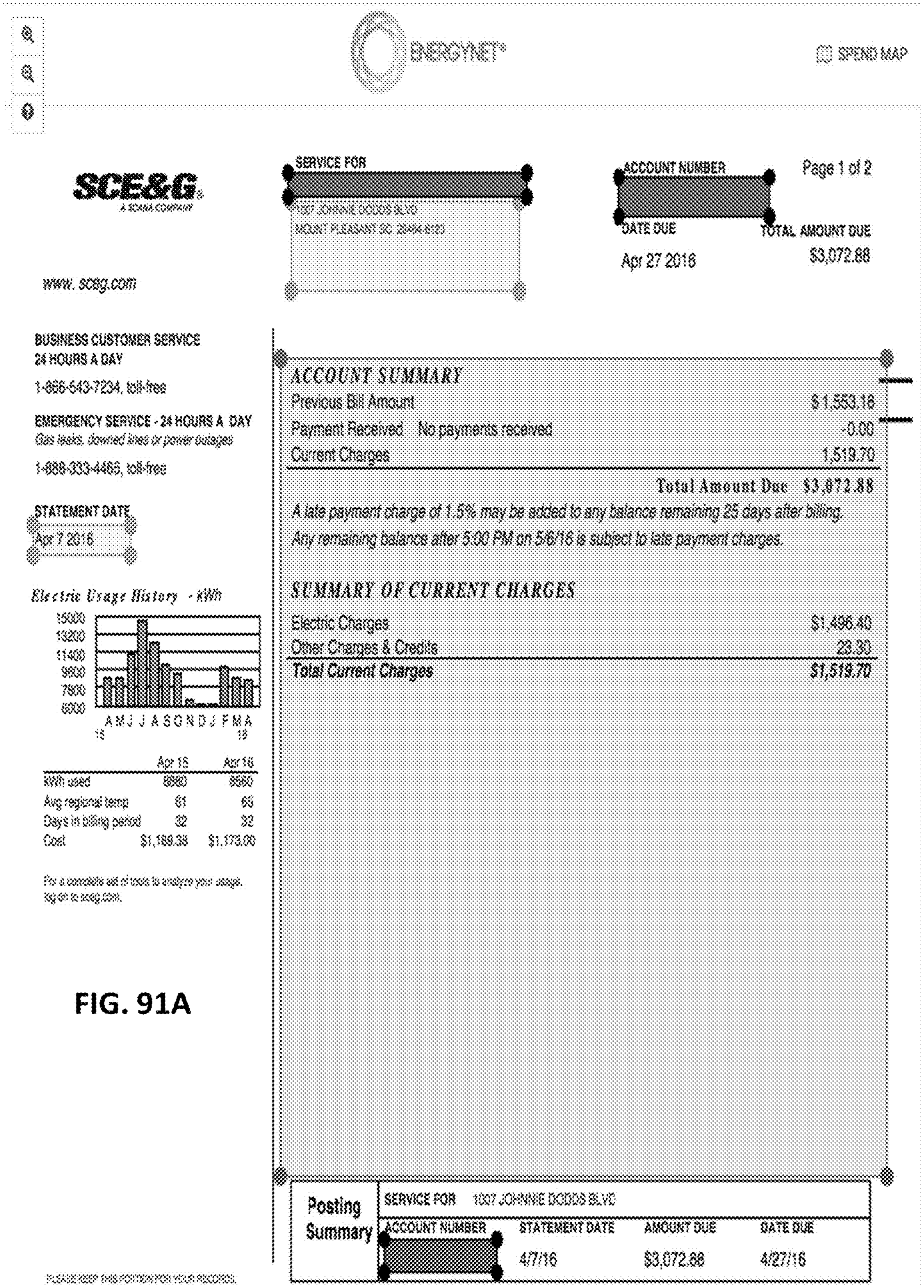

ENERGYNET®

SPEND MAP

SCE&G
A SCANA COMPANY www.sceg.com

SERVICE FOR
[redacted]
1007 JOHNNIE DODDS BLVD
MOUNT PLEASANT SC 29464 8120

ACCOUNT NUMBER
[redacted]

Page 1 of 2

DATE DUE: Apr 27 2016

TOTAL AMOUNT DUE: $3,072.88

BUSINESS CUSTOMER SERVICE
24 HOURS A DAY
1-866-543-7234, toll-free

EMERGENCY SERVICE - 24 HOURS A DAY
*Gas leaks, downed lines or power outages*
1-888-333-4465, toll-free STATEMENT DATE
Apr 7 2016

*Electric Usage History - kWh*

| | Apr 15 | Apr 16 |
|---|---|---|
| KWh used | 8880 | 8560 |
| Avg regional temp | 61 | 65 |
| Days in billing period | 32 | 32 |
| Cost | $1,189.38 | $1,173.00 |

For a complete set of tools to analyze your usage, log on to sceg.com.

ACCOUNT SUMMARY

| | |
|---|---|
| Previous Bill Amount | $1,553.18 |
| Payment Received No payments received | -0.00 |
| Current Charges | 1,519.70 |
| **Total Amount Due** | **$3,072.88** |

*A late payment charge of 1.5% may be added to any balance remaining 25 days after billing.*
*Any remaining balance after 5:00 PM on 5/6/16 is subject to late payment charges.*

SUMMARY OF CURRENT CHARGES

| | |
|---|---|
| Electric Charges | $1,496.40 |
| Other Charges & Credits | 23.30 |
| *Total Current Charges* | *$1,519.70* |

Posting Summary

SERVICE FOR 1007 JOHNNIE DODDS BLVD

| ACCOUNT NUMBER | STATEMENT DATE | AMOUNT DUE | DATE DUE |
|---|---|---|---|
| [redacted] | 4/7/16 | $3,072.88 | 4/27/16 |

PLEASE KEEP THIS PORTION FOR YOUR RECORDS.

FIG. 91A

SYSTEMS AND METHODS FOR ADVANCED ENERGY SETTLEMENTS, NETWORK-BASED MESSAGING, AND APPLICATIONS SUPPORTING THE SAME ON A BLOCKCHAIN PLATFORM

CROSS-REFERENCES TO RELATED APPLICATIONS

This application relates to and claims priority from the following U.S. patent applications. This application is a continuation of U.S. patent application Ser. No. 15/670,903, filed Aug. 7, 2017, which is a continuation-in-part of U.S. patent application Ser. No. 14/518,412 filed Oct. 20, 2014 and issued as U.S. Pat. No. 9,740,227, a continuation-in-part of U.S. patent application Ser. No. 15/644,080, filed Jul. 7, 2017 and issued as U.S. Pat. No. 10,497,073, a continuation-in-part of U.S. patent application Ser. No. 14/918,840 filed Oct. 21, 2015 and issued as U.S. Pat. No. 10,311,416, and a continuation-in-part of U.S. patent application Ser. No. 15/273,088 filed Sep. 22, 2016 and issued as U.S. Pat. No. 10,475,138. U.S. patent application Ser. No. 14/518,412 is a continuation of U.S. patent application Ser. No. 14/290,598 filed May 29, 2014 and issued as U.S. Pat. No. 8,983,669, which is a continuation of U.S. patent application Ser. No. 13/563,535 filed Jul. 31, 2012 and issued as U.S. Pat. No. 9,513,648. U.S. patent application Ser. No. 15/644,080 is a continuation of U.S. patent application Ser. No. 14/610,181 filed Jan. 30, 2015 and issued as U.S. Pat. No. 9,704,206, which is a continuation of U.S. patent application Ser. No. 14/292,418 filed May 30, 2014 and issued as U.S. Pat. No. 8,996,419, which is a continuation of U.S. patent application Ser. No. 14/193,600 filed Feb. 28, 2014 and issued as U.S. Pat. No. 8,775,283, which is a continuation of U.S. patent application Ser. No. 14/050,325 filed Oct. 9, 2013 and issued as U.S. Pat. No. 8,706,583, which is a continuation of U.S. patent application Ser. No. 13/746,703 filed Jan. 22, 2013 and issued as U.S. Pat. No. 8,583,520, which is a continuation of U.S. patent application Ser. No. 13/659,564 filed Oct. 24, 2012 and issued as U.S. Pat. No. 8,849,715. U.S. patent application Ser. No. 14/918,840 claims priority from U.S. Provisional Patent Application No. 62/067,180 filed Oct. 22, 2014. U.S. patent application Ser. No. 15/273,088 claims priority from U.S. Provisional Patent Application No. 62/222,470 filed Sep. 23, 2015. Each of the above-mentioned applications are incorporated herein by reference in their entirety.

BACKGROUND OF THE INVENTION

1. Field of the Invention

The present invention relates to electric power messaging, data aggregation, data formatting, digital contracts and settlements, and more particularly, to advanced energy settlements, contracts, messaging, and applications for electric power supply, load, and/or curtailment and data analytics associated with the same.

2. Description of the Prior Art

Generally, it is known in the prior art to provide electric power systems management including financial settlements and messaging. However, limited information is available to electric power consumers regarding their past, present, and future projected use of power with sufficient details to make informed choices about types of power supply and pricing alternatives. The lack of data is resulted from how the data is collected, who controls the data, and how the data is presented for choices and used for taking actions by an end user. Electric power supply data, power consumption data, market data, capacity, and transmission rights are not generally known by consumers/end users. Furthermore, retail electric providers (REPs) in prior art systems and methods have no access to data and analytics to provide optimal pricing for power supply to business and/or residential electricity customers, and do not have the ability to provide advanced energy settlements to provide the lowest pricing for power supplied at predetermined times, due at least in part to costs associated with obtaining power agreements without visibility to the data and analytics that provides reduced risk of capital and performance associated with the supply and demand sides. Emerging technologies such as blockchain technologies hold promise for solving some of these problems. However, Blockchain as a technology is evolving and the ability to present actionable data to consumers/end users and the market are rudimentary. Different blockchain technologies will emerge over time much in the same way that Internet browsing technologies and browsers did over time.

Examples of prior art documents include the following:

U.S. Pat. No. 6,978,931 for Energy credit card system by inventor Brobeck issued Dec. 27, 2005 describes a method of providing an energy credit system for providing redeemable energy or mass transit credits to consumers who contribute power to a shared electric power grid, wherein at least some of the consumers have their own local renewable energy source connected to the power grid including the steps of measuring the excess power generated by each consumer's energy source that is fed into the electric power grid, awarding energy credits to each of the consumers in relation to the excess power contributed to the electric power grid by the consumer, allowing each consumer receiving the energy credits to redeem them by acquiring fuel, power, or mass transit tickets from a fuel or power provider or mass transit system, and requiring the operator of the electric power grid to compensate the fuel for energy provided or mass transit system in direct relation to the energy credits redeemed by each consumer. Additionally, it claims recording the credits at an energy brokerage house, requiring the operator of the power grid to compensate the brokerage house for the expenses generated by the consumers, and allowing the brokerage house to retain as profit a portion of the compensation received from the operator of the power grid. See also, US Patent Application Publication No. 20040206813.

U.S. Pat. No. 6,900,556 by Provanzana, and assigned on the face of the patent to American Electric Power Company, Inc., for Power load-leveling system and packet electrical storage issued May 31, 2005, describing a large-scale, capacitor-based electrical energy storage and distribution system capable of effectuating load-leveling during periods of peak demand and a cost savings associated with the purchase of electrical energy; and disclosing a method of storing and distributing electrical energy to achieve a cost savings associated with the purchase thereof including the steps of providing a source of electrical energy, providing at least one electrical energy storage capacitor capable of storing a significant amount of energy, the capacitor in communication with the source, providing control equipment adapted to analyze and monitor the real-time cost of purchasing electrical energy from the source and to predict a future cost, supplying an amount of electrical energy to the capacitor to charge it in response to a charge signal from control equipment, discharging at least a portion of the stored energy to a load, and repeating to maximize cost savings; also disclosing deducting the value of the electrical energy sold back to the source for any costs of purchasing energy from the source. See also US Patent Application Pub. No. 20030160595.

US Patent Application Pub. No. 20090177548 for Cooperative environmental and life benefit exchange system by Eisnlohr filed Jan. 9, 2009 and published Jul. 9, 2009 describing a cooperative environmental and life benefit system including a grid transmitting available energy, a plurality of rate payers using energy generated from available energy sources, a plurality of utility companies providing the grid, a plurality of credits redeemable for acquiring one or more of a plurality of life benefits, and an administrator overseeing a redemption process, wherein credits are accumulated by the rate payers based on either a predetermined amount of electrical energy purchased from or sold back to the grid; further describing the redemption process wherein credits accumulated by the payers are redeemed at a redemption rate to provide a redemption value, which is remitted by the rate payers to satisfy benefit cost for acquiring the benefits, or portions thereof.

U.S. Pat. No. 7,274,975 for Optimized energy management system by Miller and assigned to Gridpoint, Inc., issued Sep. 25, 2007 describing methods and systems for optimizing the control of energy supply and demand, including activating battery storage and alternative energy sources to sell energy to the power grid during favorable cost conditions, including method steps for allocating energy at a location where the electrical energy is consumed, with computer-implemented steps of: determining a marginal cost for each of a plurality of energy sources available at the location, at least one of which is a non-grid source of electricity; determining a capacity of electrical energy available from each non-grid energy source; determining a demand for electrical energy at the location; dynamically allocating, in order of lowest marginal cost to highest marginal cost, electrical energy capacity from each of the plurality of energy sources to meet the demand; reducing demand at the location by automatically deferring electrical consumption for a device for which consumption can be deferred from a higher-cost time period to a lower-cost time period, including the computer-implemented step of issuing a command to the device to cause the deferral to occur, and further including determining projected marginal costs in each of a plurality of future time frames and deferring electrical consumption for the device to one of the plurality of future time frames, while conforming to an operational constraint for the device, the operational constraint for the device comprising a maximum time duration for which the device can be switched off; further including step of determining, on the basis of time-varying cost of grid-based electrical energy, whether it is cost-effective to sell electrical energy back to a grid-based source, and if so, automatically initiating such sale; and the step of selling electrical energy from a battery to the grid-based source. See also US Patent Application Pub. Nos. 20110208365, 20070276547, and 20060276938.

U.S. Pat. No. 7,890,436 for Billing and payment methods and systems enabling consumer premises equipment by Kremen and assigned to Clean Power Finance, Inc. issued Feb. 15, 2011 and describes a variety of systems and methods enabling renewable energy consumer premises equipment (CPE) such as dual metering techniques, and disclosing supporting by increasing a likelihood of meeting financing obligations, a consumer purchasing, leasing, installing, and/or maintaining renewable energy CPE for power generation at a consumer premises; coupling the CPE to a power grid operable to receive at least a portion of the power generated by the CPE, measuring power generated by the CPE and delivered onto the power grid of a utility, and processing receivables from the utility associated with the power generated and delivered onto the power grid directly to the lender at times corresponding to power measurement to fulfill the consumer's obligation to repay the loan. See also US Patent App. Pub. Nos. 20080091625, 20080091581, 20080091626, 20080091590, 20080091580.

Thus, there remains a need for improved information, controls, real-time or near-real-time data on power consumption for electric power market participants, REPs, customers, data centers, microgrid owners, and messaging and management of financial settlement therefor.

SUMMARY OF THE INVENTION

The present invention relates to the use of real-time or near real-time data for electric power messaging and settlements, and more particularly, to advanced energy settlements, messaging, and applications for electric power supply, load, and/or curtailment and data analytics associated with the same. The present invention also contemplates the use of blockchain technologies to solve problems associated with transparency, digital contracts, distributed ledgers, consensus, security, and compensation for suppliers and consumers of electric power in a market-based system, such as an Independent System Operator (ISO), an Regional Transmission Operator (RTO), a utility service area as defined by the National Electric Reliability Corporation (NERC), the Federal Energy Regulatory Commission (FERC) or a governing entity responsible for establishing the regulations for the buying and selling of electric power, capacity, demand response or combinations. Systems and methods for ingress of data, aggregation of data, formatting of data, presentation of data or providing data analytics and customer or consumer guidance and controls are provided, and coupled with graphic user interfaces for interactive control and command of grid elements, design, specification, construction, management and financial settlement for any end user or consumer of electric power including commercial, residential, wholesale (brokers), retail electric providers, or any entity authorized by the governing entity to conduct transactions on the electric power grid. Furthermore, specific applications for distributed energy resources, renewable energy, storage devices, electric vehicles, fuel cells or any supply or demand side technologies are provided in data centers and/or microgrids for military, government, business and residence. The present invention also provides power consumption control, management, messaging and settlements, mobile applications, web sites, marketing offers, optimal pricing for comparable energy plans, retail electric provider and direct consumer alternatives, network of power architecture, EnergyNet applications, software development kit(s), application program interfaces (APIs), service oriented architecture (SOA) also known as web services, application web-based storefronts, and combinations thereof.

The present invention provides for systems, methods, and graphic user interface embodiments for providing electric power usage (past, current, and/or future projected) information, management, financial settlements, and messaging, and applications as described herein. In addition, the present invention provides for the use of blockchain technologies that provide for market based electric power usage (past, current, and/or future projected) information collection, management, tokens, financial settlements, alternative currencies such as "crypto currencies", distributed databases, distributed general ledgers and secure messaging distributed amongst coordinators and data processing nodes as described herein.

An advanced energy settlement platform is provided including at least one server computer operable for communication over a network with a multiplicity of distributed computing devices. The platform can also be embedded into grid elements that are physically or logically attached to a power grid, a network appliance, a coordinator and combinations thereof. The advanced energy settlement platform aggregates consumption data from energy customers or their grid elements associated with the customer that contains revenue grade and settlement information and aggregates revenue grade metrology data from distributed generation sources, demand side management devices, renewable energy sources, or consumption data from end users/consumers into settlement blocks. The advanced energy settlement platform is also capable of aggregating supply and consumption data from larger (macro) sources of generation such as combined cycle natural gas, coal, nuclear, utility sized renewable facilities into settlement blocks. The advanced energy settlement platform further aggregates and settles distributed energy charges with distributed generators or logical settlement nodes such as electrical buses (substations), nodal market clearing points as defined by the market and for energy consumers during the billing period through a clearing house that measures, verifies, clears, reconciles and settles the settlement grade or revenue grade data. The advanced energy settlement platform further aggregates and settles fixed energy changes with the energy retailer or retail energy provider for energy customers during the billing period.

In one embodiment, the present invention is directed to systems and methods for financial settlement of transactions within an electric power grid network are disclosed. A multiplicity of active grid elements are constructed and configured for electric connection and network-based communication over a blockchain-based platform. Each of the multiplicity of active grid elements comprises a computing component operatively coupled with a memory. The multiplicity of active grid elements are operable to make peer-to-peer transactions based on their participation within the electric power grid by generating and executing a digital contract; and generate messages autonomously and/or automatically within a predetermined time interval. The messages comprise energy related data and settlement related data. The energy related data of the multiplicity of active grid elements are based on measurement and verification sufficient as defined by the market or grid operator. The energy related data and the settlement related data are validated and recorded on a distributed ledger with a time stamp and a geodetic reference. The data also includes attributes of the grid element, supply or demand side relevant or important for market participation or compliance with market rules.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 illustrates EnergyNet features in the present invention.

FIG. 15 shows a schematic diagram illustrating a high-level system architecture for an EnergyNet embodiment according to the present invention.

FIGS. 90A and 90B are screenshots of a utility bill verification for an electric bill. FIG. 90A is the left side of the screen and FIG. 90B is the right side of the screen.

FIGS. 91A and 91B are screenshots of a utility bill verification for an electric and gas bill. FIG. 91A is the left side of the screen and FIG. 91B is the right side of the screen.

DETAILED DESCRIPTION

Figure 1:
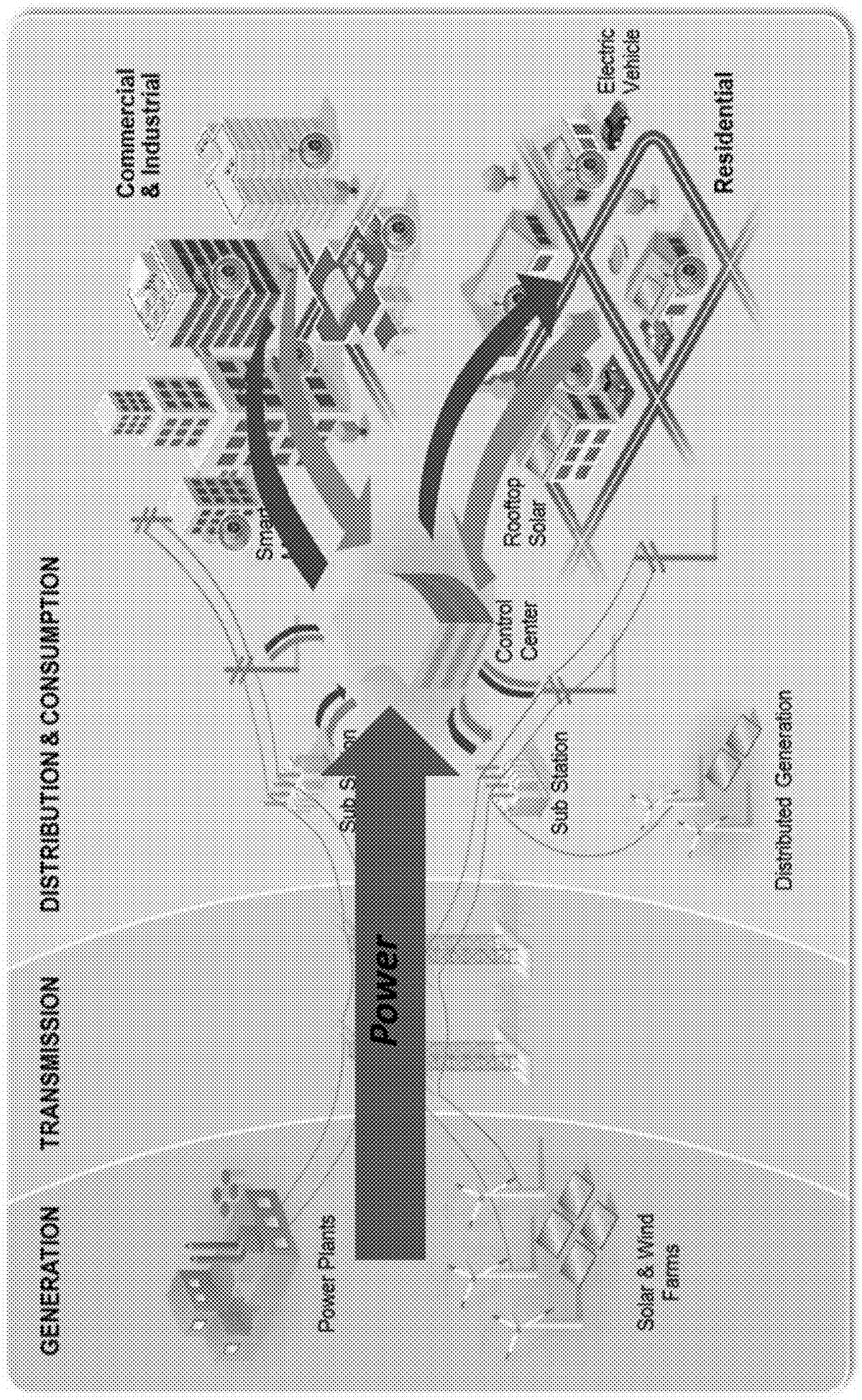
FIG. 1 illustrates an electric power grid in the present invention.

Referring now to the drawings in general, the illustrations are for the purpose of describing preferred embodiment(s) of the invention at this time, and are not intended to limit the invention thereto. Any and all text associated with the figures as illustrated is hereby incorporated by reference in this detailed description.

The present invention relates to the use of real-time or near real-time data for electric power messaging and settlements, and more particularly, to advanced energy settlements, messaging, and applications for electric power supply, load, and/or curtailment and data analytics associated with the same. The present invention also contemplates the use of blockchain technologies to solve problems associated with transparency, digital contracts, distributed ledgers, consensus, security, and compensation for suppliers and consumers of electric power in a market-based system, such as an Independent System Operator (ISO), an Regional Transmission Operator (RTO), a utility service area as defined by the National Electric Reliability Corporation (NERC), the Federal Energy Regulatory Commission (FERC) or a governing entity responsible for establishing the regulations for the buying and selling of electric power, capacity, demand response or combinations. Systems and methods for ingress of data, aggregation of data, formatting of data, presentation of data or providing data analytics and customer or consumer guidance and controls are provided, and coupled with graphic user interfaces for interactive control and command of grid elements, design, specification, construction, management and financial settlement for any end user or consumer of electric power including commercial, residential, wholesale (brokers), retail electric providers, or any entity authorized by the governing entity to conduct transactions on the electric power grid. Furthermore, specific applications for distributed energy resources, renewable energy, storage devices, electric vehicles, fuel cells or any supply or demand side technologies are provided in data centers and/or microgrids for military, government, business and residence. The present invention also provides power consumption control, management, messaging and settlements, mobile applications, web sites, marketing offers, optimal pricing for comparable energy plans, retail electric provider and direct consumer alternatives, network of power architecture, EnergyNet applications, software development kit(s), application program interfaces (APIs), service oriented architecture (SOA) also known as web services, application web-based storefronts, and combinations thereof.

The present invention provides for systems, methods, and graphic user interface embodiments for providing electric power usage (past, current, and/or future projected) information, management, financial settlements, and messaging, and applications as described herein. In addition, the present invention provides for the use of blockchain technologies that provide for market based electric power usage (past, current, and/or future projected) information collection, management, tokens, financial settlements, alternative currencies such as "crypto currencies", distributed databases, distributed general ledgers and secure messaging distributed amongst coordinators and data processing nodes as described herein.

An advanced energy settlement platform is provided including at least one server computer operable for communication over a network with a multiplicity of distributed computing devices. The platform can also be embedded into grid elements that are physically or logically attached to a power grid, a network appliance, a coordinator and combinations thereof. The advanced energy settlement platform aggregates consumption data from energy customers or their grid elements associated with the customer that contains revenue grade and settlement information and aggregates revenue grade metrology data from distributed generation sources, demand side management devices, renewable energy sources, or consumption data from end users/consumers into settlement blocks. The advanced energy settlement platform is also capable of aggregating supply and consumption data from larger (macro) sources of generation such as combined cycle natural gas, coal, nuclear, utility sized renewable facilities into settlement blocks. The advanced energy settlement platform further aggregates and settles distributed energy charges with distributed generators or logical settlement nodes such as electrical buses (substations), nodal market clearing points as defined by the market and for energy consumers during the billing period through a clearing house that measures, verifies, clears, reconciles and settles the settlement grade or revenue grade data. The advanced energy settlement platform further aggregates and settles fixed energy changes with the energy retailer or retail energy provider for energy customers during the billing period.

In one embodiment, the present invention is directed to systems and methods for financial settlement of transactions within an electric power grid network are disclosed. A multiplicity of active grid elements are constructed and configured for electric connection and network-based communication over a blockchain-based platform. Each of the multiplicity of active grid elements comprises a computing component operatively coupled with a memory. The multiplicity of active grid elements are operable to make peer-to-peer transactions based on their participation within the electric power grid by generating and executing a digital contract; and generate messages autonomously and/or automatically within a predetermined time interval. The messages comprise energy related data and settlement related data. The energy related data of the multiplicity of active grid elements are based on measurement and verification sufficient as defined by the market or grid operator. The energy related data and the settlement related data are validated and recorded on a distributed ledger with a time stamp and a geodetic reference. The data also includes attributes of the grid element, supply or demand side relevant or important for market participation or compliance with market rules.

The present invention provides systems and methods for data analysis, messaging, advanced energy settlements, command and control and management of electric power supply, demand, and/or curtailment including graphic user interface for consumers, including consumer profiles and alternative pricing programs and/or settlement programs for business and residential applications, including but not limited to graphic user interfaces for interactive control and command of grid elements, design, specification, construction, management and financial settlement for data centers and/or microgrids, business and residential power consumption, control, management, messaging and settlements, mobile applications, web sites, marketing offers, optimal pricing for comparable energy plans, retail electric provider and direct consumer alternatives, network of power architecture, EnergyNet applications, software development kit, application web-based storefronts, and combinations thereof. Apparatus embodiments are also provided in accordance with the systems and methods described herein.

Furthermore, novel methods of the present invention provided for consumer guidance and controls are coupled with graphic user interfaces for mobile applications, web sites, and computer displays that provide improved information and controls for consumers for electric power consumption and management of financial settlement therefor.

In the description of the present invention, it will be understood that all EnergyNet embodiments and AES systems and methods descriptions include and incorporate by this reference without regard to individual, specific recitation for each example described, real-time and/or near-real-time data, including revenue grade metrology or revenue grade metrology equivalent (RGME) as defined herein, used for AES financial settlements. Additionally and similarly, real-time communication, messaging, and data packet transfer is provided over at least one network associated with the advanced energy settlement platform of the systems and methods of the present invention.

This detailed description of the present invention includes energy financial settlements and messaging and/or data packet transfer or transmission, including the following issued patents, copending application publications, and/or copending non-published applications by common inventor and/or assignee Causam Energy, Inc.: U.S. Pat. Nos. 8,849,715, 8,583,520, 8,595,094, 8,719,125, 8,706,583, 8,706,584, 2014/0180884, U.S. Pat. Nos. 8,775,283, 8,768,799, 2014/0279326, WO2014/066087, 2014/0039699, 2014/0277788, 2014/0039701, U.S. Pat. Nos. 8,588,991, 8,761,952, 2014/0277786, 2014/0277787, WO2014/022596, 2014/0039699, U.S. Pat. Nos. 8,849,715, 8,983,669, Ser. No. 14/885,525, each of which is incorporated by reference in its entirety herein.

FIG. 1 illustrates an overall electric power grid. Traditionally, it is largely One-Way Power Network from generation to transmission to distribution and consumption. The present invention reconstructs the traditional market and enables new market participants, including residential customers, and commercial and industrial customers. Residential customers may have their own power generation system (for example but not limited to rooftop solar systems) and their energy storage devices (for example but not limited to electric vehicles). Commercial and industrial buildings have smart meters installed, but also utilize revenue grade or settlement grade sub-meters to provide the data necessary to participate and utilize the advanced energy settlements platform.

Figure 2:
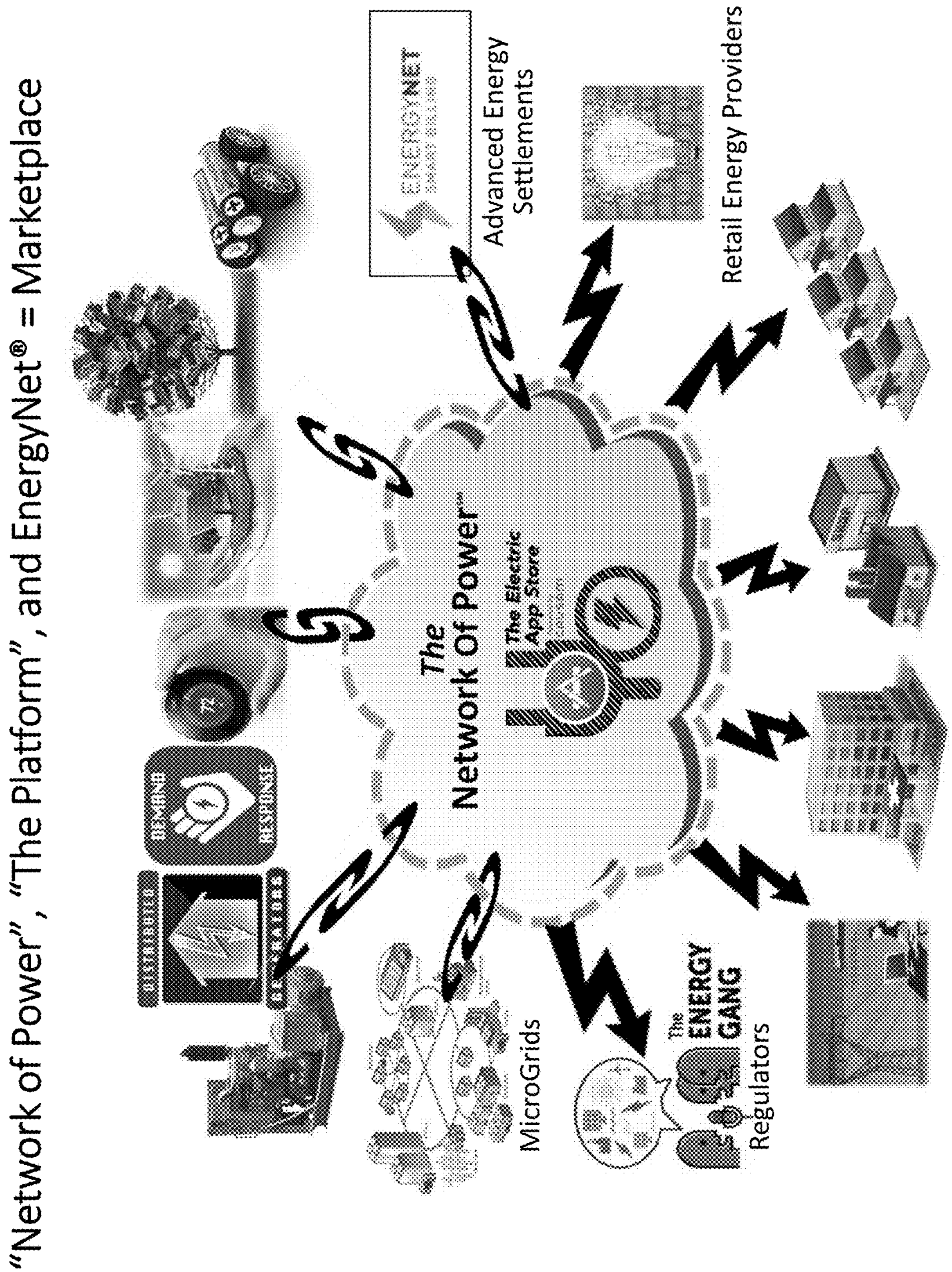
FIG. 2 illustrates a network of power with all the participants and the EnergyNet Platform in the present invention.

FIG. 2 is a network of power with all the participants and the EnergyNet Platform in the present invention. Different market participants are connected to the network of power with specific Application programs from an electric app store over an EnergyNet platform. The EnergyNet platform also provides advanced energy settlements for different market participants.

FIG. 3 illustrates EnergyNet features in the present invention. EnergyNet is a secure and dynamic marketplace ecosystem enabling energy consumers, distributed generators, utility service providers, equipment providers and application developers to participate in financial and electrical service transactions. EnergyNet delivers an "app store," real-time communications, real-time financial transactions and data services to all power grid participants. EnergyNet is a market platform ecosystems with an "arm's length" interface to existing OT and IT systems. Real-time communication increases messaging and telecommunications exchange speed among grid elements, existing grid deployments, and intelligent management systems. Advanced settlements deliver rapid payments to market participants and settle transactions with energy markets in days instead of weeks; enables distributed energy resources to aggregate capacity, generation, or DR to the market level; and provides intelligent analysis including making decisions and forecasting based on high-velocity, revenue-grade data capture from grid elements, meters, generators, controls, and distribution networks.

Figure 4:
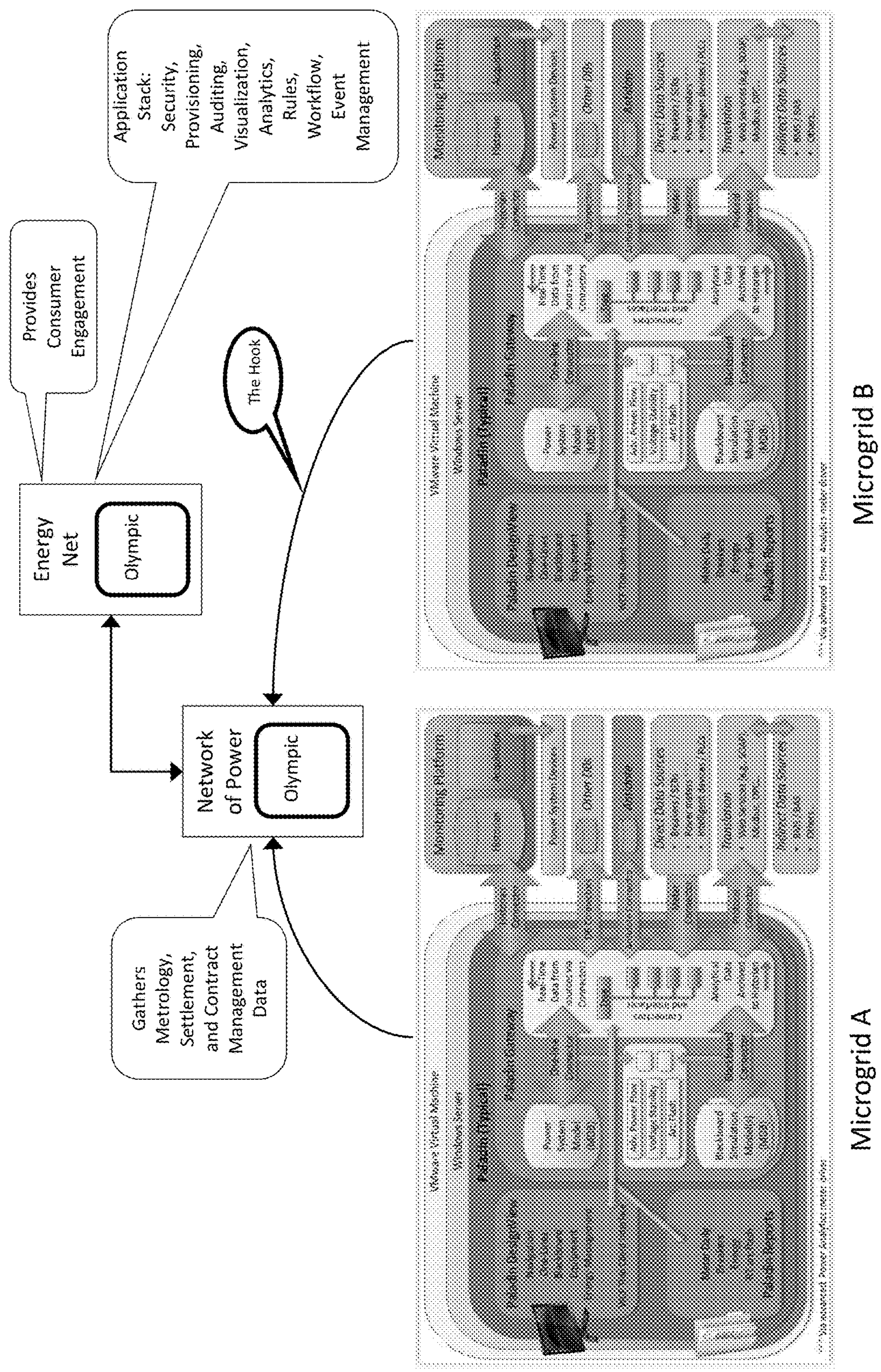
FIG. 4 illustrates an embodiment of a network of microgrids integrated with an EnergyNet platform.

FIG. 4 is a diagram of a microgrid integration. There are two microgrids, Microgrid A and Microgrid B, electrically and communicatively integrated to a network of power. An EnergyNet platform is coupled to the network of power. A detailed structure of Microgrid A and Microgrid B are illustrated in the two modules respectively. The network of power gathers metrology, settlement and contract management data from Microgrid A and Microgrid B. The EnergyNet platform has its application stack including security, provisioning, auditing, visualization, analytics, rules, workflow, event management. The EnergyNet platform provides consumer engagement.

Figure 5:
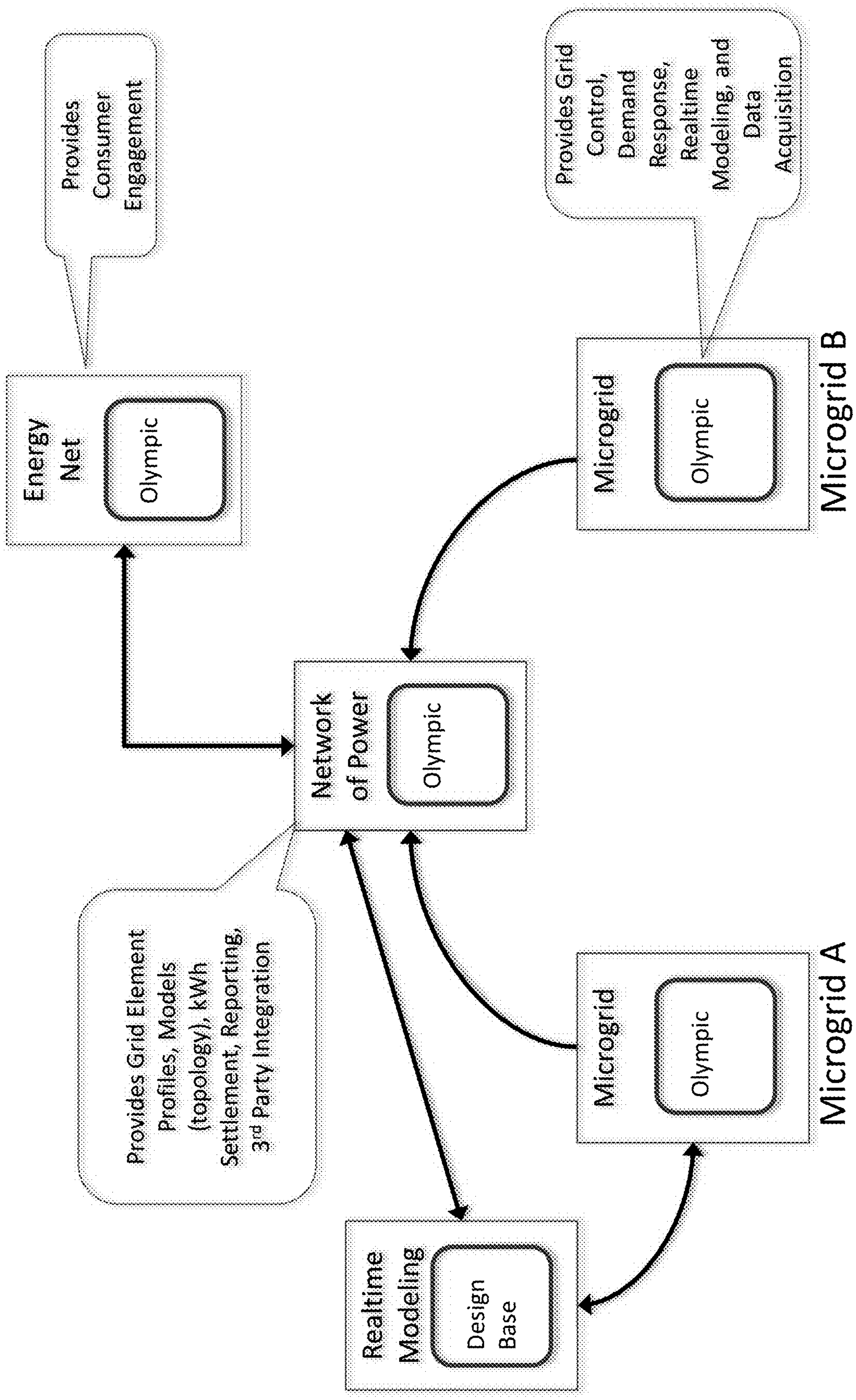
FIG. 5 illustrates another embodiment of a network of power microgrids integrated with an EnergyNet platform.

FIG. 5 is another diagram of microgrid integration. There are two microgrids, Microgrid A and Microgrid B. Microgrid B is electrically and communicatively integrated to a network of power, and provides grid control, demand response, real-time modeling, and data acquisition. Microgrid A is externally linked to a real-time modelling module. Both Microgrid A and the real-time model module are connected to the network of power for providing grid control, demand response, real-time modeling, and data acquisition. The network of power provides grid element profiles, models/topologies, kWh settlement, reporting, and third party integration. The network of power is coupled with an EnergyNet platform, which provides consumer engagement.

Figure 6:
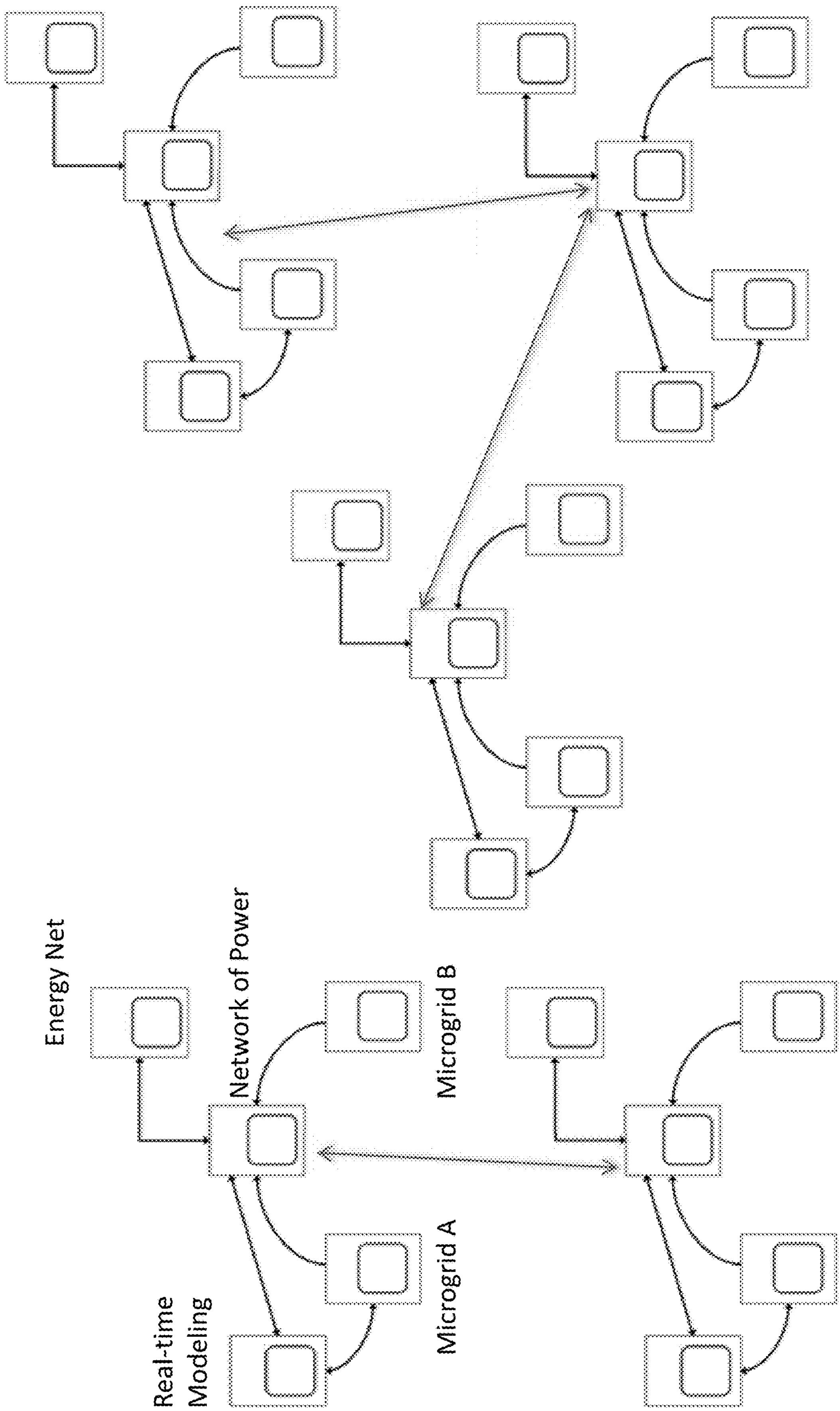
FIG. 6 is a scheme diagram of Federated Microgrid Communities comprising different grid zones.

FIG. 6 is a scheme diagram of Federated Microgrid Communities. These microgrid communities are located in different grid zones. Each of the microgrid communities has a structure shown in FIG. 5. There are communication links among different microgrid communities within a grid zone.

The present invention includes a multiplicity of interactive graphic user interface (GUI) for all aspects of AES and/or EnergyNet embodiments. By way of example and not limitation, as illustrated in the figures, at least one GUI is provided for electric power consumption for business or commercial facilities, including information and/or controls wherein the GUI is provided for mobile applications, websites, terminal and/or computer displays, and combinations thereof. For mobile applications, one embodiment includes a mobile communication computer device, such as a smartphone, tablet computer, or other mobile smart interactive communications device (personal/wearable or portable), having an application including software operable on a processor coupled with memory, wherein the mobile communication computer device is constructed and configured for network-based communication within a cloud-based computing system as illustrated in FIG. 7.

Figure 7:
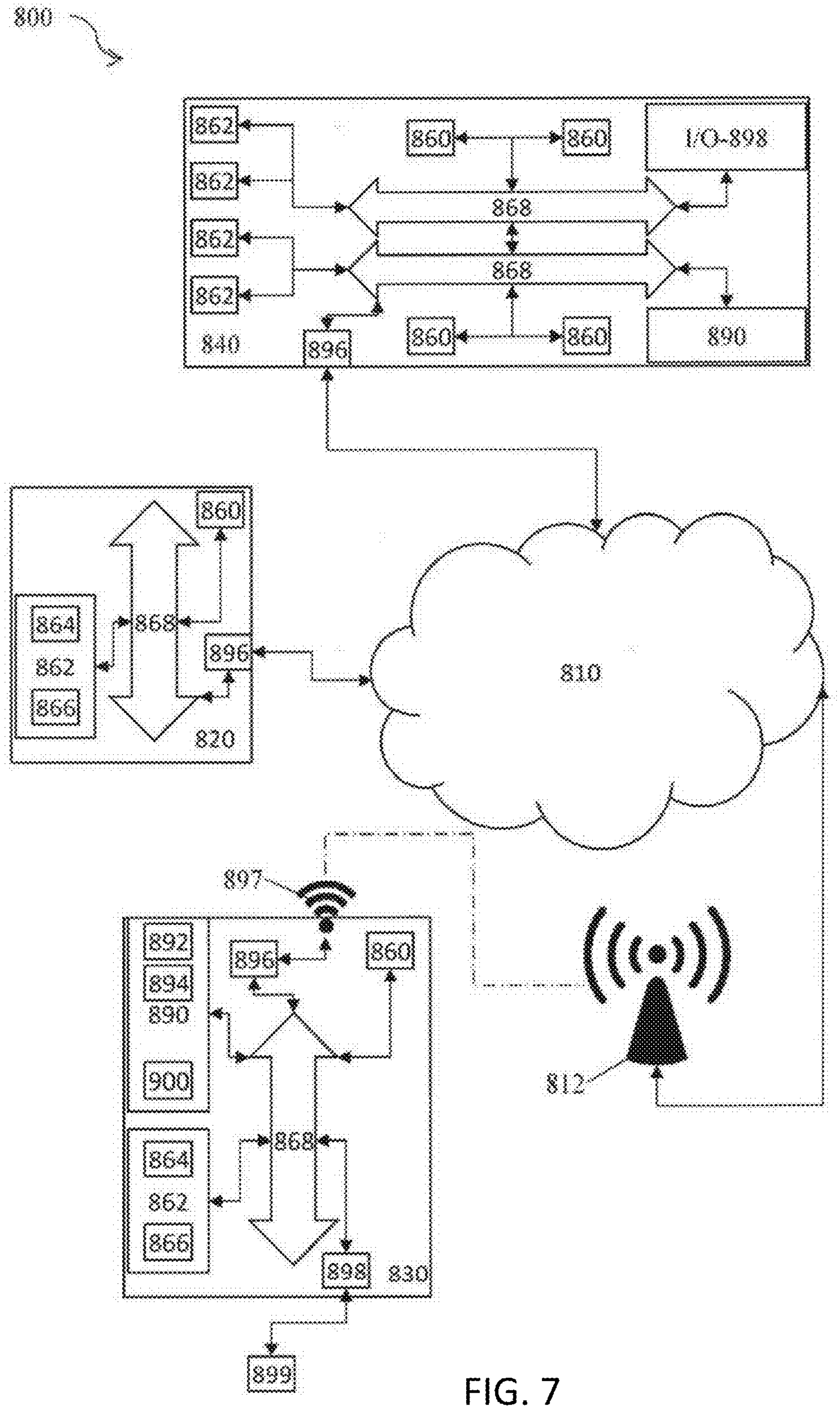
FIG. 7 illustrates a schematic diagram of an embodiment showing a configuration for a cloud-based computing system for user interface with the systems of the present invention.

FIG. 7 is a schematic diagram of an embodiment of the invention illustrating a computer system, generally described as 800, having a network 810 and a plurality of computing devices 820, 830, 840. In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, a personal digital assistant (PDA), a smart phone, a desktop computer, a netbook computer, a tablet computer, a workstation, a laptop, a wearable computing device, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information. Also included are embedded and open source program languages, machine language that can be executed at the coordinator, server, the end device, and combinations thereof.

In another implementation, shown as 840 in FIG. 7, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function or hardware appliances or discrete hardware devices that are capable of performing the tasks described herein.

According to various embodiments, the computer system 800 may operate in a networked environment using logical connections to local and/or remote computing devices 820, 830, and 840 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media, including modulation across the power lines, modulated carrier signals along or across power lines, distribution or transmission subsystems, and combinations thereof. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 7, may include other components that are not explicitly shown in FIG. 7 or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the application (e.g., smartphone app) automatically provides information via the GUI associated with the app to indicate to the user (consumer) information about electric pricing plan alternatives, including but not limited to their location, the price for electric power supply on any per unit (data center, microgrid, building (commercial or residential), facility, device, grid element, and combinations thereof) for a duration and/or at a predetermined time, and combinations thereof. Also, preferably the app GUI provides additional information including marketing and advertising information about any merchants, products, and/or services associated with or related to their profile(s), power usage, activities within the system, and combinations thereof. Also preferably, the app GUI provides an interactive interface allowing inputs to be received for generating at least one account and corresponding profile, advanced energy settlements selections, etc. In one embodiment of the present invention, the received inputs are associated with a consumer or user profile that is stored on the smartphone and/or in a database associated with a server computer and/or cloud-based computing system with at least one server computer and at least one database having remote inputs and outputs via the data and communications network, preferably via secure access and/or secure messaging for authorized users associated with the at least one account. Data centers are interconnected to form a secure SaaS, localized interdependently operated subsystems are connected for autonomous operations if disconnected from the SaaS or cloud-based system. Components must be virtualized through VMware, open source equivalent, etc. even if they are going into the same logical node and running through same EMS or microgrid EMS or microgrid power management solution (MPMS). If a microgrid is 100 Watt or of regulated size, then it is subject to performance and liability regulations from FERC, NERC, ISO, governing entity, etc. Cloud-based system must be separated at or above that level.

In a virtualized or cloud-based computing system and methods of the present invention, the following components are provided as illustrated by way of example and not limitation to those described in FIG. 7. Components of a cloud-based computing system and network for distributed communication therewith by mobile communication devices include but are not limited to a system including a server computer with a processing unit. The server is constructed, configured and coupled to enable communication over a network. The server provides for user interconnection with the server over the network using a remote computer device or a personal computer (PC) or smartphone, tablet computer, etc. positioned remotely from the server. Furthermore, the system is operable for a multiplicity of remote personal computers or terminals for example, in a client-server architecture, as shown. Alternatively, a user may interconnect through the network using a user device such as a personal digital assistant (PDA), mobile communication device, such as by way of example and not limitation, a mobile phone, a cell phone, smart phone, tablet computer, laptop computer, netbook, a terminal, in car computer, or any other computing device suitable for network connection. Also, alternative architectures may be used instead of the client/server architecture. For example, a computer communications network, or other suitable architecture may be used. The network may be the Internet, an intranet, or any other network suitable for searching, obtaining, and/or using information and/or communications. The system of the present invention further includes an operating system installed and running on the server, enabling server to communicate through network 810 with the remote, distributed user devices. The operating system may be any operating system known in the art that is suitable for network communication.

Figure 8:
FIG. 8 illustrates method steps for providing advanced energy settlements (AES) according to one embodiment of the present invention.

FIG. 8 illustrates method steps for providing advanced energy settlements (AES) according to one embodiment of the present invention. A settlement AES process is outlined in six distinct steps as follows: Revenue grade settlement block data is used to underpin the settlement process for the billing period e.g. daily, weekly, monthly or predict and pay; Settlement block data is mapped to the appropriate distributed or fixed energy power purchase agreement in effect at that point in time; the cost or pricing of each settlement block inclusive of Time of Use (TOU), demand, taxes, access fees and energy charges is calculated; a customer balance is summated from all the settlement blocks that apply within the period is and automatically collected from the customer; Distributed energy charges billed in the cycle are aggregated by generator and settled through the clearing house for activities by the distributed generators and/or at least one customer; Fixed energy charges billed in the cycle are aggregated and settled with the energy retailer or REP for the delivery of power by the Transmission/Distribution Service Provider (TDSP).

The EnergyNet data platform used with AES preferably provides and/or is operable for real time revenue grade data ingress; store and organize packet level information that can be used for forecasting, data mining, revenue extraction, event detection, sophisticated energy management and enterprise integration purposes; aggregate and store revenue data into revenue grade settlement blocks (or Power Trading Blocks (PTBs)); connect microgrid and spot market buyers and sellers; provide a fully automated and high latency industry leading settlement process underpinned by a distributed settlement rules engine capable of settling with both distributed and fixed generator market participants; provide an automated payment exchange which supports all advanced billing models (shared data plan, daily plan and predict & pay); payments should be managed as single energy bills for customers with EnergyNet responsible for settlement payments between multiple distributed energy generators and the customers' existing energy retailer; provide a real time energy purchasing solution that matches the customers' real energy consumption against energy currently available within the microgrid or spot market; capture and transform market data that can provide intelligent analytics by generators for trending, forecasting, planning and maximising revenue/investment opportunities; capture and transform energy data that can provide intelligent analytics for customers energy management, forecasting, procurement, profiling, bill optimization and recommendation purposes; and integrate with the existing distributed energy market exchange to allow EnergyNet buyers and sellers to connect and agree prices on distributed generation or curtailment, with revenue grade metrology or with a revenue grade metrology equivalent (RGME) that provides data within less than about 10% variation from revenue grade metrology as required by the utility or governing entity for the electric power grid management and settlement, wherein the RGME is provided by a lower accuracy device and/or derived by data from the lower accuracy device combined with historical data or other complex rules and billing determinants, to generate the RGME that is approved or accepted for financial settlement based upon contracts, digital contracts, or virtual contracts between and among at least two entities in connection with the financial settlement for those grid elements having RGME. For example RTU is a non-revenue grade device but is used for energy auditing, or as a starting point for disputing payments within prior art systems for financial settlement and energy settlement. In the systems and methods of the present invention, RGME mechanism provides data that the buyer and seller agree to accept for settlement, including financial and energy settlement for DER, load control, curtailment, and combinations, and including line losses. For interconnected devices, i.e., power supplying or power consuming devices that share the same interconnection for the electric power grid, the agreements between the parties provide for energy settlement and the corresponding market-based financial settlement for the electric power generated or consumed, including RGME instead of traditional revenue grade metrology as required by the utility or governing entity of the electric power grid.

Figure 14:
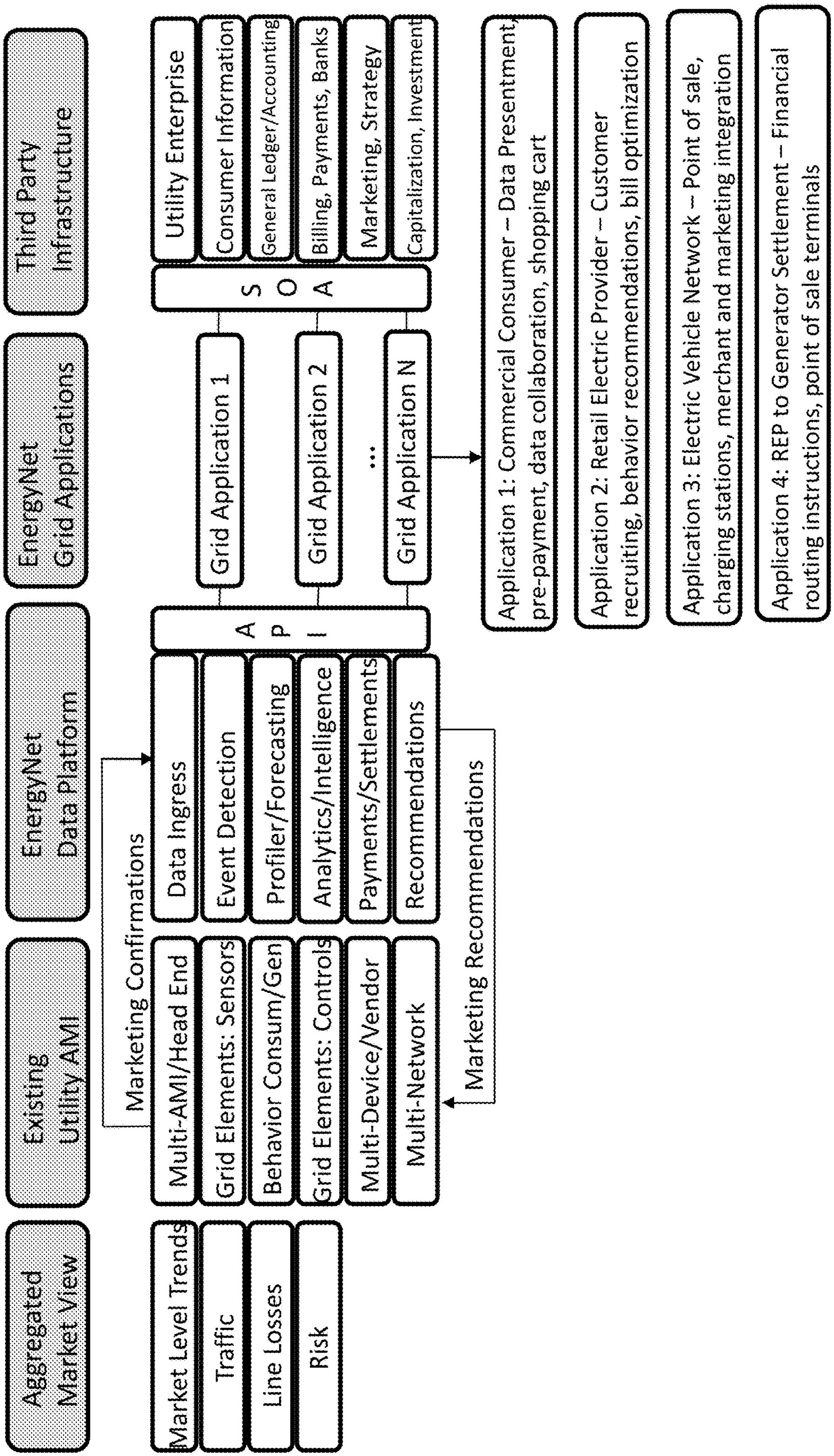
FIG. 14 is a schematic diagram illustrating a grid application model of the systems and methods of the present invention.

As illustrated in FIG. 14, EnergyNet grid applications ensure that the EnergyNet framework is operable to support 1:n grid applications. Third party infrastructure may provide Service-Oriented Architecture (SOA) integration with utility and/or market participant enterprise systems; provide SOA integration with general ledger and accounting systems; and/or provide SOA integration with the financial, banking and clearing infrastructure, as needed.

Figure 9:
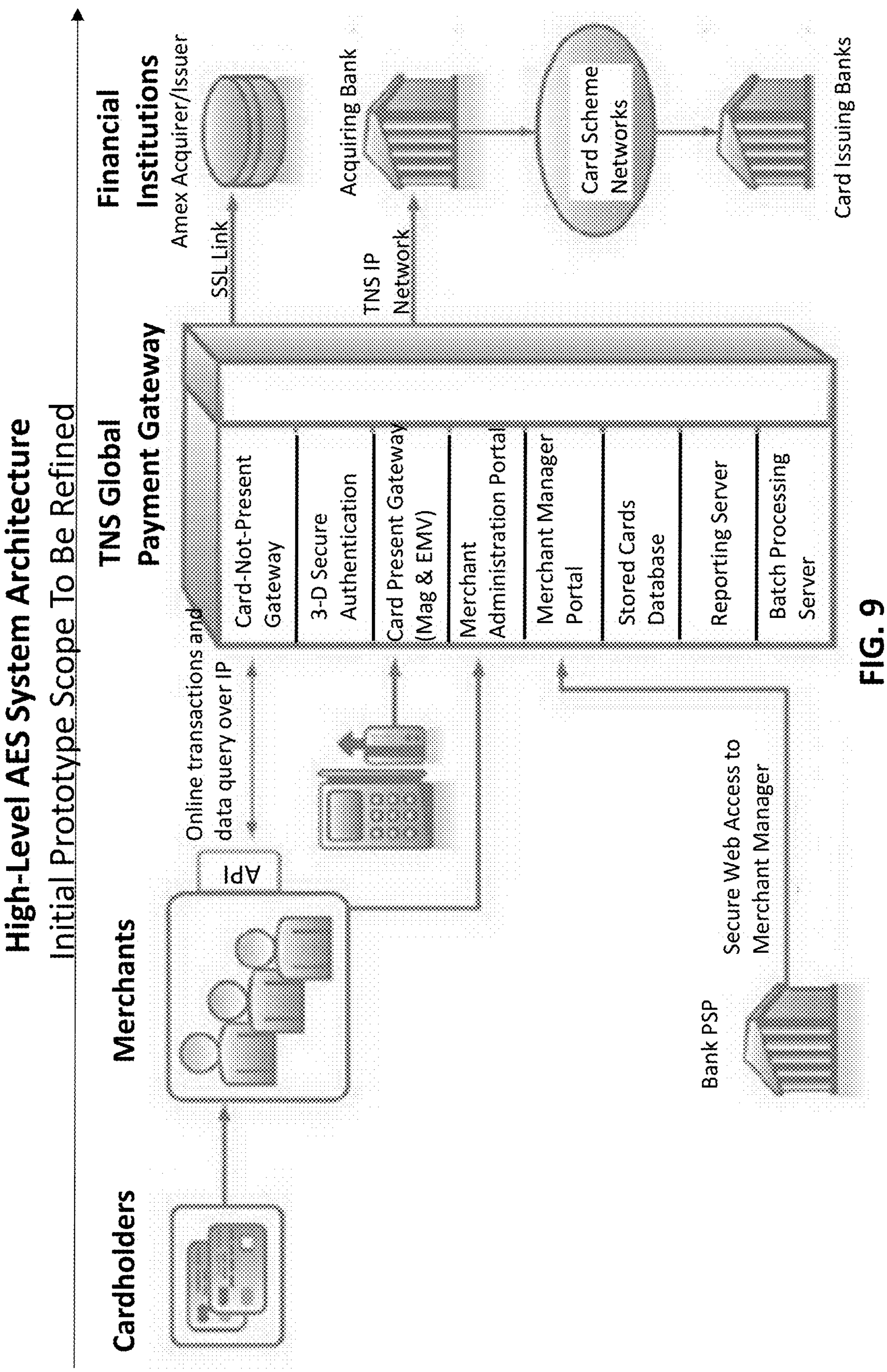
FIG. 9 shows a schematic diagram illustrating a high-level AES system architecture according to the present invention.
Figure 16:
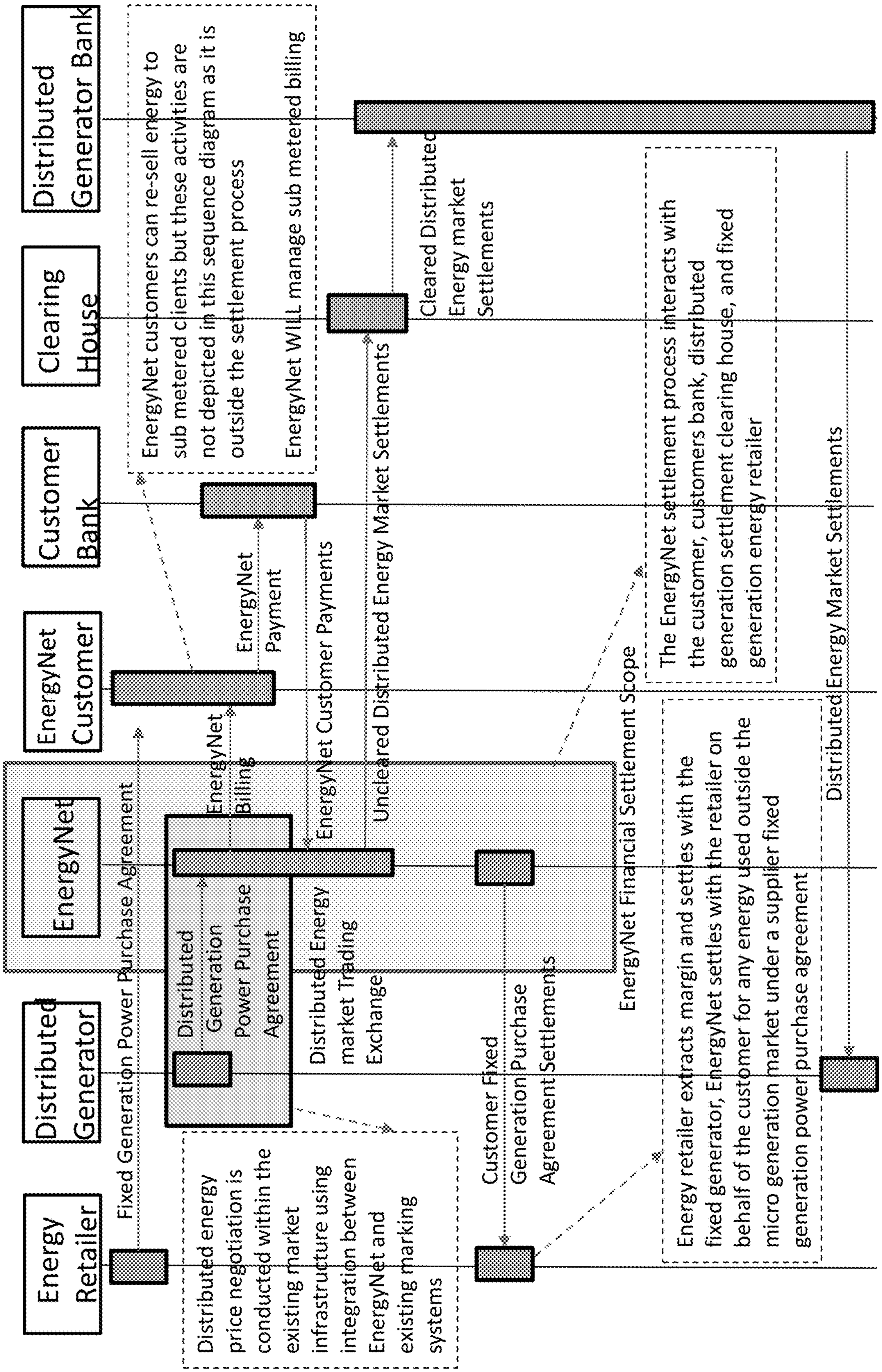
FIG. 16 is a schematic and flow diagram illustrating AES sequencing.

FIG. 9 shows a schematic diagram illustrating a high-level AES system architecture according to the present invention. It illustrates a VisaNet platform to demonstrate AES for the power sector. The primary revenue formula includes percentage of settlement transaction fee as in traditional VisaNet Model and platform sales to RTO/ISO with O&M at annual rate (20%-25%). The secondary revenue includes per settlement transaction fee of $0.01/transaction (est. 600 MM/day) bi-lateral and sales of basic analytics services and other settlement capabilities. The downstream potential includes: Big Data analytics fees for advanced security assessments and other analyses; other opportunities for banks and energy companies to collaborate on future business transactions (e.g., credit scoring); "VisaNet for the Power Grid," which significantly reduces transaction costs for customers and market participants; provides near real-time settlement, for example, one to two days for 90% of transactions; provides a scalable solution to handle high volume and velocity; and a solution for the future when a massive increase in scale of distributed generation and discrete local points are anticipated. The principal actors and data flows depicted in FIG. 9 and FIGS. 15 and 16 are as follows for EnergyNet embodiments: Customers receive near real time market connection data and price signals giving visibility to generation as it becomes available in the market. This data is used by EnergyNet to facilitate intelligent energy purchasing and settlement between all market participants; Distributed generation availability in the form of power purchase offerings is received from Distributed Generators ensuring that intelligent energy purchasing decisions can be automated or recommended within a real time market. Customers with a generation capacity can also act as generators through EnergyNet if they have an exportable capacity; Payments received from the Customer Bank represent consolidated single payments to EnergyNet for energy supplied from their existing Energy Retailer or from Distributed Generators; Settlements are apportioned across revenue grade TOU meter readings over a billing period and internal usage is measured through real time sub metering technology at 1 second intervals and/or near-real-time or real-time. Sub-metered entities are considered as follows: EnergyNet supports the billing of sub-metered occupants allowing the EnergyNet customer to re-sell or cross charge energy using the sub metered meter readings. The EnergyNet customer instance will allow these energy costs to be recovered against the enterprises total energy consumption. Distributed generation suppliers are included as follows: Market participants publish power purchase offerings to EnergyNet customers. This data is used by EnergyNet to facilitate intelligent energy purchasing. Excess energy capacity can also be offered to the market by customers using EnergyNet. The distributed generator/generation supplier participants receive settlements from the Distributed Generator Bank or financial settlement entity (non-bank); distributed generator receives cleared settlements for all energy consumed within the billing timelines specified in the distributed power purchase agreements of EnergyNet customers. A clearinghouse receives all un cleared distributed energy settlements made through EnergyNet's, point of sale devices or advanced billing methods before passing the cleared settlements to the Generator Bank or financial settlement entity (non-bank entity). Customer Payments received from the Customer Bank represent consolidated single payments for energy purchased on the both the distributed and fixed generation market. EnergyNet performs all settlement activities for all participants behind the single bill; EnergyNet can also manage the payments for energy re-sold or cross charged by the customer. This can be viewed and analysed against the imported energy bill. The distributed generator bank receives aggregated and cleared settlements from the Clearinghouse for distributed energy that was consumed within each power purchase agreement held by EnergyNet customers. An energy retailer or REP is included as follows in one EnergyNet embodiment: Customers can still consume energy supplied by fixed generators outside the spot energy or micro market and the portion of a customer's consumption that resides within their fixed generation power purchase agreement will be settled with the retailer. The settlement algorithms resolve this using settlement blocks, all power purchase agreements in place and revenue grade meter reads. Purchasing within the spot market requires prices to be negotiated and agreed in seconds and these activities require integration with existing market trading systems. A growing customer base would allow EnergyNet to provide a complete trading market between users in the future. The purchasing rules engine criteria allows generators respond to customer preferences and offer a variety of different tariffs as wells as alter their own behavior e.g. if they are a customer/generator can they shift their highest usage off peak and export excess energy at peak periods when demand and prices are higher.

Figure 10:
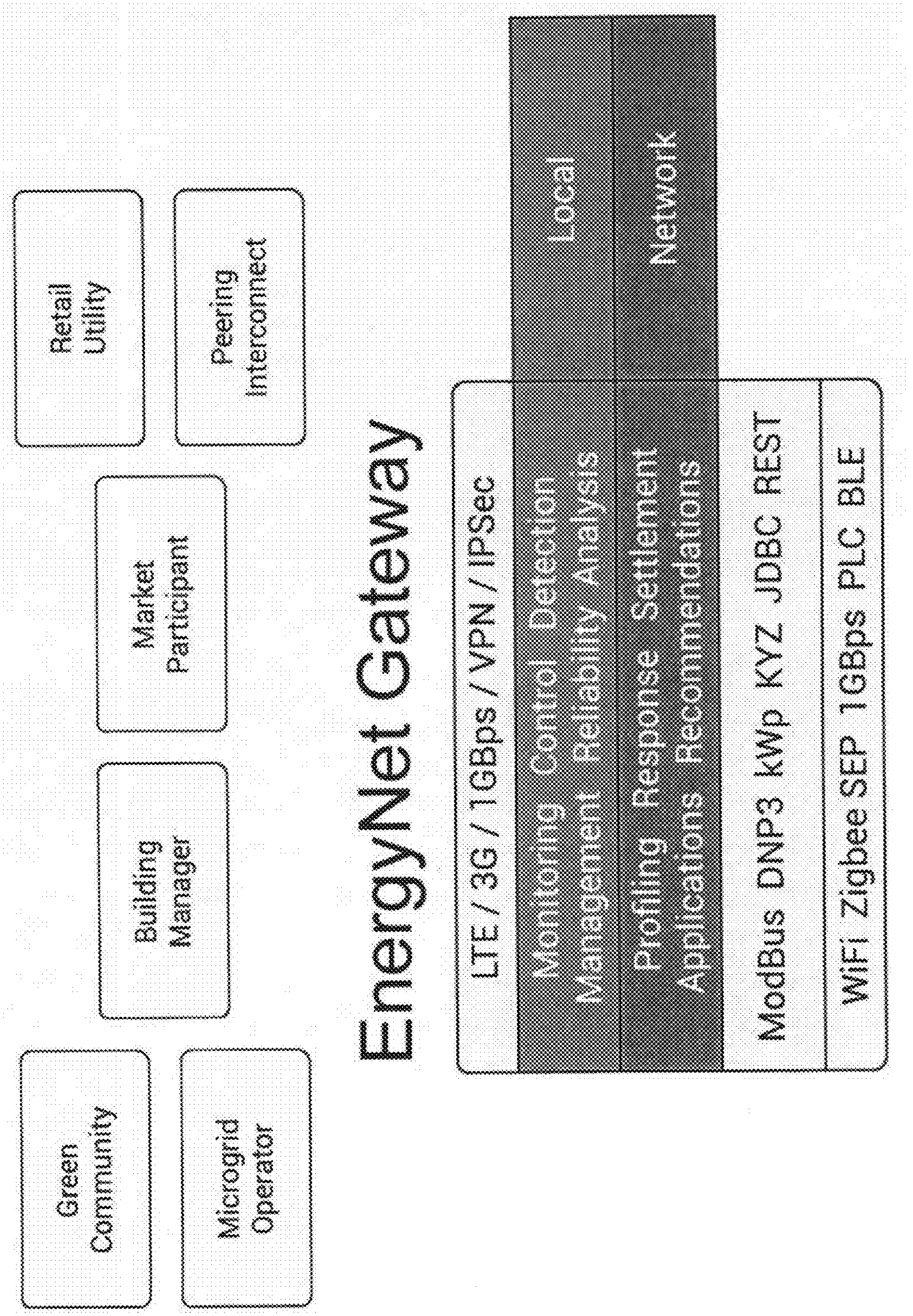
FIG. 10 is a schematic diagram illustrating an exemplary EnergyNet gateway according to the present invention.

FIG. 10 is a schematic diagram illustrating an exemplary EnergyNet gateway according to the present invention. The EnergyNet gateway in the present invention connects different participants having different network protocols to the advanced energy settlement platform. The different participants comprise green communities, microgrid operators, building managers, market participants, and retail utilities. The EnergyNet gateway is also used for peering interconnections. Different communication protocols/standards supported by the EnergyNet gateway include but not limited to LTE, 3G, 1 GBps, VPN, IPSec, ModBus, DNP3, kWp, KYZ, JDBC, REST, WiFi, Zigbee, SEP, 1 GBps, PLC, BLE. At local level, the EnergyNet gateway is operable for monitoring, control detection, management, and reliability analysis. At network level, the EnergyNet gateway is operable for profiling response settlement and applications recommendations.

Figure 11:
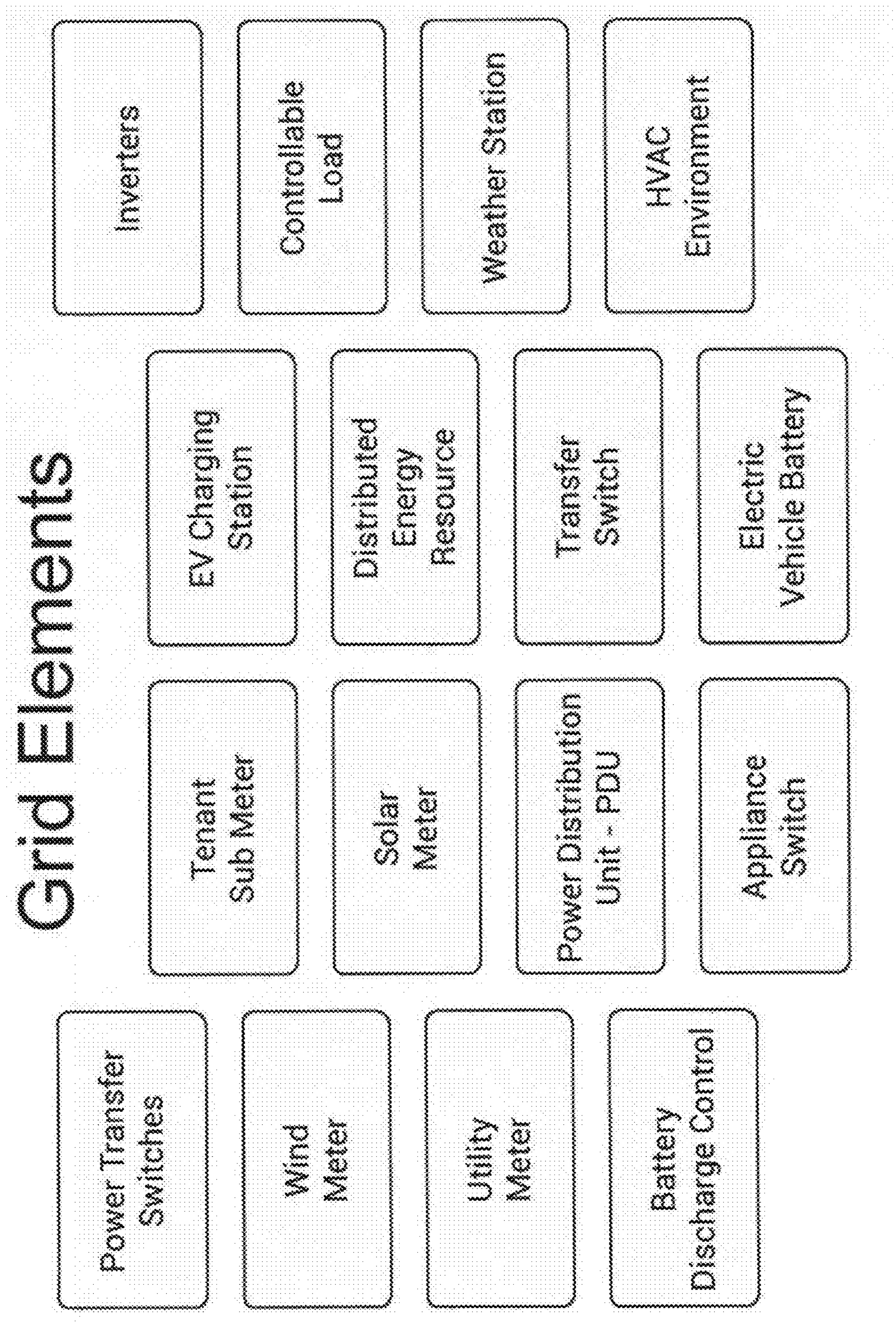
FIG. 11 is a schematic diagram illustrating a partial selection of exemplary grid elements according to the present invention.

FIG. 11 is a schematic diagram illustrating a partial selection of exemplary grid elements according to the present invention. The grid elements can be power transfer switches, wind meters, utility meters, battery discharge controllers, tenant sub meters, solar meters, power distribution units (PDUs), appliance switches, EV charging stations, distributed energy resources (DERs), transfer switches, EV batteries, battery storage solutions other than EVs, inverters, controllable loads, weather stations, and HVAC environments.

Figure 12:
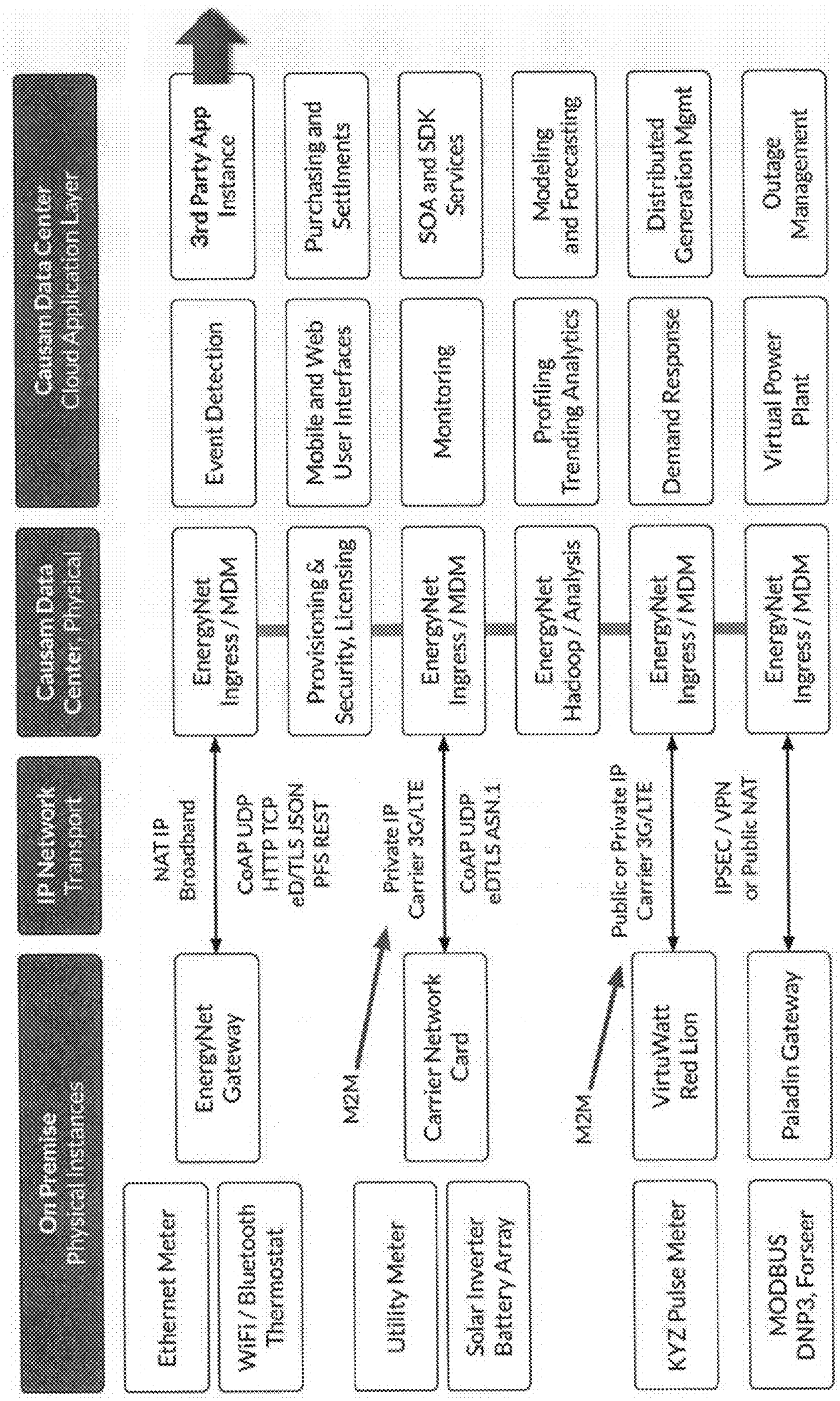
FIG. 12 is a schematic diagram illustrating components of the systems and methods of the present invention.
Figure 13:
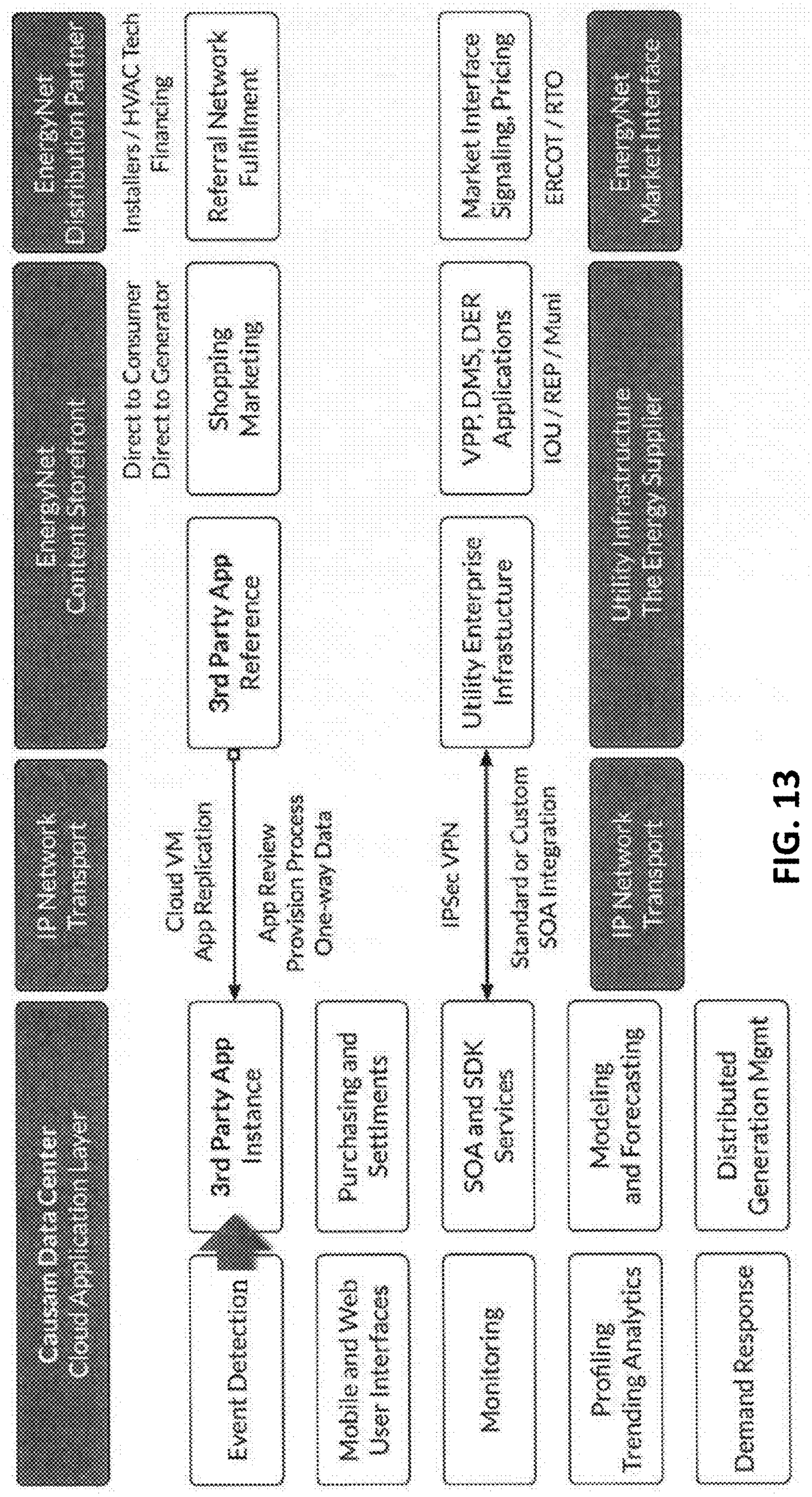
FIG. 13 is a schematic diagram illustrating components of the systems and methods of the present invention.

FIGS. 12 and 13 is a schematic diagram illustrating components of the systems and methods of the present invention. The systems of the present invention include on premise physical instances, IP network, a Causam data center, EnergyNet Content Storefront, and EnergyNet Distribution Partner, EnergyNet Market Interface, and Utility Infrastructure at the Energy Supplier. The on premise physical instances such as EnergyNet gateway, carrier network card, VirtuWatt Red Lion, Paladin gateway are present at Ethernet meters, WiFi/Bluetooth thermostats, utility meters, solar inverter battery array, KYZ Pulse meters, MODBUS DNP3 Foreseer, for IP network connection. The Causam data center has a physical layer includes EnergyNet Ingress for meter data management (MDM), provisioning, security and licensing, and EnergyNet distributed databases (for example: Hadoop) for analysis. The Causam data center further includes a cloud application layer providing event detection, third party App instance, mobile and web user interface, purchasing and settlements, monitoring, Service-Oriented Architecture (SOA) and Software Development Kit (SDK) services, profiling trending analytics, modeling and forecasting, demand response, distributed generation management, virtual power plant (VPP), and outage management. The EnergyNet Content Storefront provides third party App reference, which has one-way communication to the third party App instance in the Causam data center for cloud Virtual Machine (VM), App replication, App review, and provision process. The EnergyNet Content Storefront also provides shopping and marketing directed to consumer and generator. The EnergyNet Distribution Partner includes installers, HVAC technicians, and financing institutions, which are referrals for network fulfilment. The EnergyNet Market Interface connects with regulation agencies, for example ERCOT and other RTOs, for signaling and pricing. The Energy Supplier can be IOU, REP, and/or Municipal power agencies. The Utility Infrastructure at the Energy Supplier provides applications, such as VPP, Distribution Management System (DMS), and DER applications, and Utility Enterprise Infrastructure. The Utility Enterprise Infrastructure communicates with the SOA and SDK services at the Causam data center via IPSec and/or VPN for standard or customer SOA integration. FIG. 14 is a schematic diagram illustrating a grid application model of the systems and methods of the present invention. The EnergyNet Grid Application Model includes aggregated market view, existing utility AMI, EnergyNet Data Platform, EnergyNet Grid Applications, and Third Party Infrastructure. The Aggregated Market View provides information such as market level trends, traffic, line losses, and risk. The Existing Utility AMI includes multi-AMI for head end systems, grid elements for sensing, grid elements for controlling, multi-devices/vendors, and multi-network. The EnergyNet Data Platform provides API for data ingress, event detection, profiling and forecasting, analytics and intelligence, payments and settlements, recommendations. The multi-AMI for head end systems in the existing utility AMI provides marketing confirmation to data ingress on the EnergyNet Data Platform. The recommendations provided by the EnergyNet Data Platform are marketing recommendations provided to multi-network in the existing Utility AMI. EnergyNet Grid Applications include multiple grid applications. For example, grid application 1 is for data presentment, pre-payment, data collaborations, shopping carts for commercial consumers, grid application 2 is for customer recruiting, behavior recommendations, bill optimization for retail electric provider; grid application 3 is for point of sale, charging stations, merchant and marketing integration for electric vehicle network; grid application 4 is for financial routing instructions, point of sale terminals for REP to generator settlement, etc. Third Party Infrastructure includes SOA for utility enterprise, consumer information, general ledger, accounting, billing, payment, banks, marketing, strategy, capitalization and investment.

FIG. 15 shows a schematic diagram illustrating a high-level system architecture for an EnergyNet embodiment according to the present invention. This high-level system architecture includes a customer deployable distributed EnergyNet Customer Instance providing customers with a complete energy management, purchasing and settlement solution within the microgrid and spot generation market for AES. FIG. 16 is a schematic and flow diagram illustrating AES sequencing; there are four key elements within the EnergyNet enterprise financial settlement product: data ingress, market participation, payments collection and advanced energy settlements. Intelligent purchasing decisions require advanced smart metering and EnergyNet uses high speed IP metering technology to build a complete and real time energy consumption profile aggregated from multiple sub-metering points. All consumption data within the enterprise forms settlement blocks, which are used to drive the billing and settlement process. All metering data is aggregated to provide a real time settlement block and total enterprise consumption view with drill down. This data forms the basis for billing, settlement, forecasting, market view and other analytical transformations. Aggregation of multiple distributed nodes and/or microgrids into logical nodes for interconnection with the utility or main power grid and for settlement at those nodes is also provided. Note that EnergyNet can also utilize less dynamic data from legacy meters and head end systems where a customer investment in conventional sub metering has already been made. In some markets, carbon credit and renewable energy credits are "self-reported" through data input directly to forms via a web site interface or through manual data input methods. While sub-optimal, this data can be utilized if it is acceptable to the governing entity. Profiling is an important element for customers to forecast future usage and committing to purchase offerings. Time of Use (TOU) and/or demand profiles created from base data are an important tool for customers and generators alike; industry standard profiling techniques can be used to create profiles. Generators can use profiles to price their products and plan their generation activities. Customers can use them to ensure they commit to the power purchase offerings that are best aligned with their anticipated usage.

Buyers and sellers of electric power are connected within the microgrid or spot market associated with AES of the present invention. Buyers can expose their generated capacity to customers in near real time and customers can make intelligent purchasing decisions based upon actionable real time data. The Advanced Energy Settlement (AES) process performs all billing, payment and settlement activities with financial and clearing participants. A configurable market purchasing rules engine ranks and selects energy from the market based on customer preferences such as cost, payment preference, locality, how green the energy, market supply, consumption etc. and may recommend purchasing from one or more suppliers. The suitability of the offering also depends on additional factors such as any minimum and maximum usage constraints which requires decisions to be made based upon forecasts derived using historical data and profiling stored within EnergyNet.

Figure 17:
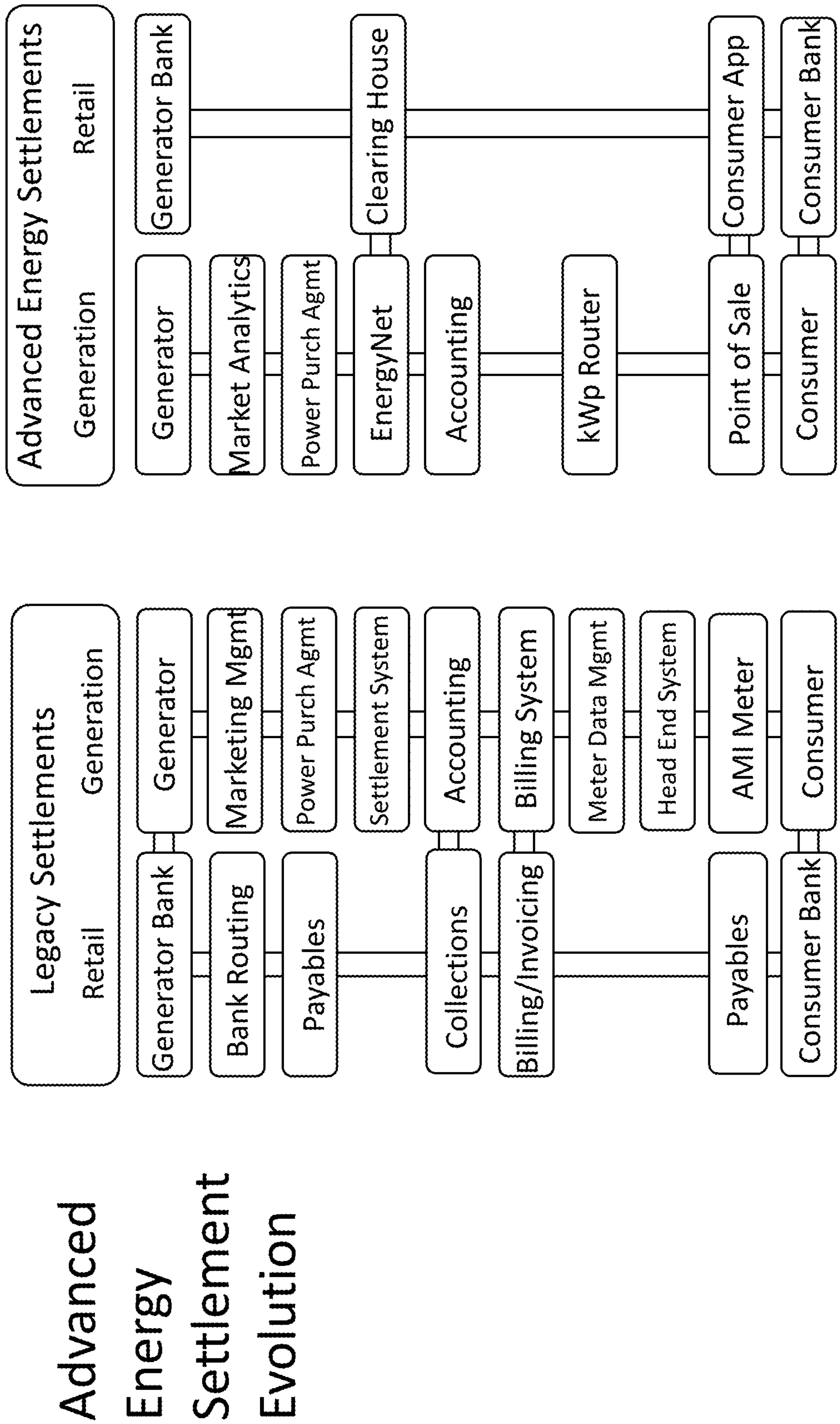
FIG. 17 is a schematic diagram illustrating AES evolution for the systems and methods of the present invention.

FIG. 17 is a schematic diagram illustrating AES evolution for the systems and methods of the present invention. Comparing to legacy settlements, the advanced energy settlements in the present invention has an EnergyNet Platform communicates with a clearing house, which does the settlements between the generator bank and the consumer bank besides simpler communications and less participants.

Certain Apps are provided for different participants in the advanced energy settlement systems. These Apps are operable for command and control, advanced settlement, monitoring and alarming, etc. via real time communication.

Figure 18:
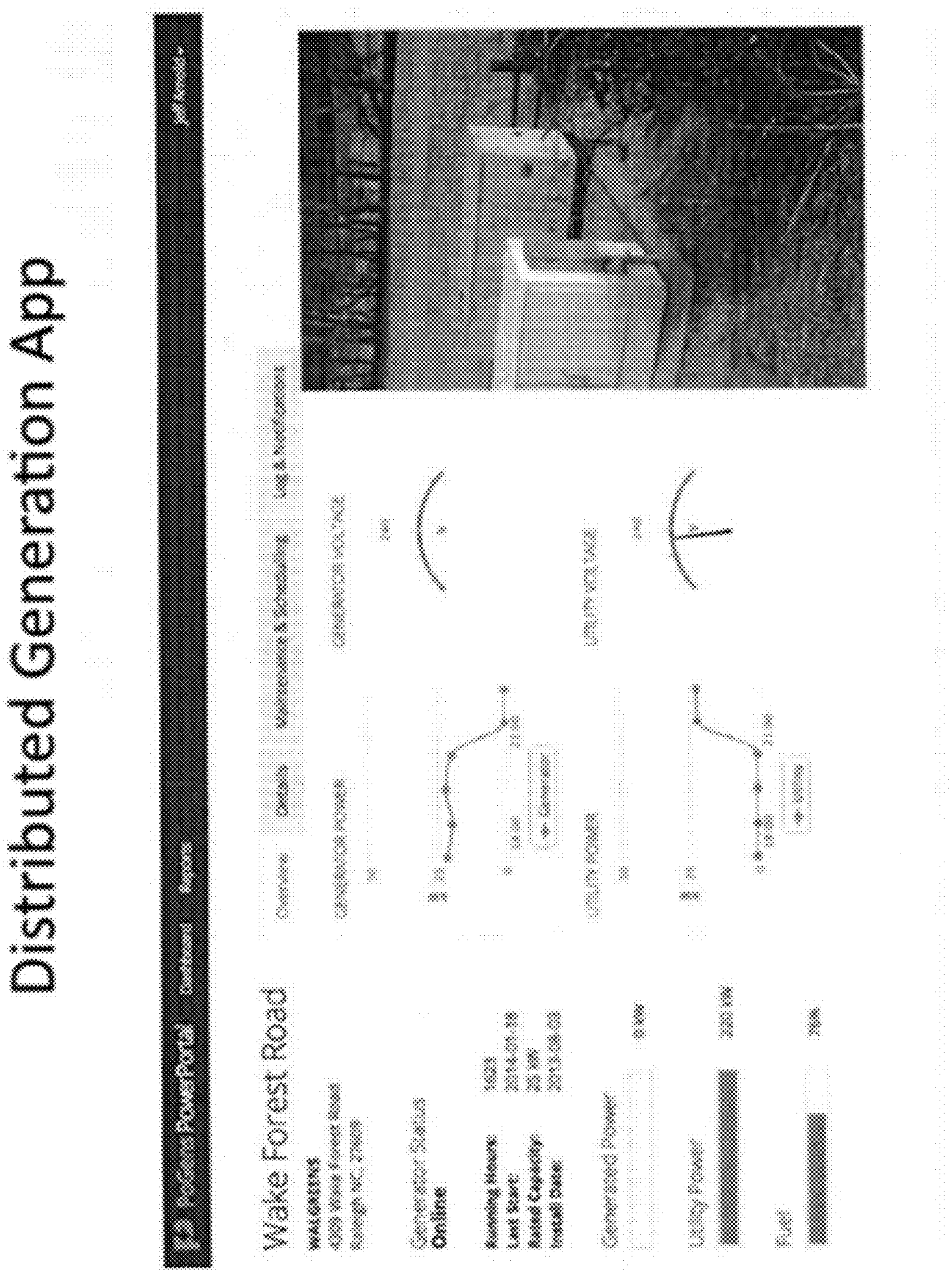
FIG. 18 illustrates a graphic user interface screen shot for an embodiment of the present invention showing a distributed generation App.

FIG. 18 illustrates a graphic user interface screen shot for an embodiment of the present invention showing a distributed generation App. The Distribution Generation App provides an overview of a distributed generator including a basic profile, curves for generator power and utility power, scales for generator voltage and utility voltage. The distribution generation App also provides details for the generator, maintenance and scheduling, log and notifications.

Figure 19:
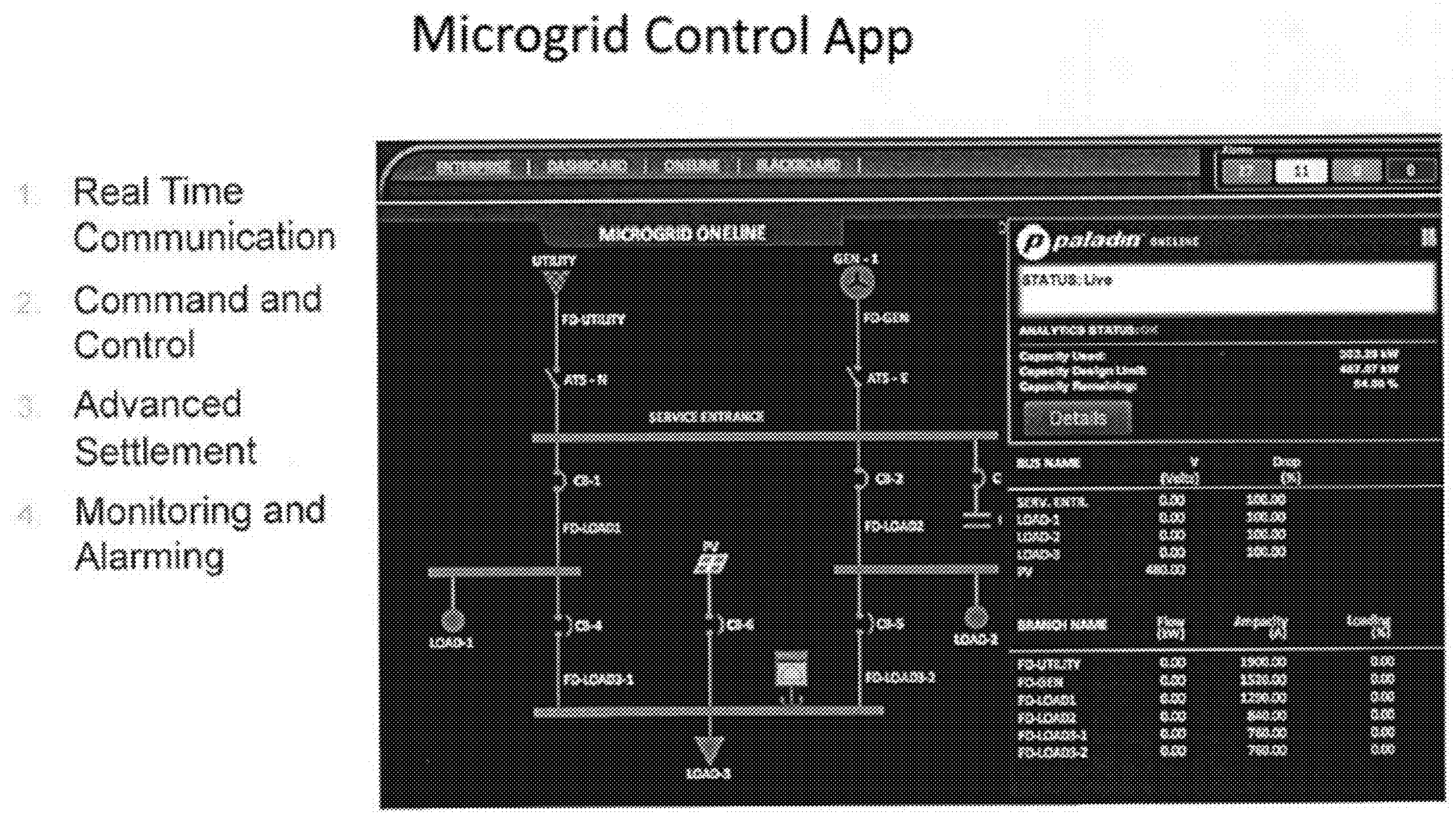
FIG. 19 illustrates a graphic user interface screen shot for one embodiment of the present invention showing a microgrid control App applicable to data centers and/or microgrids.

FIG. 19 illustrates a graphic user interface screen shot for one embodiment of the present invention showing a microgrid control App applicable to data centers and/or microgrids. A one-line microgrid diagram is displayed with bus voltage information and branch power flow information.

Figure 20:
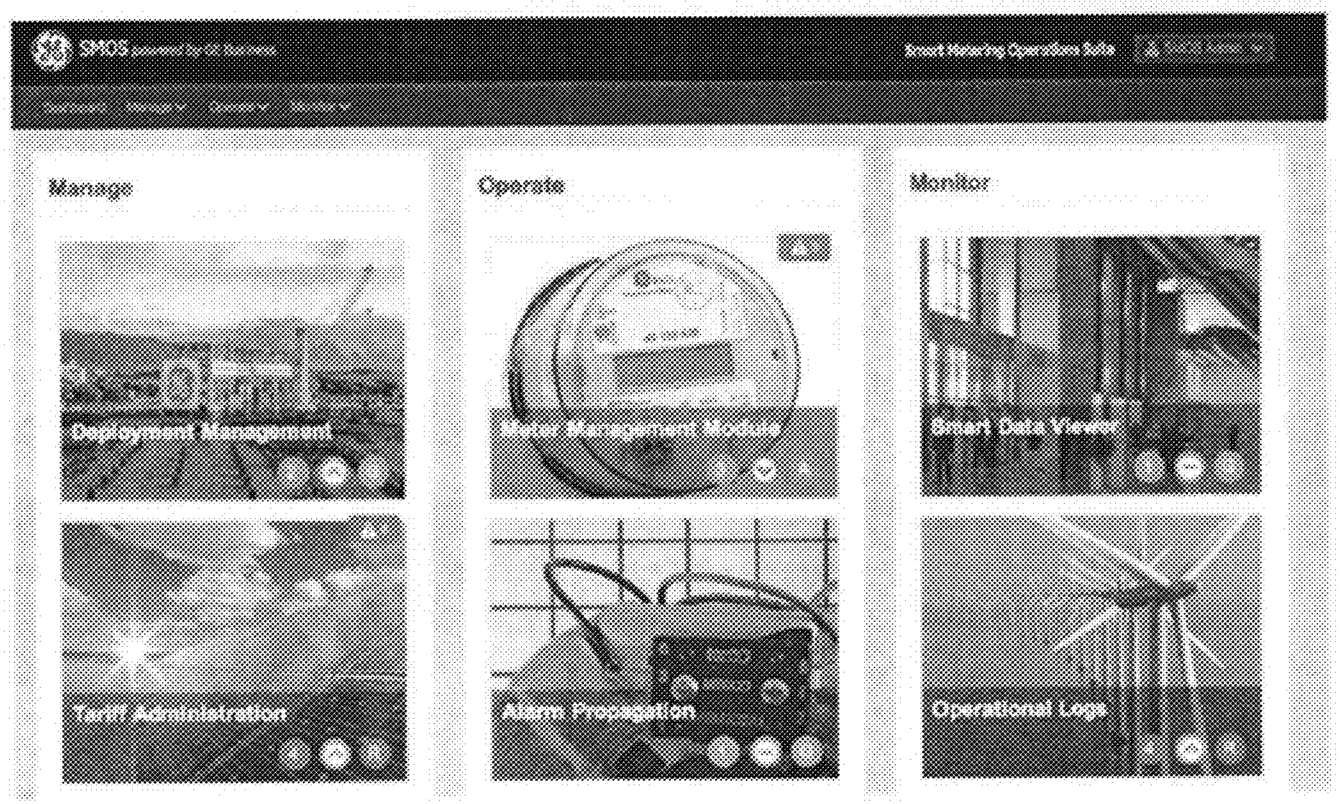
FIG. 20 illustrates a graphic user interface screen shot for an embodiment of the present invention showing an AMI Head End App.

FIG. 20 illustrates a graphic user interface screen shot for an embodiment of the present invention showing an AMI Head End App. The AMI Head End App is operable for deployment management and tariff administration. The AMI Head End App is operable to operate meter management module and alarm propagation. The AMI Head End App provides smart data viewer and operational logs for monitoring distributed PV generation and/or wind farm.

Figure 21:
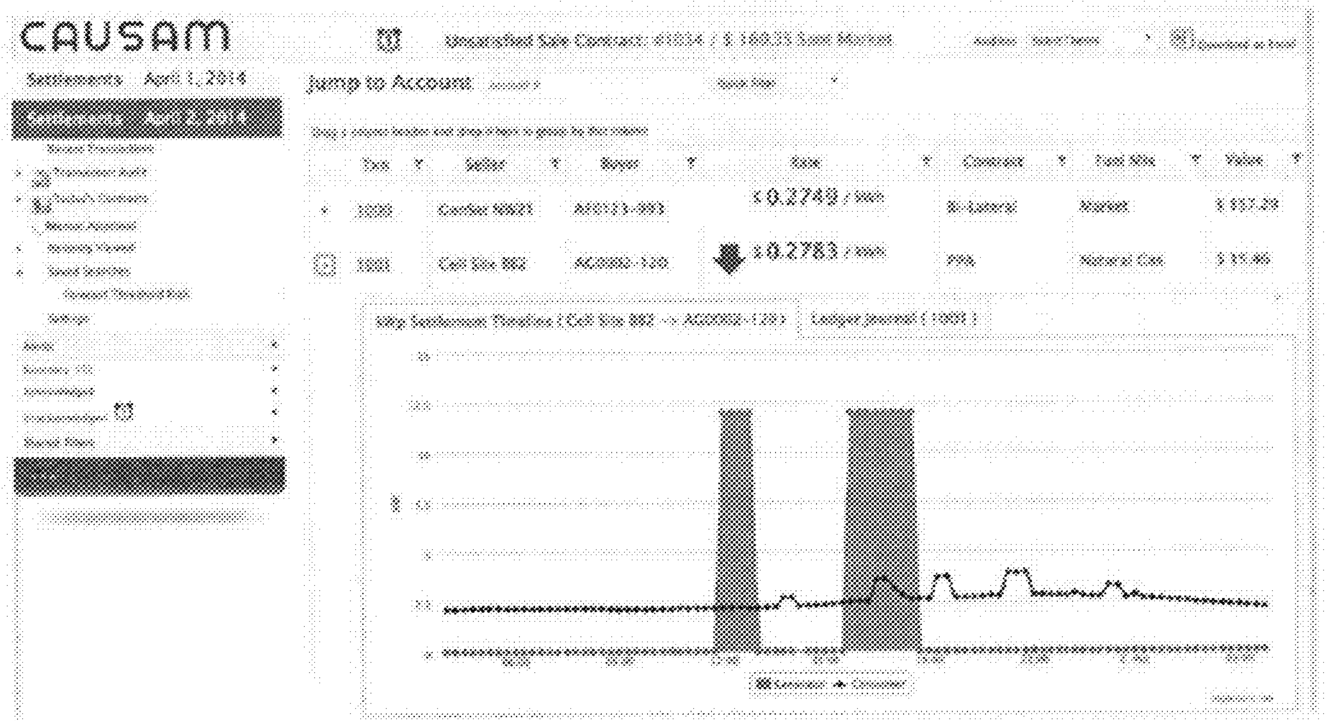
FIG. 21 illustrates a graphic user interface screen shot for an embodiment of the present invention showing an AES App.

FIG. 21 illustrates a graphic user interface screen shot for an embodiment of the present invention showing an AES App. The AES app provides daily payment and clearing, bid/offer pairing between micro generation and consumers, monitoring and alarming.

Figure 22:
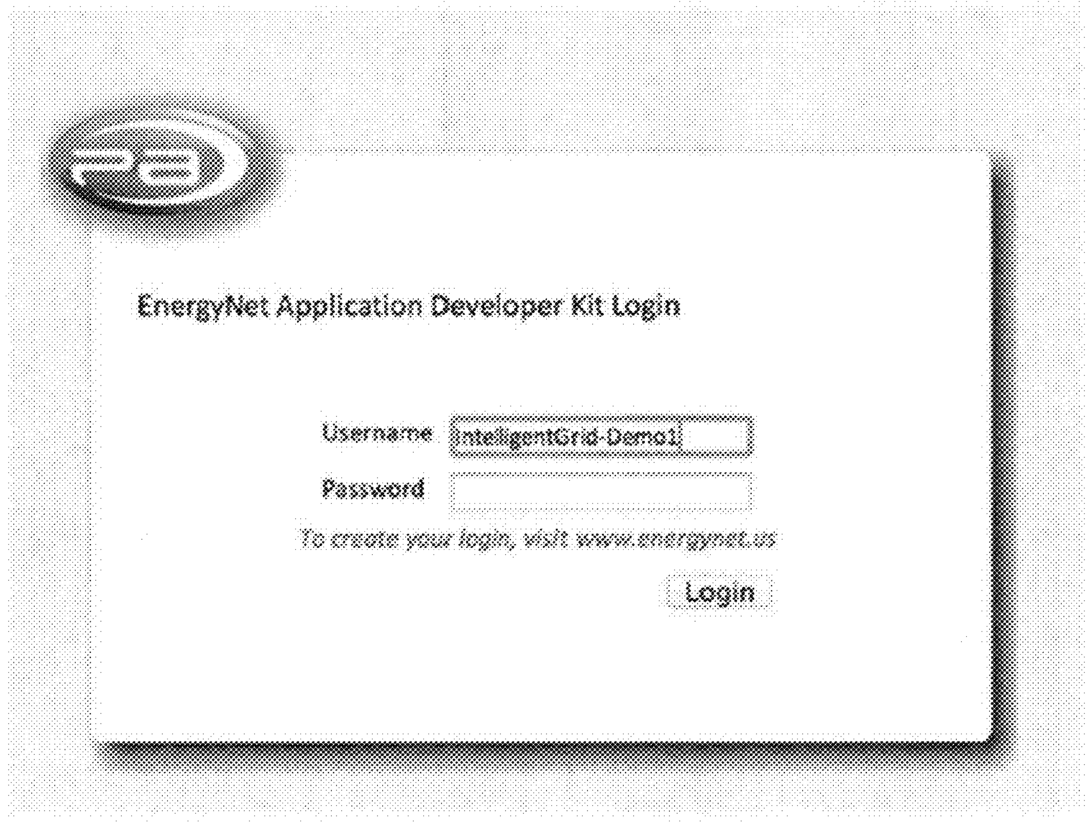
FIG. 22 illustrates a graphic user interface screen shot for an EnergyNet application development kit for a datacenter example case.

FIG. 22 illustrates a graphic user interface screen shot for an embodiment of the present invention showing an EnergyNet application development kit. Users can login the kit with a username and password. The EnergyNet Application Development Kit provides codes for browser construction and layout. The Kit provides connectivity for real time communication, command and control, payments and settlements, and third party SOA services and Enterprises.

Figure 23:
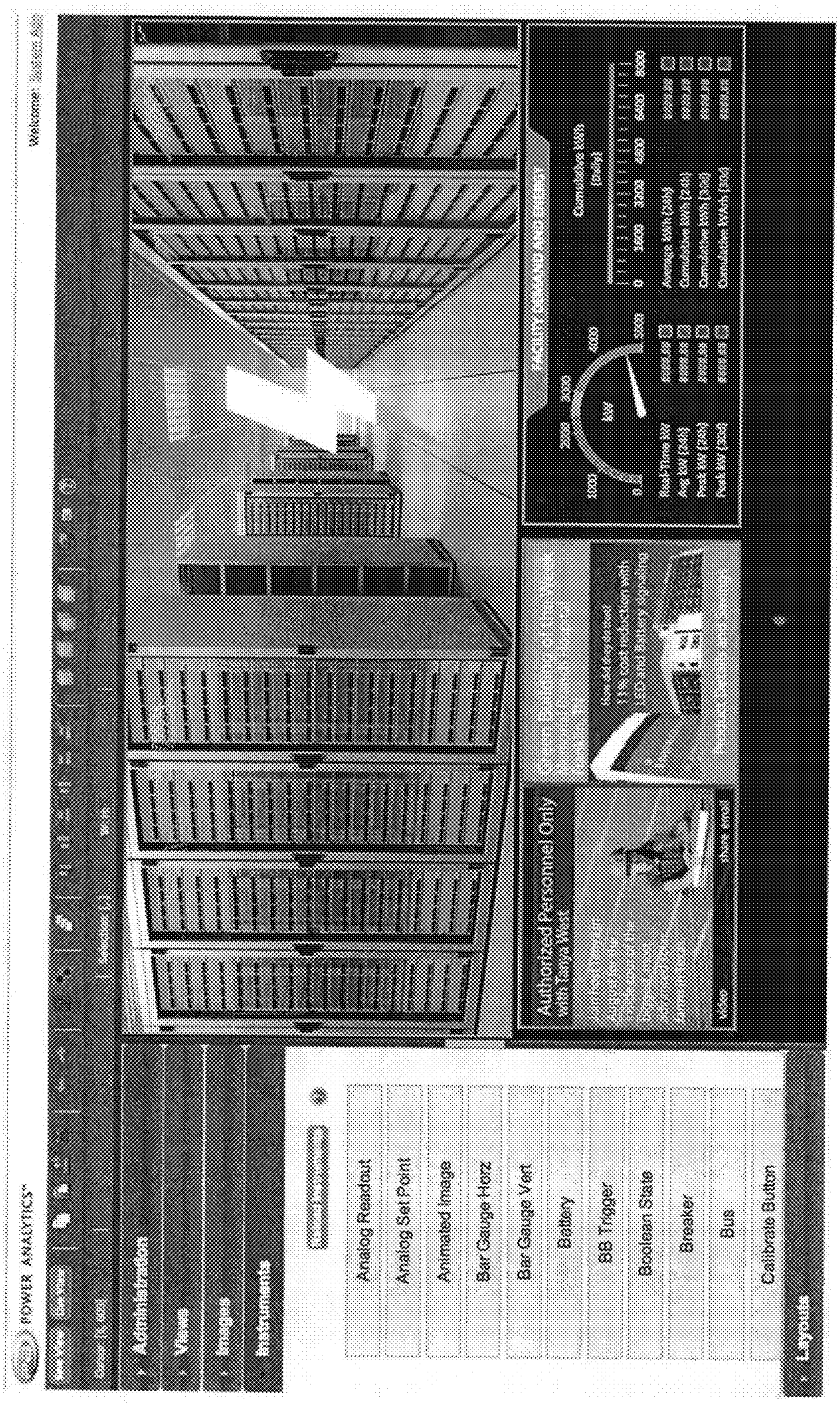
FIG. 23 illustrates another GUI screen shot for a datacenter example case of FIG. 15.
Figure 24:
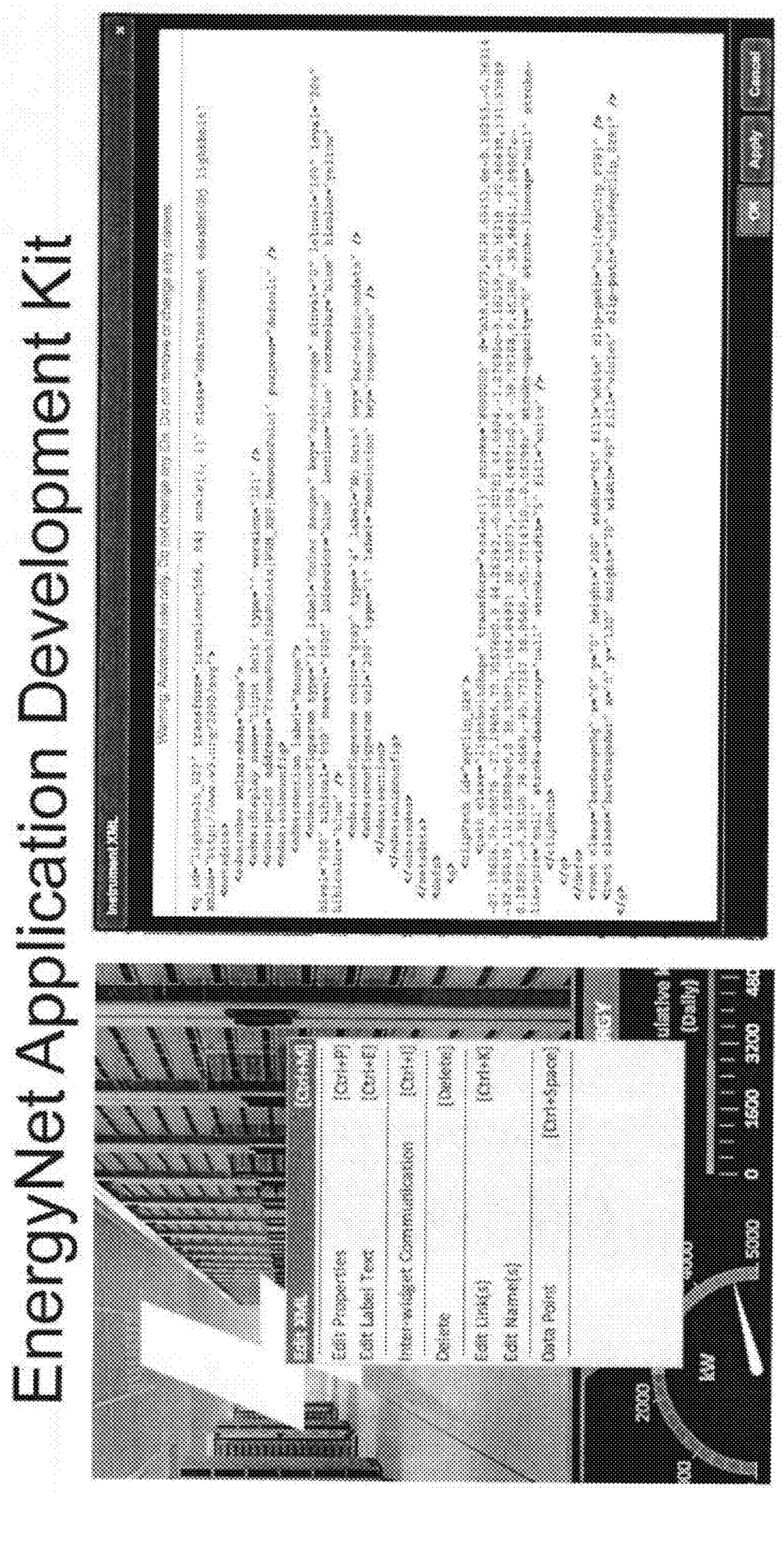
FIG. 24 illustrates another GUI screen shot for a datacenter example case with XML editing.
Figure 25:
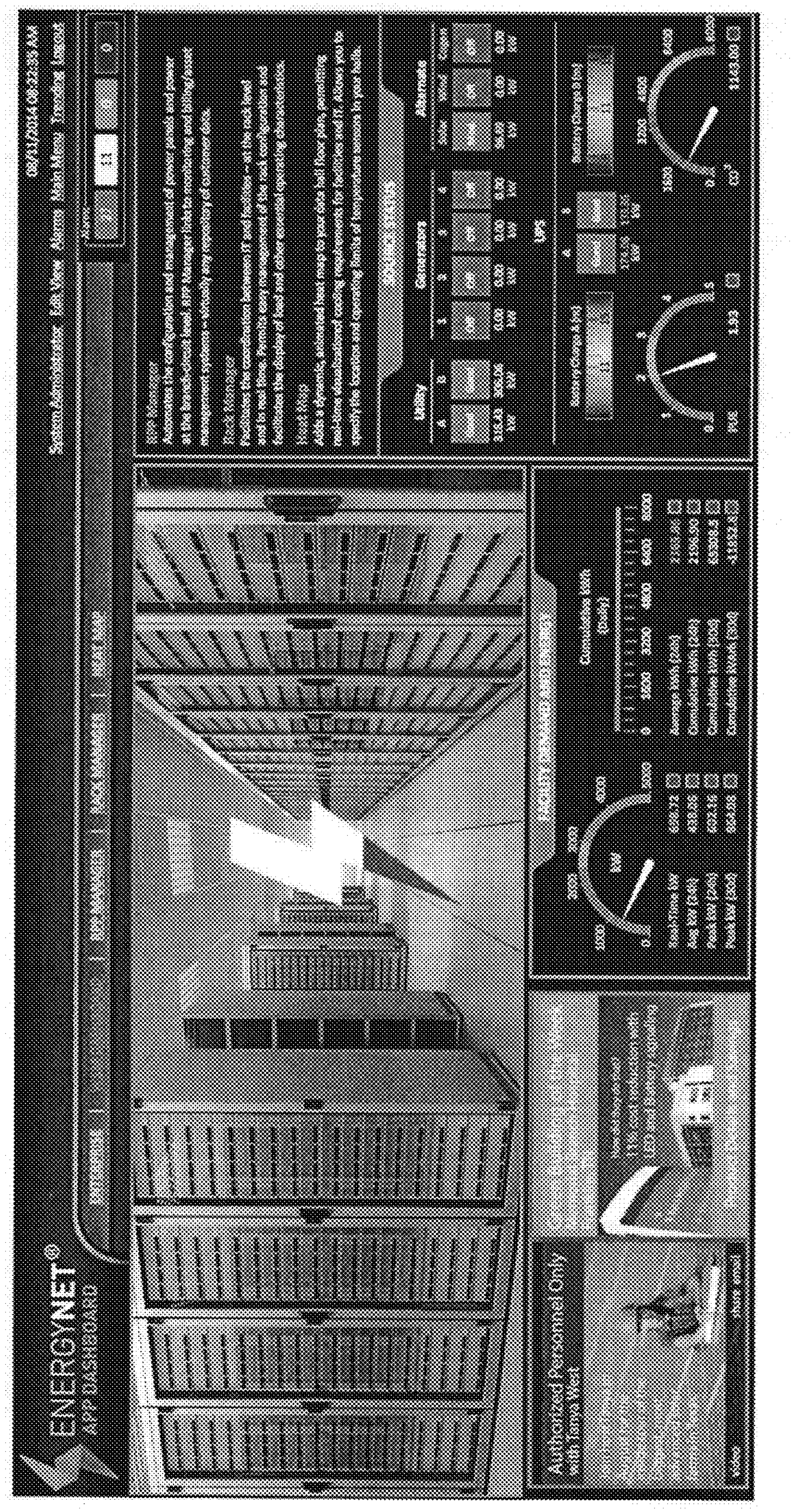
FIG. 25 illustrates another GUI screen shot for a datacenter example case with EnergyNet App dashboard view.
Figure 26:
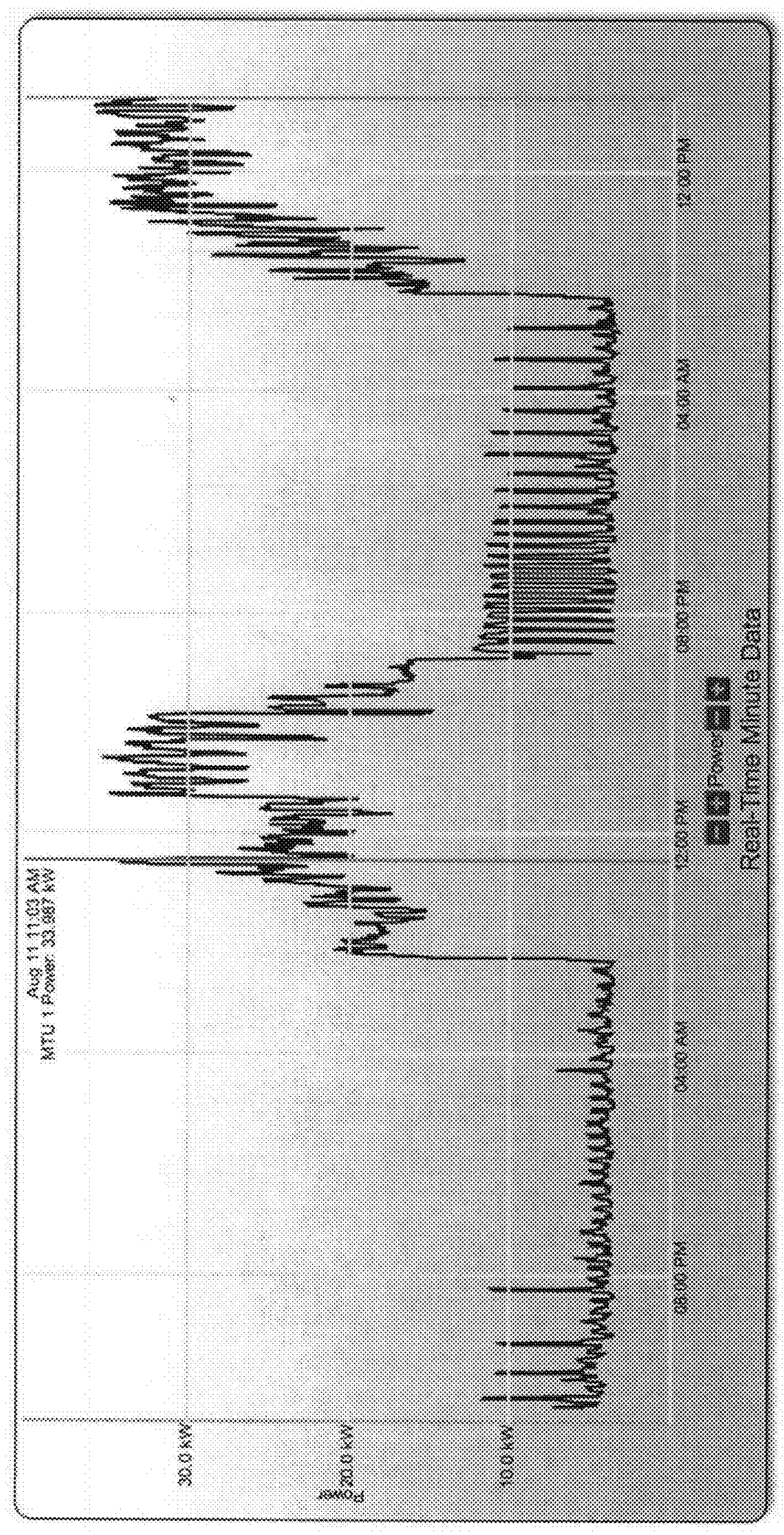
FIG. 26 illustrates another GUI screen shot for an EnergyNet App view.

FIG. 23 illustrates another GUI screen shot for the embodiment of FIG. 22 showing a datacenter example case. Several instruments can be utilized for developing the datacenter layout. FIG. 24 illustrates another GUI screen shot for the embodiment of FIG. 22 showing a datacenter example case with XML editing. FIG. 25 illustrates another GUI screen shot for the embodiment of FIG. 22 showing a datacenter example case with EnergyNet App dashboard view. FIG. 26 illustrates another GUI screen shot for the embodiment of FIG. 22 showing an EnergyNet App view for real-time minute data.

Figure 27:
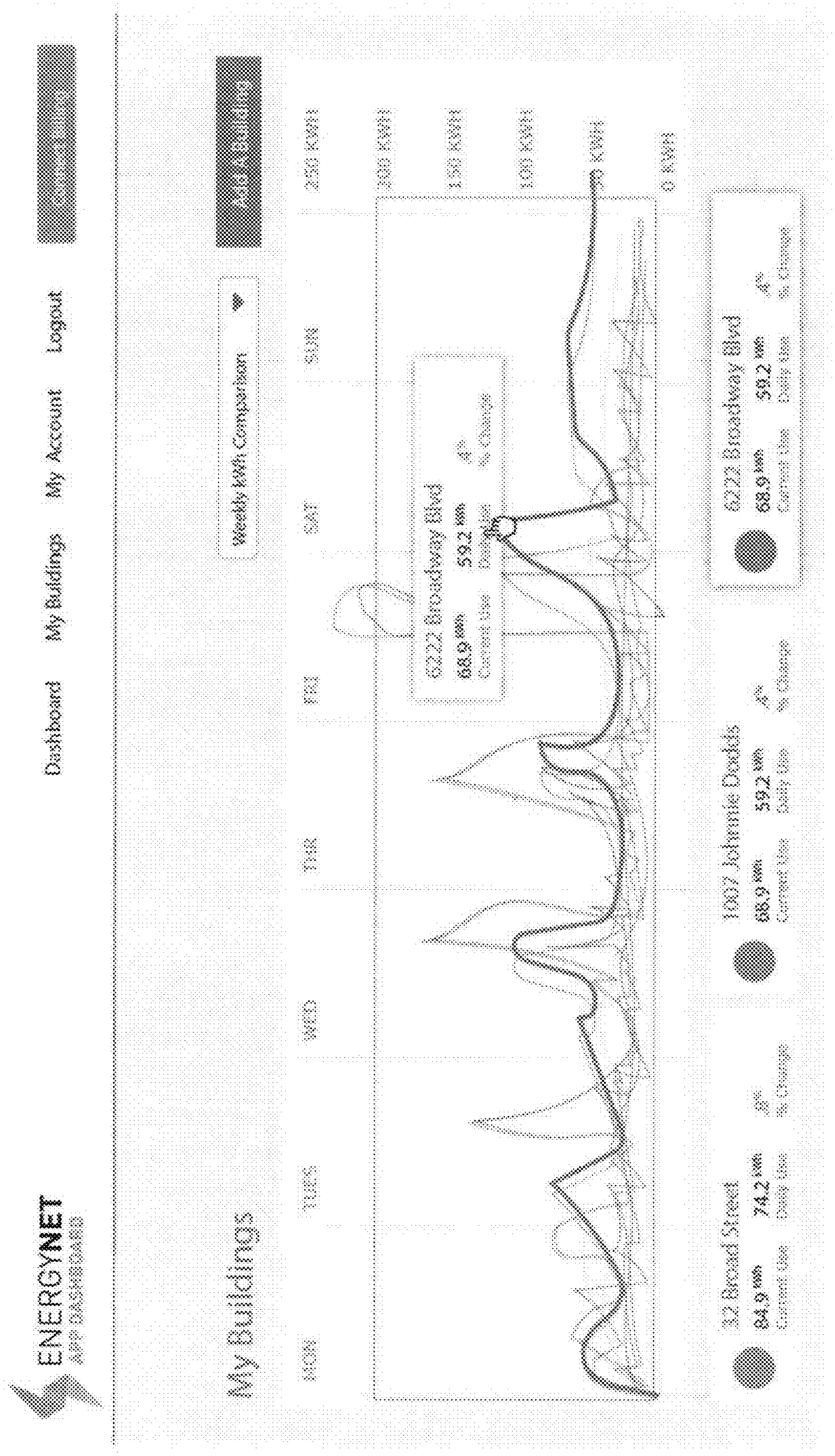
FIG. 27 illustrates another GUI screen shot showing EnergyNet App dashboard view for commercial building or facilities data.
Figure 28:
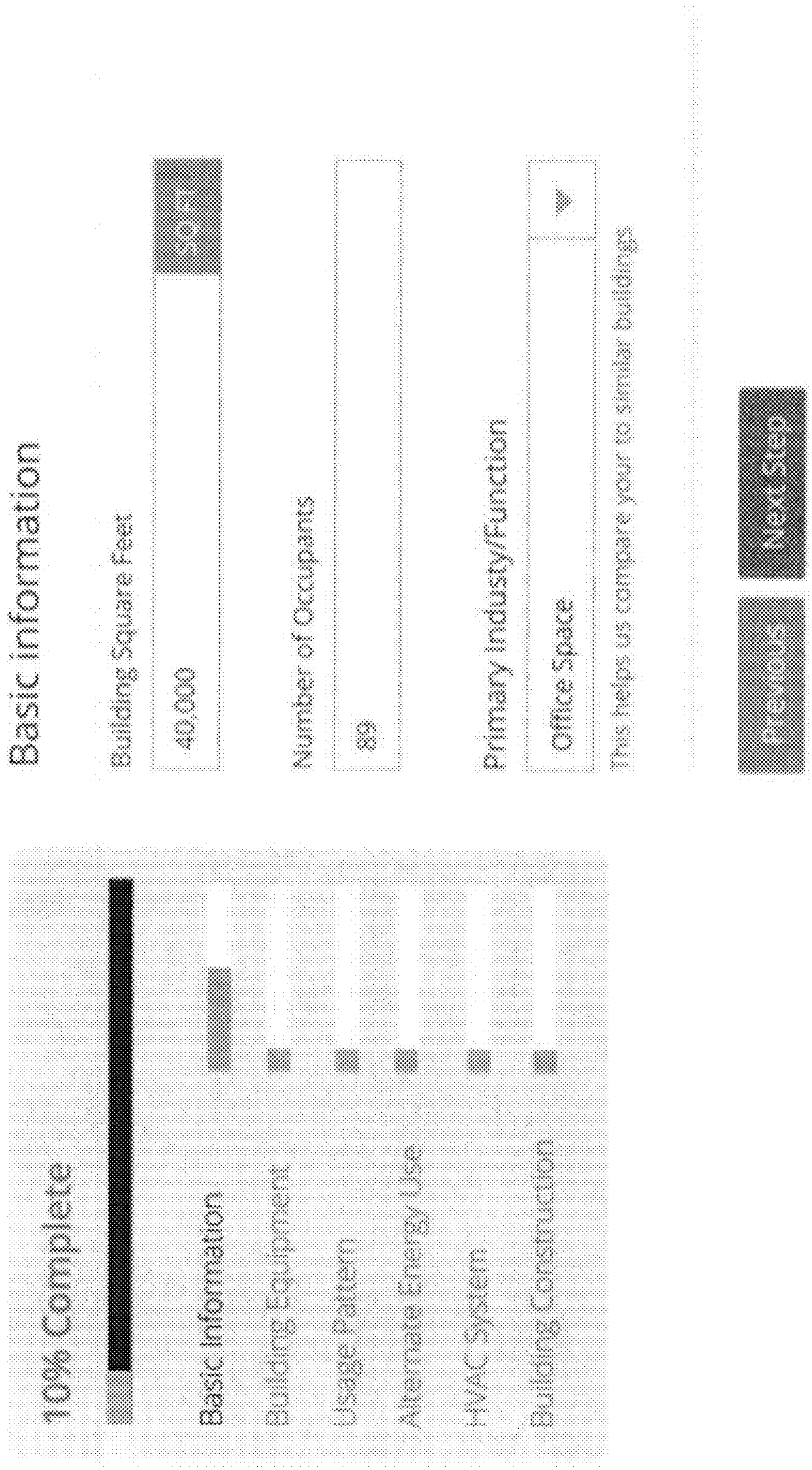
FIG. 28 illustrates another GUI screen shot showing EnergyNet App dashboard view for developing a profile for a building or facility.
Figure 29:
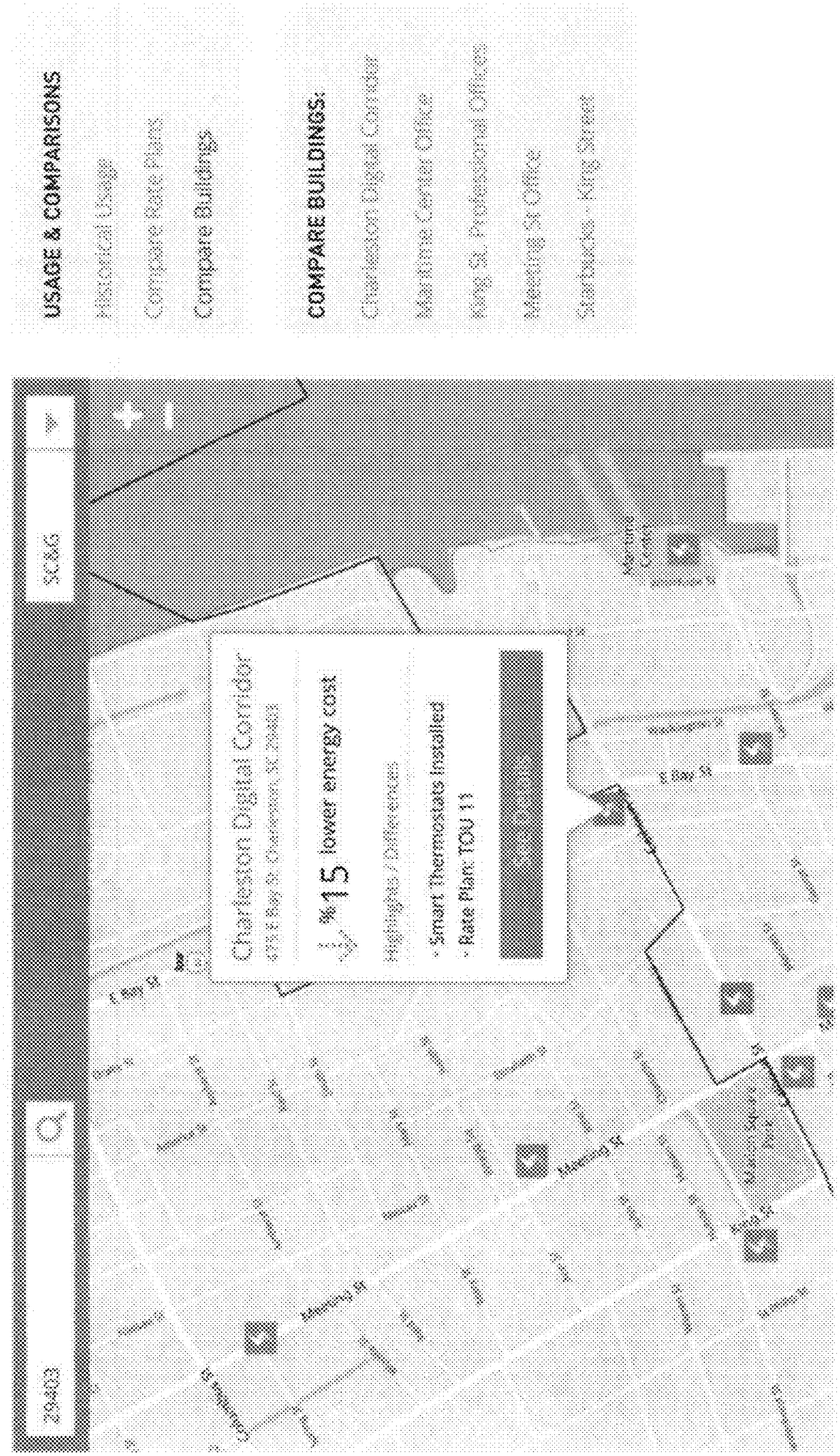
FIG. 29 illustrates another GUI screen shot showing EnergyNet App dashboard view for comparing buildings within a predetermined geographic area.
Figure 30:
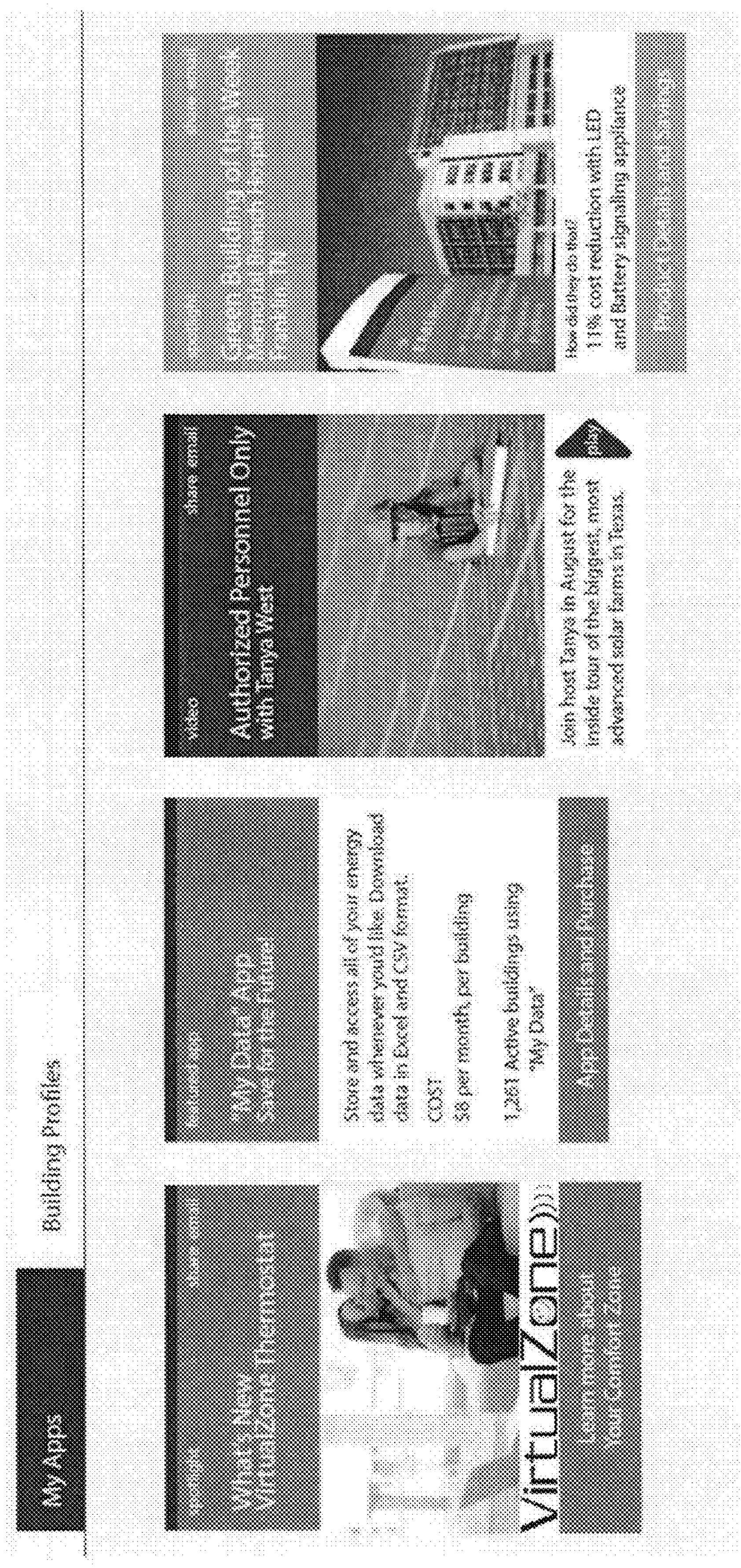
FIG. 30 illustrates another GUI screen shot showing EnergyNet App dashboard view for Apps associated with the profile and/or account in addition to building profiles.
Figure 31:
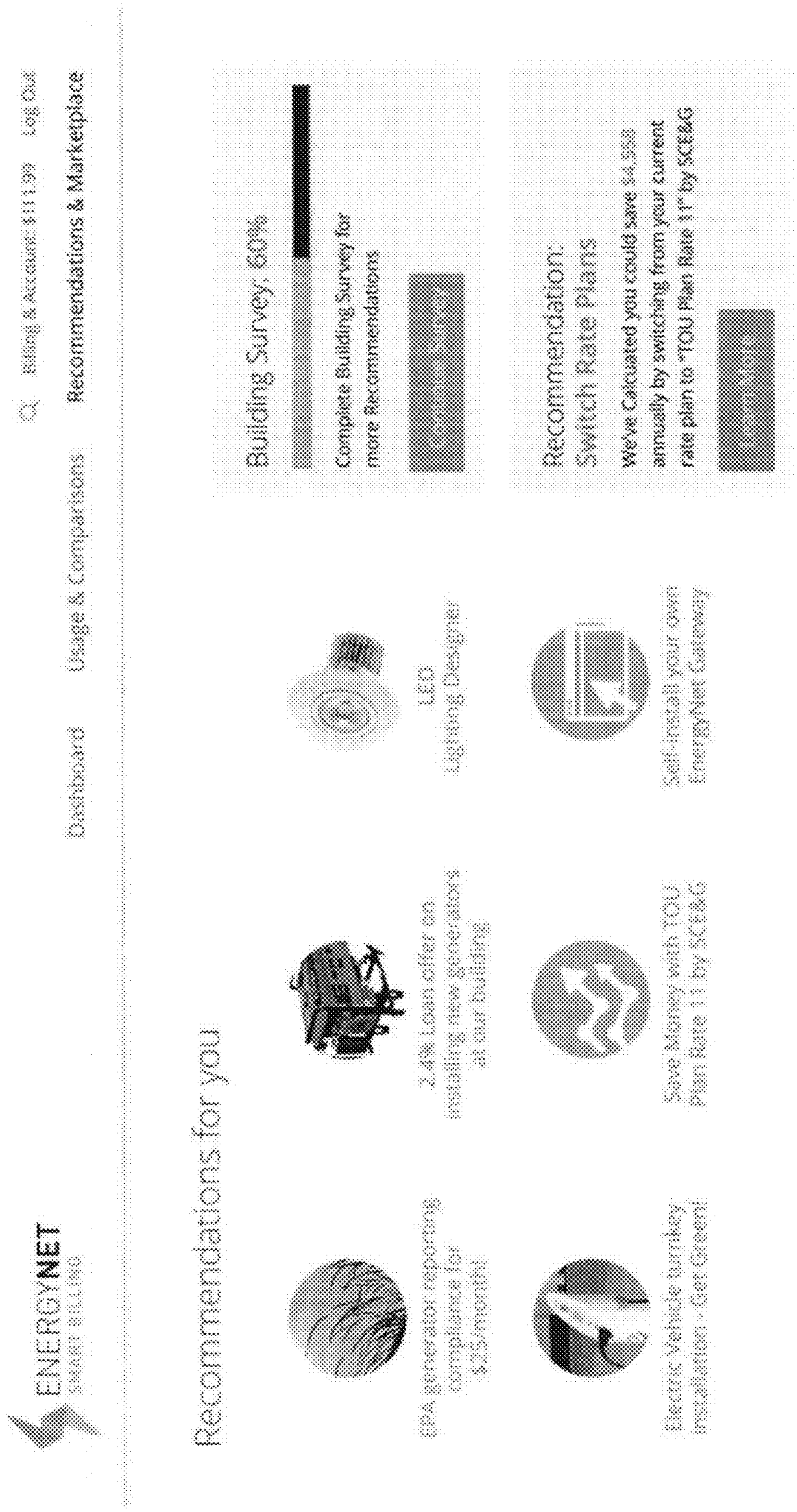
FIG. 31 illustrates another GUI screen shot showing EnergyNet App dashboard view for automatically generated recommendations.
Figure 32:
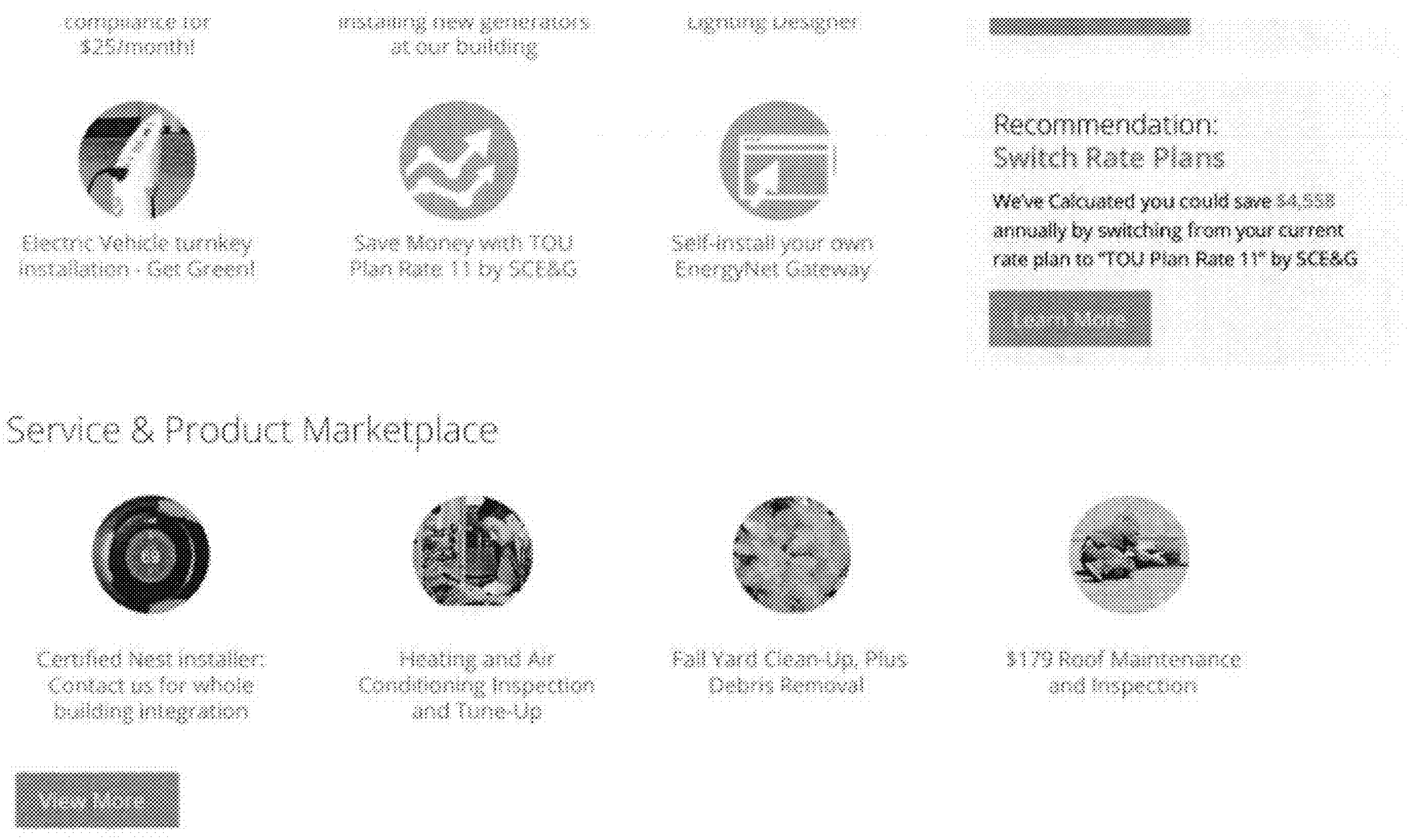
FIG. 32 illustrates another GUI screen shot showing EnergyNet App dashboard view for service and product marketplace.
Figure 33:
FIG. 33 illustrates another GUI screen shot showing EnergyNet App dashboard view for at least one of the selected automatically generated recommendations.

FIG. 27 illustrates another GUI screen shot showing EnergyNet App dashboard view for commercial building or facilities data over time, including historical, real-time, and projected future data for each of at least one commercial building. FIG. 28 illustrates another GUI screen shot showing EnergyNet App dashboard view for commercial building or facilities data associated with FIG. 27 for developing a profile for a building or facility. FIG. 29 illustrates another GUI screen shot showing EnergyNet App dashboard view for commercial building or facilities data associated with FIG. 27 for comparing buildings within a predetermined geographic area. FIG. 30 illustrates another GUI screen shot showing EnergyNet App dashboard view for commercial building or facilities data associated with FIG. 27 for showing Apps associated with the profile and/or account in addition to a tab for building profiles. FIG. 31 illustrates another GUI screen shot showing EnergyNet App dashboard view for automatically generated recommendations for the user and/or account associated with FIG. 27, including Apps and services offerings. FIG. 32 illustrates another GUI screen shot showing EnergyNet App dashboard view for automatically generated recommendations for the user and/or account associated with FIG. 27, in addition to those illustrated in FIG. 31. FIG. 32 also shows recommendations for service and product market place. FIG. 33 illustrates another GUI screen shot showing EnergyNet App dashboard view for at least one of the selected automatically generated recommendations for the user and/or account associated with FIG. 32, including automatically generated related offers. FIG. 33 also shows electric vehicle turnkey installation as a market officer from the recommendations.

EnergyNet is a one-stop or integrated platform and provides an automated payment exchange using advanced billing models which allow customers to pay in a variety of ways, for example a shared data plan coupled with a monthly payment plan, a daily payment plan, and/or prepayment plan with a remote disconnect option enabled. Single payments simplify access to the distributed energy market and are automatically aggregated and settled between the distributed and fixed generators via energy retailers. Prompt payment reduces the cost of capital, bad debt and credit risk for market participants; it is a fundamental aspect of the AES. Payments are collected through integration with third party payment banking systems and can be managed by customers in the Energy Net Customer Portal GUI. A meter data aggregator allows entities to function as intermediary between load serving entity or to share data to the TDSP, and is provided with the platform. Also, payment to customers may be provided for their data to facilitate transactions through the Energy Net Customer Portal GUI.

Figure 34:
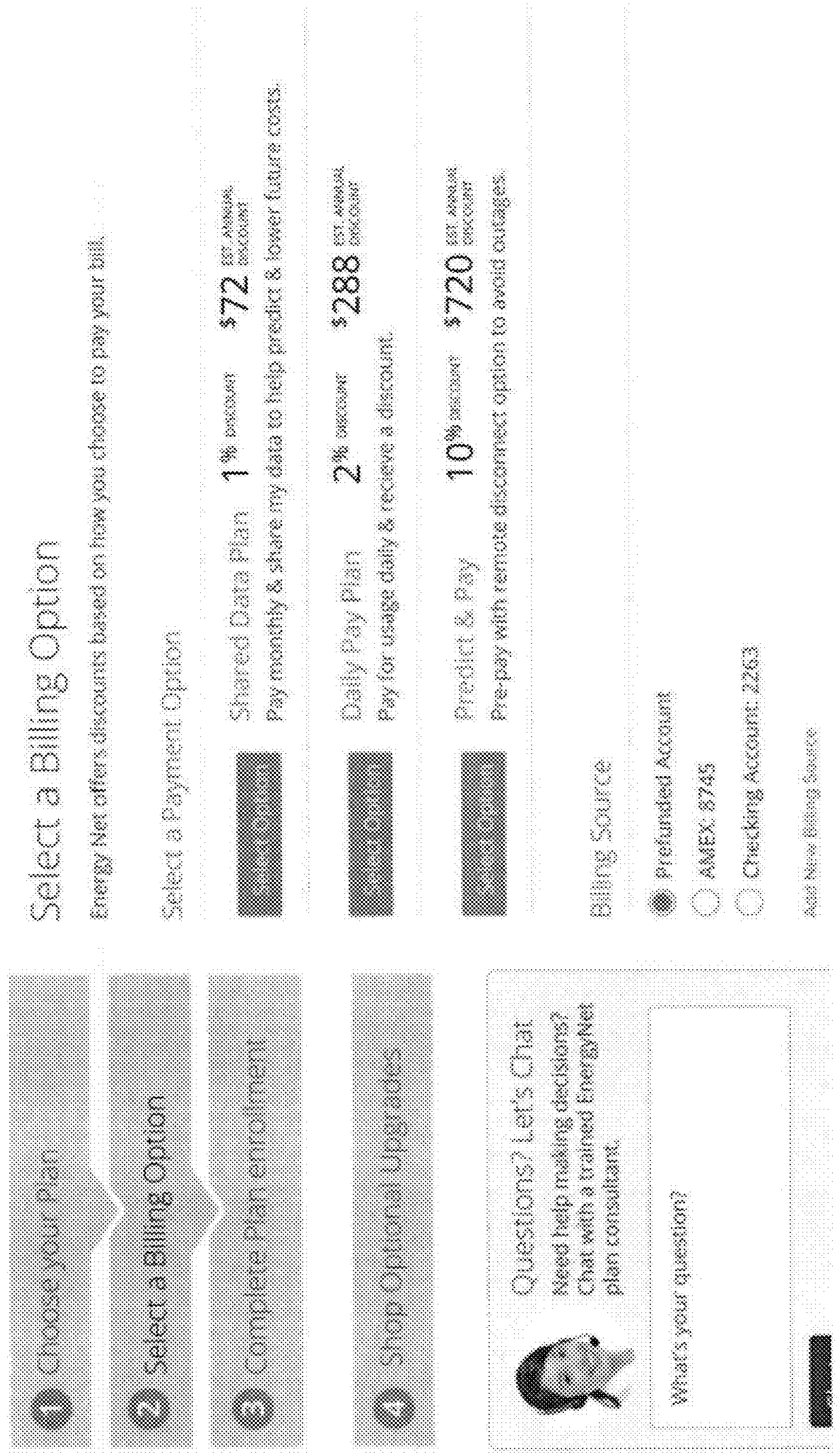
FIG. 34 illustrates a graphic user interface screen shot for an embodiment of the present invention showing a Select a Billing Option interactive GUI.
Figure 35:
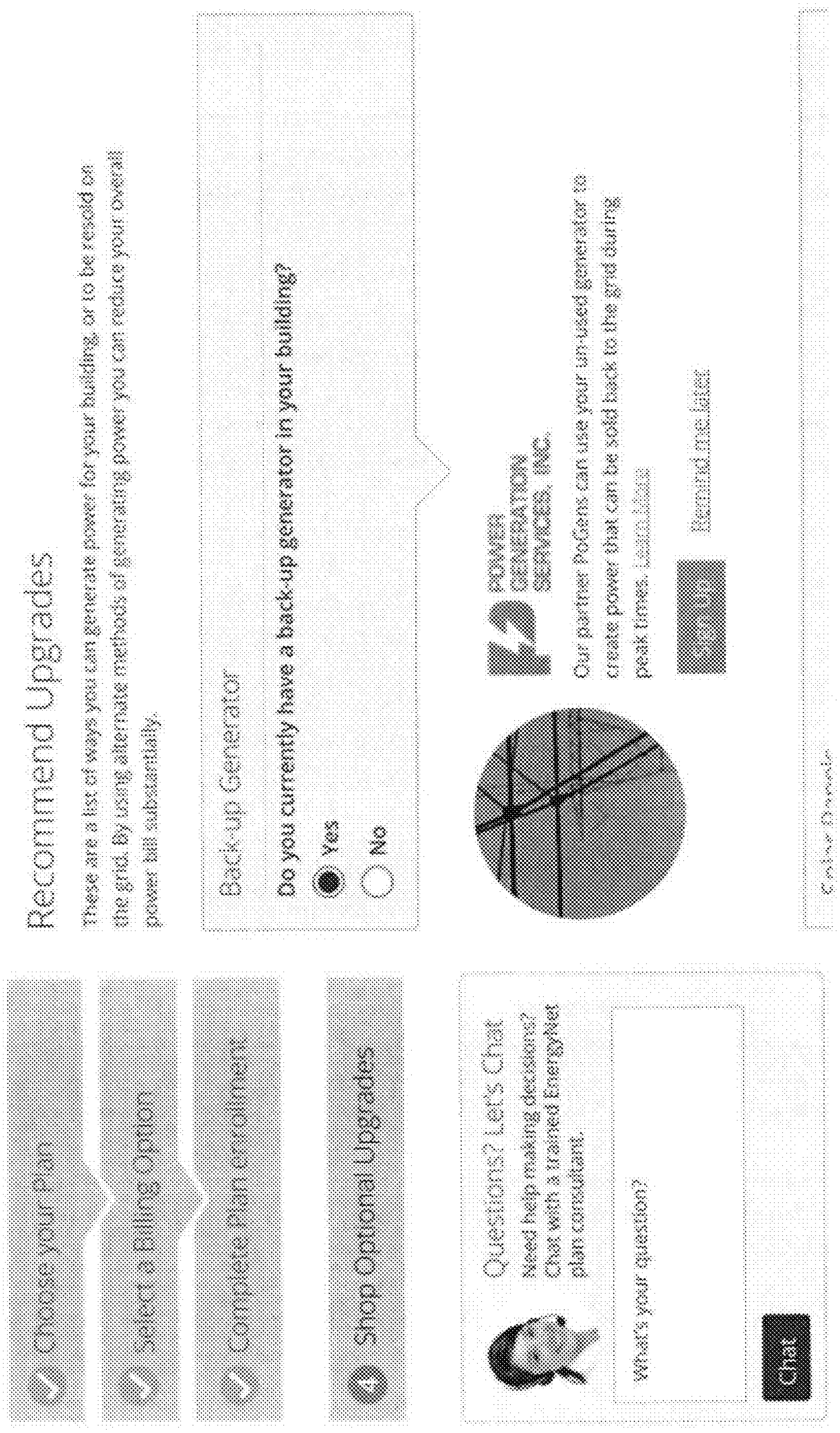
FIG. 35 illustrates another GUI screen shot showing EnergyNet App dashboard view for completing AES plan enrollment and showing Recommend Upgrades options for interactive selection.

FIG. 34 illustrates a GUI screen shot for an embodiment of the present invention showing a Select a Billing Option interactive GUI providing alternative payment options that are optimized to provide lowest rates for AES, including Billing Source for making electronic payments with credit card(s) and/or financial or bank accounts, including adding New Billing Source. FIG. 35 illustrates another GUI screen shot showing EnergyNet App dashboard view for completing AES plan enrollment and showing Recommend Upgrades options for interactive selection.

Figure 36:
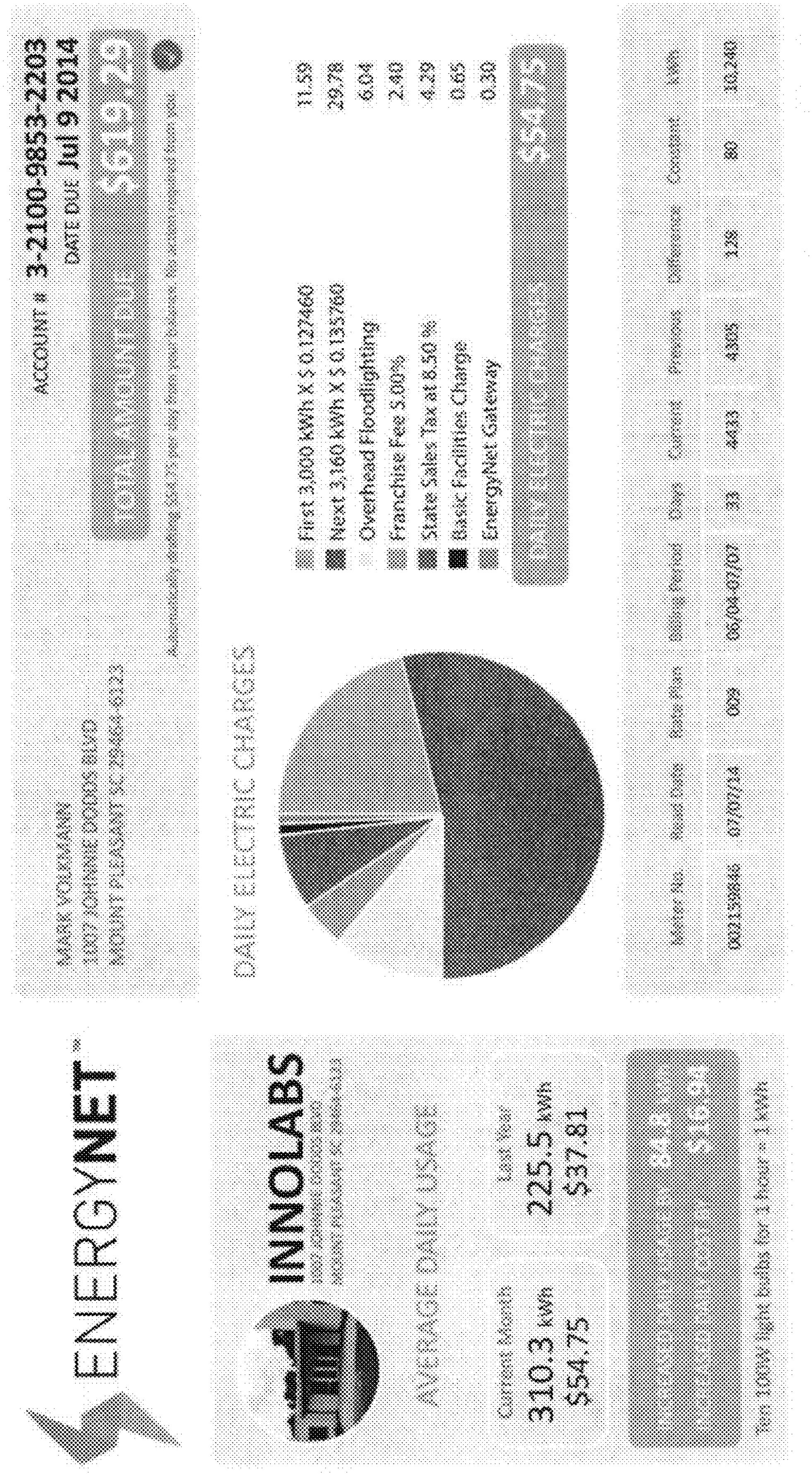
FIG. 36 illustrates another GUI screen shot showing EnergyNet App view for an AES financial summary for a building.
Figure 37:
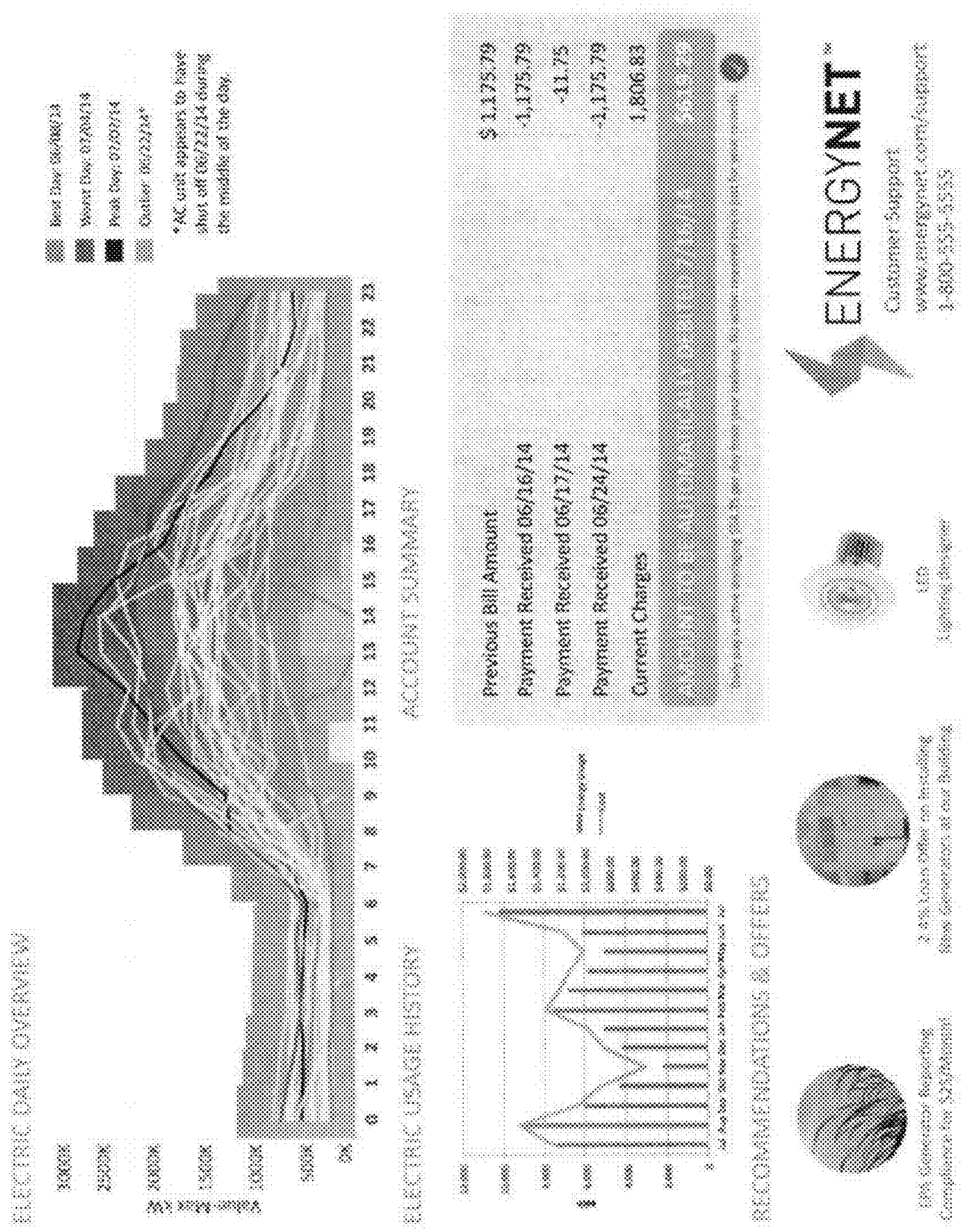
FIG. 37 illustrates another GUI screen shot showing EnergyNet App view for an AES financial summary with additional information relating to FIG. 36.

FIG. 36 illustrates another GUI screen shot showing EnergyNet App view for an AES financial summary for a building as illustrated in the prior figures associated with FIG. 27 for a commercial building. FIG. 37 illustrates another GUI screen shot showing EnergyNet App view for an AES financial summary with additional information relating to FIG. 36. This additional information includes electric daily overview, electric usage history, account summary, and recommendations and offers.

Figure 38:
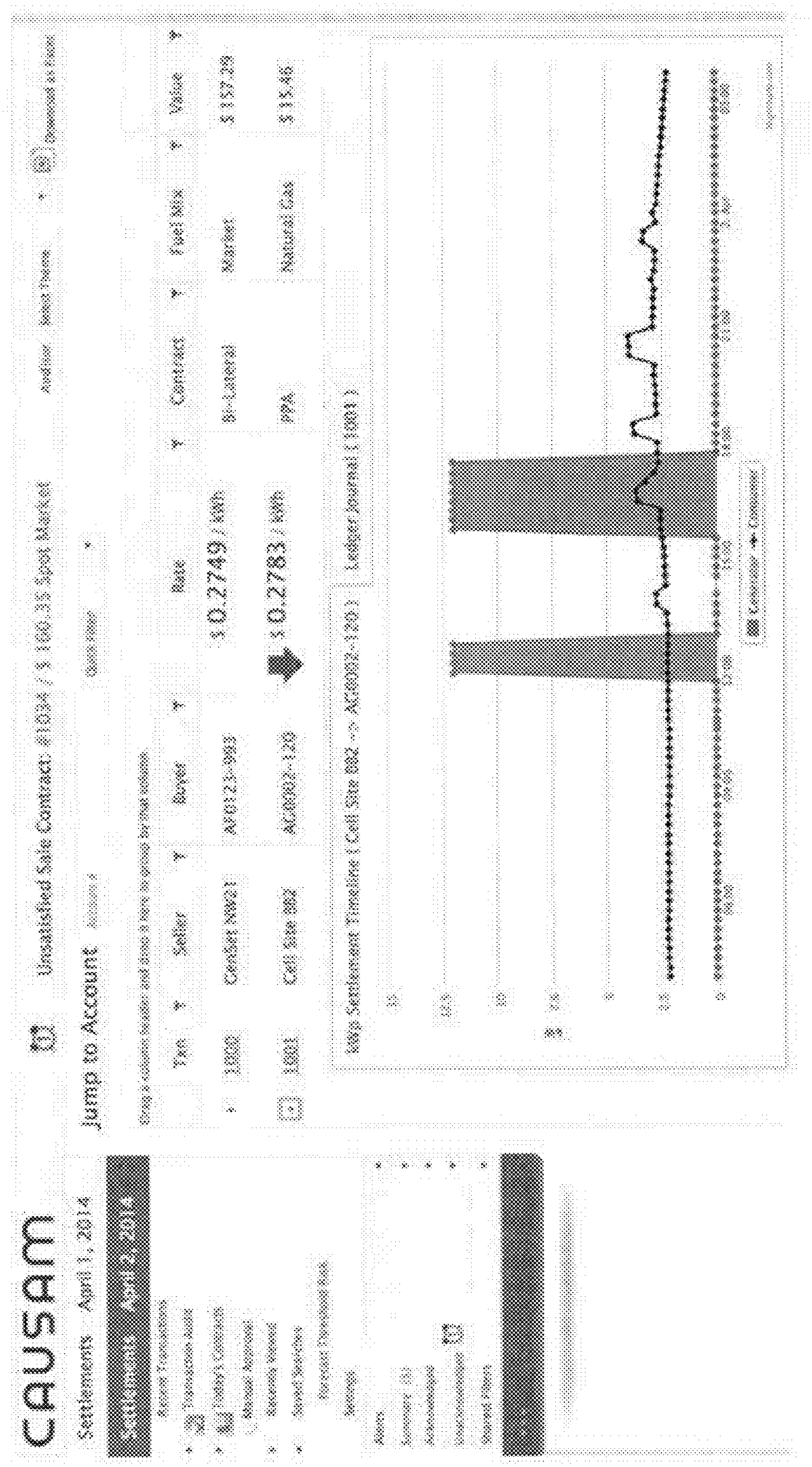
FIG. 38 illustrates another GUI screen shot showing EnergyNet App dashboard view for REPS for AES participation.

FIG. 38 illustrates another GUI screen shot showing EnergyNet App dashboard view for REPs for AES participation, including at least a partial ledger view. Information, such as sellers, buyers, rates, contracts, fuel types, and value, is listed for each transaction. A kilowatt packet (KWP) settlement timeline is also provided.

Figure 39:
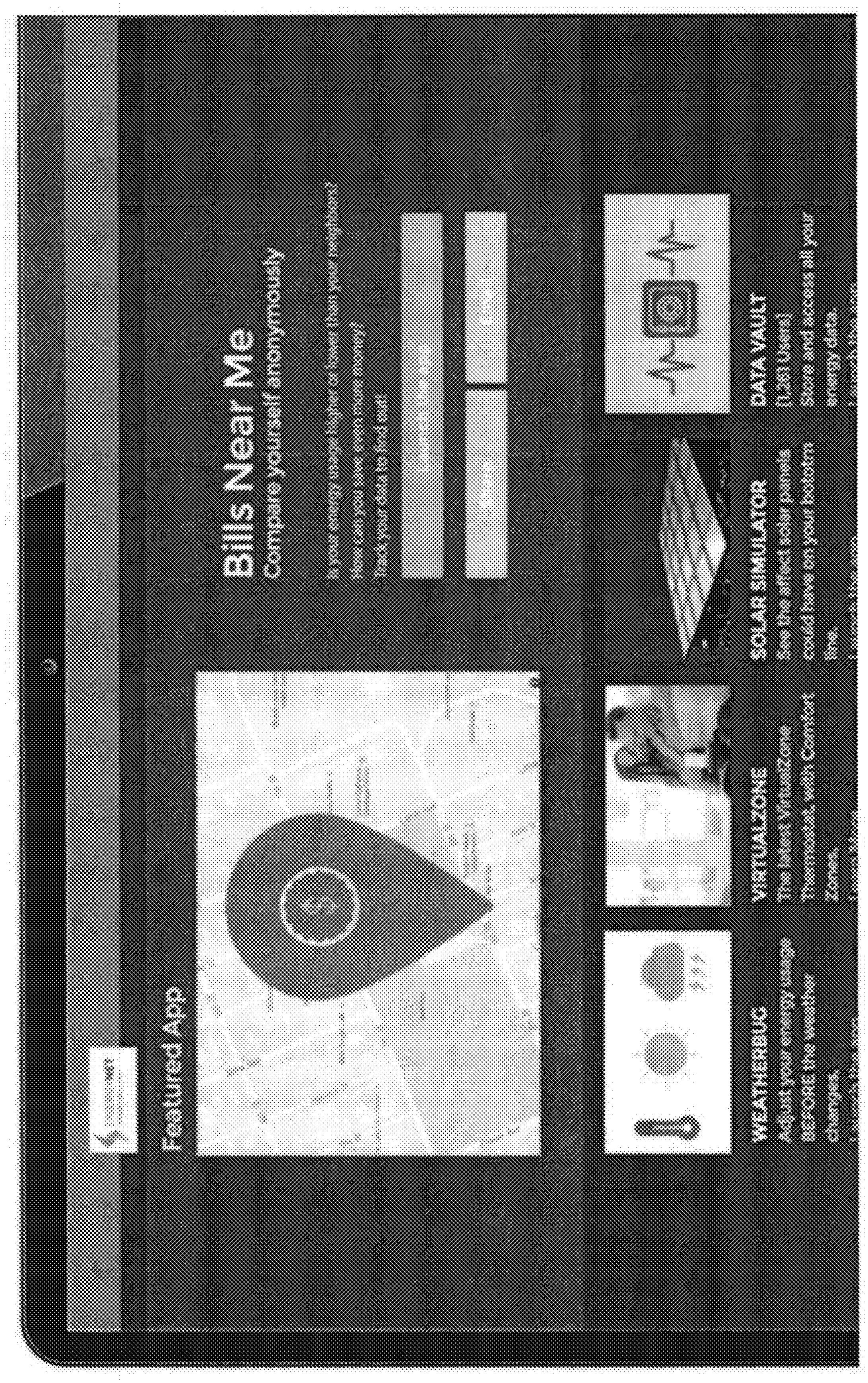
FIG. 39 illustrates another GUI screen shot showing EnergyNet App dashboard view for a featured App "Bills Near Me."

FIG. 39 illustrates another GUI screen shot showing EnergyNet App dashboard view for a featured App for anonymous comparison of electrical energy usage within a predetermined geographic area, as well as other Apps, for selection for an account and/or user.

Figure 40:
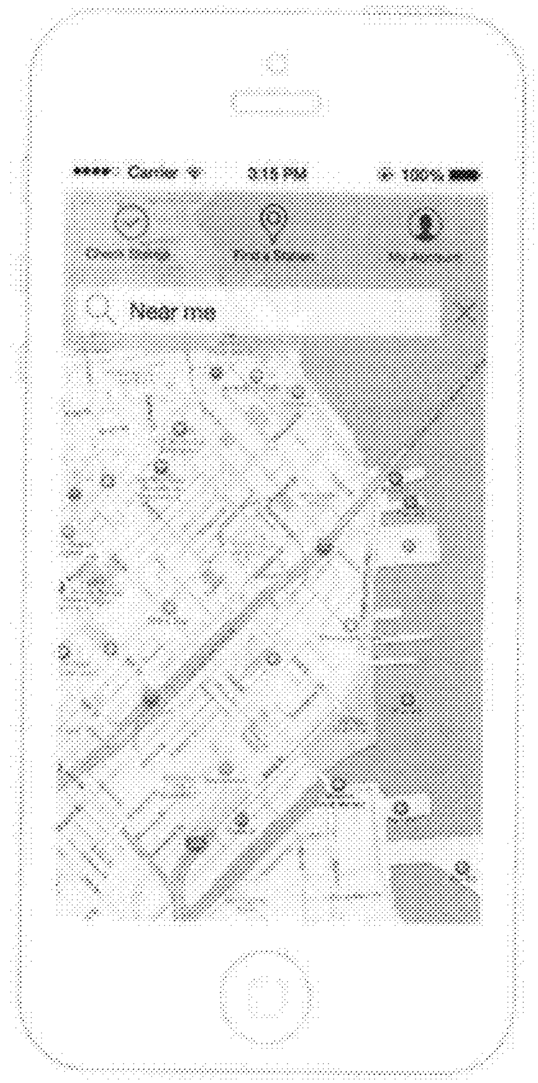
FIG. 40 illustrate a GUI screen shot for a mobile smartphone App for electric vehicle (EV) charging.
Figure 41:
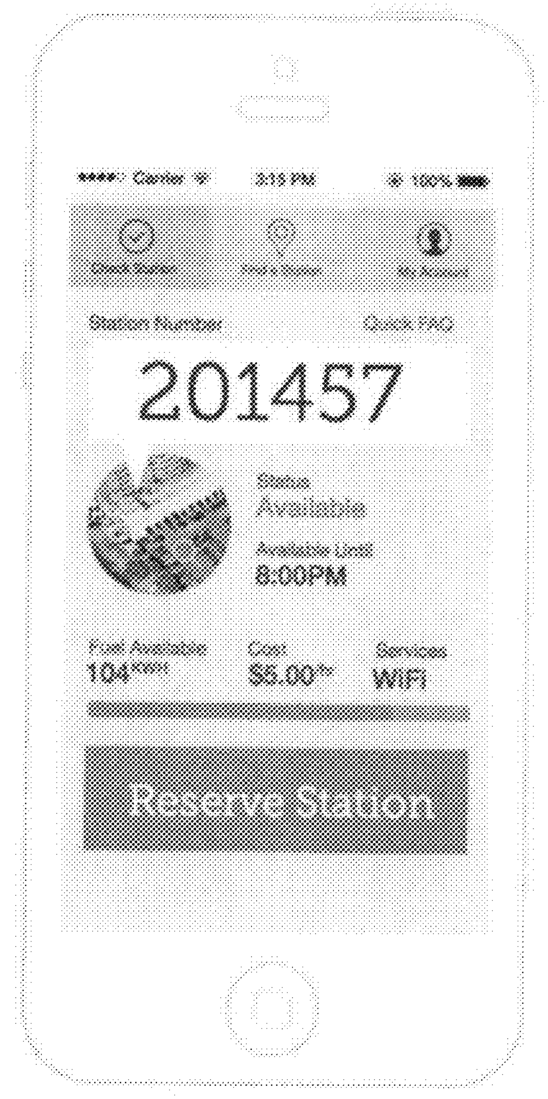
FIG. 41 illustrate another GUI screen shot for a mobile smartphone App for EV charging.
Figure 42:
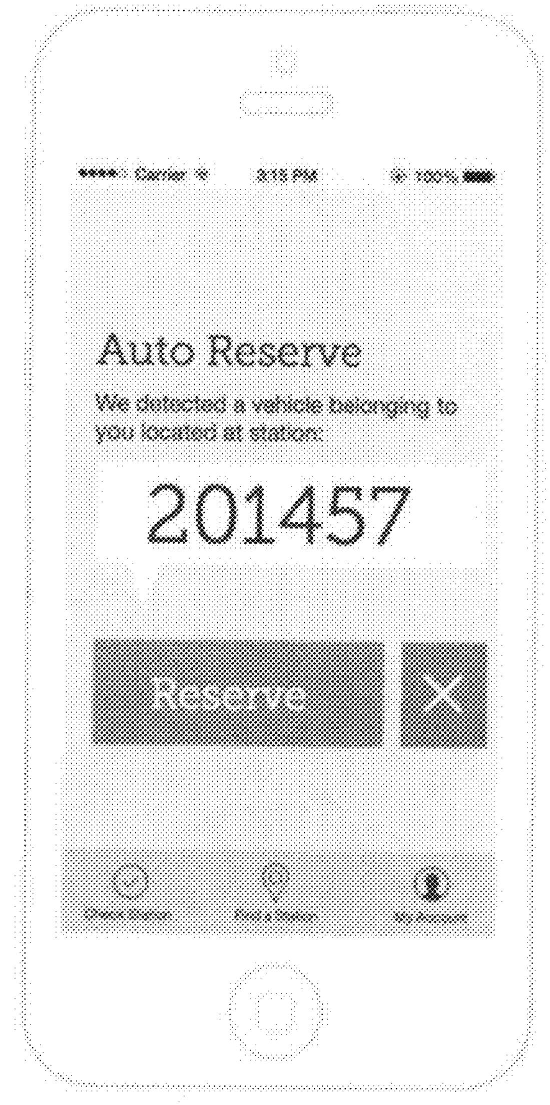
FIG. 42 illustrate another GUI screen shot for a mobile smartphone App for EV charging.
Figure 43:
FIG. 43 illustrate another GUI screen shot for a mobile smartphone App for EV charging.

FIGS. 40-43 illustrate GUI screen shots for a mobile smartphone App for electric vehicle (EV) charging. FIG. 40 relates to finding a station and includes a GPS-based map and current location of the EV App user. This App is operable to locate and reserve a station near you now, in advance or on your GPS itinerary, and provide target marketing based on user profile and priority. A “green” App is for people focusing on recharging. An “urban” App is for people focused on reserved parking. A “healthy” app is for people focused on shopping. FIG. 41 relates to reserving a station and includes a blow-out section from a GPS-based map. Information such as availability, fees, recharge strength, amenities, and nearby services, is provides. Users may book reservation in advanced, or pre-purchase one time or with subscription. FIG. 42 relates to arriving at the station reserved in FIG. 41. Once arriving at the reserved station, a user simply parks his car, receives a push notification call to action, and purchases via smartphone device or in vehicle dash display. New users need to sign up by GPS location, GQ, RFID, Video, or EV charger identification. FIG. 43 relates to data associated with the parked and/or charging time for the EV and related reserved station of FIG. 41. Users can view vehicle recharging status and fees associated, browse offers, order food, and easily top-up or extend reservation. Discounts and parking validation is automatic by local retailers and marketers. Users can view their vehicles through video security monitoring while enjoying free WiFi videos and games.

The account, consumer, and/or user profile(s) preferably includes a unique user identifier or identification, such as, by way of example and not limitation, a username and password. Further information is preferably provided, including an account identifier, user financial account information, utility and/or market participant account information, geodetic information such as by way of example and not limitation a smartphone location identifier (such as GPS-based location information, RFID, and/or near-field communication identifier), which is preferably communicated wirelessly over network-based communication to the server computer and/or processor with memory associated with the account for advanced energy settlements, and/or communicated with user of optical bar code, QR code, Digital Radio, Radio Frequency Identification, Optical Pattern Matching, etc. Additional information may optionally be associated and/or stored with the consumer profile, and communicated via the network, including historical data relating to energy consumption, status, supply systems (by way of example and not limitation, back-up power supply, generator(s), battery, alternative energy such as solar, wind, etc., smartphone transactions relating to energy-affected activities, history of purchases made for products and/or services, history of offers and responses made for products and/or services, and combinations thereof. At least one message included with the GUI preferably includes information about electric power supply pricing and corresponding plan alternatives associated with advanced energy settlements; additional advertising and offers for products and/or services may be provided via the GUI based upon the corresponding profile for the user and/or account, opt-in/opt-out inputs, and combinations thereof. Preferably, market pricing conditions via a customer profile that can be loaded to a computer, smart phone, tablet, or any web-enabled appliance for accepting or modifying a profile or moreover a profile that automated controls based upon previously selected economic messages. In a further embodiment, energy consumption patterns within active grid elements profiles could be used to identify opportunities for up selling, down selling, or cross selling. These opportunities may be determined by the power utility or market participant, REP, and/or by affiliates, partners, or advertisers. Data from active grid elements profiles associated with the user and/or account (including historical data, real-time data, and/or projected or predicted future data) may be used to provide insights on inefficient devices, defective devices, or devices that require updating to meet current standards, and/or products and services corresponding or complementary to the active grid elements or the user/account. Active grid elements profiles data, individually or collectively (or selectively) in the aggregate, performance and/or participation, actions or activities, may also be used to identify related power grid participation opportunities. Data from consumer purchase and marketing activities may be used to provide insights on inefficient merchants or service providers.

Figure 44:
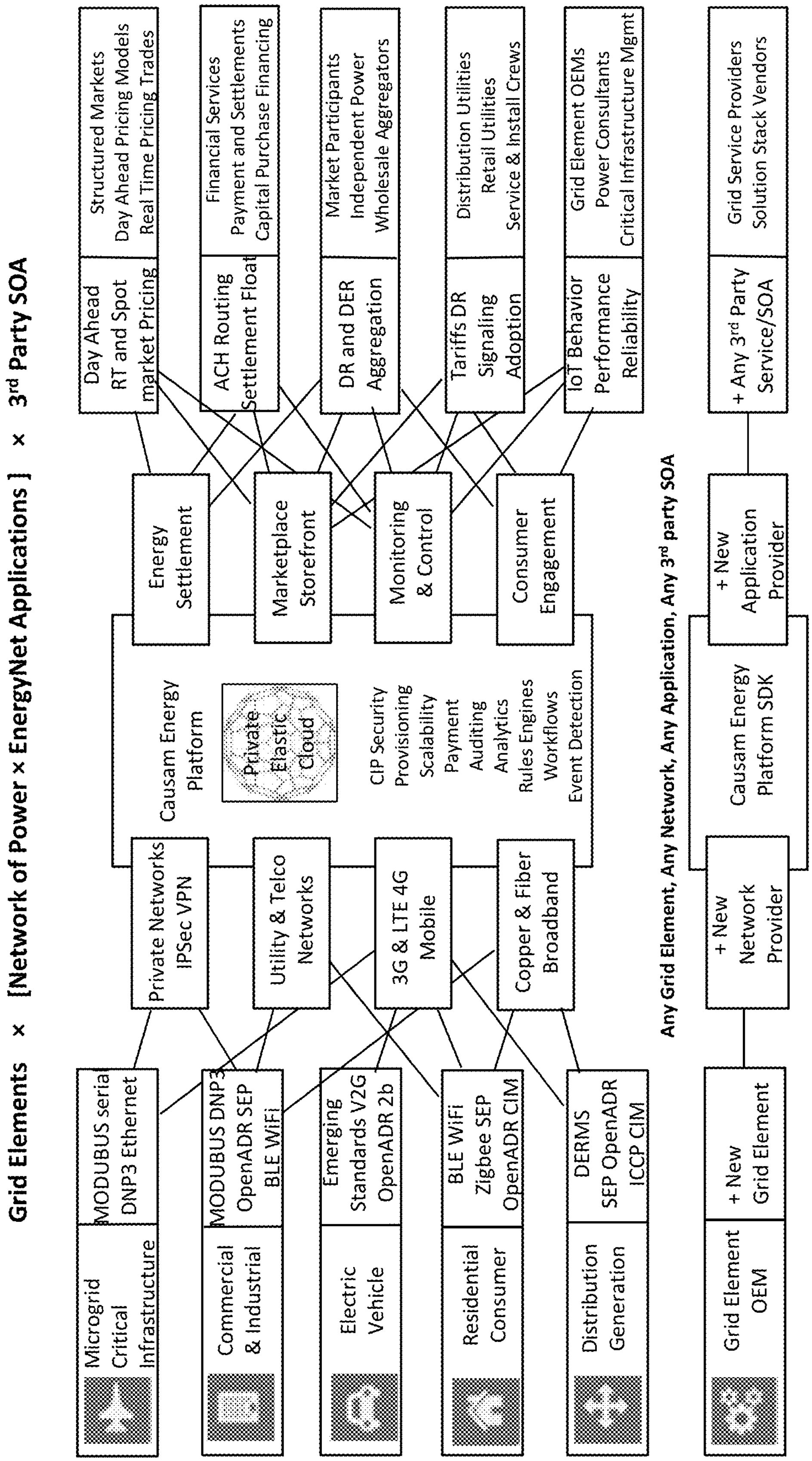
FIG. 44 provides a diagram of the functions of the advanced EnergyNet platform in the present invention.

FIG. 44 provides a diagram of the functions of the advanced EnergyNet platform in the present invention. The platform includes a private elastic cloud providing Critical Infrastructure Protection (CIP) security, provisioning, scalability, payment, auditing, analytics, rules engines, workflows, and event detection. The advanced EnergyNet platform connects a network of power and various EnergyNet Applications. Grid elements are connected to the network of power via various communication protocols over private networks, utility & telecommunication networks, 3G, 4G LTE mobile networks, and/or copper & fiber broadband. Third party SOA is developed by different grid service providers and/or solution stack vendors for different EnergyNet Applications, for example but not limited to energy settlement, market place storefront, monitoring and control, consumer engagement. Grid elements include but not limited to microgrids for critical infrastructure, commercial and/or industrial buildings, electric vehicles, residential consumers, and distribution generations. The communication protocols include but not limited to MODBUS Serial, DNP3, Ethernet, OpenADR SEP, BLE, WiFi, Emerging Standards V2G, OpenADR 2b, ZigBee SEP, OpenADR CIM, DERMS, SEP, OpenADR, ICCP CIM. Meanwhile, grid element OEM can provide new grid elements to be connected to the network of power through new network providers. The third party SOA enables grid service providers and/or solution stack vendors to provide third party service for the EnergyNet applications. Grid service providers and/or solution stack vendors include but not limited to structured markets, financial services, market participants, independent power, wholesale aggregators, distributed utilities, retail utilities, service & Install Crews, Grid Element OEMs, power consultants, critical infrastructure management. The third party service includes day ahead, real time and spot market pricing, Automated Clearing House (ACH) routing, settlement float, tariffs, DR signaling, adoption, IoT behavior, performance, reliability, etc. Meanwhile, new application provider can add new applications to the platform.

By way of example and not limitation, the systems and methods of the advanced energy settlement platform are operable for the design, specification, construction, management, and advanced energy settlement with real-time or near-real-time market rates for electrical activities of a data center or a microgrid. GUI, icons, and/or visual representations or symbols of grid elements (Grid Element Icons—GEIs) are provided by the system and methods of the present invention, and associated with corresponding data for each of the grid elements stored in a grid element library or virtual or digital catalog. The grid element data may be provided by corresponding grid element suppliers, equipment manufacturers, distributors, historical data from user/account (including but not limited to grid element purchases, acquisitions, grid element activations for registration with the electric power grid, etc.), publicly available data from the internet, proprietary data, and/or custom-generated data. Preferably, the GUIs are selectable by a remote user on a computer having a display and interactive graphic user interface for making a digital design for a data center. The GUIs may be click-selected and/or by drag-and-drop selection from the grid element library to the design layout or schematic diagram, as illustrated on FIG. 19.

In one embodiment, an EnergyNet Grid Element Photo Capture application is provided by the advanced EnergyNet Platform. Field technicians are responsible for capturing Microgrid and DER information as part of a site survey or energy assessment. EnergyNet streamlines this process by taking advantage of the geo location and camera capabilities of modern smartphones. All mobile field captured information is immediately available to the back office support team.

Figure 45:
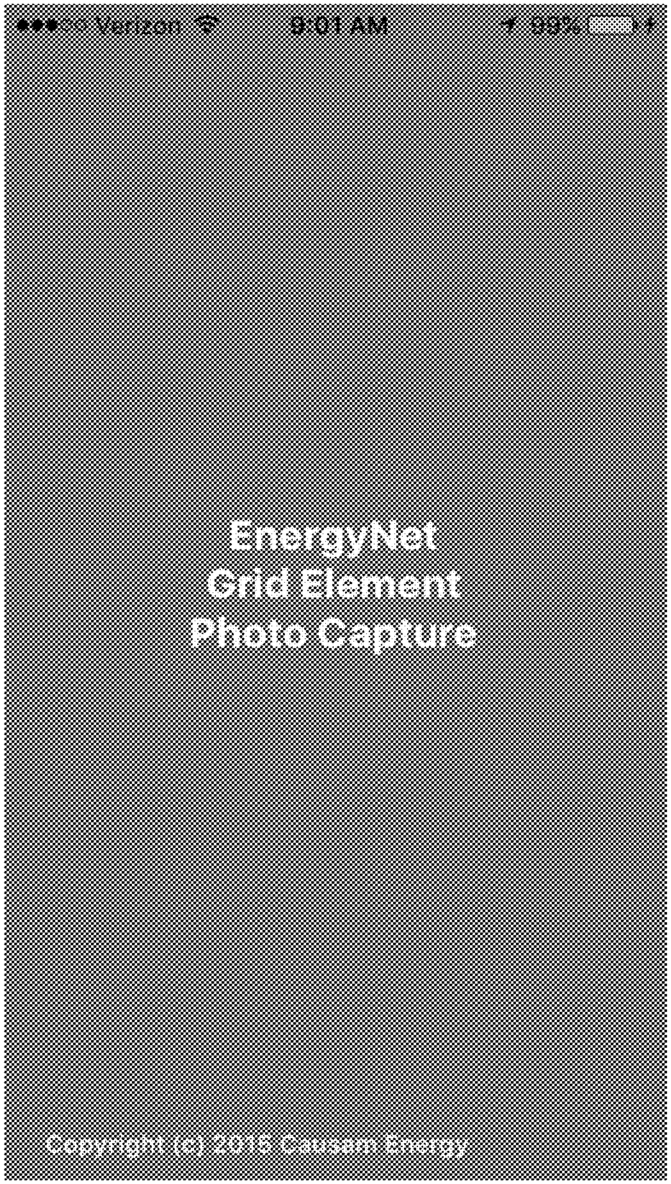
FIG. 45 is a screenshot for the EnergyNet Grid Element Photo Capture application.

FIG. 45 is a screenshot for the EnergyNet Grid Element Photo Capture application. Field technicians install this application on any modern smartphone platform including iOS and Android. Professional ruggedized devices can be pre-provisioned and shipped to field technicians, or field technicians can use their own commodity equipment available over the counter.

Figure 46:
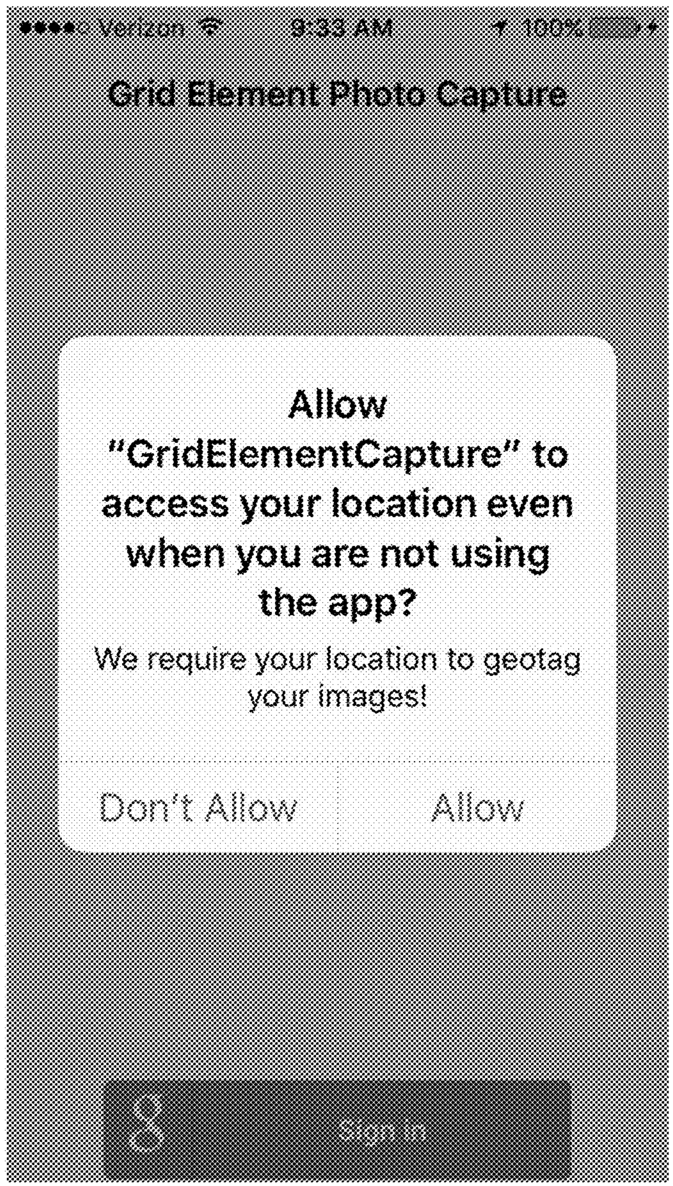
FIG. 46 is another screenshot for the EnergyNet Grid Element Photo Capture application.

FIG. 46 is another screenshot of the EnergyNet Grid Element Photo Capture application. A field technician launches the application for the first time, a dialogue window pops out asking "allow "GridElementCaputre" to access your location even when you are not using the app?" and reminding "we require your location to geotag your images." The filed technician approves the application to record and/or geotag pictures.

Figure 47:
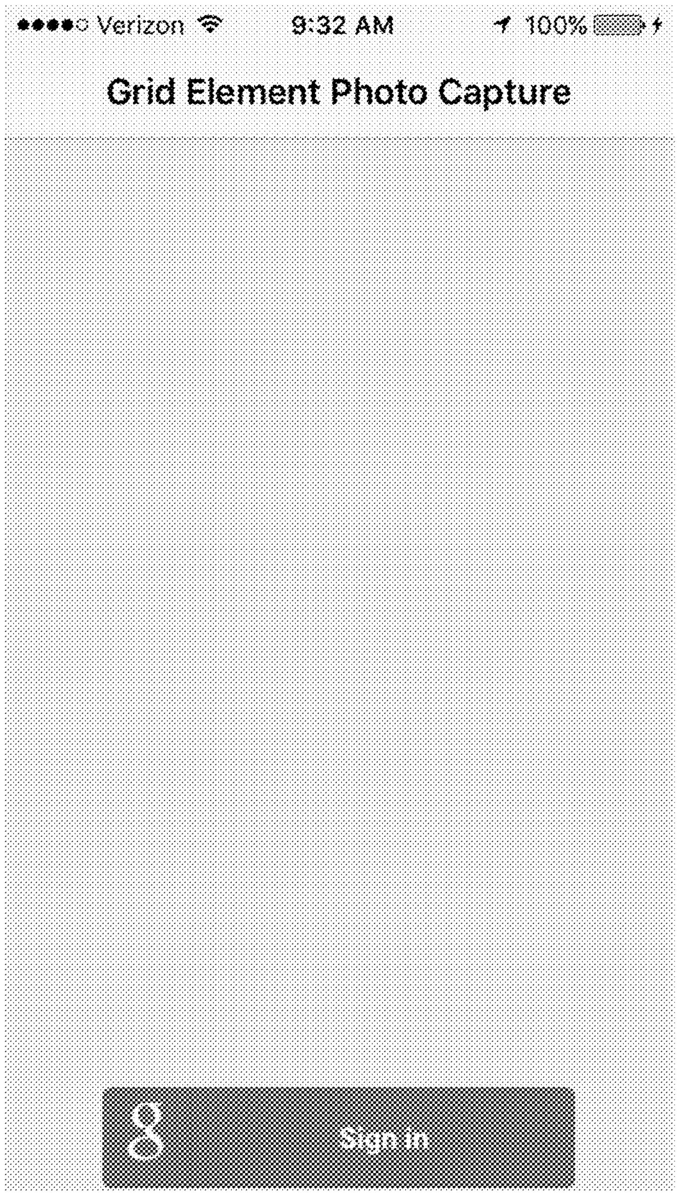
FIG. 47 is another screenshot for the EnergyNet Grid Element Photo Capture application.

FIG. 47 is another screenshot of the EnergyNet Grid Element Photo Capture application. A field technician authenticates via single sign-in with cloud service, such as google, or enterprise service, such as Active Directory or SAP.

Figure 48:
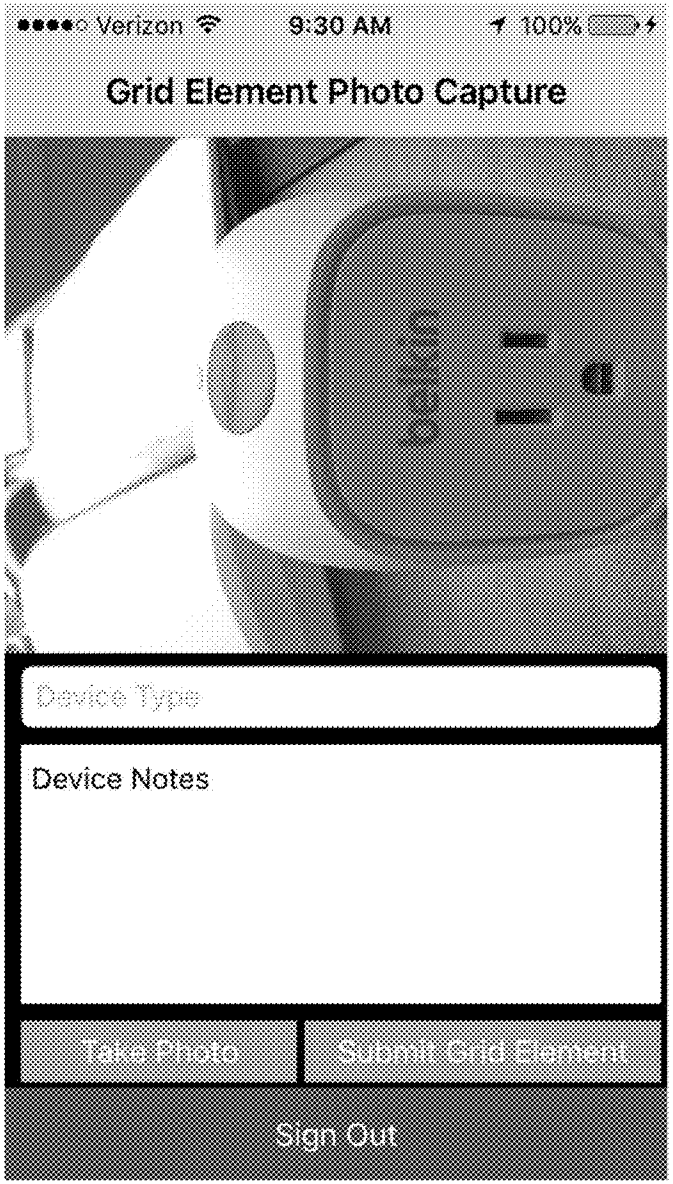
FIG. 48 is another screenshot for the EnergyNet Grid Element Photo Capture application.

FIG. 48 is another screenshot for the EnergyNet Grid Element Photo Capture application. The primary function of the application is to take pictures of grid elements, meters, infrastructure, and power bill invoices. The video camera on the device instantly activates and the view finder displays the object the video camera is pointed at. The field technician presses the "Take Photo" button to capture an image of the object.

Figure 49:
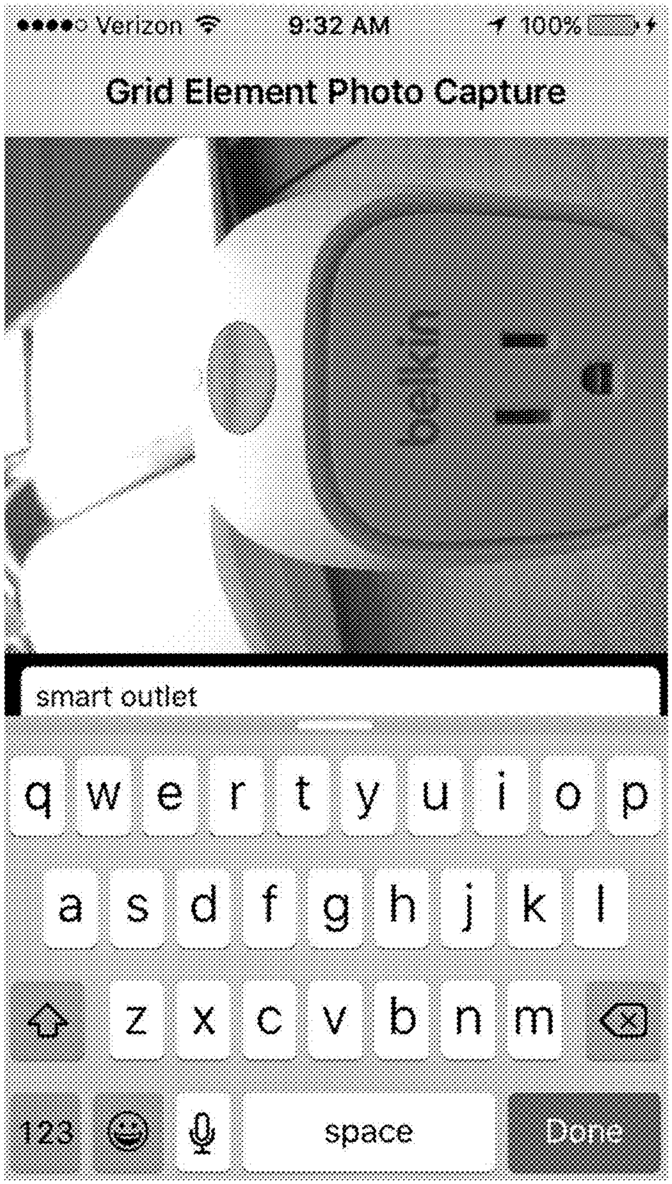
FIG. 49 is another screenshot for the EnergyNet Grid Element Photo Capture application.

FIG. 49 is another screenshot for the EnergyNet Grid Element Photo Capture application. After taking the image, the field technician is prompted to tag the content with a drop-down list of selections, free-form text, and optical character recognition (OCR) review and approval. For example, OCR can be used to automatically detect meter manufacturer brand information, face place data, or LCD real-time data points.

Figure 50:
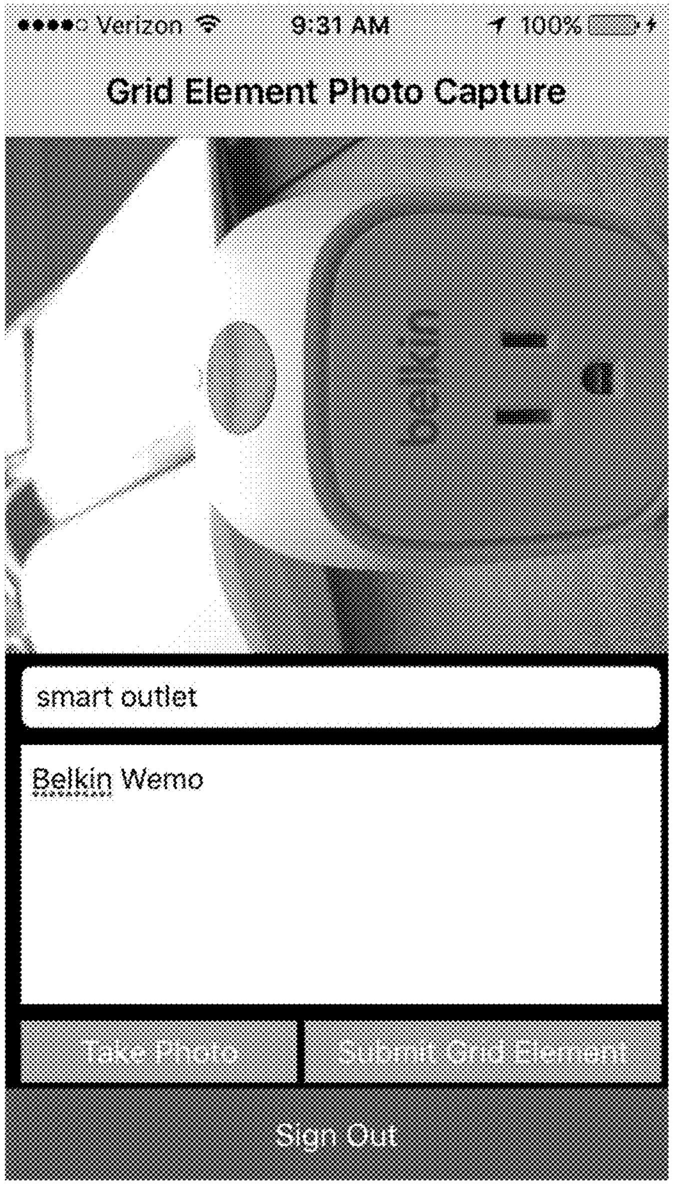
FIG. 50 is another screenshot for the EnergyNet Grid Element Photo Capture application.

FIG. 50 is another screenshot for the EnergyNet Grid Element Photo Capture application. After the image is tagged, the user presses the "Submit Grid Element" button. The image, tagging, description, location, geoTag are all sent to the server side.

The active grid elements within an electric power grid (or off the grid in alternative embodiments) operate to receive information automatically through a plurality of methods utilizing IP-based communications methods and web based devices such as in car computers, smart phones, computers, text messages, paging messages, or even voice response units or live customer service agents. Under a real time scenario, active grid elements could dynamically "Opt In" to a pre-determined profile or "Opt Out" or more importantly change the profile dynamically through the Energy Net Customer Portal GUI to take advantage of real time market pricing of electricity being sold by the utility, market participant, REP or any entity authorized to buy, sell and trade electric commodity or demand response products on behalf of the owner. Control activity including messaging for changing account and/or grid element settings, profile, functionality, and combinations thereof is also provided; analytics are included as well. Event-based messaging is also provided. In one embodiment, electric power is supplied through non-islanded microgrid or cogeneration. The settlement is independent of utility. Transformers are functioning like diodes; current flowing through the branch is stopped. The advanced EnergyNet settlement platform matches load and supply as long as not exceeding limitations of the leg. The flow of power is stopped that is being measured by utility revenue grid meter by TDSP. In another embodiment, still with utility connected microgrid, but the advanced EnergyNet settlement platform can run bilateral transaction that is settled as described herein within. Add FERC Order No. 2003 and No. 2006 are incorporated by reference in entirety herein. The systems and methods of the present invention further provide for analyzing the control activity, responses to the controls (for example like Google adwords so that when a marketing message is provided, then there is compensation for the messaging like Google adwords), e.g., least cost provider for recharging mobile electric power storage and/or EVs; whoever plugs in also is preferably connected to the financial settlement network associated with the mobile app and/or charging terminal, which may further include a marketing database, so that as the consumer is reviewing possible opportunities. The system includes AES messaging and/or payment to clear the messages and/or data packet transmission, and for delivering the marketing message, and the analytics over the marketing message including but not limited to open rate, response rate, referral rate, purchase conversion rate.

In one embodiment of the present invention, the EV app and GUI provide for targeted mobile and in-car advertising to the user or consumer based upon the consumer profile, in particular where the consumer has authorized information to be shared or used for purposes other than for EV charging at any given time.

While the foregoing description of preferred embodiments illustrates the applications for EVs as automobiles, the present invention further includes other EV applications, including but not limited to trucks, transport vehicles, boats and boat marinas, and the like, and mobile battery charging for portable storage of electric power. Also, the present invention for EV automobiles applies to private residence and private parking facilities, as well as fixed and temporary public EV charging including but not limited to hotels, public parking slips or spots, public parking in garage settings, corporate, event venues, temporary parking, overflow parking, etc.

The EnergyNet data platform provides distinct graphic user interfaces (GUIs) for various participants of advanced energy settlements. In one embodiment, the GUIs are web-based interfaces. In another embodiment, the GUIs are interfaces of mobile application programs (Apps) for various participants.

The GUI enables simulation and modeling for building demand response resources DERs, microgrids, etc., allowing for a drag and drop that automatically triggers generation of a power model and a pro forma model having at least one generator and/or at least one load device associated with it, and an engineering interconnection based upon location, equipment, grid identifier, geodetic information, attachment point information, etc. The model considers collected data provided by the customer, historical data, and the current environment of the distribution system; it allows any operable attachment point to be an energy settlement and market-based financial settlement point, and provides an interconnection to the attachment point. The model also indicates if devices are added, provides cost information for the devices, lists the attributes of the devices, etc., which are used as inputs to generate a cost curve that determines how much the customer will spend and funds receivable based upon participation in programs (e.g., encouraging sustainable or alternative energy).

The system includes a grid element catalog that includes attributes of the grid elements. Based upon customer inputs, the model indicates options that match or fit the customer's profile. The model also provides information about financing and energy capacity programs as provided by REP, TDSP, independent system operator (ISO), RTO, community, FERC, and/or the governing body of the power grid. Once the customer selects a grid element, the system provides digital contract elements and/or financing terms associated with that grid element and/or corresponding services. For example, installation, service, and maintenance contract terms for generator, solar, etc. The digital contract is a standard form document between suppliers and consumers at wholesale or retail level. Digital contract terms are coordinated through the platform for market participants (e.g., utilities, consumers, and all parties between the utility and consumer). Digital contract terms for a grid element device are presented as part of update messaging and/or programming, through a coordinator or distributed database, or combinations thereof. Contract terms and data, including but not limited to financial settlements for grid elements and their participation on or with any electric power grid, extend through the fields of the template and function as a complex rules engine to be administered vis-à-vis the grid elements and related or corresponding services, distributed architectures, networks, etc.

The GUI shows options for customers based on customer preferences, data generated by the customer, and the results of power modeling. End use customers (residential or commercial) are presented choices for grid elements, OEMs offering grid elements, energy plans, and service and maintenance plans.

The platform makes calculations based upon the reliability of microgrids and/or DERs. These calculations are used to provide recommendations and updated information to users in real time and/or near real time through the GUIs.

Electric vehicles or other mobile power storage devices on the microgrid are part of the platform. The present invention allows for receiving, delivering, and/or discharging power from a mobile power storage device, interrupting the charging of that device, and combinations thereof with a portable market participant platform and corresponding GUI. Grid elements may decouple or couple to any pre-approved attachment point; this provides for dynamic interconnection of the grid element having mobile power storage. The platform dynamically updates the model for the grid upon confirmation of location or geo-detection of that grid element. The platform also contains predictive analytics that show locations in need of power inputs. Required components associated with the mobile storage device or electric vehicle include at least a meter for revenue grade metrology sufficient for market-based financial settlement and at least one pre-approved attachment point for the interconnect; the mobile storage device or electric vehicle must also be registered with the platform. Pre-approved interconnection zones are thus provided for mobile grid elements; these zones and/or their aggregation further provide for logical nodes for controlling or inputting power or load, demand response, etc. The zones may further function as balancing areas.

Utility Operator Interface

A utility operator interface provides a utility view for control room staff to control DERs with transparency. Maps, tables, and charts are applied for illustration and view in regional or smaller areas. Regional control scenario algorithm and detail view control for specific premise or units are applied for real-time behavior or run-mode adjustments to support grid operations.

Figure 51:
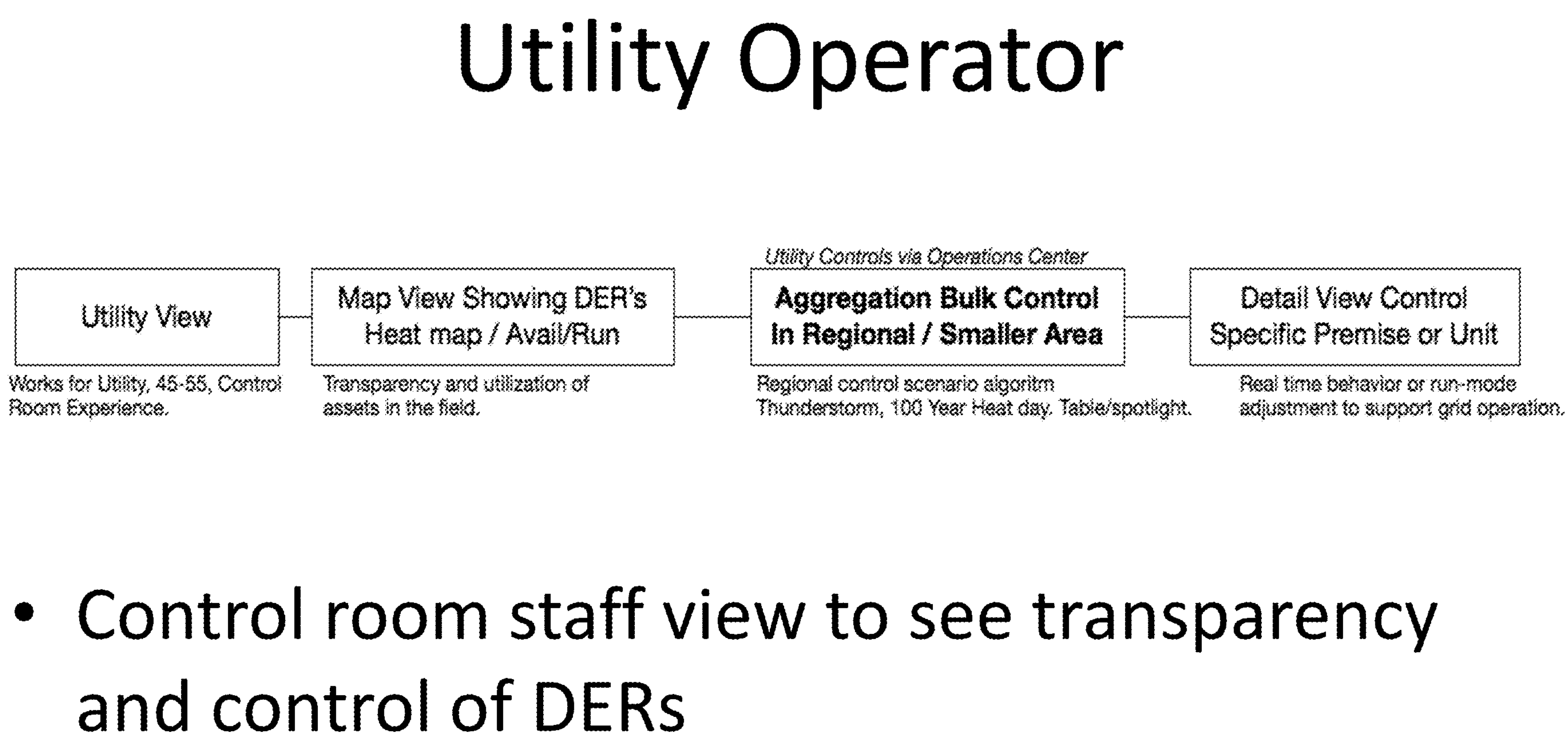
FIG. 51 is a block diagram for the functions of a utility operator interface provided by an EnergyNet data platform.

FIG. 51 is a block diagram for the functions of a utility operator interface provided by an EnergyNet data platform. The utility operator interface provides utility operators with a utility view, map view showing DERs, aggregation bulk control in regional or smaller areas, and detail view control for a specific premise or unit. In one embodiment, the map view of the utility operator interface includes a heat map of DERs showing available capacity and running capacity. It provides a transparent view of utilization of assets in the field. In one embodiment, a regional control scenario algorithm is used for aggregation bulk control. Current and/or historical weather and climate data may be listed in a table. Detail view control provides real-time behavior or run-mode adjustment to support grid operation.

Figure 52:
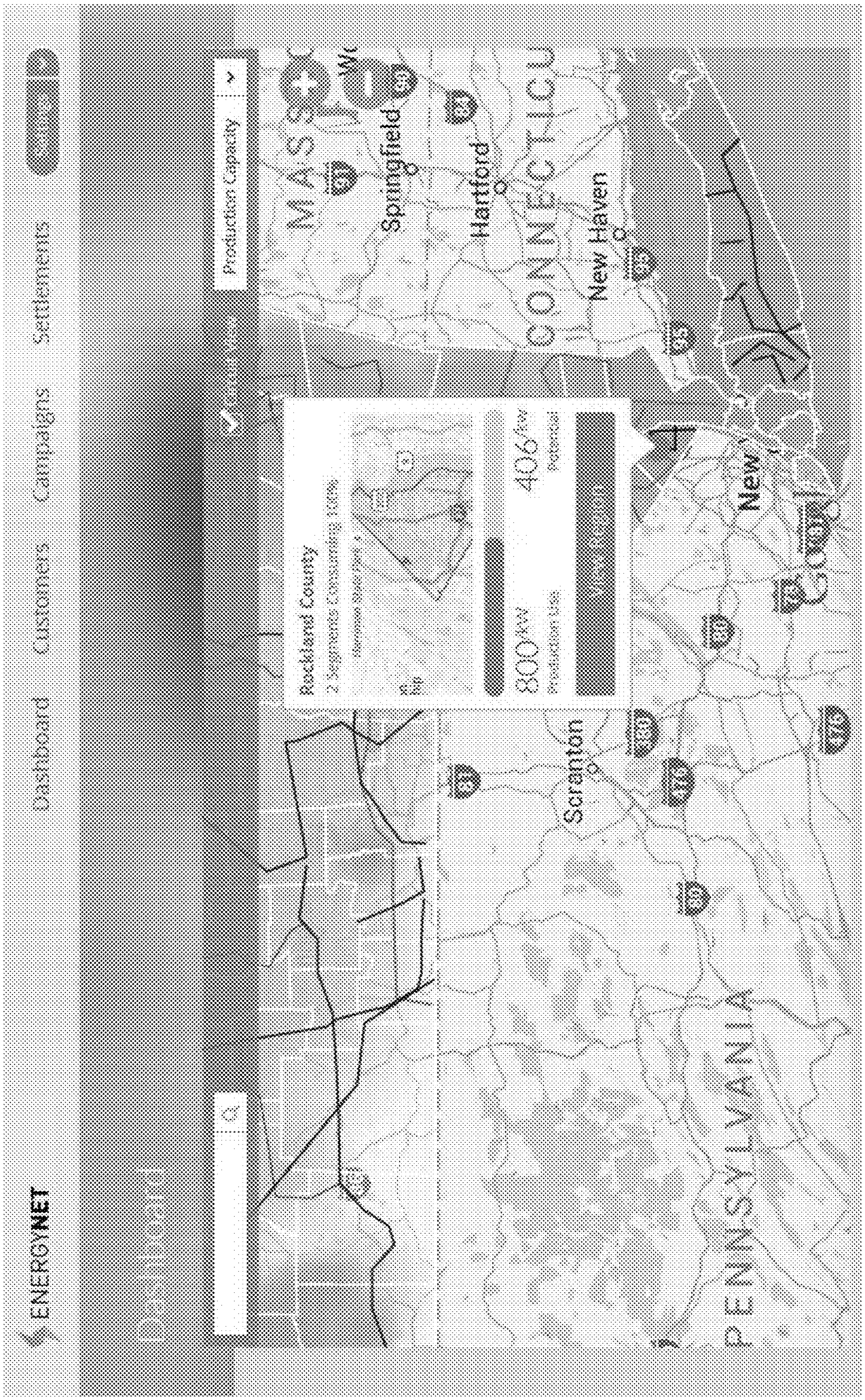
FIG. 52 is a screenshot of a utility operator interface showing a heat map of a distributed energy resource (DER) in a certain area displaying production capacity distribution by circuit view.
Figure 53:
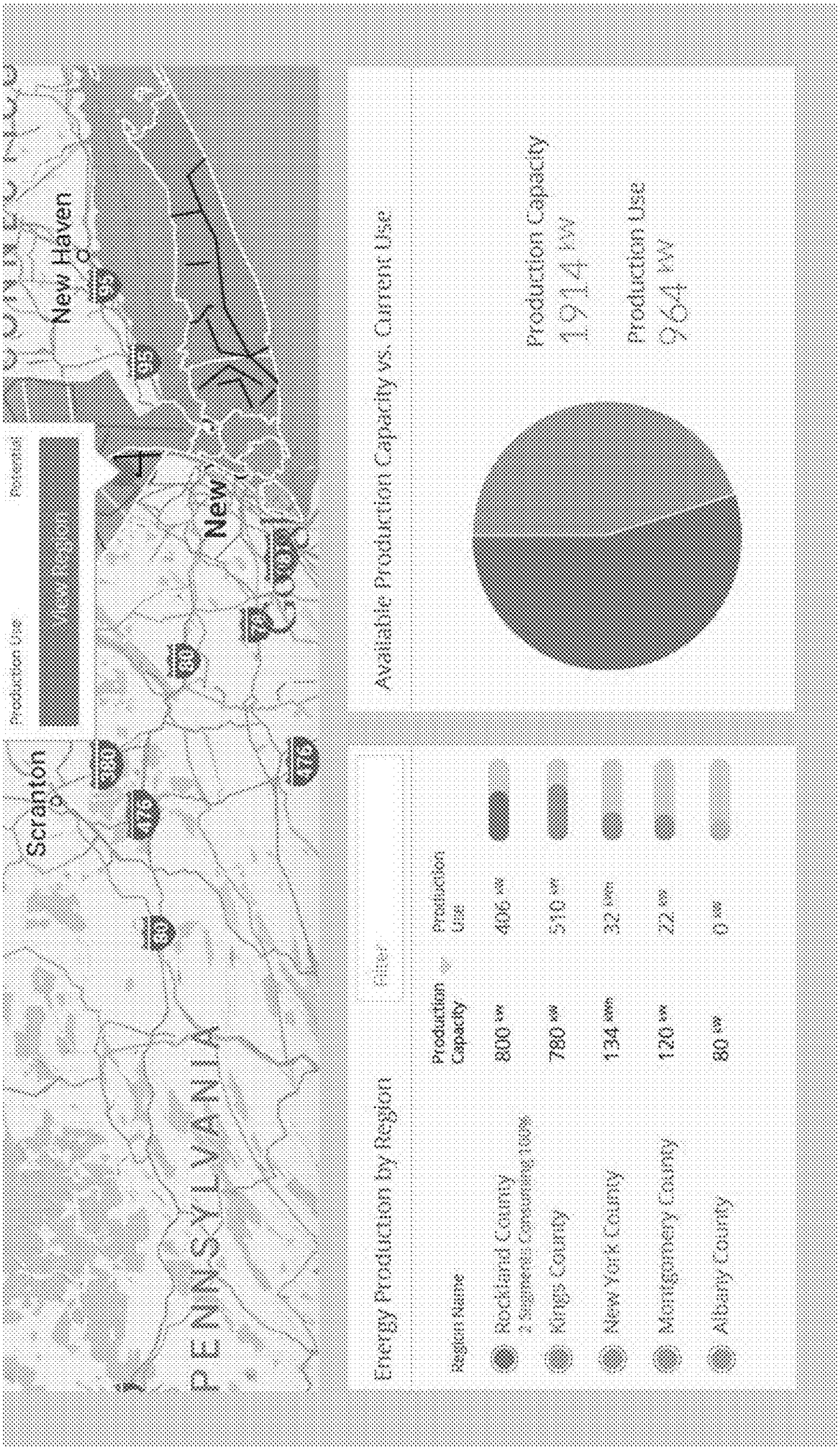
FIG. 53 is a screenshot of a utility operator interface showing energy production in a certain area by region.
Figure 54:
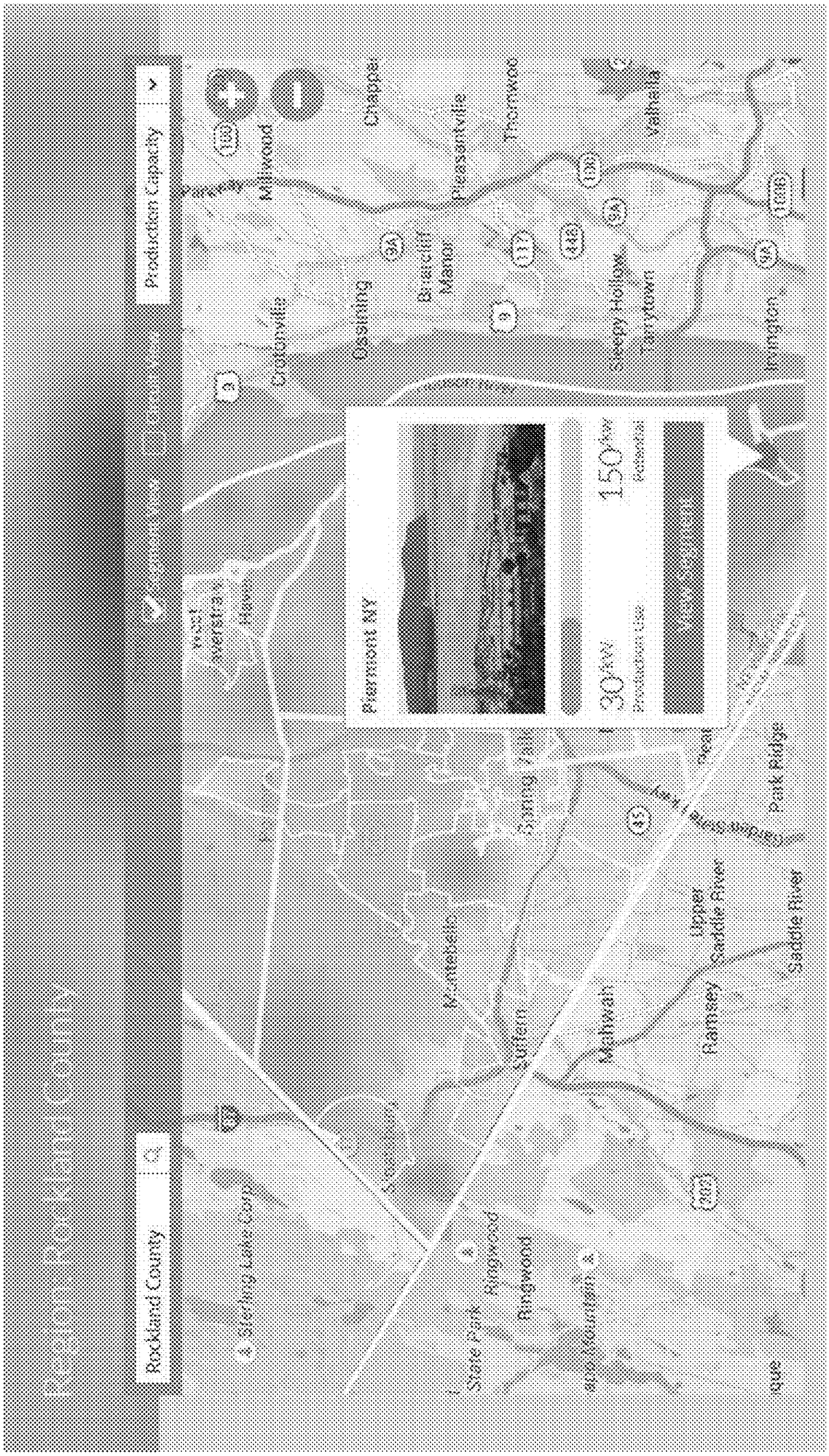
FIG. 54 is a screenshot of a utility operator interface showing a heat map of a DER displaying production capacity distribution by segment view.
Figure 55:
FIG. 55 is a screenshot of a utility operator interface showing a tabular and graphic description of different segments.
Figure 56:
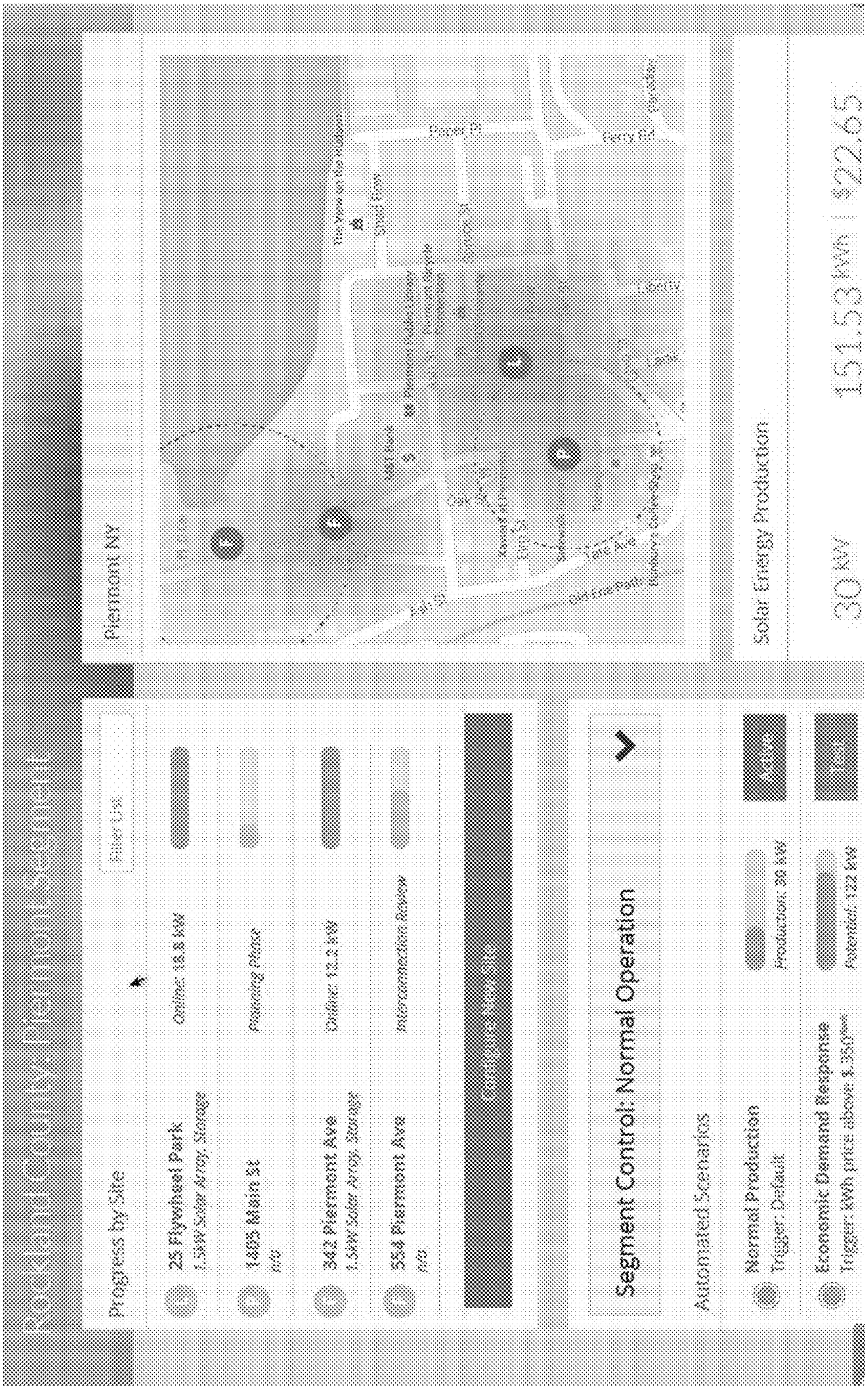
FIG. 56 is a screenshot of a utility operator interface providing a map of different DERs sites in a certain segment and information regarding each site's configuration.
Figure 57:
FIG. 57 is a screenshot of a utility operator interface showing a detailed energy description of a specific site.
Figure 58:
FIG. 58 is a screenshot of a utility operator interface describing the grid configuration of a specific site and showing the energy demand and usage of a specific site.

FIGS. 52-58 are screenshots of a utility operator interface. FIG. 52 shows a heat map of a distributed energy resource (DER) in a certain area displaying production capacity distribution by circuit view. FIG. 53 shows energy production in a certain area by region. Region name, production capacity, and production use are listed. A chart of available production capacity vs. current use is also displayed. FIG. 54 shows a heat map of a DER in a certain region displaying production capacity distribution by segment view. FIG. 55 shows a tabular and graphical description of different segments. Segment status, segment name, zip code, utility usage, the number of DERs sites in a segment, production potential, production use, and the microgrid configuration mode are listed in a table. The microgrid configuration mode options include but are not limited to normal production and economic demand response. When the utility cost is above a threshold, the microgrid in a certain segment may be in economic demand response mode. Control room staff can perform segment control via the utility operator interface, for example, to change microgrid configurations. Production sources are presented in a pie chart listing the type of power source, including but not limited to solar, generator, or storage. A bar graph of production vs. consumption is also shown, along with the average monthly production of energy per square foot, average monthly price per square foot for energy produced, average monthly consumption of energy per square foot, and average monthly price per square foot for energy consumed. FIG. 56 provides a map of different DERs sites in a certain segment and information regarding each site's configuration. Energy production, demand, and usage can be displayed for each site. The progress by site is shown, including information about whether a site is online, in the planning phase, or under interconnection review. A heat map including these different sites is also displayed. FIG. 57 provides a detailed energy description of a specific site. A heat map showing the location of the specific site is provided. Different energy sources, including alternate solar, utility, and battery storage, are listed with their current status, rate, and power usage. Solar energy production is illustrated in a bar graph, and values are shown for the current production and average daily production. FIG. 58 describes the grid configuration of a specific site and shows the energy demand and usage of that site. Various configuration modes include normal operation, off-grid island, grid parallel, distributed generation, demand response, and black start support. Utility operators are enabled to activate a certain configuration mode. Demand and use is displayed graphically, and information about the real-time power usage, current energy usage, current daily cost, average energy usage, and average daily cost is provided.

Interconnection Processing Interface

Figure 59:
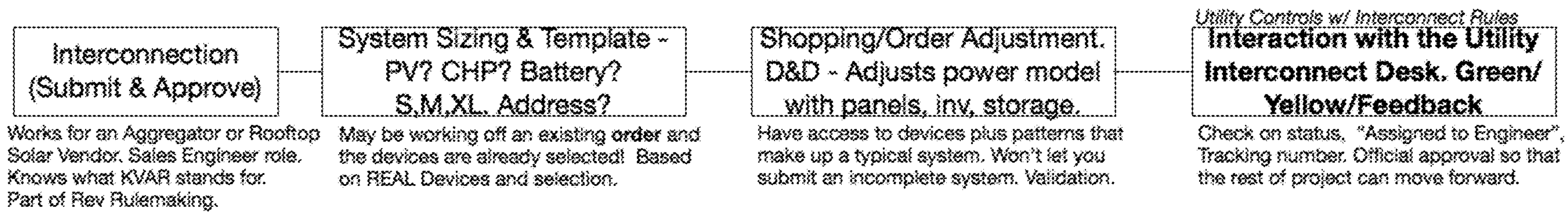
FIG. 59 is a block diagram for the functions of an interconnection processing interface provided by an EnergyNet data platform.

FIG. 59 is a block diagram for the functions of an interconnection processing interface provided by an EnergyNet data platform. The interconnection processing interface enables a sales engineer for a DER provider, demand response, curtailment response provider, or renewable energy provider, or any assets deployed at transmission/distribution system level for electric power grids to facilitate interconnection requests and studies, system sizing and template, shopping and order adjustments, and interaction with the utility interconnect desk. The interconnection processing interface also provides a validation function wherein a sales engineer is unable to submit an incomplete system.

Figure 60:
FIG. 60 is a screenshot of an interconnection processing interface showing interconnection progress by site.
Figure 61:
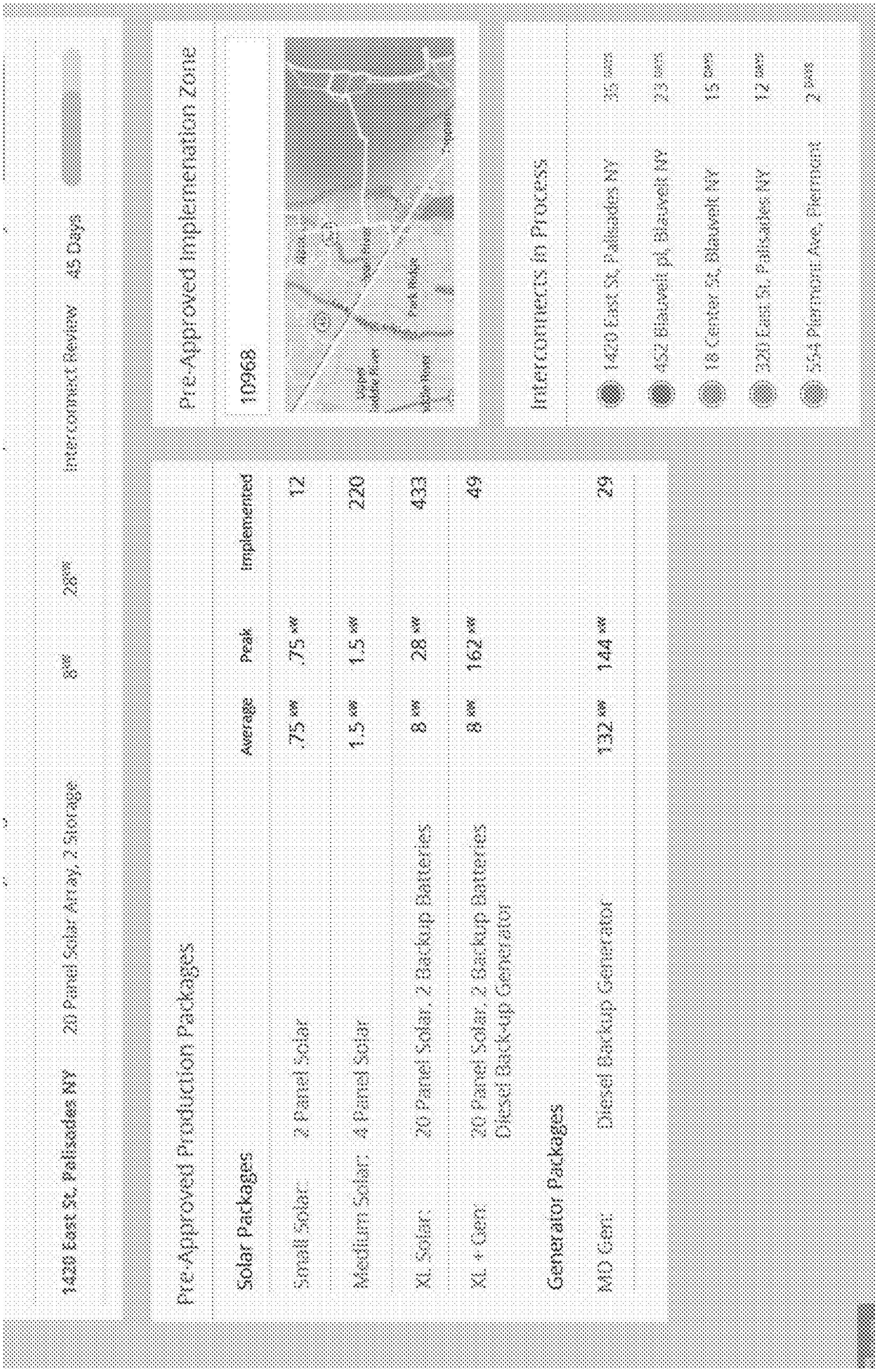
FIG. 61 is a screenshot of an interconnection processing interface displaying pre-approved production packages and listing interconnects in progress.
Figure 62:
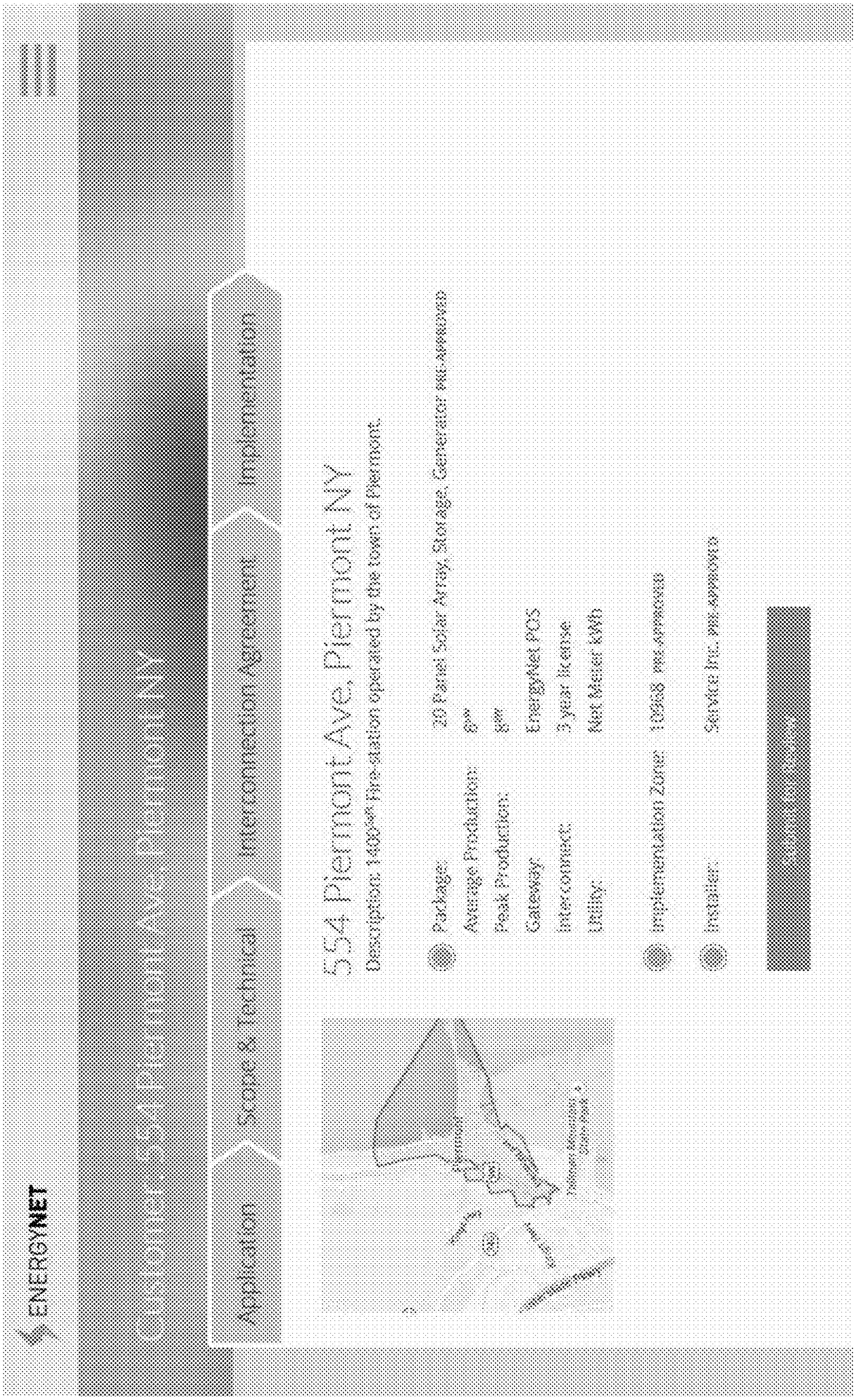
FIG. 62 is a screenshot of an interconnection processing interface displaying the scope and technical description for an interconnection application submitted for review.
Figure 63:
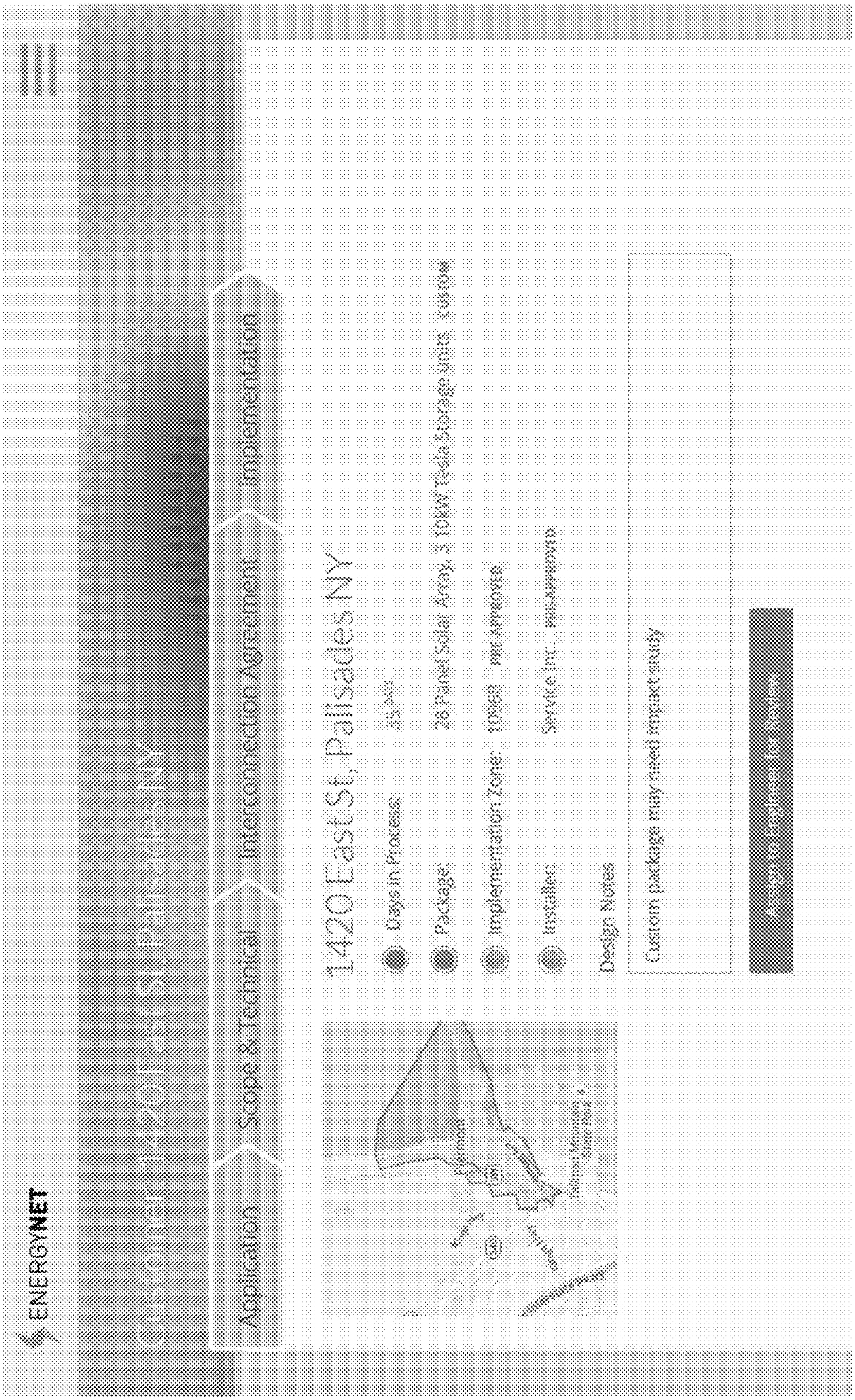
FIG. 63 is a screenshot of an interconnection processing interface displaying information about the interconnection agreement for an interconnection application assigned to an engineer for review.

FIGS. 60-63 are screenshots of an interconnection processing interface. FIG. 60 shows interconnection progress by site. Address, production configuration, average power, peak power, interconnection request stage, and time in progress are provided for each site. FIG. 61 displays pre-approved production packages. Descriptions of solar packages including size, equipment needed (e.g., solar panels, backup batteries, and backup generators), average power, peak power, and the number of implemented packages are provided, as well as descriptions of generator packages including the average power, peak power, and number of implemented packages. The interface also includes a list of interconnects in progress and the time in progress. FIG. 62 displays the scope and technical description for an interconnection application submitted for review. The interface displays a description of the site, the package selected by the customer, the average power production, peak power production, gateway, interconnect license information, utility, implementation zone, and installer. FIG. 63 displays information about the interconnection agreement for an interconnection application assigned to an engineer for review. The interface displays the address, days in process, package selected by the customer, implementation zone, and installer; it also allows for design notes to be entered about the application.

Vendor/Aggregator View Interface

Figure 64:
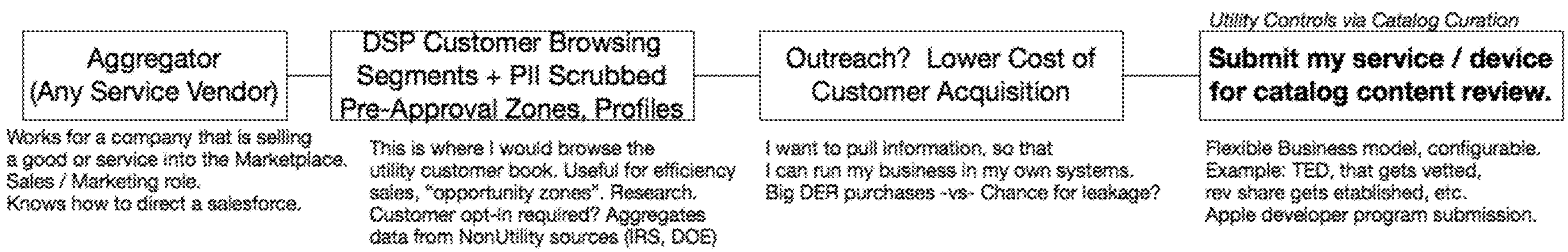
FIG. 64 is a block diagram for the functions of a vendor/aggregator view interface provided by an EnergyNet data platform.

FIG. 64 is a block diagram for the functions of a vendor/aggregator view interface provided by an EnergyNet data platform. The interface enables vendors/aggregators to browse distributed service provider customers, perform outreach, lower the cost of customer acquisition, and submit services and devices for catalog content review.

Figure 65:
FIG. 65 is a screenshot of a vendor/aggregator view interface listing top customer segments, top sellers in the marketplace, top campaigns in the marketplace, and pre-approved production zones.
Figure 66:
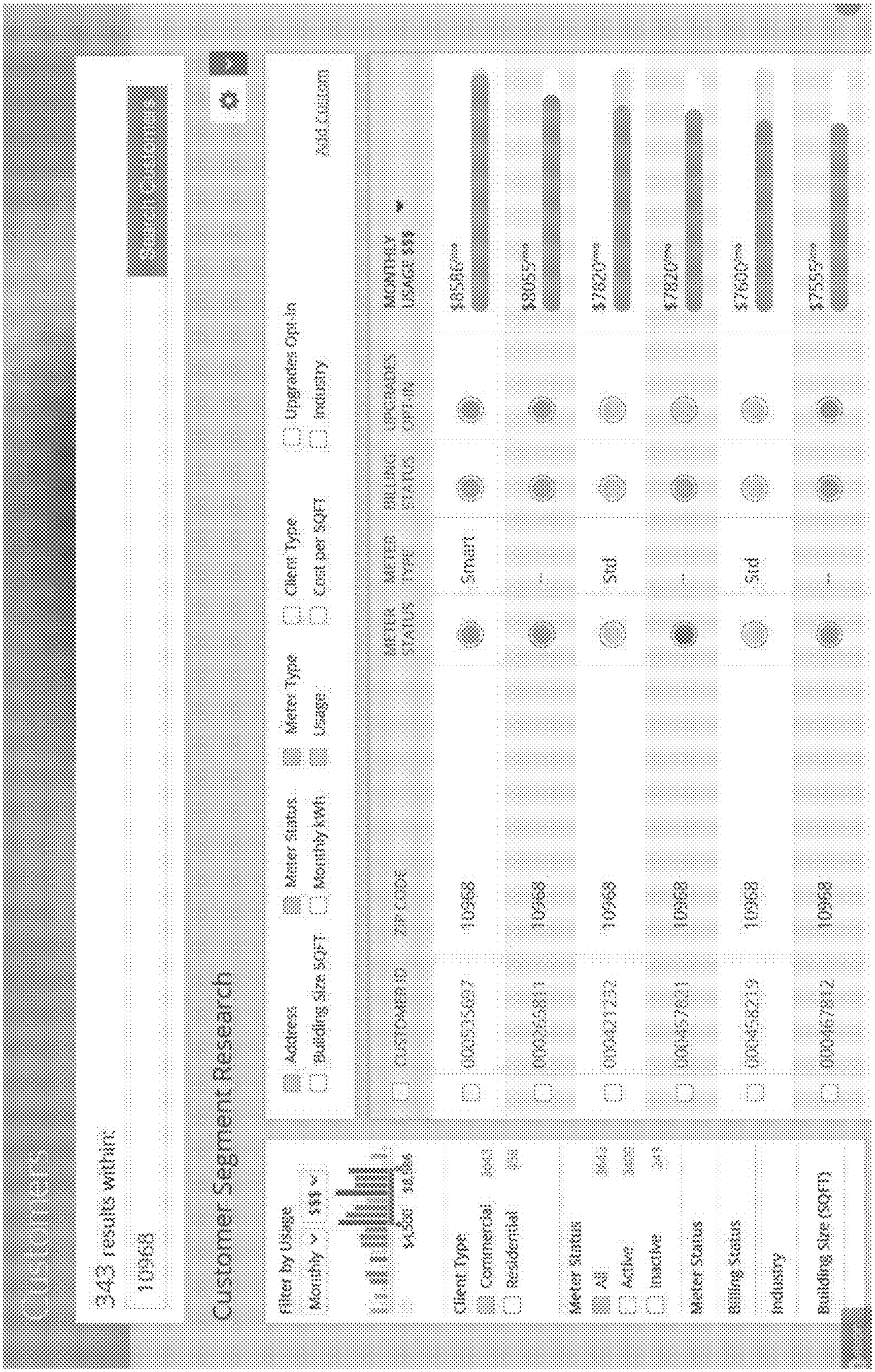
FIG. 66 is a screenshot of a vendor/aggregator view interface displaying customer segment research for vendors/aggregators.
Figure 67:
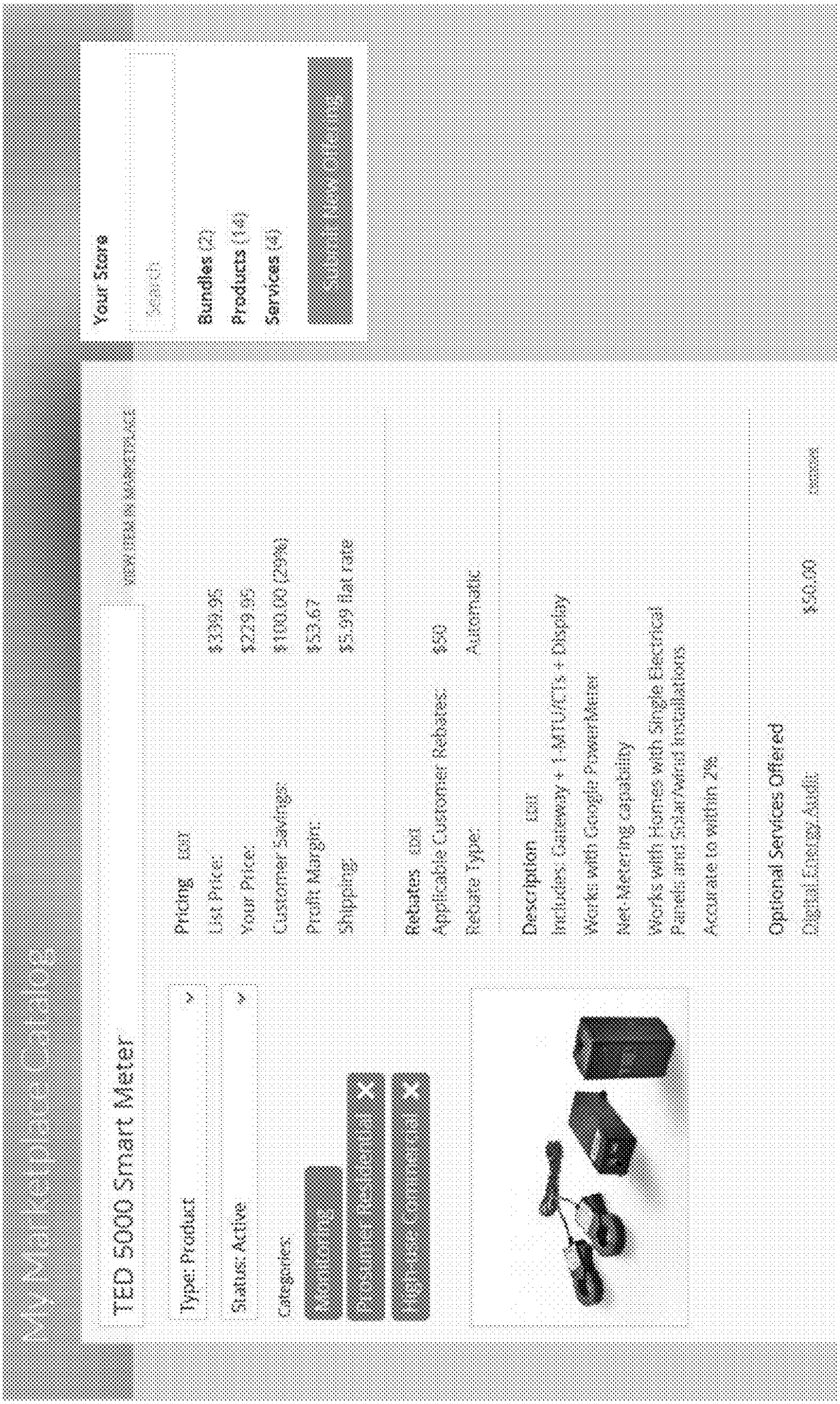
FIG. 67 is a screenshot of a vendor/aggregator view interface displaying submission of a device for catalog content review.

FIGS. 65-67 are screenshots of a vendor/aggregator view interface. Vendors can see their portfolio and prospect for new sales via the vendor/aggregator view interface. FIG. 65 lists top customer segments, top sellers in the marketplace, top campaigns in the marketplace, and pre-approved production zones. FIG. 66 displays customer segment research for vendors/aggregators. The platform is operable to allow a vendor user from level 3 (L3) to search customers based on key words, for example, zip code. The system also presents vendors with GUIs or views customers using relevant information such as address, meter status (e.g., active, inactive), meter type, client type (commercial or residential), billing status, upgrades opt-in, building size, monthly cost, monthly energy consumption, cost per square foot, industry type, etc. FIG. 67 displays submission of a device for catalog content review. Vendors/aggregators can edit information regarding pricing, rebates, and descriptions for a certain type of device, and provide information regarding optional services offered.

Marketplace View Interface

Figure 68:
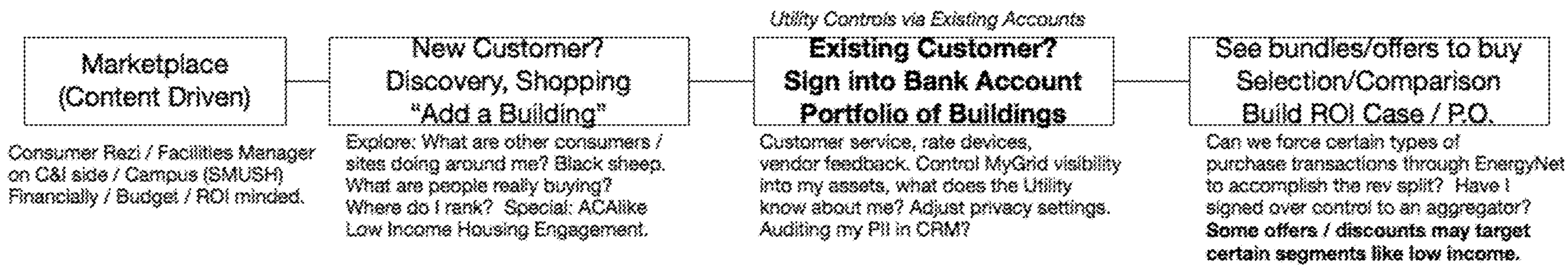
FIG. 68 is a block diagram for the functions of a marketplace view interface provided by an EnergyNet data platform.

FIG. 68 is a block diagram for the functions of a marketplace view interface. The marketplace view interface enables new customers to discover what other customers are doing in the market, and enables existing customers to manage their portfolios on the market and see bundles and offers for transaction.

Figure 69:
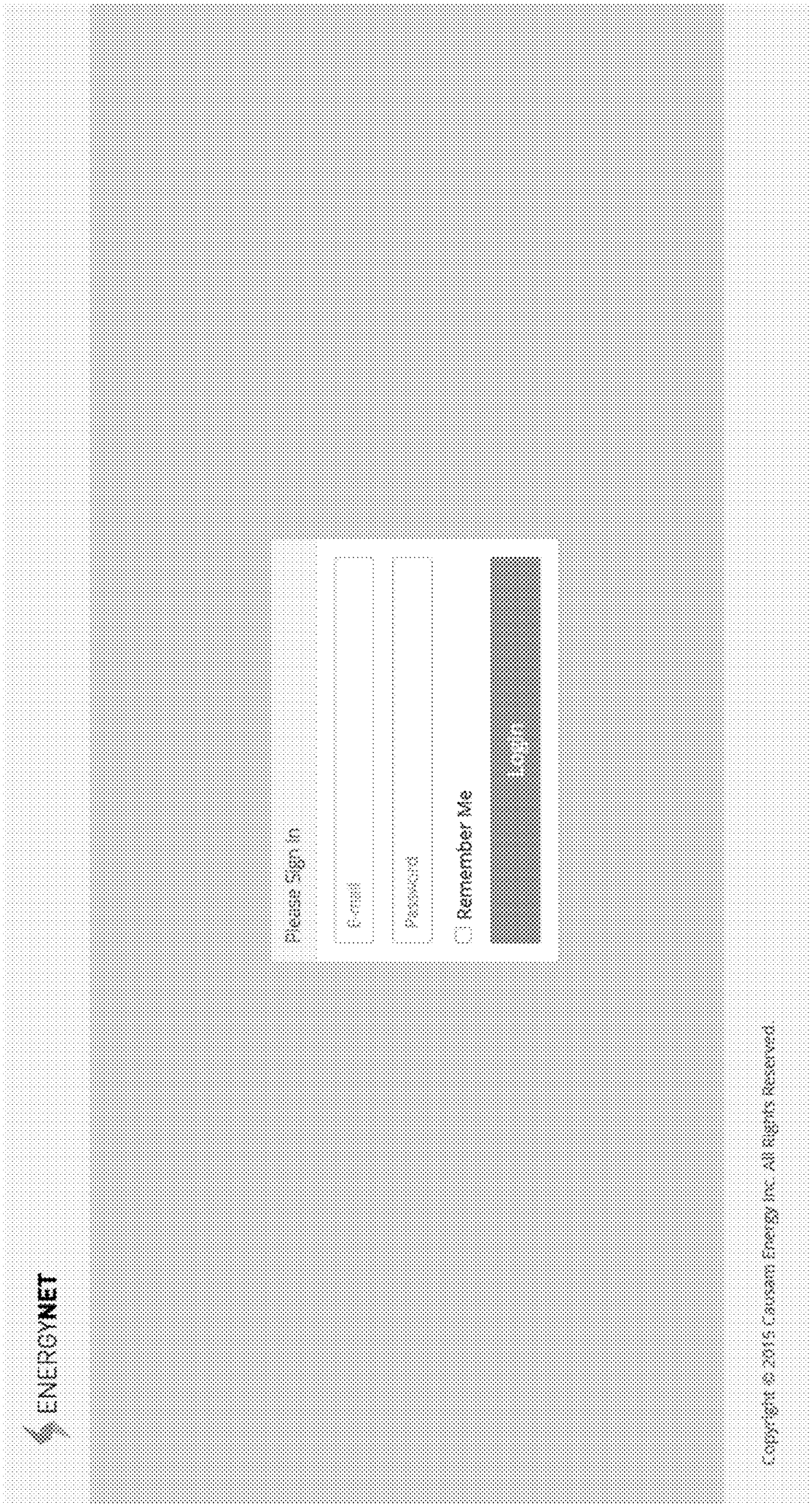
FIG. 69 is a screenshot of the log in screen for a marketplace view interface.
Figure 70:
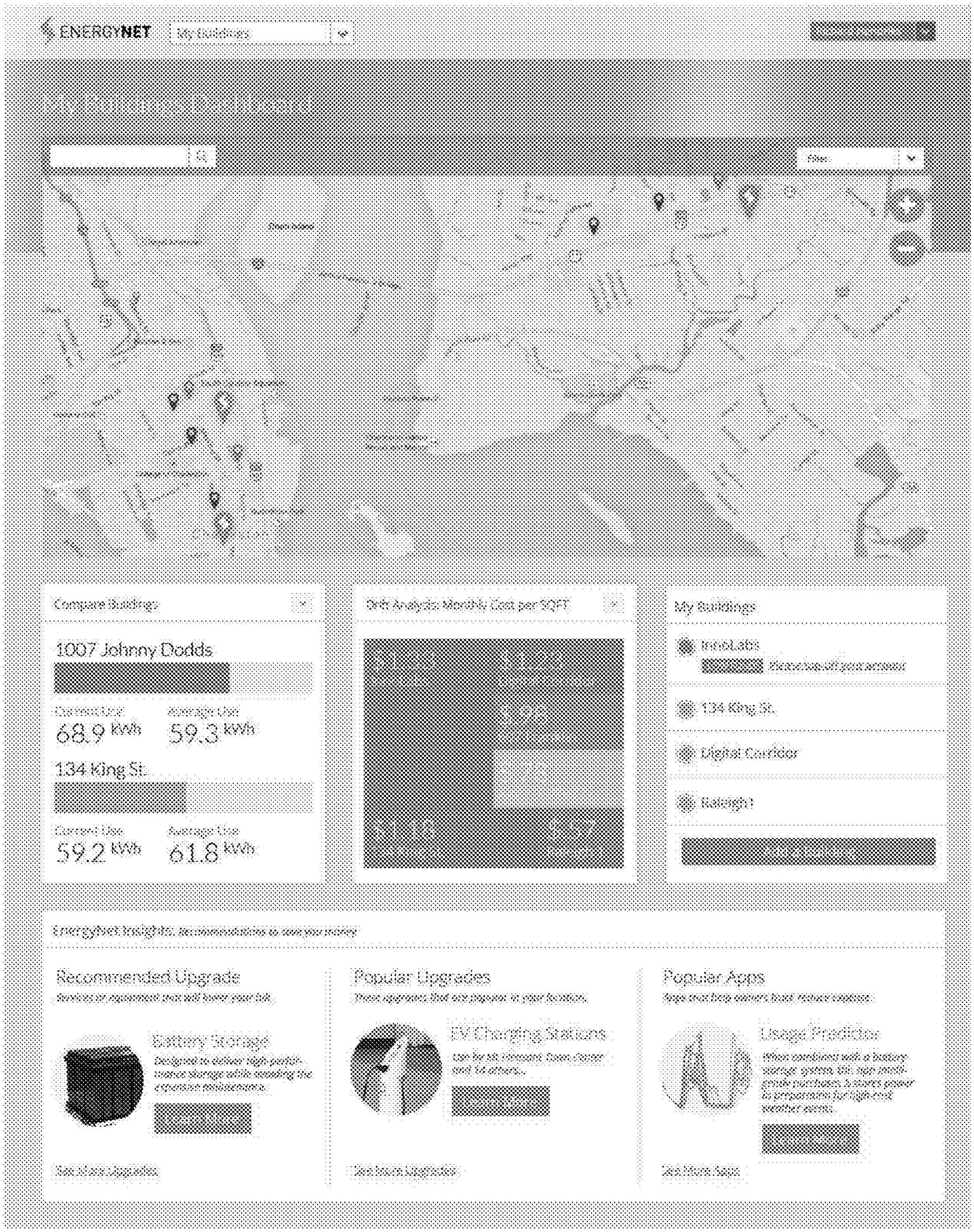
FIG. 70 is a screenshot of a marketplace view interface displaying a customer's buildings on a map and information related to energy usage at the buildings.
Figure 71:
FIG. 71 continues to illustrate the marketplace view interface of FIG. 70 with an overlay providing information about a specific building.
Figure 72:
FIG. 72 is a screenshot of a marketplace view interface displaying the description, energy rate, current/average usage, and daily cost for a site.

FIGS. 69-86 are screenshots of a marketplace view interface. The marketplace view interface enables commercial, industrial, and residential participants, such as homeowners or facility managers, to see their energy information, shop for new products or services in the marketplace on the EnergyNet platform, and manage rate plans. FIG. 69 is a screenshot of the log in screen for a marketplace view interface. FIGS. 70-72 display various functions under the "Dashboard" tab in the marketplace view interface. FIG. 70 displays a customer's buildings on a map and information related to energy usage at the buildings. The interface provides a list of all buildings owned or managed by the customer, the monthly cost per square foot for each building, and allows the customer to compare buildings. FIG. 71 continues to illustrate the marketplace view interface of FIG. 70 with an overlay providing information about a specific building. The overlay lists the price per square foot and energy rate for the building. FIG. 72 displays the description, energy rate, current/average usage, and daily cost for a site. The power sources for the site are listed (e.g., utility, solar, backup generator), and a summary of the account balance is shown. Additionally, a recommendation to configure the site's grid to connect to nearby microgrid producers is displayed.

Figure 73:
FIG. 73 is a screenshot of a marketplace view interface displaying current energy usage.
Figure 74:
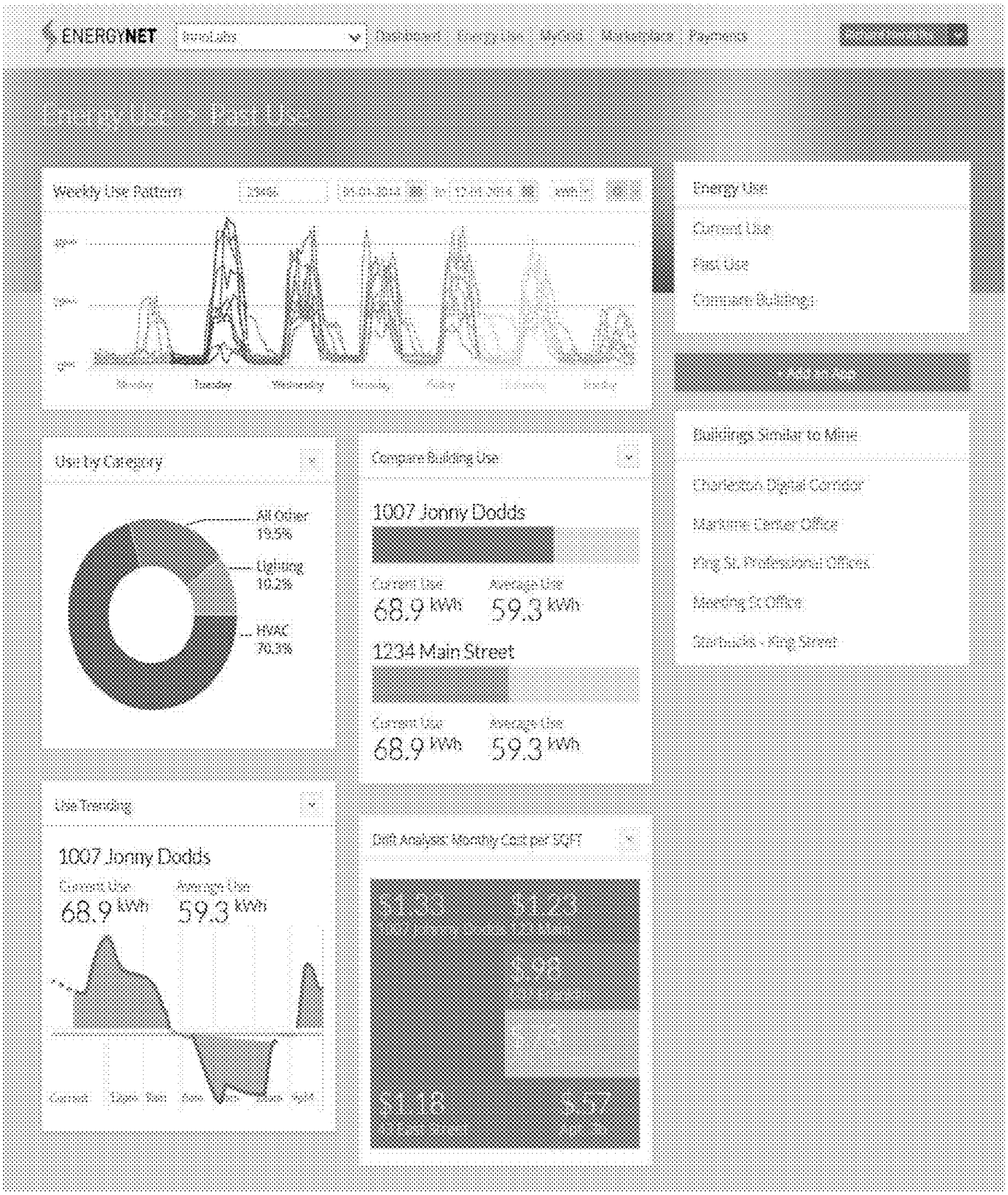
FIG. 74 is a screenshot of a marketplace view interface displaying past energy usage.
Figure 75:
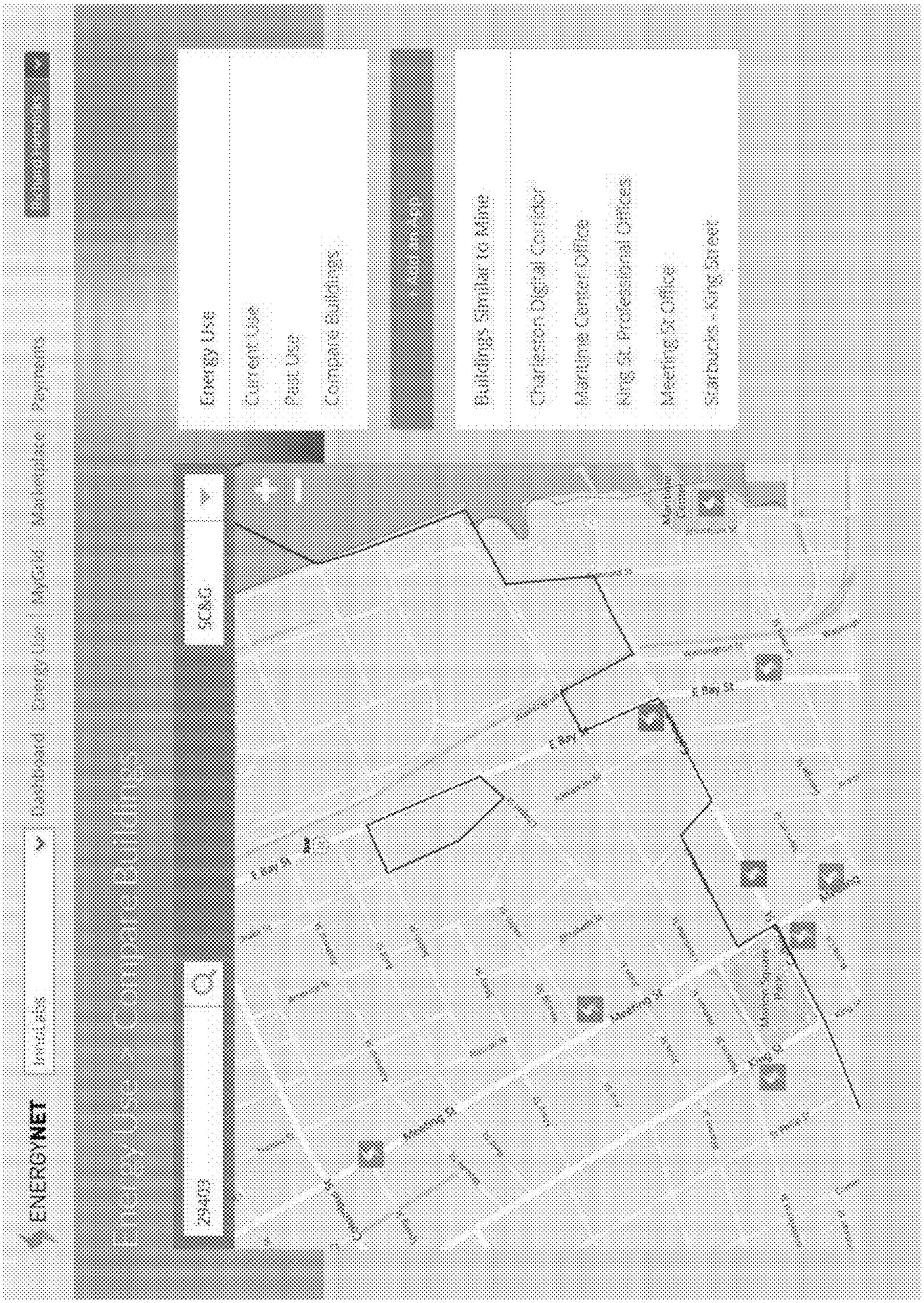
FIG. 75 is a screenshot of a marketplace view interface allowing users to compare the energy use of different buildings.
Figure 76:
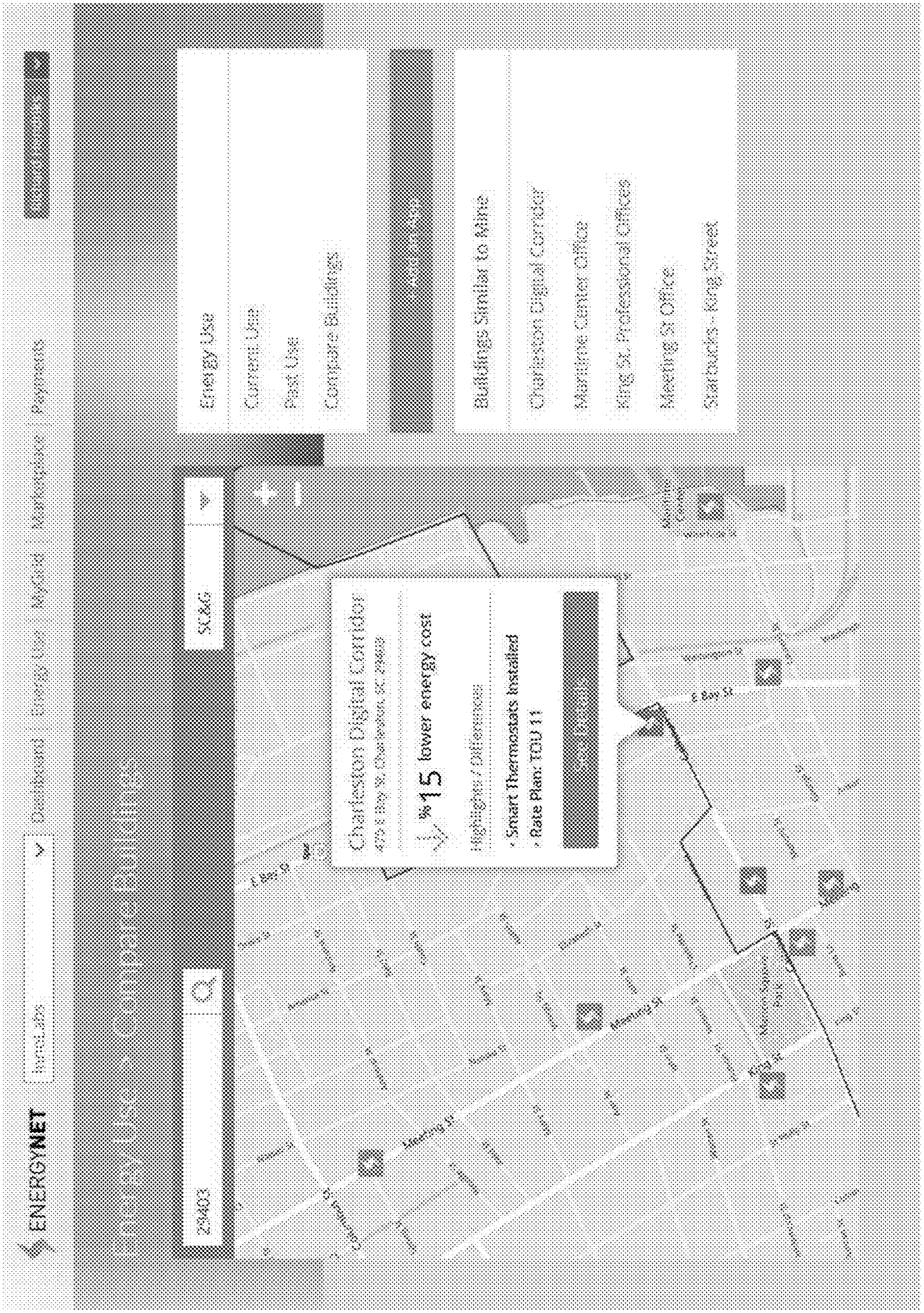
FIG. 76 continues to illustrate the marketplace view interface of FIG. 75 with an overlay showing a brief description of a selected building.
Figure 77:
FIG. 77 is a screenshot of a marketplace view interface showing a comparison between two buildings.
Figure 78:
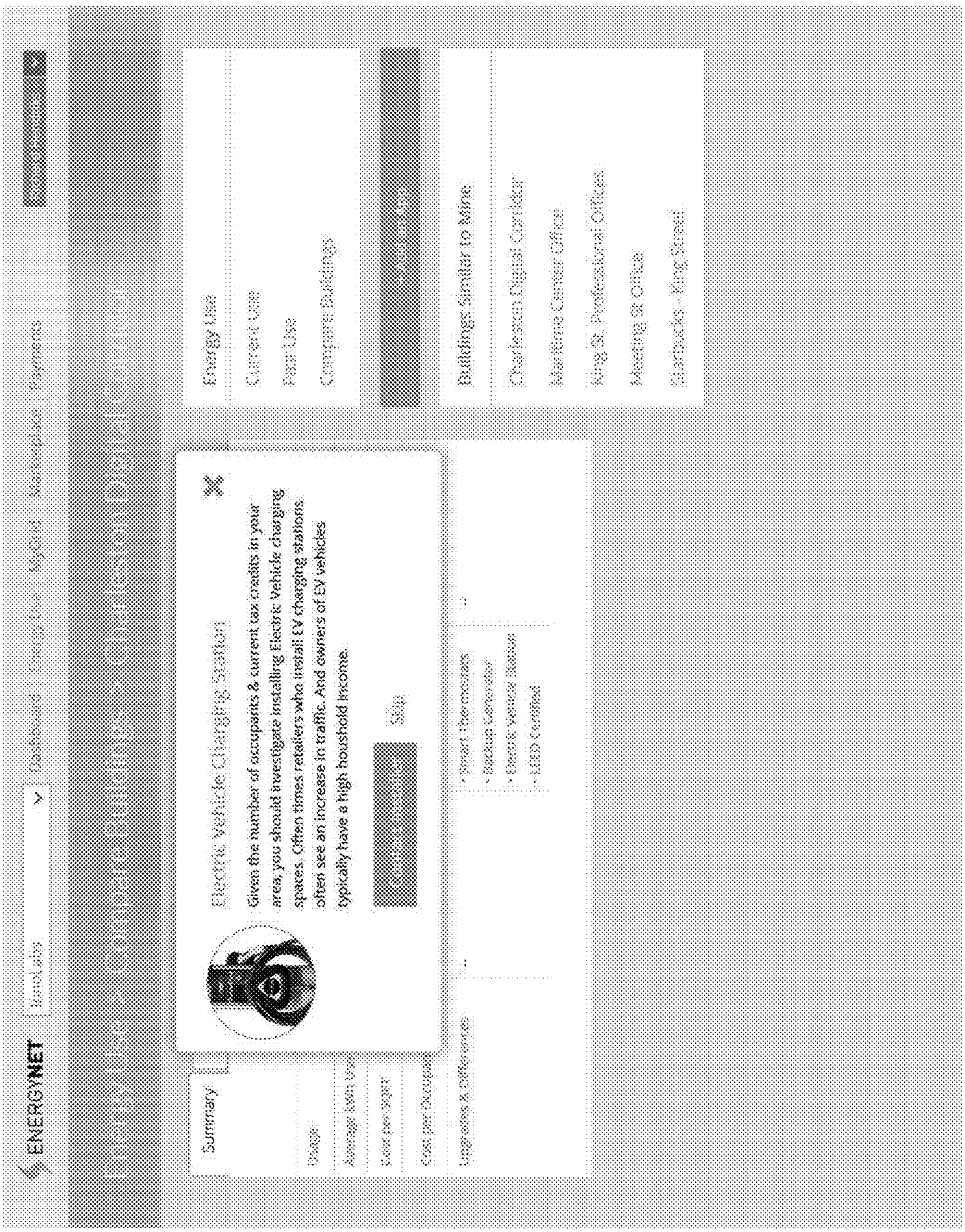
FIG. 78 continues to illustrate the marketplace view interface of FIG. 77 with an overlay showing a recommendation to install an electric vehicle charging station.

FIGS. 73-78 display various functions under the "Energy Use" tab in the marketplace view interface. FIG. 73 displays current energy usage, including a real-time power usage chart, average daily power usage, peak daily power usage, peak monthly power usage, cumulative daily energy use, average daily energy usage, 30 day energy usage, and 30 day reactive energy usage. FIG. 74 displays past energy usage, including weekly use pattern, use by category, use trending, building use comparison, and drift analysis. FIG. 75 is a screenshot of a marketplace view interface allowing users to compare the energy use of different buildings. FIG. 76 continues to illustrate the marketplace view interface of FIG. 75 with an overlay showing a brief description of a selected building. FIG. 77 shows a usage and cost comparison between two buildings. The interface also allows the user to compare the energy use of a specific building to the regional average. FIG. 78 continues to illustrate the marketplace view interface of FIG. 77 with an overlay showing a recommendation to install an electric vehicle (EV) charging station.

Figure 79:
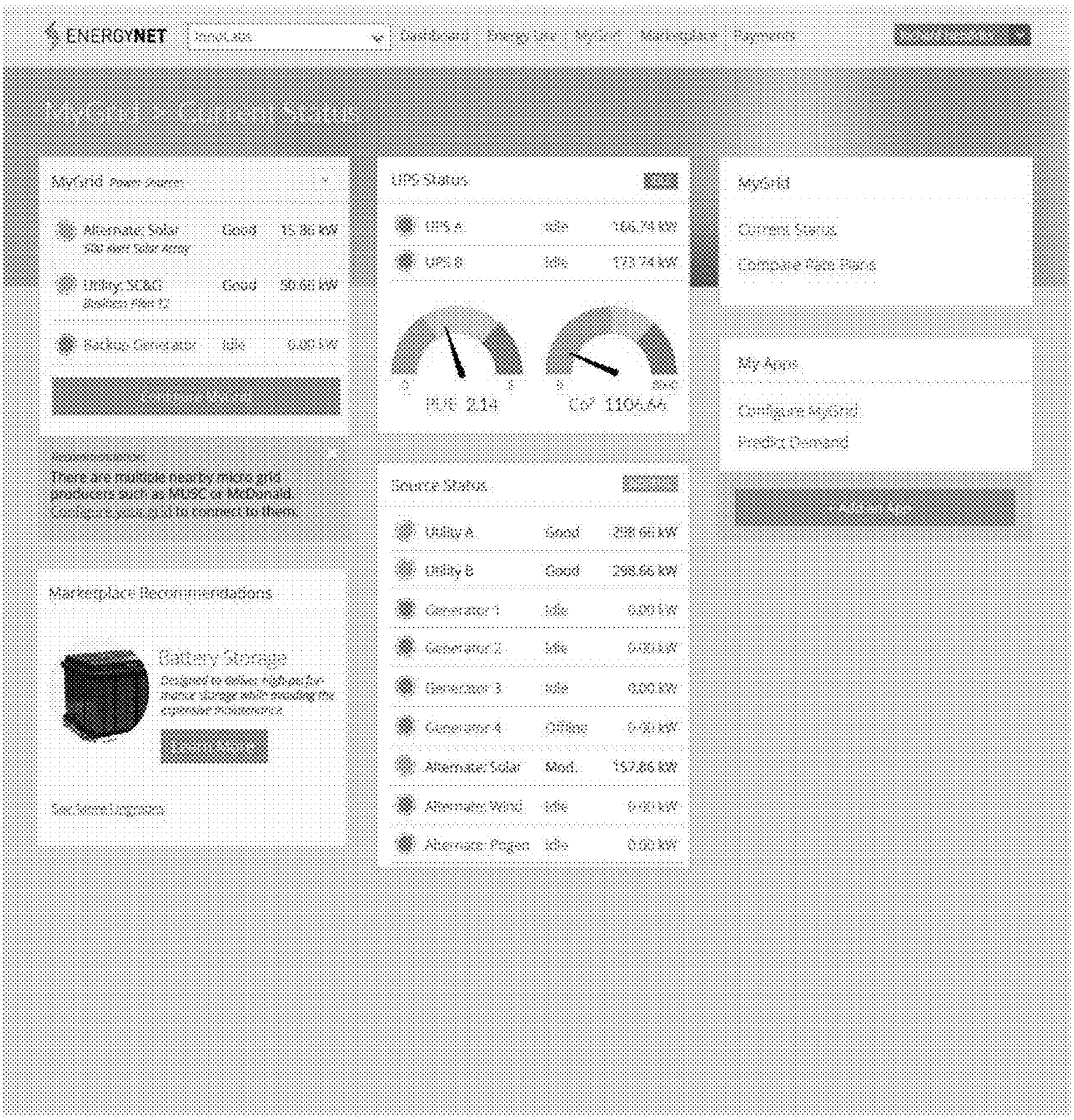
FIG. 79 is a screenshot of a marketplace view interface showing the current status of a customer's grid.

FIG. 79 displays the current status of a customer's grid. Power sources (e.g., solar, utility, backup generator) are listed with real-time and/or near-real-time status and power level, and real-time and/or near-real-time UPS status and power levels are displayed. Graphic representations of power usage efficiency (PUE) and carbon dioxide emissions are shown. A table showing source status, including the source name, status, and power level, is displayed. Additionally, a recommendation to configure the site's grid to connect to nearby microgrid producers is displayed, as well as a recommendation to purchase an upgraded battery storage device.

Figure 80:
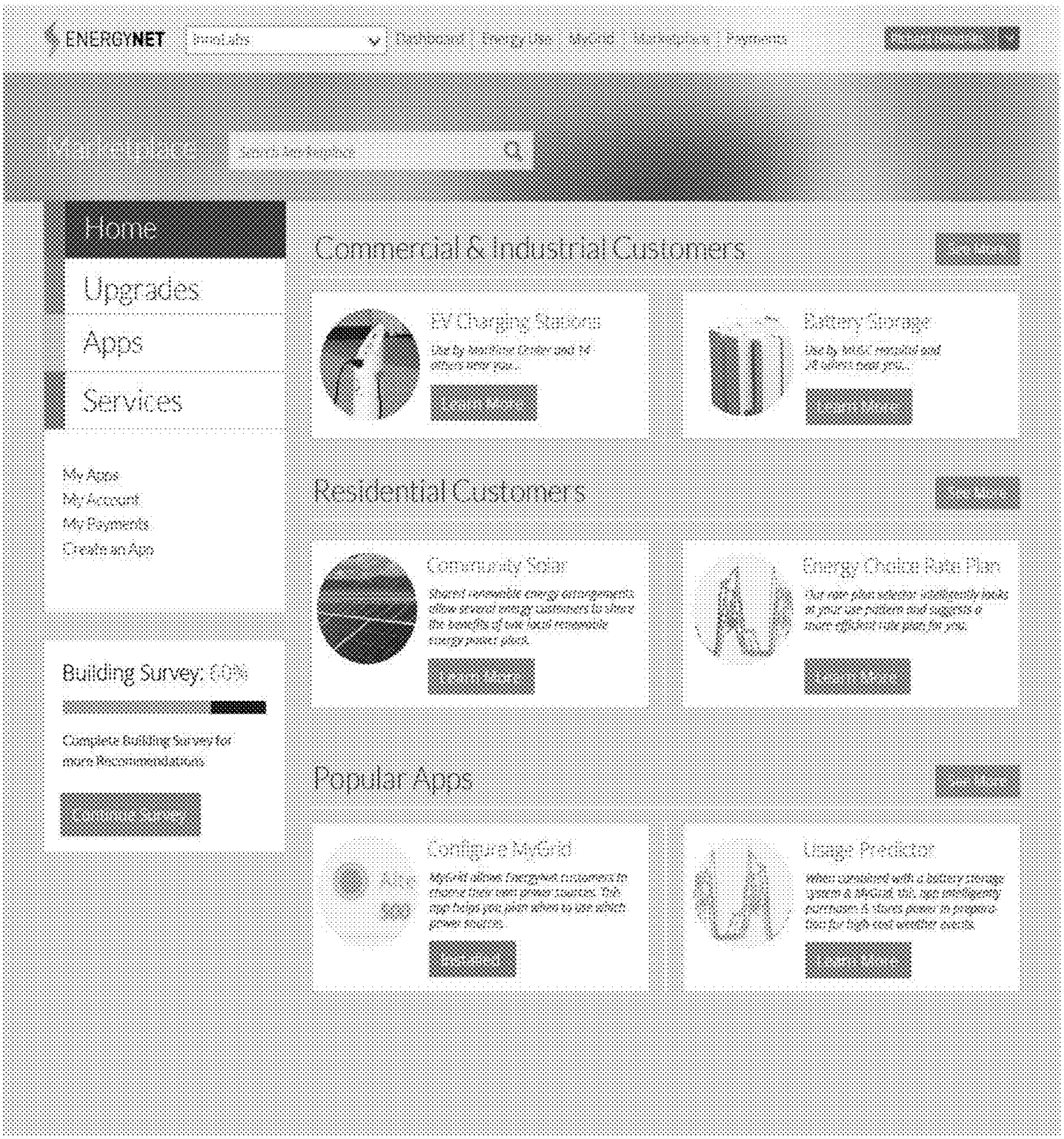
FIG. 80 is a screenshot of the home page of the marketplace for commercial and industrial customers, residential customers, and popular apps.
Figure 81:
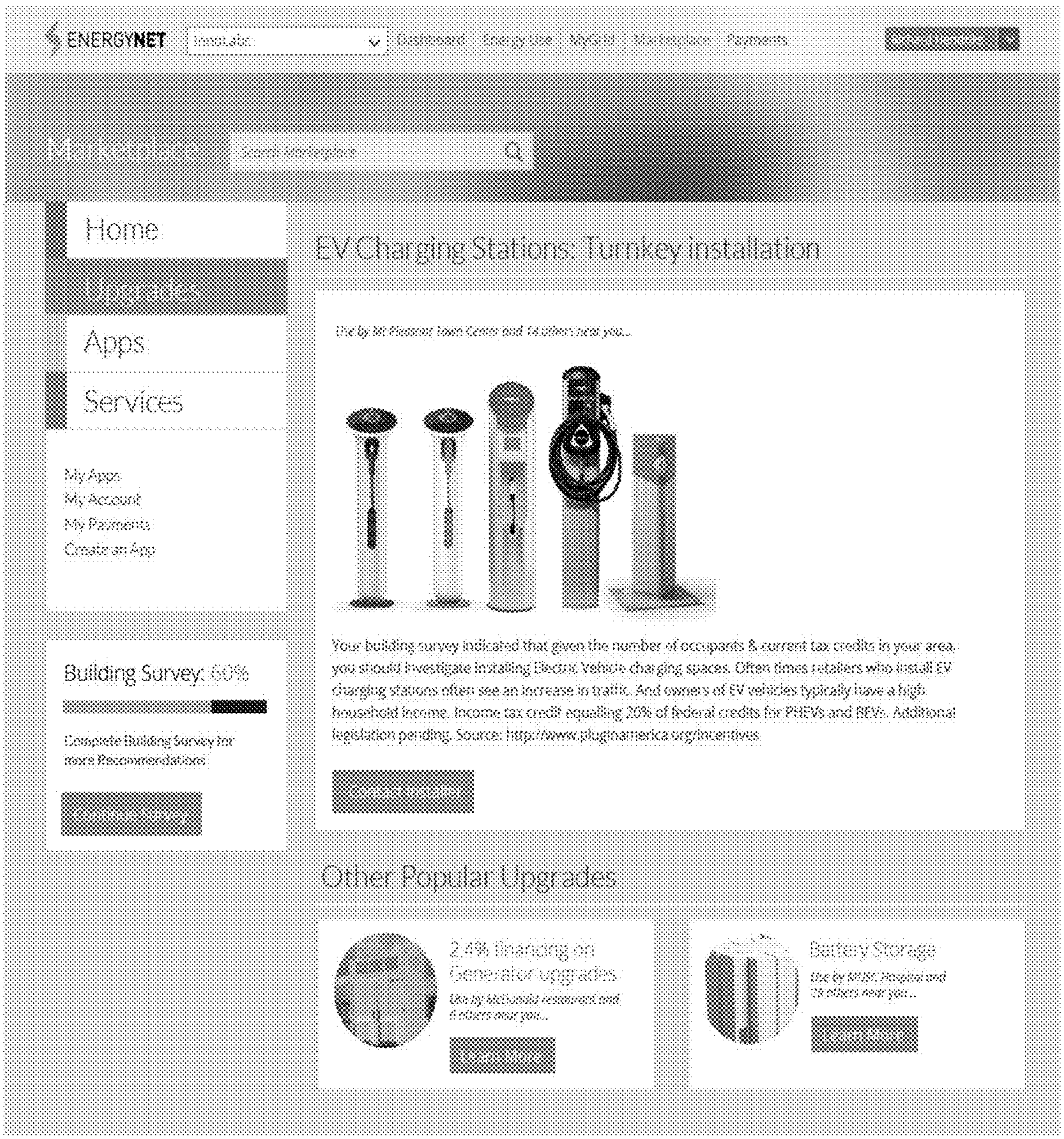
FIG. 81 is a screenshot showing upgrade options in a marketplace view interface.
Figure 82:
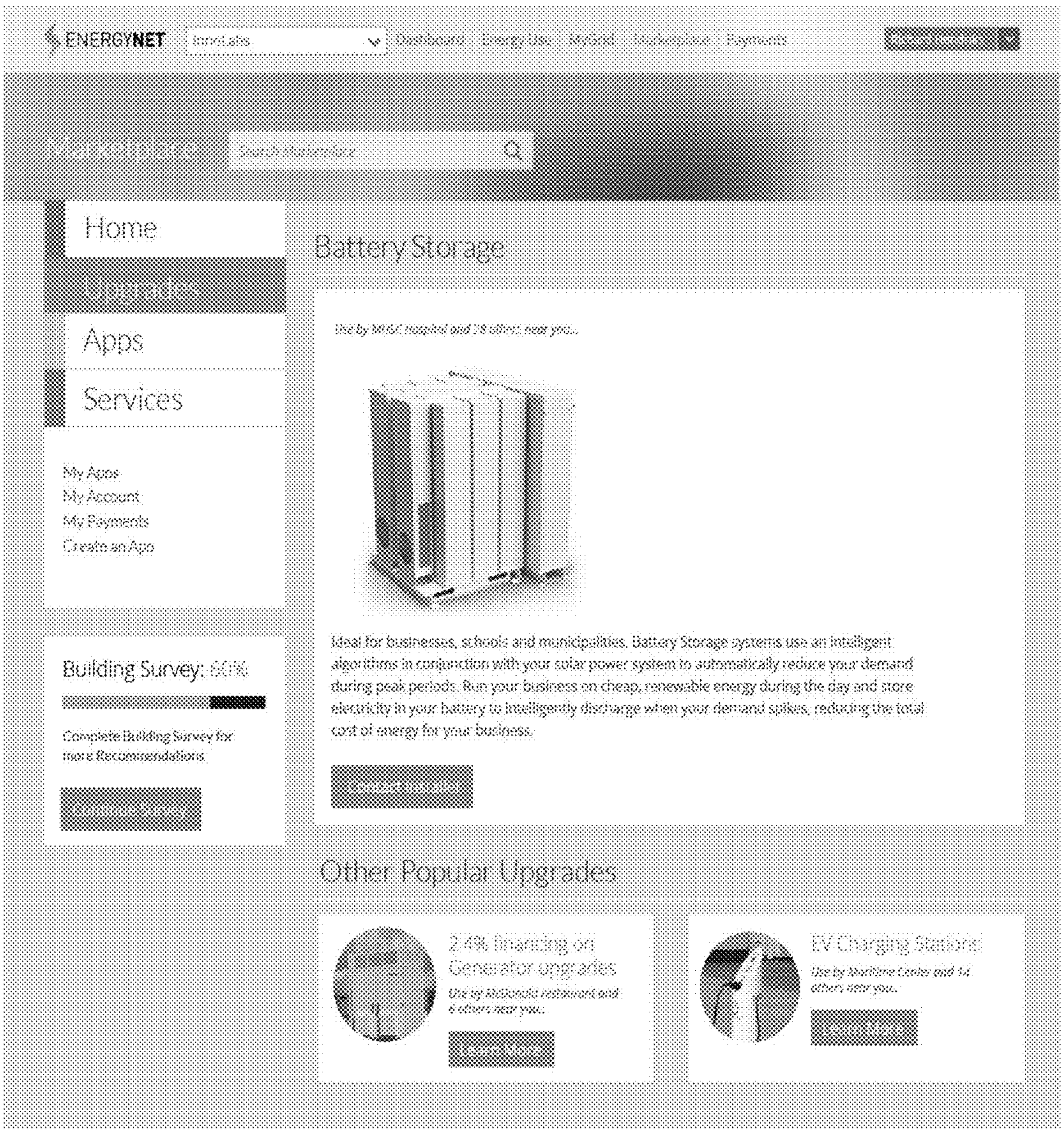
FIG. 82 is another screenshot showing upgrade options in a marketplace view interface.
Figure 83:
FIG. 83 is a screenshot showing a rate plan selector in a marketplace view interface.
Figure 84:
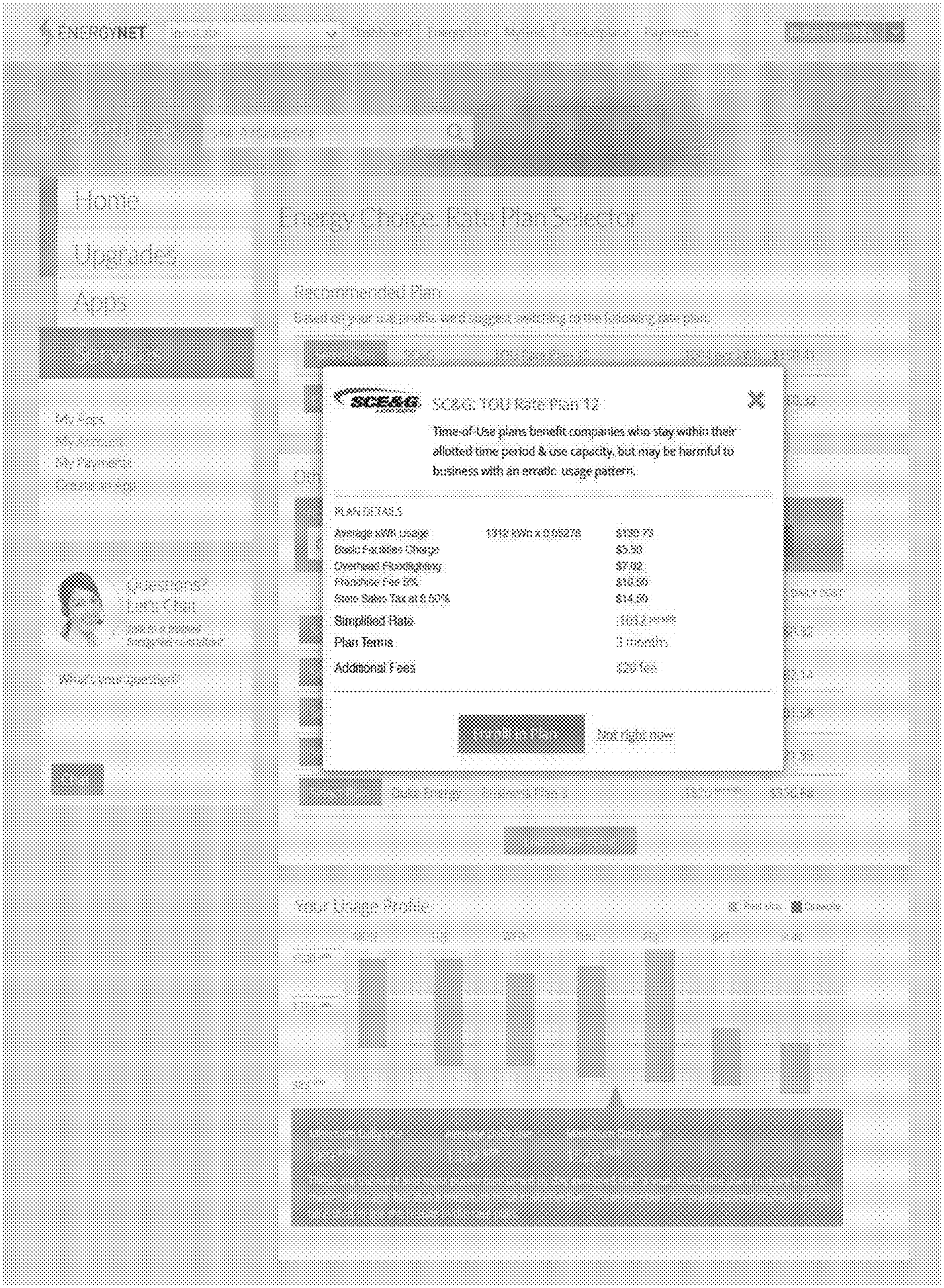
FIG. 84 continues to illustrate the marketplace view interface of FIG. 83 with an overlay showing a description of a selected plan.
Figure 85:
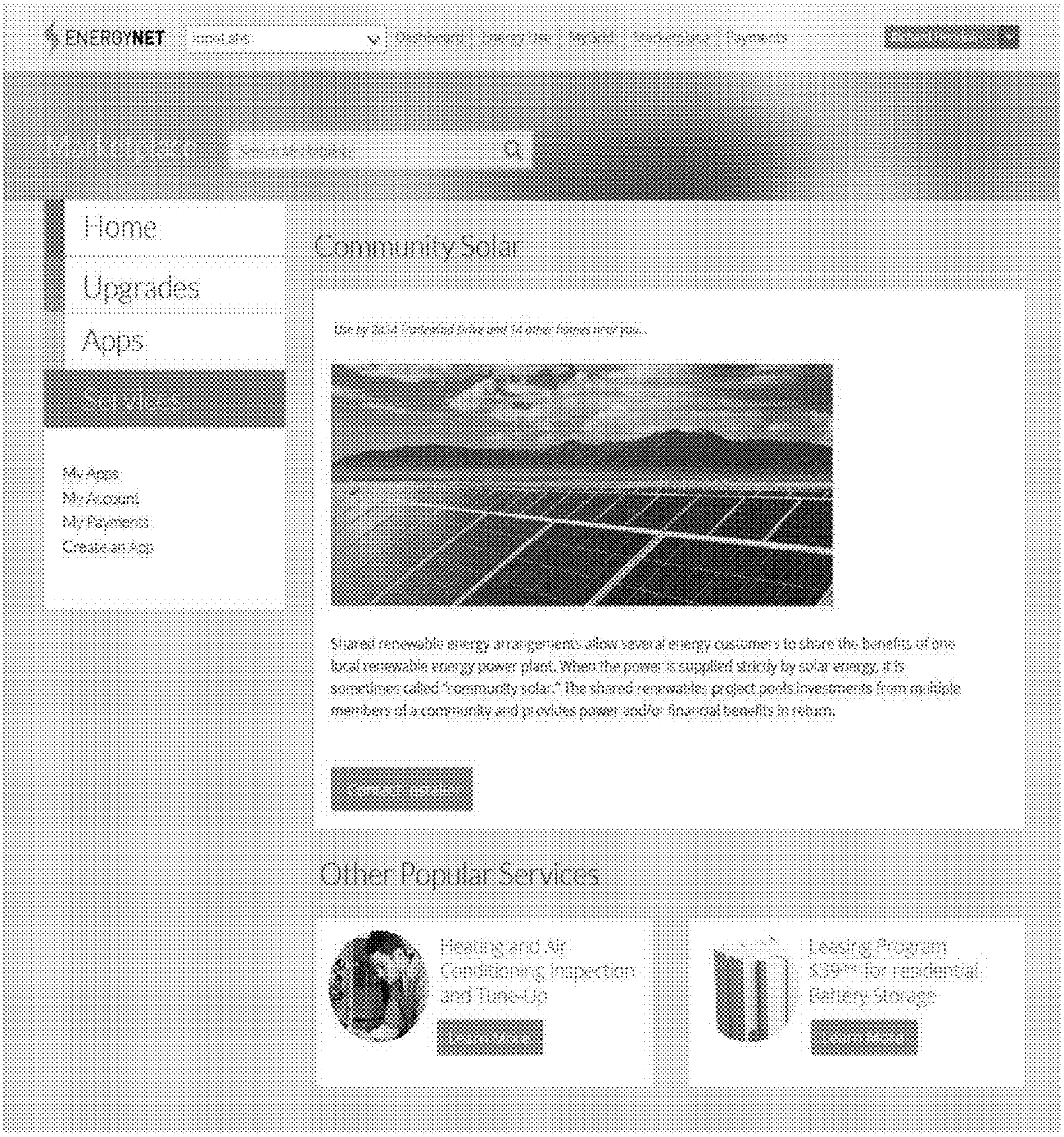
FIG. 85 is a screenshot of a marketplace view interface displaying other services provided by the marketplace.

FIGS. 80-85 display various functions under the "Marketplace" tab in the marketplace view interface. FIG. 80 is a screenshot of the home page of the marketplace for commercial and industrial customers, residential customers, and popular apps. The home page suggests completing a building survey for more recommendations. FIGS. 81 and 82 show upgrade options, including turnkey installation for EV charging stations, battery storage upgrades, and low interest financing on generator upgrades. FIG. 83 shows a Rate Plan Selector as one of the services provided by the marketplace. Recommended plans are listed based on the user profile. Other plans are also listed and users may filter the listed plans by information such as cost or plan type (e.g., all, renewable, fixed, variable). A user may select a plan by clicking the "Select Plan" button next to the plan. FIG. 84 continues to illustrate the marketplace view interface of FIG. 83 with an overlay showing a description of the selected plan, including the simplified rate, plan terms, and additional fees. If the user decides to select the plan, they can do so by clicking "Enroll in Plan." FIG. 85 displays other services provided by the marketplace, for example, community solar installation, heating and air conditioning inspection and tune-up, and a leasing program for residential battery storage.

Figure 86:
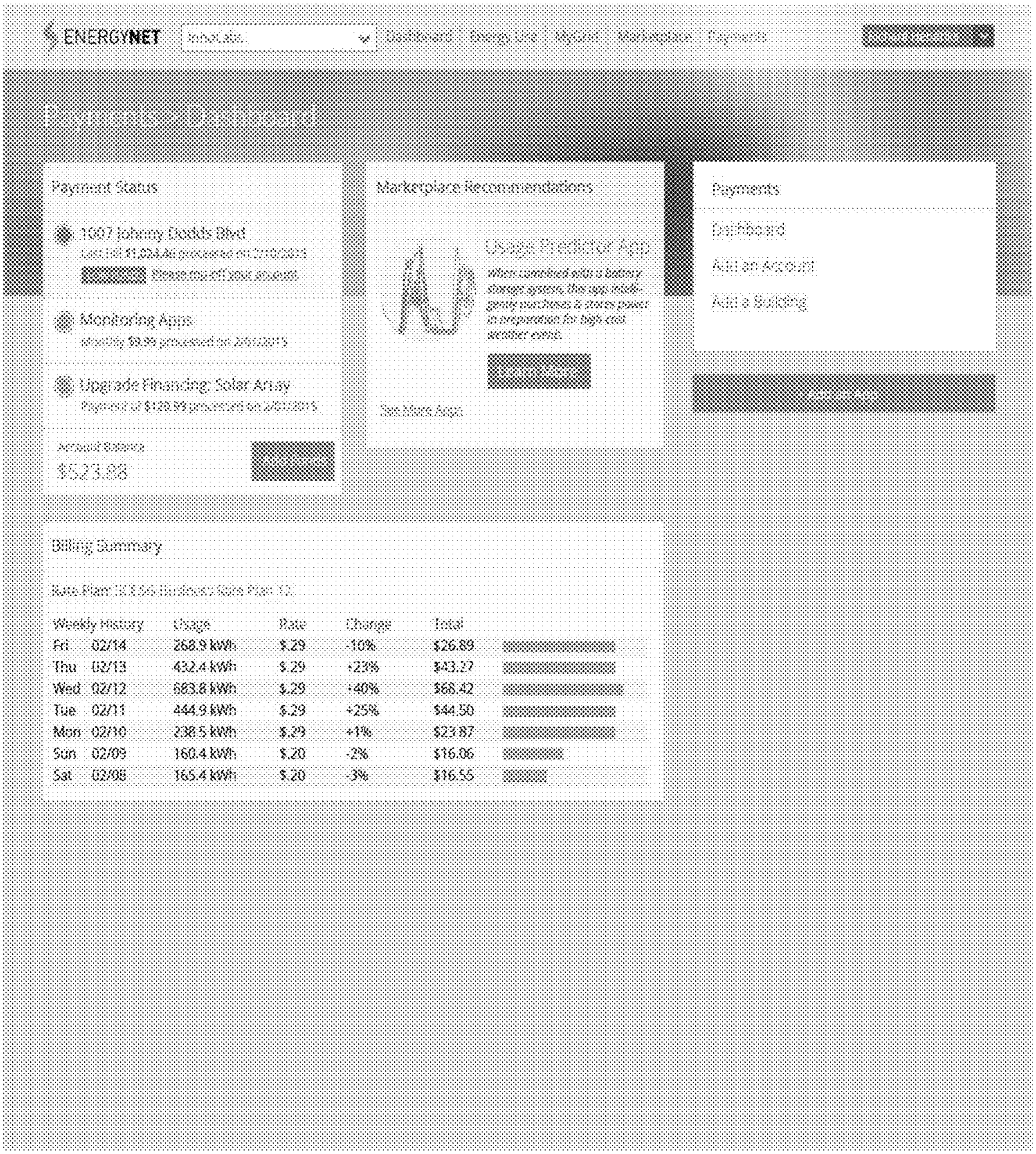
FIG. 86 is a screenshot of a marketplace view interface showing the payments dashboard.

FIG. 86 displays the payment dashboard in the marketplace view interface. Payment status, marketplace recommendations, and a billing summary are provided. The billing summary includes weekly history, energy usage, rate, change, and total for the rate plan. Users can also add funds to the account through the payment dashboard.

Financial Settlement View Interface

Figure 87:
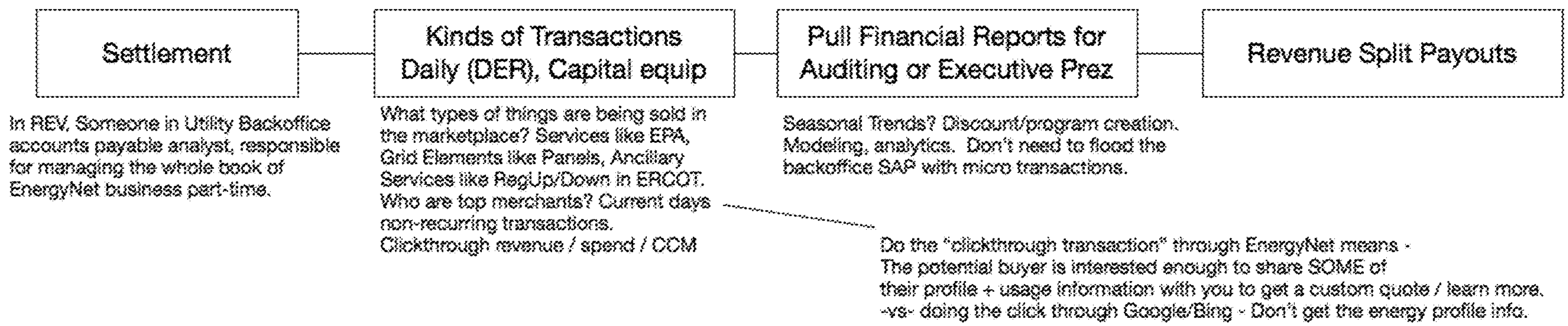
FIG. 87 is a block diagram for the functions of a financial settlement view interface provided by an EnergyNet data platform.

FIG. 87 is a block diagram for the functions of a financial settlement view interface provided by an EnergyNet data platform. The financial settlement view interface provides information regarding settlements, transactions, and revenue split payouts, as well as financial reports. The financial settlement view interface also enables utility back office staff to see a view of revenue streams from the EnergyNet platform to the utility. The supplied energy and consumed energy are also reconciled and provided in similar views such as a general ledger format. A blockchain view may also be provided, wherein a list of nodes is provided that show the number of transactions that are being published through the nodes, which allows users to view their node and status of transactions through the node.

Figure 88:
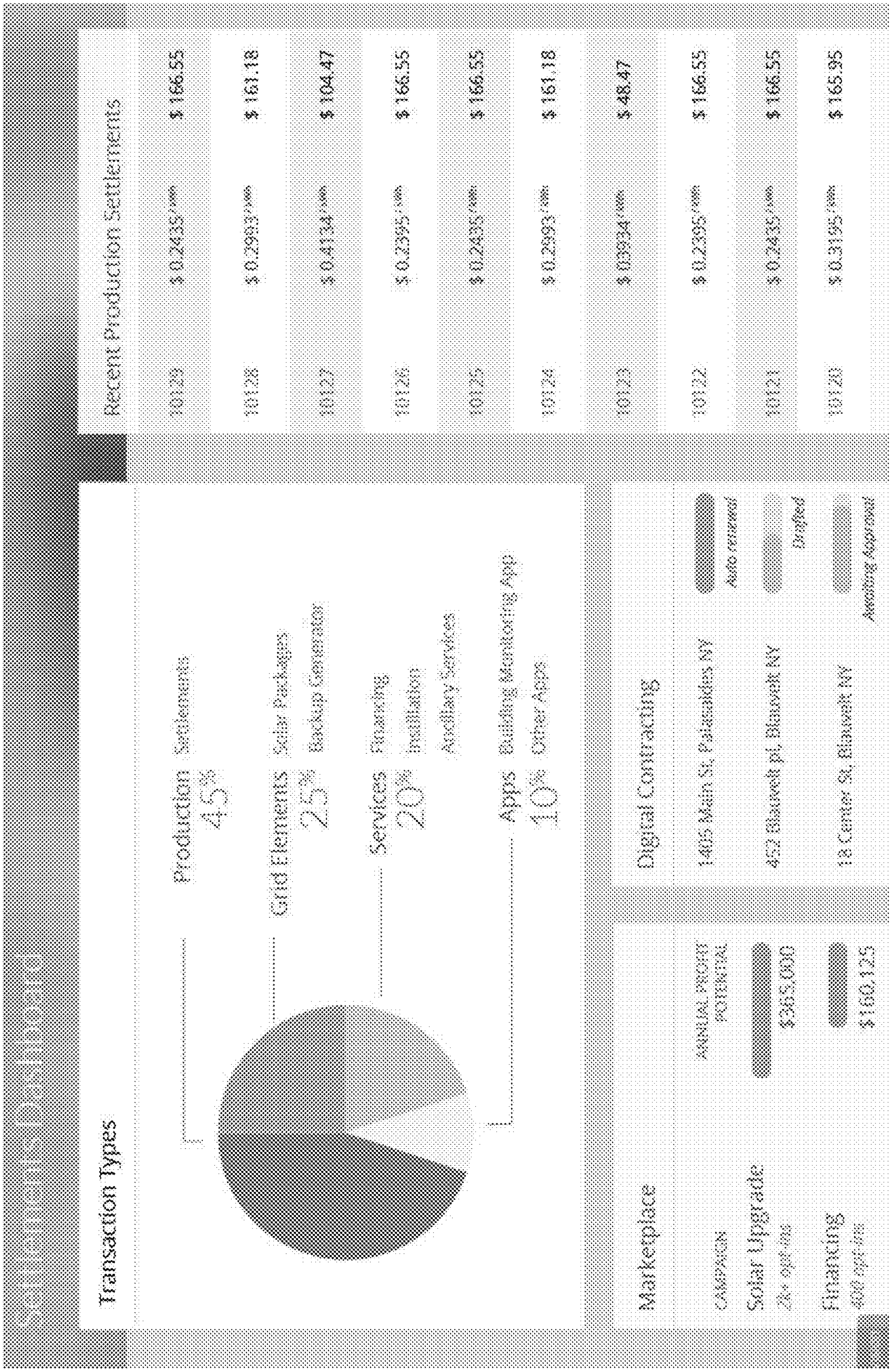
FIG. 88 is a screenshot of a financial settlement view interface showing the settlements dashboard.
Figure 89:
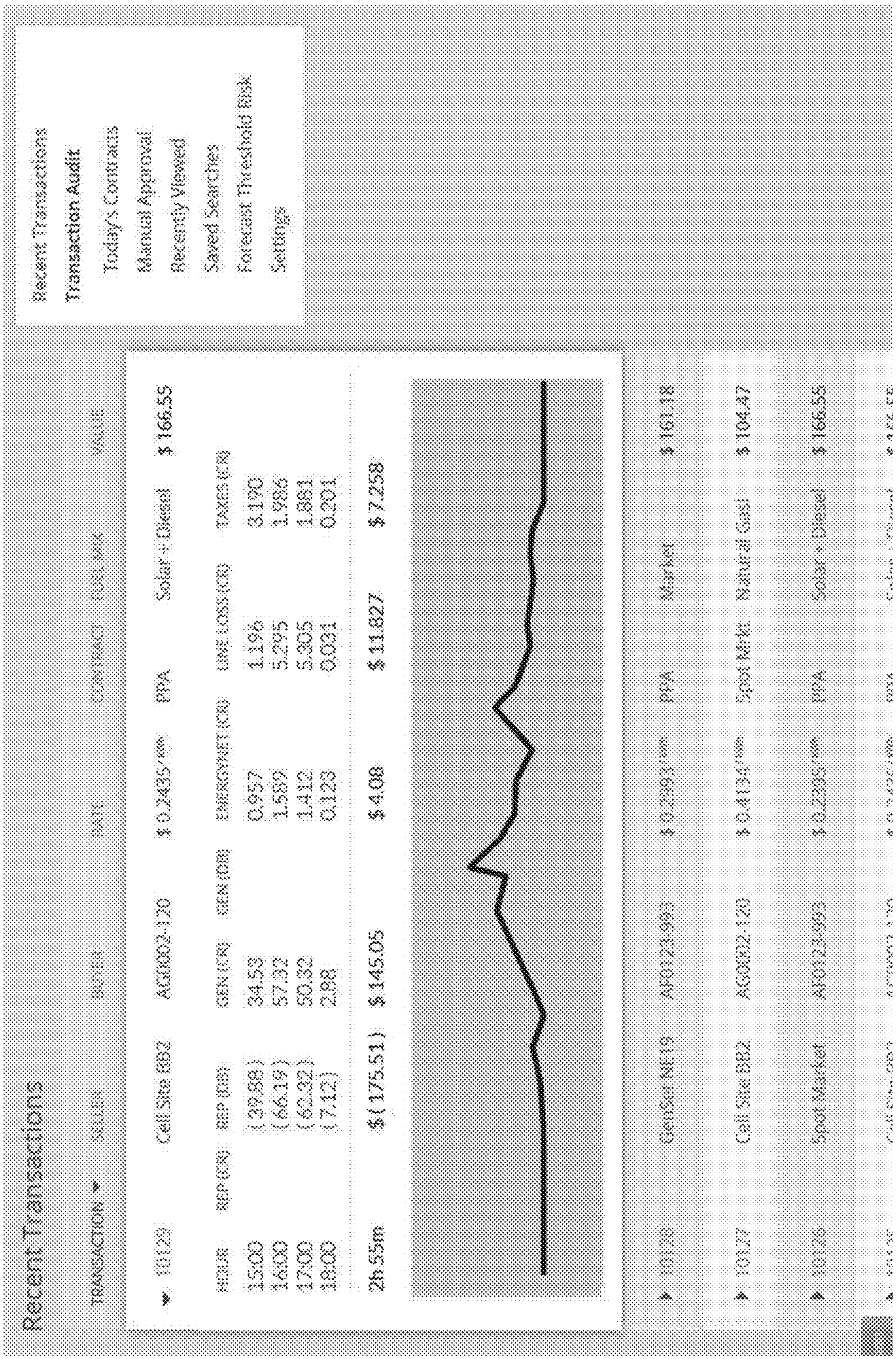
FIG. 89 is a screenshot of a financial settlement view interface showing recent transactions.

FIGS. 88-89 are screenshots of a financial settlement view interface. FIG. 88 displays the settlements dashboard of the financial settlement view interface. The financial settlement view interface is operable to show different transaction types (e.g., energy production, grid elements, services, application programs) performed by the EnergyNet platform and the percentage of financial settlements within the EnergyNet platform for each transaction type. The production transaction type includes settlements between energy consumers and energy providers. The grid elements transaction type includes solar panels and backup generators. The services transaction type includes Environmental Protection Agency (EPA) service, financing, installation, and ancillary services. An example of an ancillary service is regulation down/regulation up in Electric Reliability Council of Texas (ERCOT). The Apps transaction type includes the building monitoring app and other apps. The financial settlement view interface also displays marketplace campaign information, including annual profit potential, and digital contracting status for different sites. A table of recent production settlements, including transaction number, energy rate, and settlement amount (value), is also shown. FIG. 89 displays recent transactions within the financial settlement view interface. Detailed information for each transaction number is provided, including seller, buyer, rate, contract type, fuel mix, and value.

Tiers or Levels within the EnergyNet Platform

One embodiment of the present invention is a system of an advanced energy network, comprising a platform communicatively connected to at least one distributed computing device operable for providing inputs from at least one energy user, wherein the platform is operable to: create a user profile for the at least one energy user; collect energy usage data for the at least one energy user; associate the energy usage data with the user profile corresponding to the at least one energy user; aggregate the energy usage data; estimate projected energy usage for the at least one energy user; predict energy consumption data based on the energy usage data and the projected energy usage data; and store the energy usage data, the projected energy usage data, and the predicted energy consumption data in a database. In Level 0 (L0) of the present invention, the user or consumer is engaged in the platform by providing verified information on actual energy usage to the platform. In Level 1 (L1) of the present invention, the user may provide additional information to the system and/or additional information may be gathered from public sources. In Level 2 (L2) of the present invention, the user may add grid elements to their user profile. In Level 3 (L3) of present invention, the utility, grid element vendors, meter data aggregators, etc. may identify sales opportunities based on data in the database and provide marketing for products and/or service offerings to consumers (consumer users) or commercial users with profiles within the EnergyNet platform. In Level 4 (L4) of the present invention grid elements operable for providing electric power supply (by way of example and not limitation, solar power generation, fuel cell or battery power storage devices, wind generation, back-up power generators, etc.) that are properly constructed and configured, modeled, and connected with revenue grade metrology acceptable for energy settlement and market-based financial settlement within the energy market, are introduced after being registered and profile created within the EnergyNet platform.

In one embodiment, for level 0 (L0) the actual energy usage data documented within a utility bill is uploaded to the platform by an energy user having a profile or creating a profile on the EnergyNet platform. The actual energy usage data is uploaded and communicated over at least one network to at least one computer or server associated with the platform, which automatically recognizes the format of the utility bill based upon prior utility bill(s) uploaded by at least one user. For example, if a first user uploads a utility bill to the platform and selects the relevant information from the utility bill, the platform may automatically recognize the format of utility bills for subsequent users who have the same service provider. Also or alternatively, the energy user inputs indication of which data to capture from the utility bill for automatic association with that user's profile. The system also provides options for the energy user to selectively redact information on the utility bill, such as customer name, account number, and PIN number. The platform may automatically populate the database based on the data on actual energy usage in the utility bill. The platform is further operable to collect at least one of real-time or near real-time data from grid elements and data from smart meters associated with the at least one user.

Figure 90B:
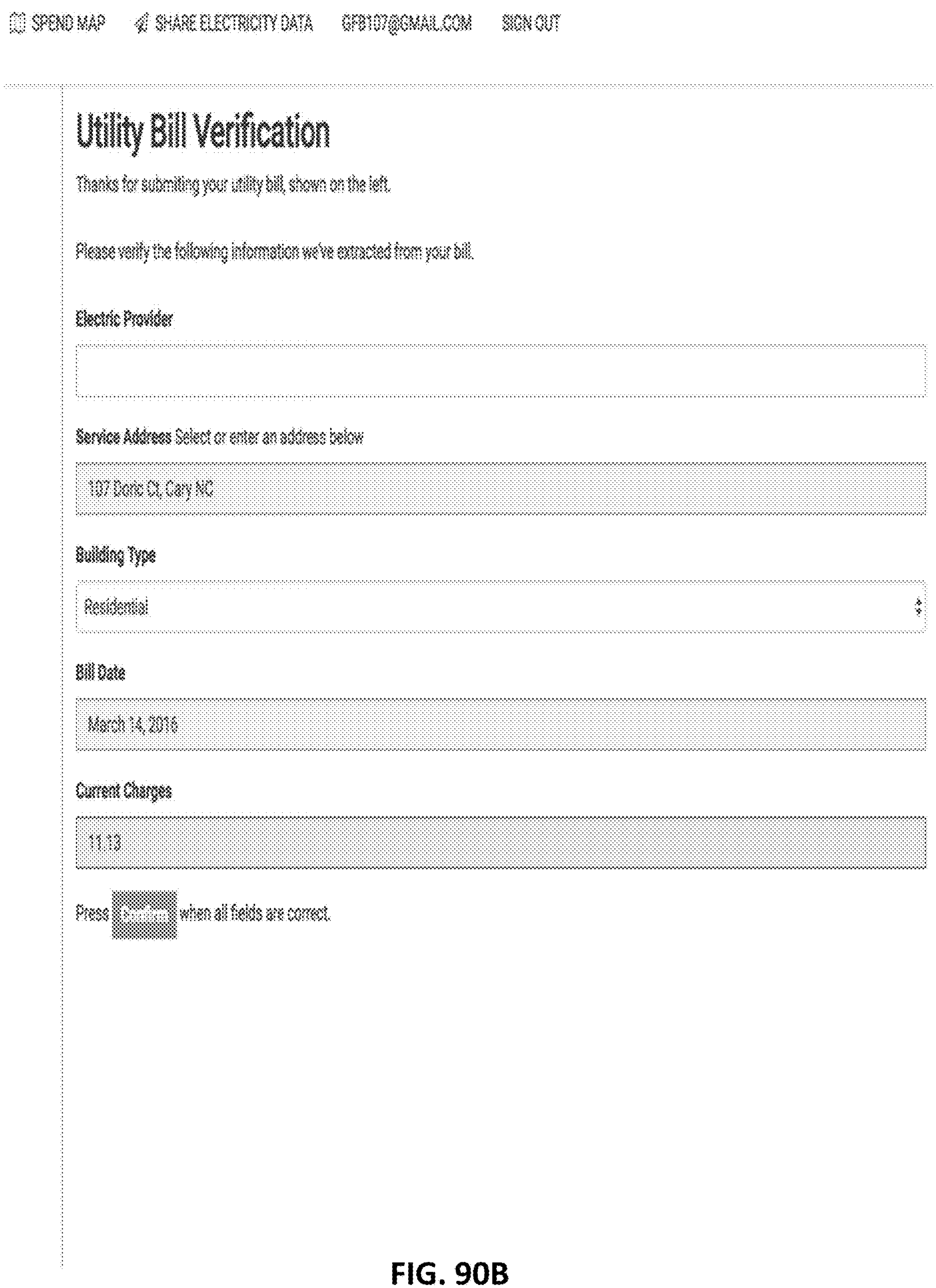
Figure 91B:
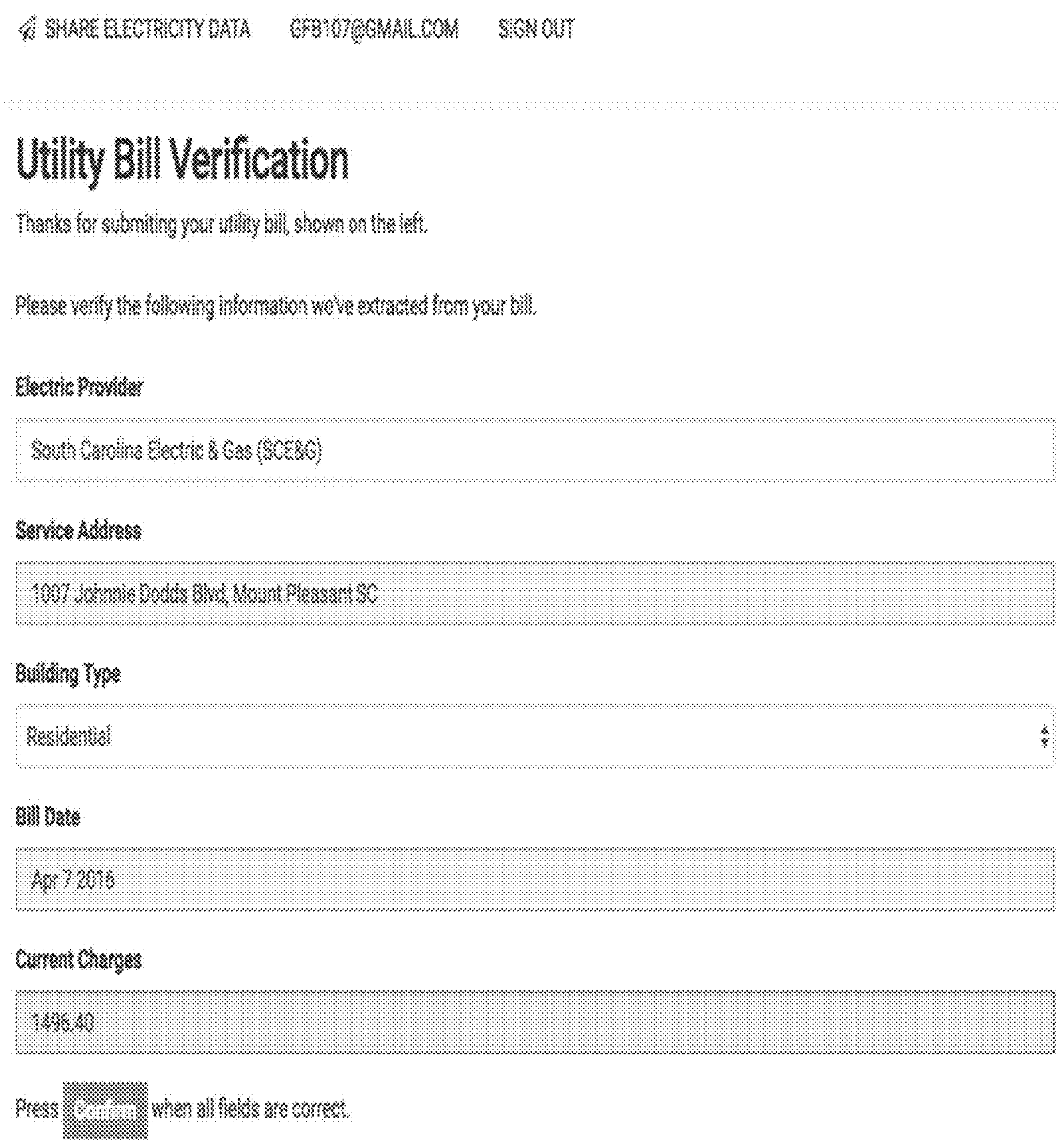

FIGS. 90A and 90B are screenshots of a utility bill verification for an electric bill. The utility bill is shown on the left side of the screen in FIG. 90A. The system extracts the relevant information from the utility bill, such as service address, bill date, and current charges for electricity from the bill as shown in FIG. 90B. The system allows users to select the relevant information to be extracted. In a preferred embodiment, the user can adjust the selection overlays with matching colors on the bill by dragging the overlays or their corners as needed. If the information is still incorrect after adjusting the selection overlays, the user can modify the values in the fields themselves. When all fields are correct, the user can verify the values in the fields by pressing the confirm button as shown in FIG. 90B. If the system recognizes the format of the utility bill, it automatically populates the fields in FIG. 90B with the name of the electric provider, service address, building type, bill date, and current charges. Information such as the customer name, account number, and PIN number may be redacted by the system and/or user inputs as shown in FIG. 90A. FIGS. 91A and 91B are screenshots of a utility bill verification for an electric and gas bill. The utility bill is shown in FIG. 91B. The system populates the current charges field in FIG. 91B with the electric charges and does not include "Other Charges & Credits" in the value populated in the field.

The embodiments disclosed make use of the "user profiles" concept. The user profile includes, but is not limited to, the following: (1) energy user name; (2) service address; (3) electric provider; (4) building type; (5) historical and current bill dates; and (6) historical and current charges for electrical service. The user profile may further include information regarding geodetic location; meter ID; customer programs (possibly including program history); device information, including device type and manufacturer/brand; user energy consumption patterns; and connection and disconnection profile. The connection/disconnection profile can include service priority (i.e., elderly, police, etc.) and disconnection instructions.

In other embodiments, additional data called "variability factors" may be captured by the system as part of the user profile, including, but not limited to, the following: (1) outside temperature, (2) sunlight, (3) humidity, (4) wind speed and direction, (5) elevation above sea level, (6) orientation of the service point structure, (7) duty duration and percentage, (8) set point difference, (9) current and historic room temperature, (10) size of structure, (11) number of floors, (12) type of construction (brick, wood, siding etc.) (13) color of structure, (14) type of roofing material and color, (15) construction surface of structure (built on turf, clay, cement, asphalt etc.), (16) land use (urban, suburban, rural), (17) latitude/longitude, (18) relative position to jet stream, (19) quality of power to devices, (20) number of people living in and/or using structure, (21) age of structure, (22) type of heating, (23) lot description, (24) type of water, (25) other square footage, and (26) other environmental factors. Additional data that may be stored by the system include vacancy times, sleep times, and times in which control events are permitted. User profiles may also include whether a swimming pool is located at the service address.

In level 1 (L1) of the present invention, the user may provide additional information to the system and/or additional information may be gathered from public sources to further populate the user profile. Information regarding the plurality of variability factors may obtained from public sources. For example, information regarding weather (e.g., outside temperature, sunlight, humidity, wind speed and direction) may be obtained from publicly available weather services. Additionally, information regarding size of structure (e.g., square footage), number of floors or stories, type of roofing material, type of construction, age of structure, type of heat, etc. may be found on publicly available web sites (e.g., county or state records, Zillow, and Trulia). Users may be given incentives to provide additional information for their user profile.

The user profile may further contain information regarding user preferences, wherein the user preferences comprise at least one of automatic uploading of utility bills, contact preferences, payment preferences, privacy preferences, renewability of energy sources, grid element preferences, rate plans, consumption, cost, locality, and market supply.

The platform uses information in the user profile to generate more accurate predictive consumption data. For example, if one energy user uploads a utility bill, that utility bill may be used to generate predictive consumption data for similar structures or similar geographic locations (e.g., houses in the same neighborhood). If additional energy users upload utility bills, the aggregated data from the utility bills may be used to generate more accurate predictive consumption data. With additional information, such as variability factors, the platform is able to increase the accuracy of the prediction. For example, a house with a pool and an electric vehicle would be expected to use more electricity than a house in the same neighborhood without a pool or electric vehicle. Additionally, a larger house or multi-story house would have a larger predictive energy consumption than a smaller house or single-story house in the same neighborhood. Also, typically older houses have lower energy efficiency, due to factors affecting energy consumption, e.g., older HVAC equipment that is less efficient than modern equipment, and/or factors affecting the leakage of conditioned air, e.g., less insulation, older windows and doors, etc. Variability factors may be added to the system by users or obtained from public sources of data.

Figure 92:
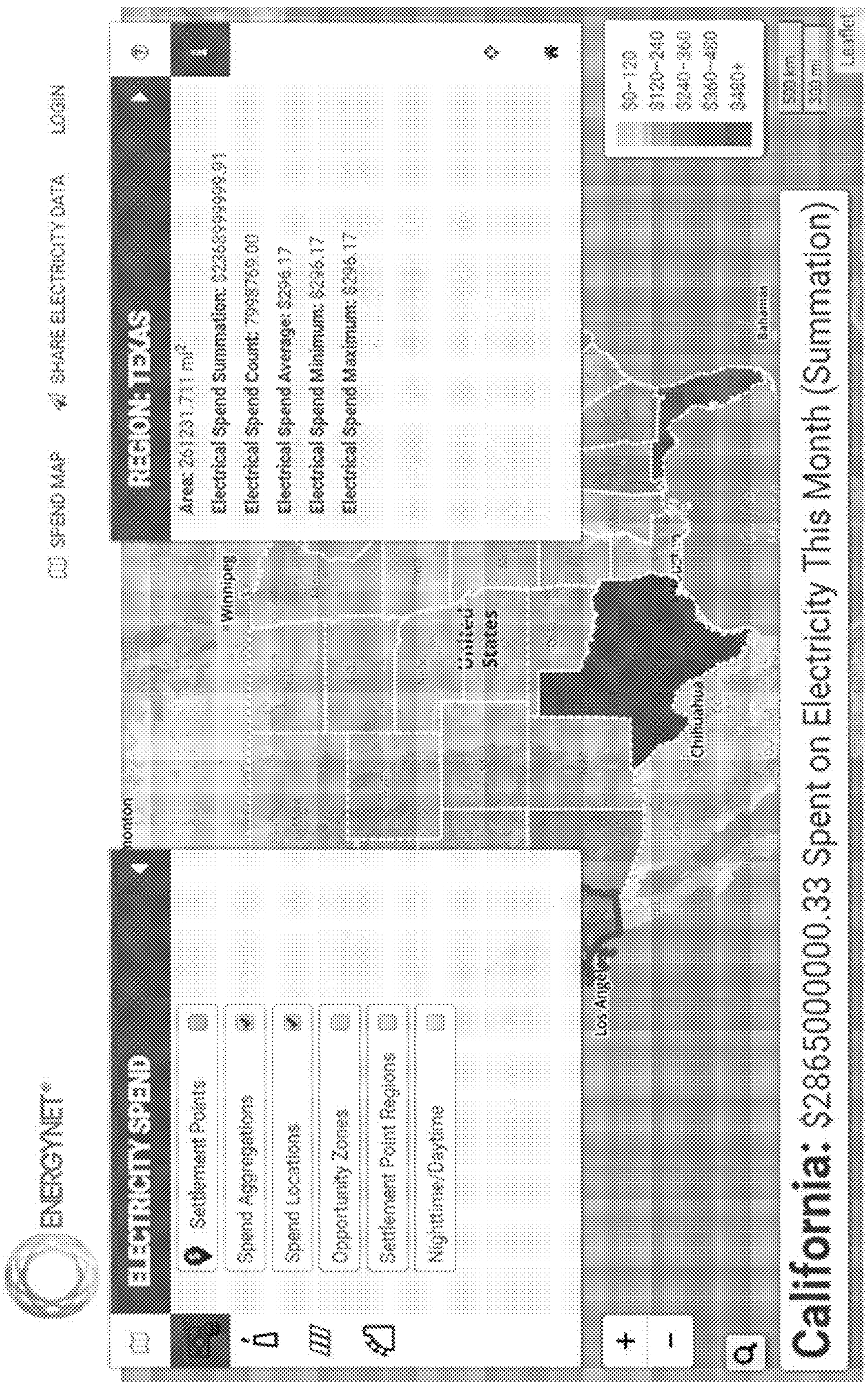
FIG. 92 is a screenshot of a map of an electrical spend map zoomed out to show the Continental United States.
Figure 93:
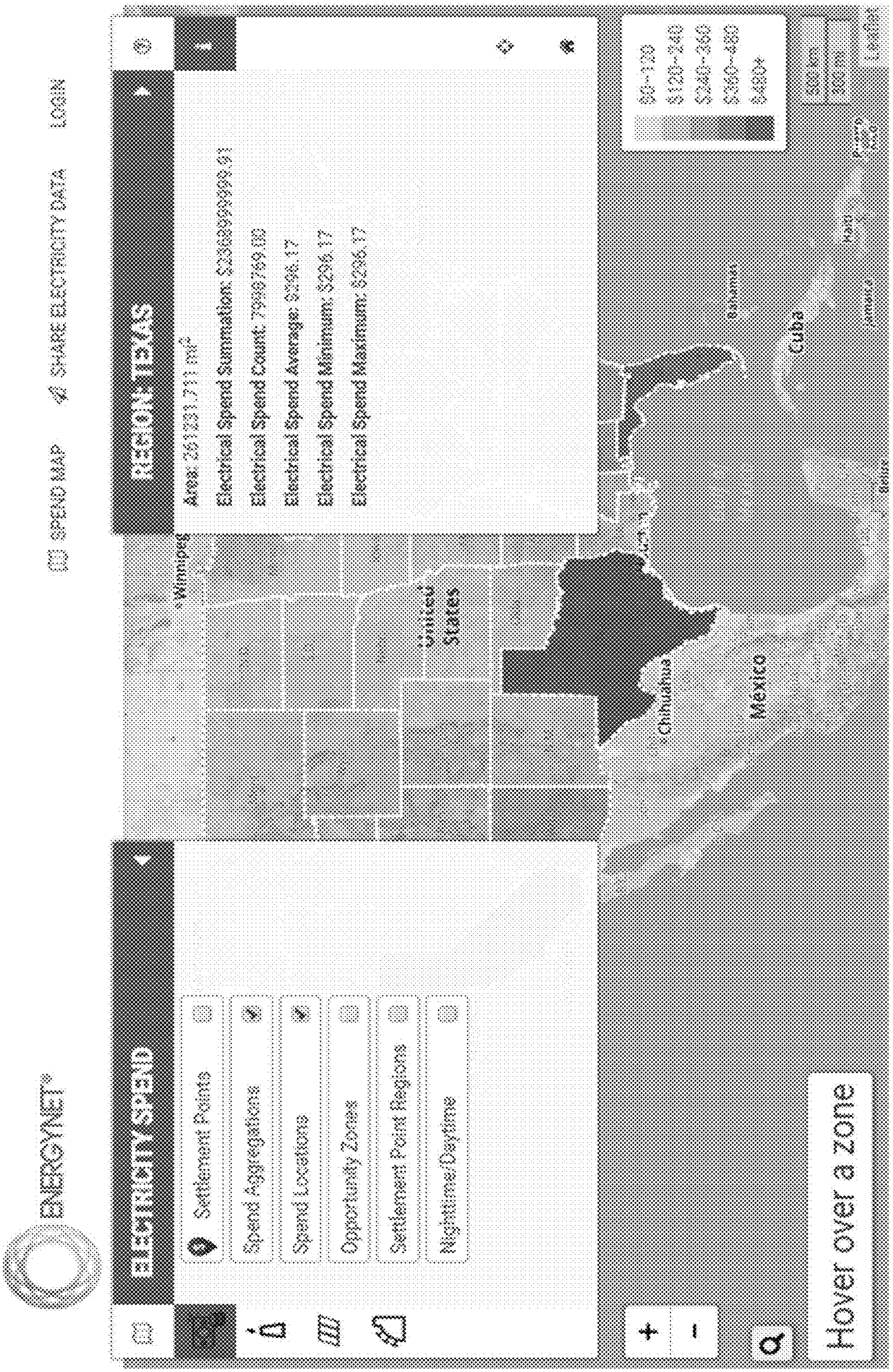
FIG. 93 is a screenshot of a map of an electrical spend map zoomed in to the region level.
Figure 94:
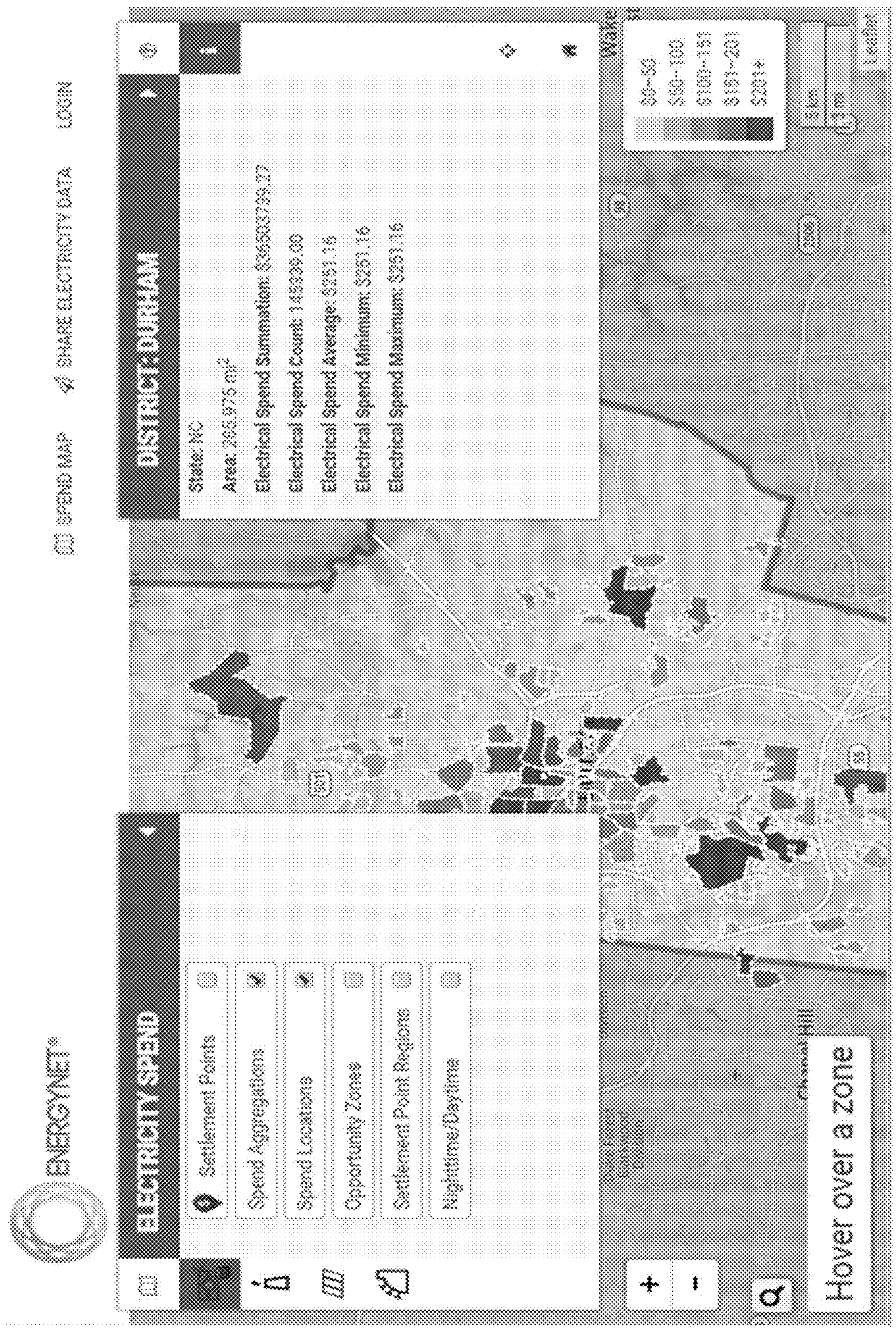
FIG. 94 is a screenshot of a map of an electrical spend map zoomed in to the district level.
Figure 95:
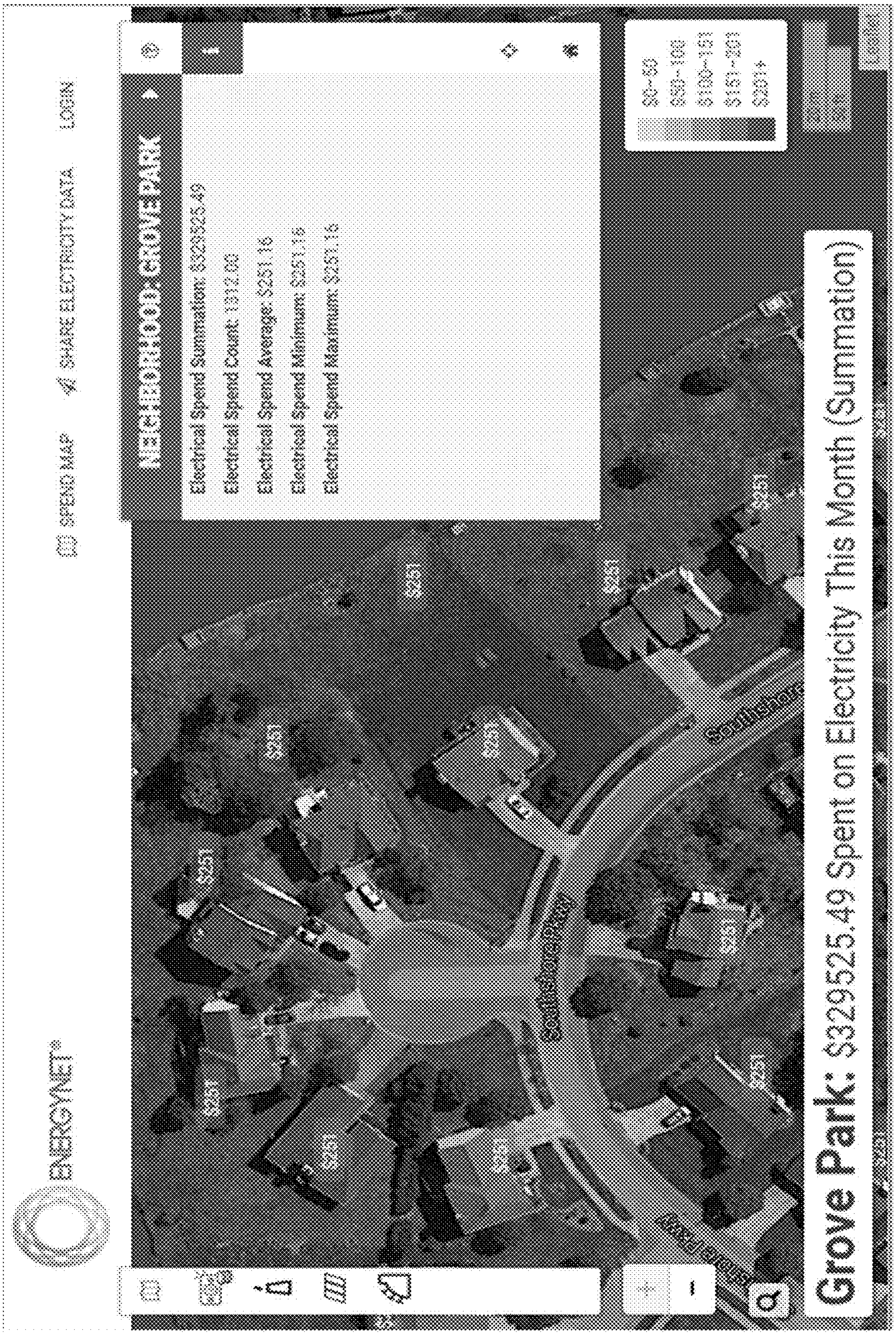
FIG. 95 is a screenshot of a map of an electrical spend map zoomed in to the neighborhood level.

The platform is further operable to display a map of the predicted energy consumption as shown in FIGS. 92-95. FIG. 92 shows an electricity spend map zoomed out to show the Continental United States. FIG. 93 shows an electricity spend map zoomed in to the region level. The area, electrical spend summation, electrical spend count, electrical spend average, electrical spend minimum, and electrical spend maximum are listed in a table. FIG. 94 shows an electricity spend map zoomed in to the district level. The state, area, electrical spend summation, electrical spend count, electrical spend average, electrical spend minimum, and electrical spend maximum are listed in a table. FIG. 95 shows an electricity spend map zoomed in to the neighborhood level. The zoomed in map is a satellite image showing houses in a particular neighborhood. The electrical spend summation, electrical spend count, electrical spend average, electrical spend minimum, and electrical spend maximum are listed in a table. The electrical spend for each house is shown above the house.

In Level 2 (L2) of the present invention, the system receives user inputs that associate at least one grid element with their corresponding user profile. The grid elements include but are not limited to power transfer switches, wind meters, utility meters, battery discharge controllers, tenant sub-meters, solar meters, power distribution units (PDUs), appliance switches, electric vehicle charging stations, distributed energy resources (DERs), transfer switches, electric vehicle batteries, inverters, controllable loads, weather stations, and/or HVAC environments. For example, the system may receive an indication or selection inputs from a user regarding a present or future interest in, or action for installing and operating of, solar panels to their roof for the location associated with their corresponding user profile; this change and the user's preferences or profile regarding the solar panels is saved in the database.

In Level 3 (L3) of present invention, the at least one utility or market participant and its partners (e.g., vendors) utilize the EnergyNet platform to identify sales opportunities based on data in the database. Data that is anonymized or permission-based access to data from user profiles may be used to provide insights on inefficient devices, defective devices, or devices that require updating to meet current standards. User profile data may also be used to identify related sales opportunities. For example, if energy consumption patterns suggest that the user may be very interested in personal energy conservation, then sales efforts could be directed toward that individual concerning products related to that lifestyle. This information can be used by the utility or its partners to provide incentives to users to buy newer, updated devices, or obtain maintenance for existing devices. The user is given the option to opt out of having his user profile used for sales and marketing efforts, or for regulating energy conservation. The user profile makes use of open standards (such as the CPExchange standard) that specify a privacy model with the user profile. The use of consumption patterns in this manner is governed by national, state, or local privacy laws and regulations.

A further embodiment of using user profiles to identify sales opportunities involves the use of device information to create incentives for users to replace inefficient devices. By identifying the known characteristics and/or behavior of devices within a service point, the invention identifies those users who may benefit from replacement of those devices. The invention estimates a payback period for replacement.

This information is used by the utility or its partners to create redemptions, discounts, and campaigns to persuade users to replace their devices.

Users may be grouped by geography or some other common characteristics. For example, groups might include "light consumers" (because they consume little energy), "daytime consumers" (because they work at night), "swimmers" (for those who have a pool and use it), or other categories. Categorizing users into groups allows the utility or its partners or market participants to target sales and marketing efforts to relevant users.

EnergyNet Graphs

Figure 96:
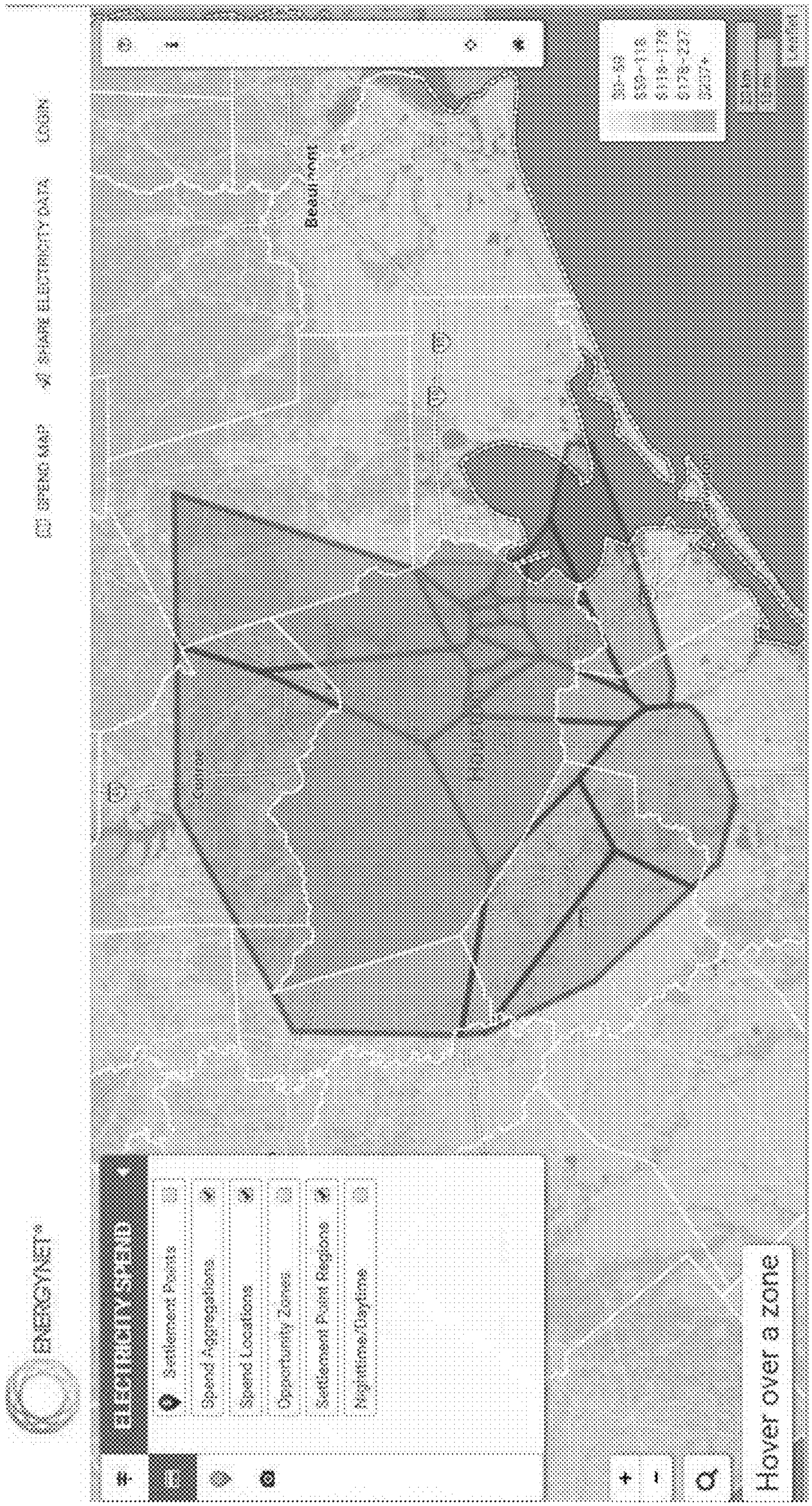
FIG. 96 is a screenshot of a sample settlement pricing zone.
Figure 97:
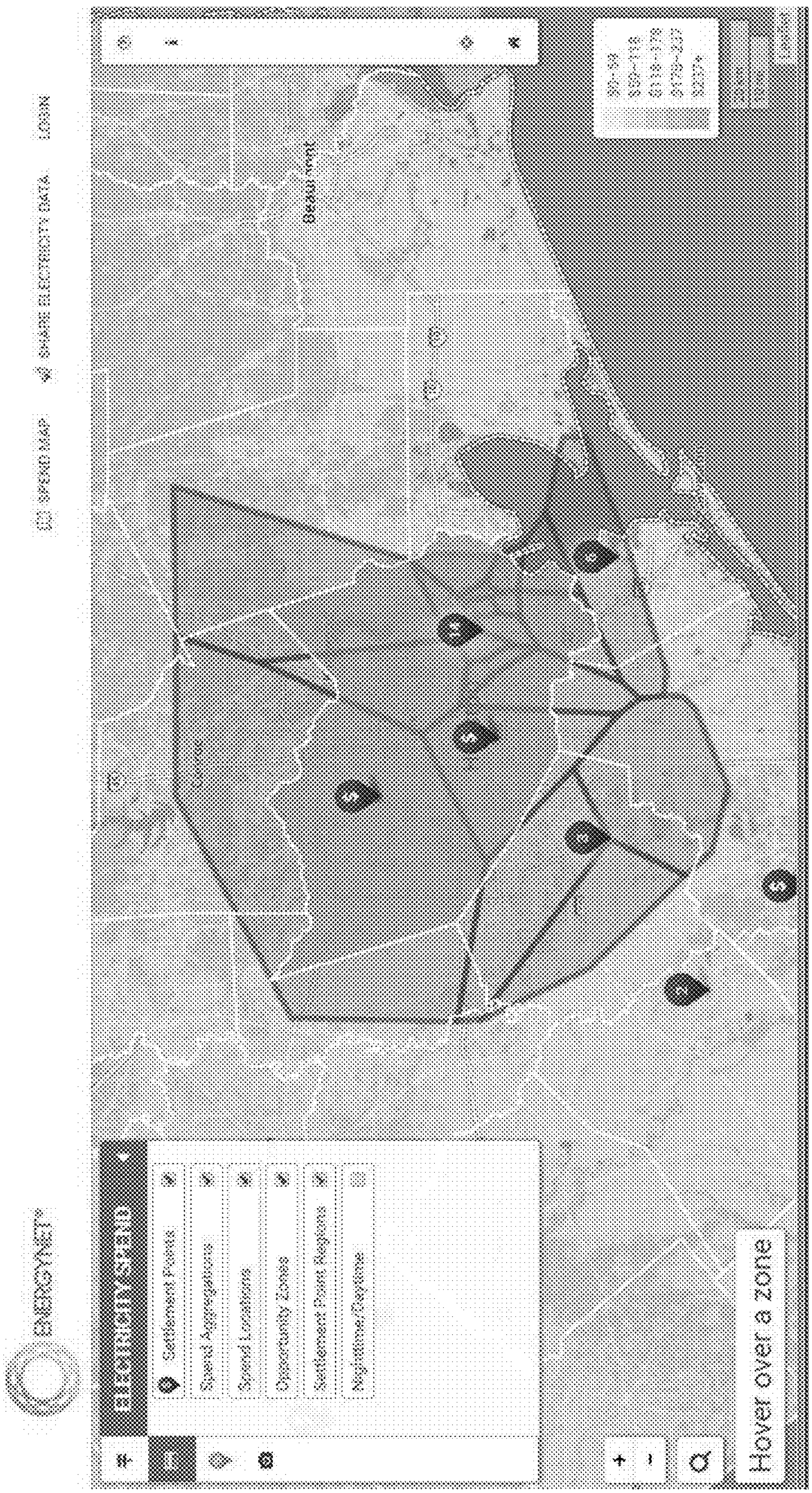
FIG. 97 continues to illustrate the screenshot of FIG. 96 with additional map layers for ERCOT Settlement Points.

FIG. 96 is a screenshot of a sample settlement pricing zone. The blue shaded areas with dark outlines in the figure are settlement zones corresponding to traditional settlement zones established by energy markets, e.g., ERCOT, wherein the market (ERCOT) determines the geographic zones that comprise the settlement zones, wherein electric power grid resources settle energy supplied and load consumed to the nearest resource point or settlement point, which are shown in the additional map layers in FIG. 97. Anything northwest of the blue shaded zone with dark outlines illustrated settles in the uppermost settlement area marked with a "$" on the map. Larger grid elements, by way of example and not limitation, power plants, substations, transmission interconnections, large commercial or industrial locations with their own substations, are also identified and energy settlement and corresponding market-based financial settlement by the market (e.g., ERCOT), which also defines them within its settlement zones and defines the pricing node for them. Locational marginal price (LMP) is based upon where the grid elements (supply or load grid elements) are relative to the blue settlement area with dark outlines marked with a "$" on the map.

Figure 98:
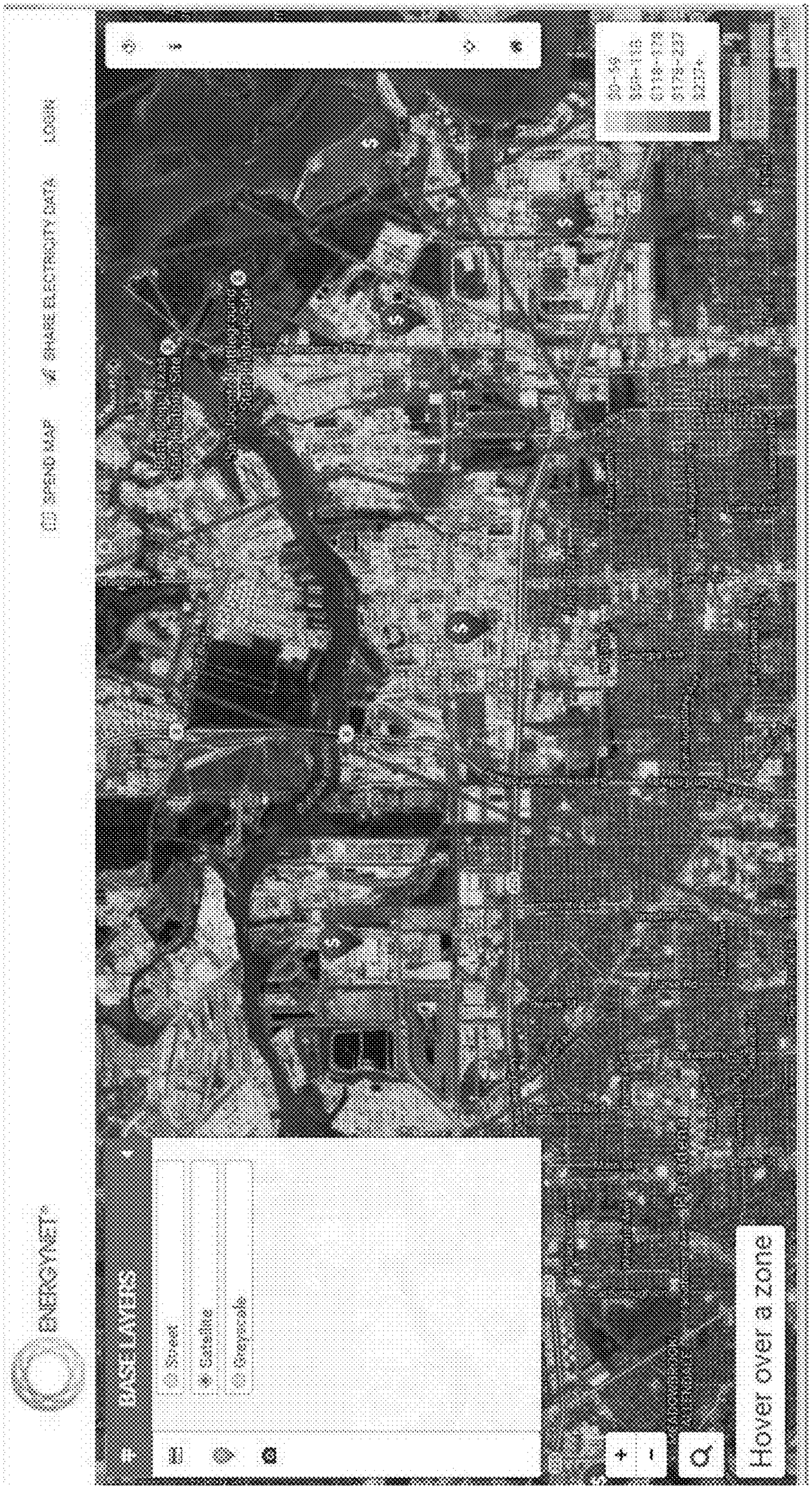
FIG. 98 is a screenshot showing a satellite image of actual settlement points.

FIG. 98 is a screenshot showing a satellite image of actual settlement points. The interface allows the user to zoom in with satellite photography to identify each grid element, e.g., power plant, substation, large commercial and/or industrial grid elements or power supply grid elements. The zones are close together in this view because a commercial facility is drawing significant amounts of power off the distribution of electrical power of the grid. Also illustrated are a power plant and light commercial and/or industrial, and residential consumers in that second zone. While these grid elements and electric power loads exist and are identifiable within the GUIs and within the EnergyNet platform and system, within the EnergyNet platform the traditional zones and nodes established by the market (e.g., ERCOT) are subdivisible into logical points below the LMP or settlement nodes. The systems and methods of the present invention are operable to aggregate and/or directly control load below these traditional zones, nodes, and attachment points. While new loads and new power supply (e.g., new generation source) may be introduced and operable below the traditional zones or nodes, the market (e.g., ERCOT) will not have data associated with those newly introduced and operable grid elements (for load and for supply) unless it is supplied to the market via the EnergyNet platform. For example, if a solar generation grid element and solar energy fuel cell or storage is introduced to the electrical power grid via the EnergyNet platform and located within one of the illustrated traditional zones, then it is operable to start introducing power for distribution at the proximal substation. The market would only be able to detect that a lower amount of electrical power is being drawn at the substation level or traditional zone. However, after the solar generation grid element and solar energy fuel cell or storage is registered and active within the EnergyNet platform, energy settlement and market-based financial settlement for the electrical power introduced or supplied to the electric power grid is provided at the point of attachment (attachment point) for those solar grid elements. This contrasts with prior art, where the market cannot detect or settle energy or provide for market-based financial settlement below the traditional zones or substation level.

Figure 99:
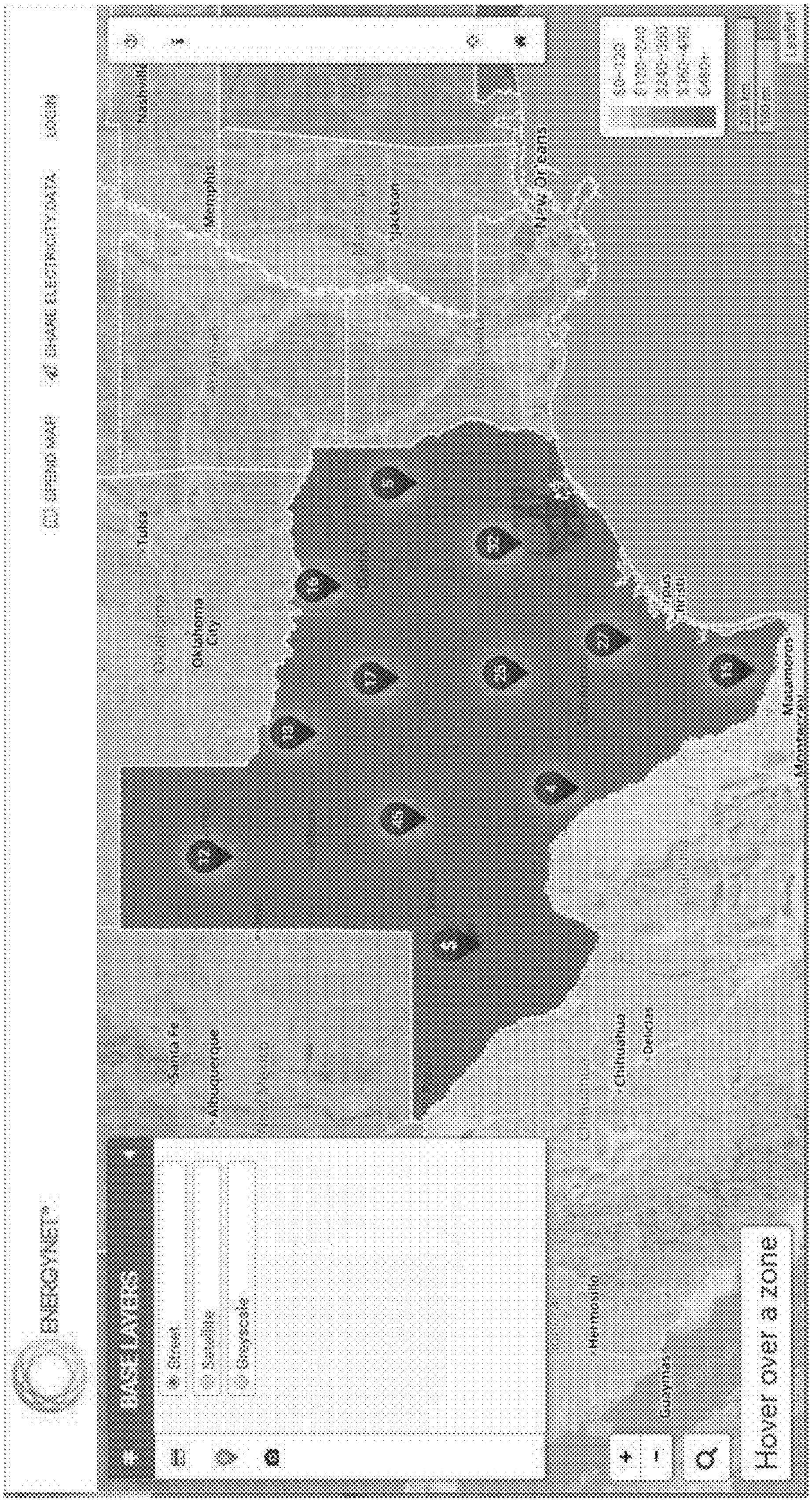
FIG. 99 is a screenshot of an overview of ERCOT Settlement Zones.

FIG. 99 is a screenshot of an overview of ERCOT Settlement Zones. The number inside the point represents the number of nodes geographically at each point. For example, there are 17 subnodes within the location marked with a "17" on the map, and 16 subnodes within the location marked with a "16" on the map; these subnodes correspond to ERCOT subnodes, which provide for settlement zones at Level 4 within the system.

Financial Model Visualization Interface

A financial model visualization interface allows at least one utility or market participant, to run Monte Carlo simulations for adding new meters to the market, energy usage distribution, and/or energy generation distribution. Adjusting the simulation parameters (e.g., mean, standard deviation, skewness) provides for minimizing or managing risk for decision-making and investment related to the electric power grid, and to better predict outcomes.

Figure 100:
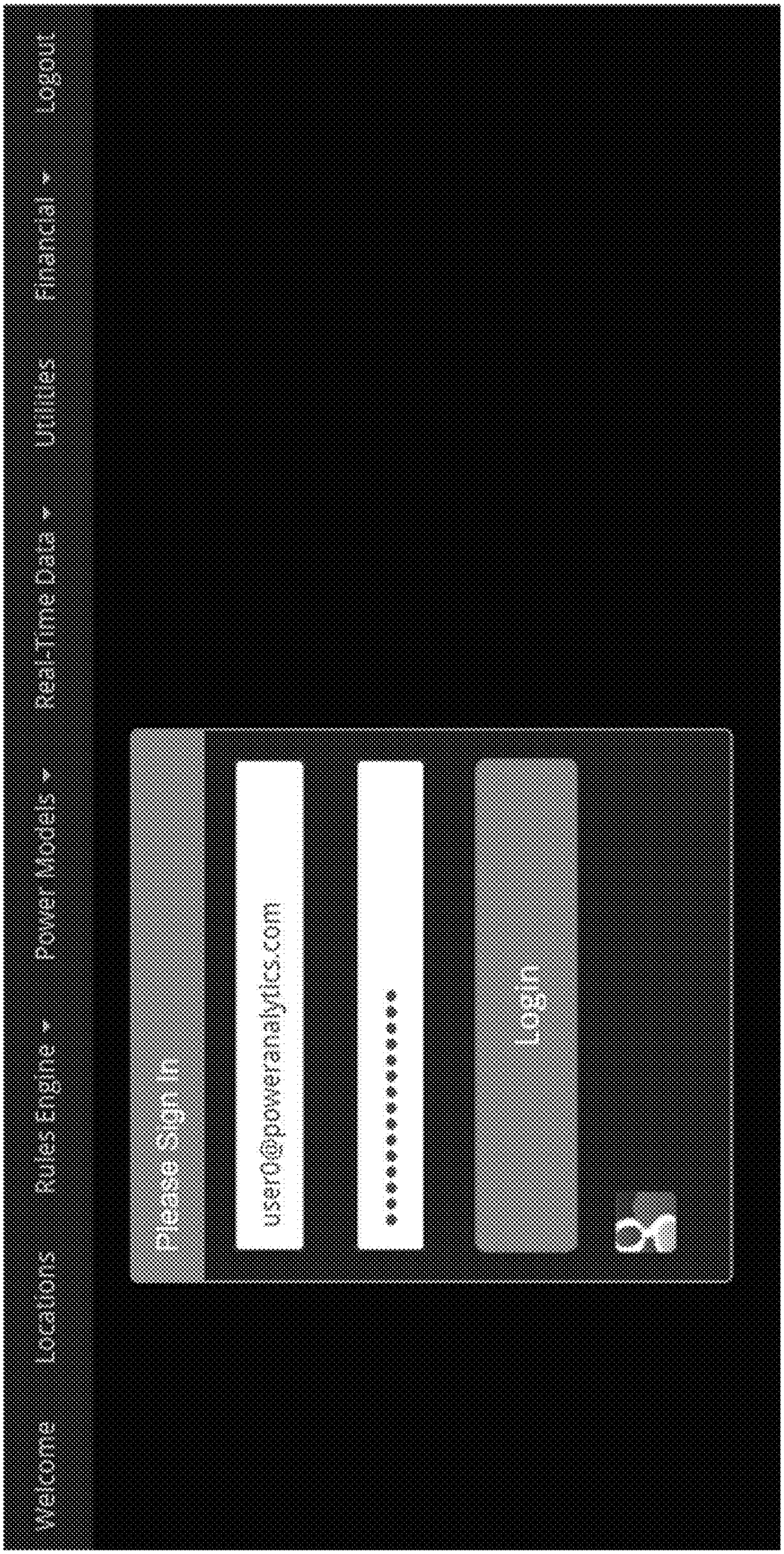
FIG. 100 is a screenshot of the log in screen for a financial model visualization interface.
Figure 101:
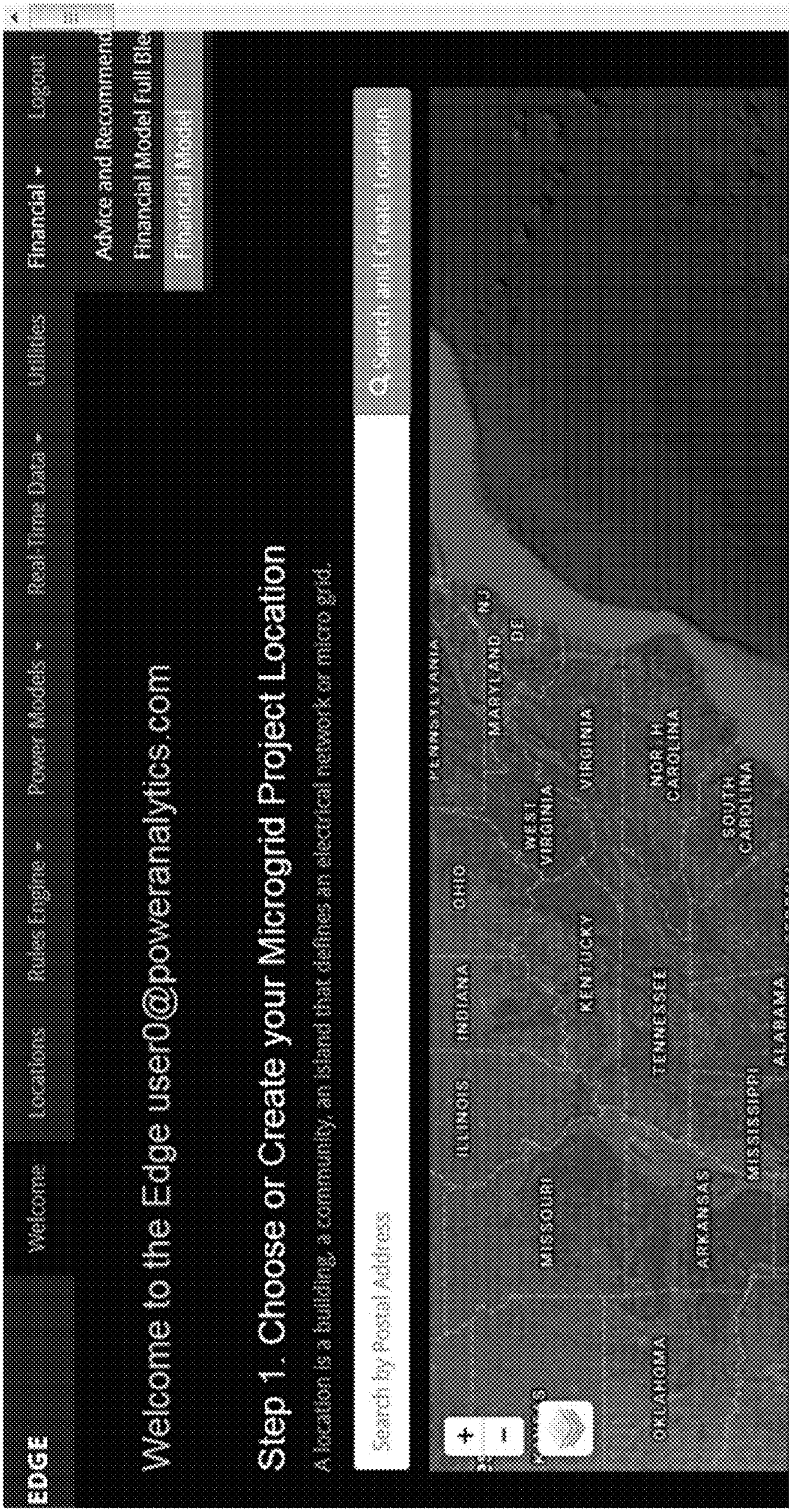
FIG. 101 is a screenshot showing the selection of the financial model from the dropdown menu.
Figure 102:
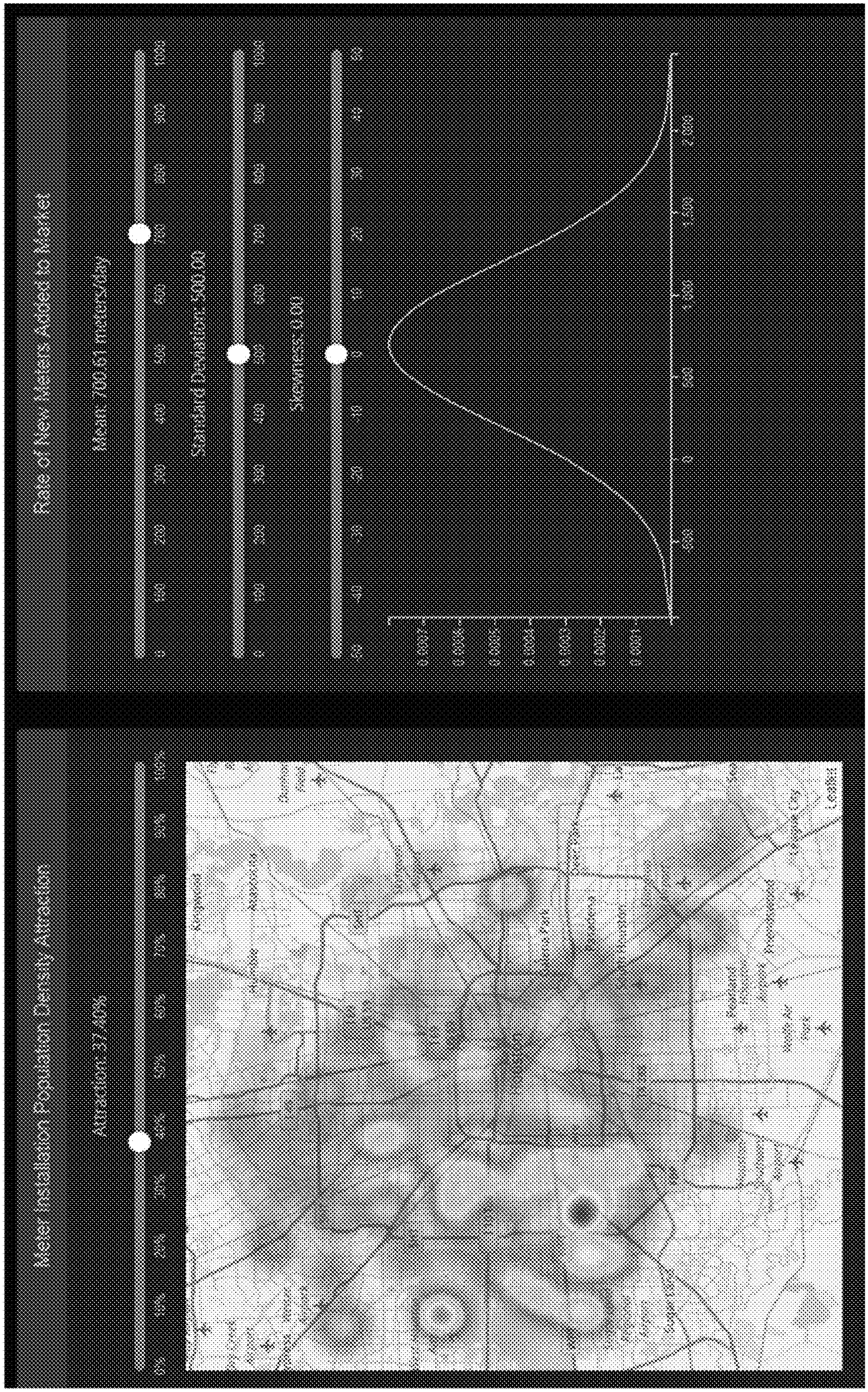
FIG. 102 is a screenshot of a financial model page.
Figure 103:
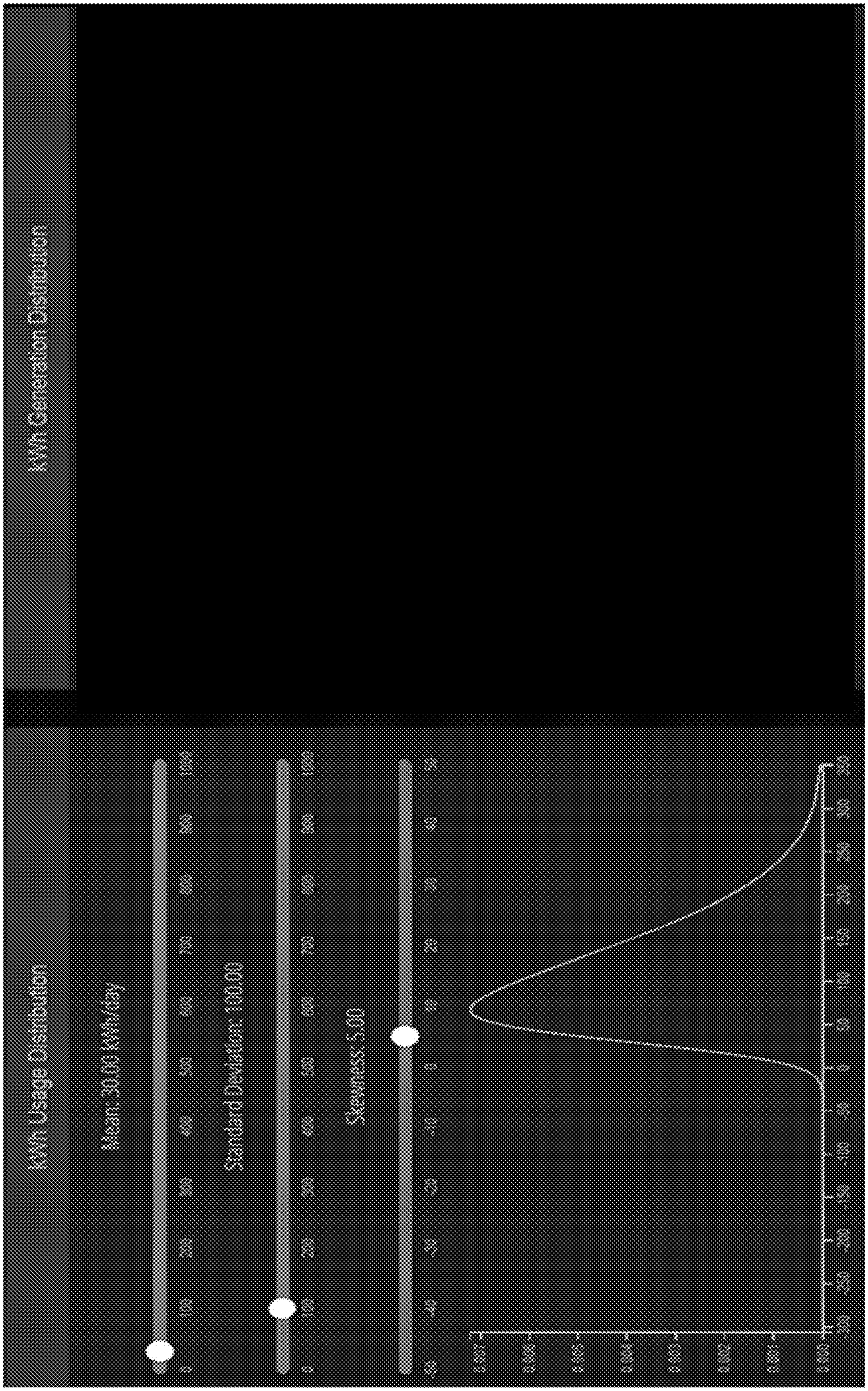
FIG. 103 is a screenshot showing kilowatt hour (kWh) Usage Distribution and kWh Generation Distribution.

FIG. 100 is a screenshot of the log in screen for a financial model visualization interface. In a preferred embodiment, the user can sign in to system and authorize the application with an account provided by a third party, e.g., Google. FIG. 101 is a screenshot showing the selection of the financial model from the dropdown menu. FIG. 102 is a screenshot of a financial model page. The left half of the screen shows a meter installation population density attraction with a heat map. The attraction percentage can be adjusted with a sliding bar. The right half of the screen shows the rate of new meters added to the market. The mean rate of new meters added to the market per day, the standard deviation, and the skewness can be adjusted with a sliding bar. A graph displays the rate of new meters added to the market based on the mean, standard deviation, and skewness selected. FIG. 103 is a screenshot showing kWh Usage Distribution and kWh Generation Distribution. The left half of the screen shows kWh Usage Distribution. The mean energy usage, standard deviation, and the skewness can be adjusted with a sliding bar. A graph displays the kWh usage distribution based on the mean, standard deviation, and skewness selected. The right half of the screen is to display kWh Generation Distribution. Users would be able to adjust the mean energy generation, standard deviation, and the skewness in much the same way as for kWh Usage Distribution. A graph could also be displayed with the kWh generation distribution based on the mean, standard deviation, and skewness selected. Skewness values may differ for residential, commercial, and industrial uses.

Figure 104:
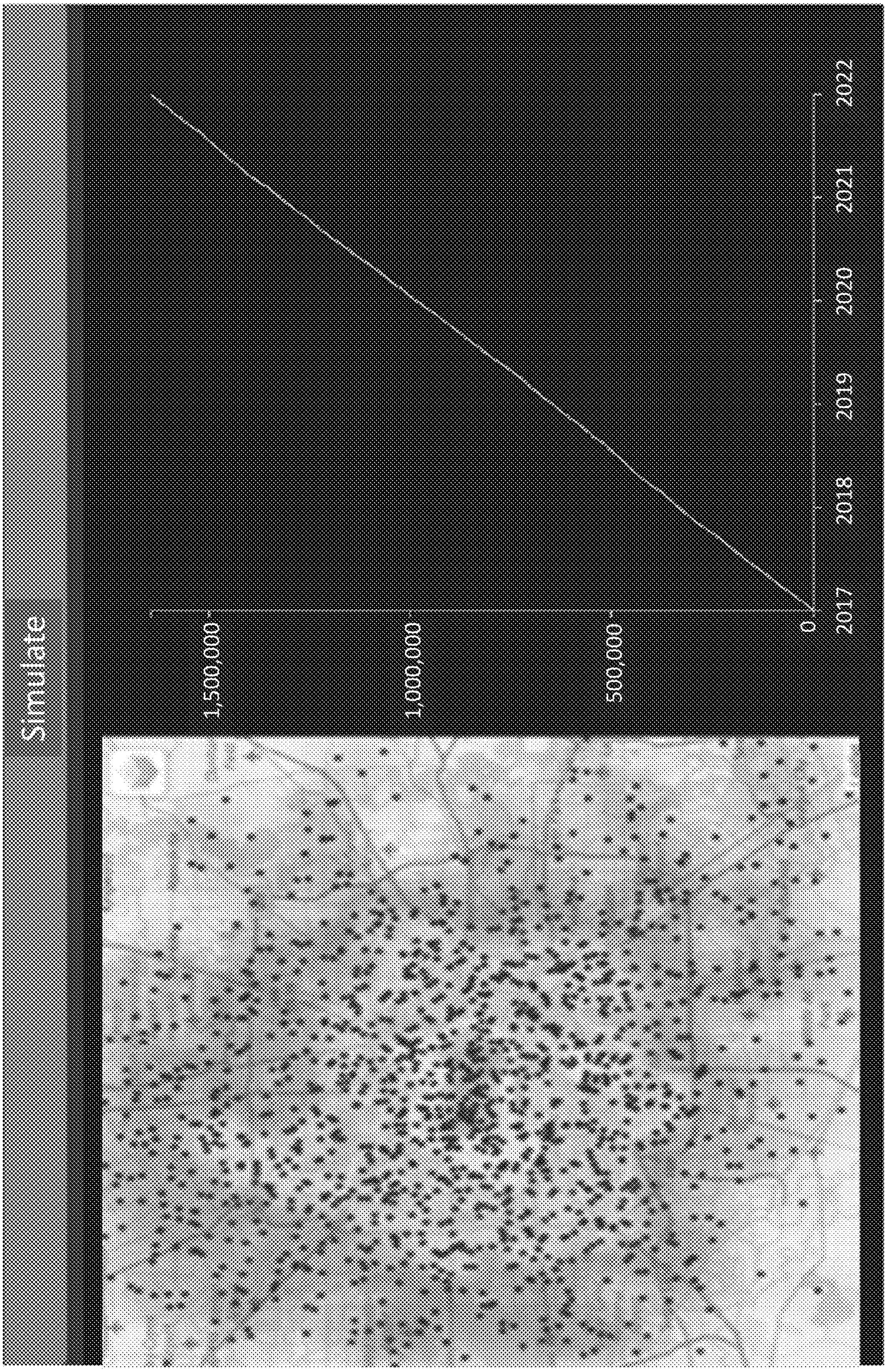
FIG. 104 is a screenshot of a simulation showing meter distributions randomly added to the map over time.
Figure 105:
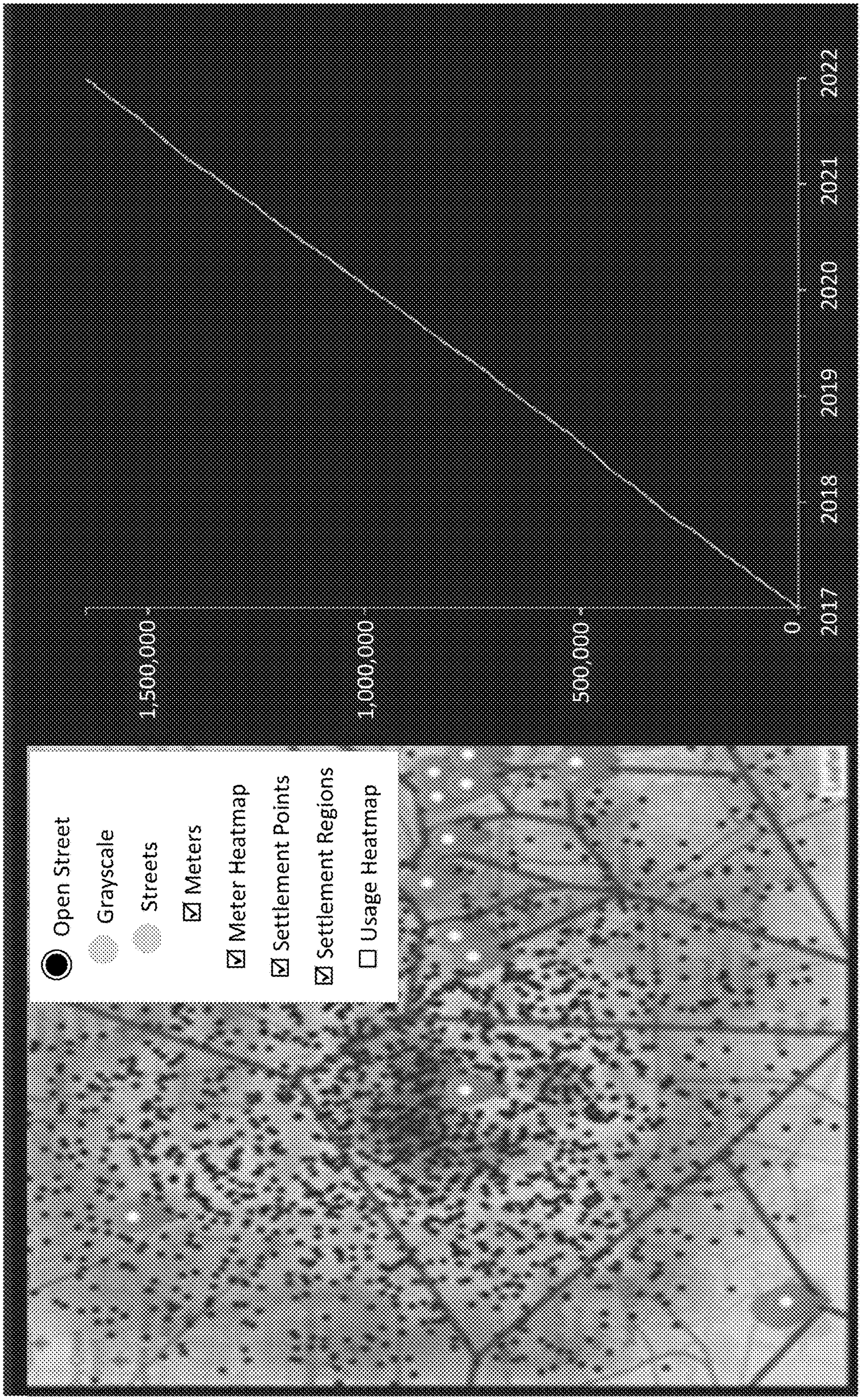
FIG. 105 continues to illustrate the screenshot of FIG. 104 with additional map layers for ERCOT Settlement Points.

FIG. 104 is a screenshot of a simulation showing meter distributions randomly added to the map over time. A map is shown on the left half of the screen showing a meter heatmap with the dots representing meters. A graph is shown on the right half of the screen showing the increase in the number of meters on the y-axis and time on the x-axis based on the parameters selected. FIG. 105 continues to illustrate the screenshot of FIG. 104 with additional map layers for ERCOT Settlement Points. The user can select the following levels: meters, meter heatmap, settlement points, settlement regions, and usage heatmap. The user can also view the map as open street, grayscale, and streets. A map is shown on the left half of the screen showing a meter heatmap, settlement points, meters, and settlement regions. A graph is shown on the right half of the screen showing the increase in the number of meters on the y-axis and time on the x-axis based on the parameters selected.

The following are incorporated herein by reference in their entirety: the NY REV order, CAL ISO rules and proposed rules and subsequent order for DER marketplace, ERCOT presentation stakeholder concerns, and terms and their definitions: telemetry light, telemetry medium, etc.

The blockchain technology is based on existing communication protocols (e.g., HTTP, RPC), cryptography (grown from Public key cryptography in 1976), distributed peer-to-peer sharing mechanisms (e.g., Napster, bitTorrent), and a distributed set of databases kept in synchronization based on time. The blockchain technology is a technology that permanently records events or transactions on a network in a transparent, auditable, and irrefutable way. A blockchain ledger is stored on each blockchain node participating in or comprising a network. Blockchain nodes include, but are not limited to grid elements, coordinators, network appliances, servers, mobile devices, work stations or any networked client that can interface with an IP-based network and can operate an operating system capable of processing blocks. Blockchain is a loose specification rather than a specific implementation, which is capable of unlocking monopoly power over information in infrastructure systems for telecommunications, healthcare, finance, energy, and government. In an introduction to blockchain applications in The Business of Blockchain by William Mougayar (2016), which is incorporated herein by reference in its entirety, it is established that just as the Web could not exist without the Internet, blockchains could not exist without the Internet, and thus, the use of blockchains within the systems and methods of the present invention provide that it is not merely an abstract idea, since it is inextricably tied to Internet technology.

There are many public blockchain networks (e.g. Internet facing), but the real growth is coming with private blockchain networks (e.g., Intranet) for specific uses like healthcare record processing. There are also hybrid networks that allow movement of information between networks. For example, there are many competing public networks that have their own currency to exchange goods and services, and there are hybrid networks that allow payment with currency from a different network.

The EnergyNet platform operable within the systems and methods of the present invention is based on three core pillars: measurement and verification of grid elements and their activity within an electric power grid or microgrid, smart digital contracts, i.e., self-executing digital contracts governed by rules engine(s) and terms, and advanced settlements, including energy settlements and corresponding financial settlements for active grid elements. In one embodiment of the present invention, the EnergyNet platform is built based on the blockchain technology. Each grid element is operable to function as a node on a power grid network or microgrid network. Each grid element is associated with at least one computing component. The at least one computing component is selected from the group consisting of PCs, laptops, smartphones, tablets, and any processor coupled with memory connected with a grid element. The at least one computing component for the grid elements are constructed and configured in network communication with the EnergyNet platform. Thus, the power control of grid elements on the power grid network and the business transaction or advanced energy settlement associated with the power control and active grid element activity on the EnergyNet platform are separate functions, but are related or coordinated based upon measurement and verification of data of the grid element(s) performance or function on the grid or microgrid.

In one embodiment of the present invention, data packets from grid elements are recorded and the information contained in the data packets are encrypted, stored and coded into blocks on a blockchain on a node. Each block includes a timestamp and a geodetic reference or a grid attachment point for each data packet denoting when and where the data packet is generated. The data packets include energy related data associated with corresponding grid elements and their intended active functioning within the electric power grid. For example, but not for limitation, each data packet includes a data content (raw data, transformed data, status, change in state, revenue grade metrology, unique grid element identifier, and combinations thereof), a priority, a security, and a transport route for communication over a network. Raw data includes information generated by, sensed by, measured by, or stored by a grid element. For example, raw data includes metrology, location, grid element identifier, C.12.19 tables, meter data, software version, firmware version, LSE priority, and combinations thereof. The data content is based on measurement and verification, so that the data content in each data packet is measurable and verifiable. The priority is based upon factors associated with the electric power grid following a hierarchy of priority including grid reliability factors, grid stability factors, energy market-based factors, billing determinants, energy settlement factors, financial settlement factors, transmission factors, and revenue grade metrology.

In one embodiment, block payloads are used to transfer data across multiple distributed EnergyNet platforms. For example, meter read data is visible to the supplier of the power, and to whoever buys the power based on a smart digital contract. This enables customers (market participants) to know exactly what information is used for their transactions. The blockchain implementation of the smart contracts have a security via cryptography including but not limited to hashing, keys, and/or digital signatures. A hash is a unique fingerprint that is used to verify that information within the blockchain has not been altered, without the need to actually see the information itself. Public-private keys are used. Together, these security elements of the blockchain used for the present invention systems and methods provide for public visibility but private inspection of the information itself. Thus, with the inclusion of blockchain and cryptocurrency for financial settlement of grid element transactions within the electric power grid or microgrid, the EnergyNet platform of the present invention simultaneously provide for a computing infrastructure, transaction platform, decentralized database, distributed account ledger, development platform, advanced energy financial settlement and marketplace, peer-to-peer network of grid elements, and a trust services layer. Advantageously, the EnergyNet platform is further operable for enabling and handling microtransactions or microsettlements and large value transactions, including but not limited to aggregated transactions or settlements from at least one Power Trade Block (PTB) unit.

In one embodiment, the data packets from different grid elements also include energy settlement information and financial settlement information associated with corresponding grid elements and transactions between the corresponding grid elements. The energy and financial settlement information is cryptographically secured on the blockchain. By way of example but not limitation, financial settlement information includes identification of payor, payee, transaction amount, transaction time, transaction method, contract term, rate, capacity, etc. Yield management can be applied to power transactions on the EnergyNet platform; then the price rate is based on a scarcity level of power in a power grid network.

Smart contracts are implemented on the blockchain-based EnergyNet platform. Smart digital contracts are self-executed between different market participants on the blockchain-based EnergyNet platform. In one embodiment, the smart digital contracts in EnergyNet are similar to traditional paper-based power purchase agreements, but their terms are in a standardized form which allows them to be more easily understood and transferable to other parties (i.e., participants can buy and sell contracts). Blockchain used within the EnergyNet platform allows both parties in a smart digital contract to access and visualize how transactional data (e.g., meter reads) impacts them on a real-time financial basis when automatically processed through EnergyNet's rules engines that enable the function of smart digital contracts within the systems and methods of the present invention. Smart digital contracts are constructed and established within the platform by related market participants on the EnergyNet platform. Contract terms are added, removed, and/or modified based on agreements between different parties in the smart digital contract. In another embodiment, smart contract as an application on the blockchain-based EnergyNet platform is created as an open contract by a first market participant. An open smart contract automatically executes itself when a second market participant meets all the contract terms, and a transaction between the first and second market participants are completed and recorded on the blockchain.

With advanced energy settlements, blockchain is used as a payment point (to or from) in public/hybrid networks, or as an indication to commit payment using another method (e.g., credit card, ACH) in private networks. In one embodiment, the "wallet" capability in private networks is used to hold energy credits that get translated into real currency outside of the blockchain private network. In another embodiment, as a point of payment, public blockchain networks have currency capabilities, which can be used for payment. The smart digital contracts in the present invention provide the transactional amount, party, and timing for payments, for which EnergyNet participants can use the built-in blockchain currency to pay for those goods. Smart contracts are enforced on the blockchain.

In one embodiment, cryptocurrency tokens are issued by the EnergyNet platform to facilitate peer-to-peer transactions between different grid elements. The cryptocurrency tokens on the EnergyNet platform are called Network of Power (NOP) tokens. In the present invention, NOP tokens can be used to make settlements for consuming, supplying, and/or curtailing power with micropayments at a grid element level in real time or near real time. In one embodiment, the NOP tokens are based on Ethereum technology, which is an open source, blockchain-based distributed computing platform with smart contracts.

NOP tokens are rewarded to end use customers or market participants who share energy related information on the EnergyNet platform. Energy related information includes load types (residential, commercial, industrial, mission critical, etc.), consumption amount, consumption reduced, consumption to be reduced, supply types (solar panels, wind turbines, power storage, etc.), power types (real power and/or reactive power), supply amount, supply available currently, supply to be available, capacity, etc. Energy related information is important to maintain grid stability and reliability in an efficient way within a microgrid, a distribution grid, and a power grid overall, as well as necessary to enable peer-to-peer power transactions.

NOP tokens are circulated on the EnergyNet platforms for fulfilling transactions between different market participants or for sharing of energy information between end users or counterparties such as market participants. Other cryptocurrencies (e.g., bitcoins, ethers, etc.) are acceptable on the EnergyNet platform based on requirements of the market participants. In one embodiment, payment methods are specified in smart contracts. In one embodiment, there is an exchange ratio for converting fiat currencies and other cryptocurrencies to NOP tokens on the EnergyNet platform. In one embodiment, NOP tokens are used as an instrument for hedging.

Figure 106:
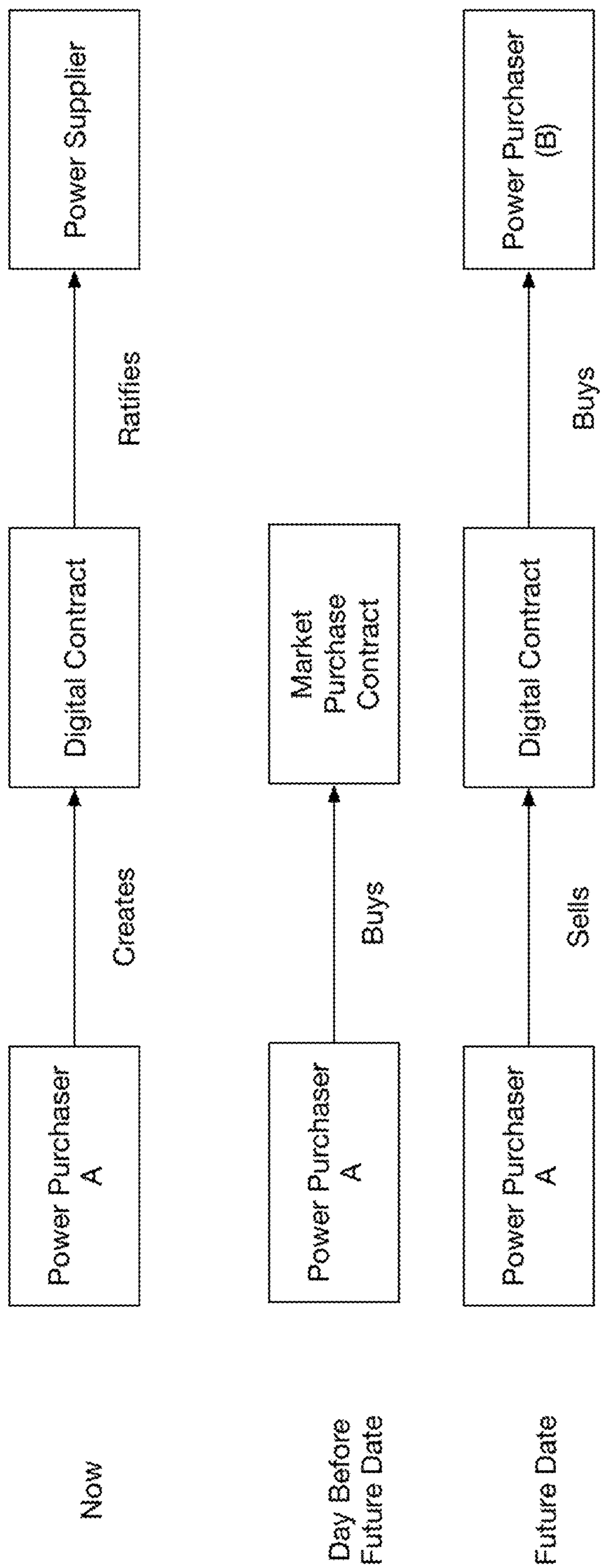
FIG. 106 is a diagram illustrating NOP tokens as an instrument for hedging.

FIG. 106 is a diagram illustrating NOP tokens as an instrument for hedging. Now, power purchaser creates a new contract with a power supplier for what the power purchaser predicts his/her power needs will be on a future date. On the day before the future date, the power purchaser secures power needs that exactly match what is needed for the day ahead. On the day of the future date, the power purchaser sells the original contract to another purchaser to recover value, either as a loss or a gain in value.

In general, hedging is used to offset the risk of price movements. With energy, cyptocurrentcy, etc., the value of a good or service on one day may not be equivalent to the value at a future date. For example, the price of a kilowatt hour (kWh) on August $1^{st}$ is 120 NOP tokens and on August $2^{nd}$ the same kilowatt hour is worth 260 NOP tokens even though the same resource requirements (i.e., the cost) on both days to produce the energy is the same. To enable hedging, there must be two transactions that have negative correlation with each other (i.e., as the value of one transaction rises the value of the other transactions falls). In this embodiment, a person who is selling an item in the future (e.g., generate 10 MW of power on Oct. 31, 2018) enters into a contract to sell (short) 10 MW of power on that future date (or as soon thereafter). A person who is planning to purchase an item in the future enters into a contract to buy (long) the item in the future. If the kWh price was 1,000 NOP tokens on Aug. 1, 2018 and the generator was planning to sell 10 MW on Oct. 31, 2018, the generator would enter a digital contract to sell 10 MW of power on Nov. 1, 2018 for 1,300 NOP tokens (the market perceives the price of power will be higher in the future). That is, on Aug. 1, 2018 the market price is 1,000 NOP tokens per kWh for 10 MW of power and there is someone willing to pay 1,300 NOP tokens per kWh on Nov. 1, 2018 for the same quantity of power. If the market price rose to 1,100 NOP tokens per kWh on Oct. 31, 2018 and the future contract (Nov. 1, 2018) was 1,105 NOP tokens, the generator would sell their power on the market and receive 1,100 NOP tokens and would "sell" their contract at a gain of 195 NOP tokens with an overall result of 1,295 NOP tokens for the generation. If the price were to fall to 600 NOP tokens for both the market and future contract, the generator would sell his generation for 600 NOP tokens on the market and sell his contract for 700 NOP tokens with an overall result of 1,300 NOP tokens for his generation. The amount of change in the market price versus the future contract price (referred to as the basis) determines how well the hedge works to remove price fluctuation risk. In this example above, the basis is favorable, and the generator does better than the market price on Aug. 1, 2018 to sell electricity on Oct. 31, 2018. For simplicity, the transactional cost of EnergyNet to provide this market capability is not included, but that also has to be considered in determining the success of the hedge. Thus, in this embodiment, the EnergyNet platform provides digital contracts to buy and sell goods or services with NOP tokens in the future at a price determined by market participants which enables them to hedge to offset price fluctuations.

In one embodiment, peer-to-peer transactions are performed at a grid element level within a microgrid, and production and consumption can be balanced out within the microgrid. Transactions are recorded on a blockchain for each microgrid. Each grid element has a copy of the transaction records. In another embodiment, peer-to-peer transactions are performed between microgrids in a network of microgrids. Blocks in one microgrid blockchain are aggregated to one block for microgrid-to-microgrid transaction. This way, a federated blockchain is provided on the network of microgrids or the macro-grid level based on blockchains for individual microgrids.

In one embodiment, a coordinator or a series of interconnected coordinators serve as blockchain nodes. The blockchain nodes serve the blockchain function of error checking and "mining." The blockchain nodes are also points of transmission of blocks. Coordinators also provide services including but not limited to currency conversion, financial settlements, data formatting, protocol arbitration, device discovery wherein the device includes but not limited to grid elements.

In one embodiment, three types of individuals and entities, i.e., power purchasers, power merchants, and power brokers, will exchange value on the blockchain-based EnergyNet platform by proposing, executing on, and settling energy contracts. A power purchaser is an entity or individual that needs to purchase power for their own consumption or on behalf of others to maintain operations and comfort. A power merchant is an entity or individual that is producing power available for use by power purchasers. Power merchants can produce power via a variety of technologies. A power broker is an entity or individual responsible for facilitating new power contract creation, forecasting demand and supply futures, and performing market research to develop new offers and services. All individuals or entities interacting over the blockchain-based EnergyNet platform maintain a public identity and associated private credentials retained in a blockchain wallet. Values for the individuals or entities are expressed in NOP tokens and accrued to their public identities. Accrued values are publicly visible to all parities via analysis of immutable settlement events recorded on the blockchain. In one embodiment, a single public identity opts for a simple wallet strategy and publishes a type of transaction event by a type of individuals or entities. In another embodiment, a sophisticated organization implement a complex wallet strategy that uses many public identities to maintain privacy and organize values.

In one embodiment, three types of events, i.e., measurement events, contract events, and settlement events, are recorded on the blockchain. During a measurement event, A set of revenue grade power measurements and metadata are recorded over an interval of time including observed power supply and/or power demand. Measurement events are produced by individuals or entities in combination with a revenue grade measurement device. Measurement data is encrypted on the blockchain and is visible to individuals and entities with a public identity, for example, an owner of physical client devices on the blockchain-based EnergyNet platform, or an owner of a contract event. During a contract event, a commitment of value is transferred by a public participant in exchange for performance under certain terms and conditions on measurement from other public participants. Contract events express the terms and conditions using a protocol that the software and computational wallet process on the blockchain-based EnergyNet platform can understand and process. Contract events can be for long-term or short-term service delivery. Contract events can result in demand control or supply control changes during performance. During a settlement Event, a statement of value is transferred from a public participant who made the commitment via contract to one or more other public participants who have delivered measurement services and are verified to have performed within the terms of the contract.

In one embodiment, the blockchain-based EnergyNet platform includes physical client devices with Internet Protocol connectivity, memory, software, and wallet capabilities that interface with revenue grade power measurement devices such as consumption meters, supply meters, transformer meters, or inverter meters. The blockchain-based EnergyNet platform also includes a software and computational wallet process as a settlement authority, responsible for connecting measurement events to contract events, running all the data against a set of rules that determine performance and delivery, and producing settlement events that reassigns value from the contract to the public identities involved. The software and computational wallet process also provides connectivity to legacy payment network or other value exchange networks. The blockchain-based EnergyNet platform also includes a software wallet application or wallet portal, as a deal desk, that enables participants to manage, search, and create new contract events. The software wallet application or wallet portal also enables extraction, summarization, and visualization of measurement events associated with those contract events and settlement events associated with those Contract events.

Figure 107:
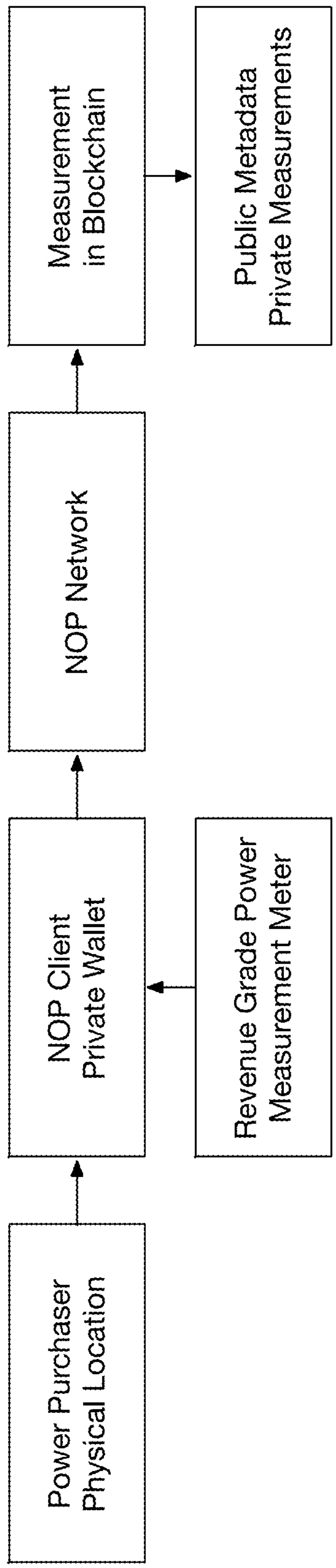
FIG. 107 is a diagram illustrating a power purchase publishing measurement events on the blockchain.

FIG. 107 is a diagram illustrating a process of a power purchase publishing measurement events on the blockchain. In one embodiment, a power purchaser has installed physical client devices paired with revenue grade meters or devices with equivalent capabilities (e.g., inverters and IoT meters). As the meters measure power, the physical client devices encrypt and transmit measurements to a closest network node for the purpose of publishing public metadata and private measurements to the blockchain. The power purchase can decrypt their own private measurements from the blockchain at any time.

Figure 108:
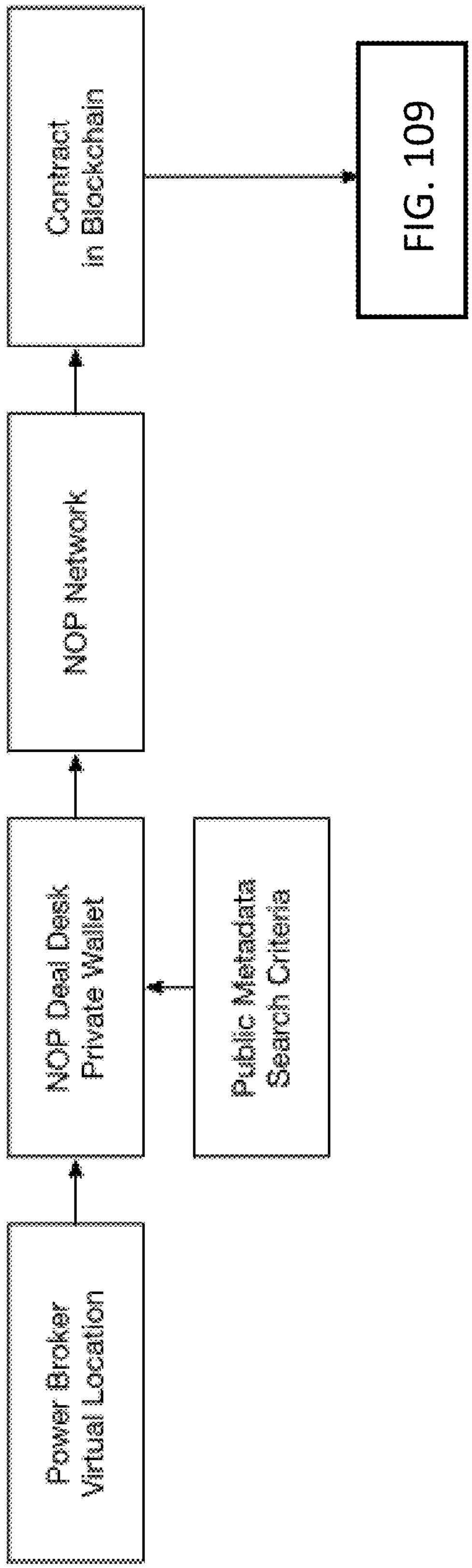
FIG. 108 is a diagram illustrating a power broker creating a request for measurement information using a smart contract.

FIG. 108 is a diagram illustrating a power broker creating a request for measurement information using a smart contract. In one embodiment, a new service offering is designed or a new distributed generation facility is planned by a power broker. Measurement data used to create an accurate power offering is obtained by exchanging NOP tokens. The Power Broker creates the offer via a smart contract, associates NOP token value to the new smart contract, and publishes the smart contract onto the blockchain. The Contract metadata solicits measurement data from specific Power Purchasers based on public identity or a larger group of purchasers based on a public metadata query.

Figure 109:
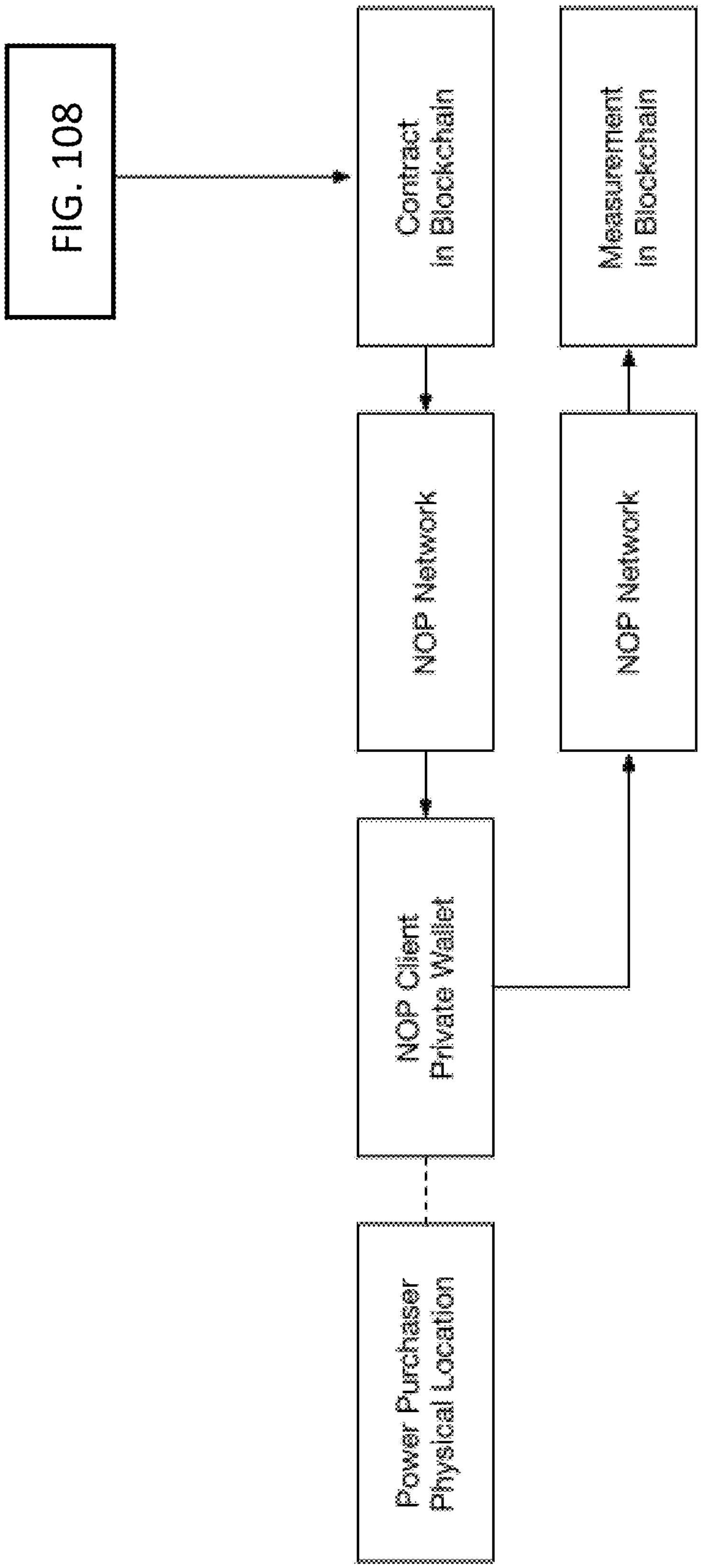
FIG. 109 is a diagram illustrating a power purchaser automatically providing measurement to fulfil a smart contract.

FIG. 109 is a diagram illustrating a power purchaser automatically providing measurement to fulfil a smart contract. In one embodiment, a power purchaser's physical client device detects a smart contract with criteria matching the measurements the power purchaser has published to the chain. The power purchaser's physical client device automatically publishes measurements when the smart contract contains enough value to meet a configured threshold. The power broker now has access to an encrypted copy of the measurement information recorded into the Blockchain during a measurement event. A settlement authority on the EnergyNet platform then detects the presence of a measurement event that matches a smart contract and clears the transaction with the next block creation. A power purchaser can sell multiple copies of the same data set to multiple power brokers.

Figure 110:
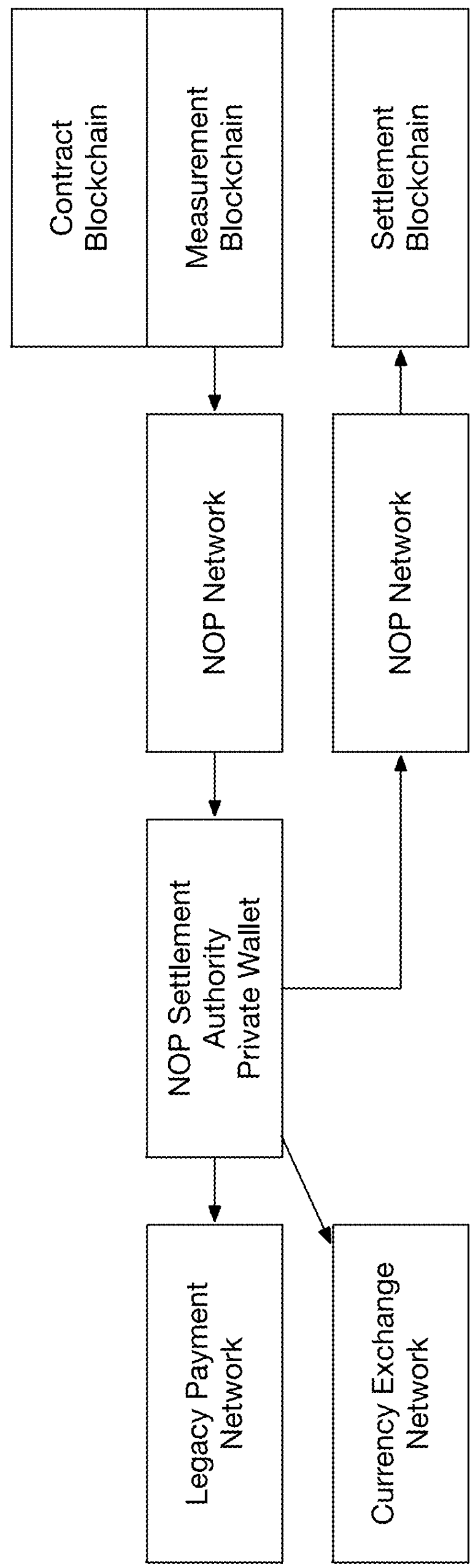
FIG. 110 is a diagram illustrating a settlement authority clearing transactions based on measurements and contracts on the blockchain-based EnergyNet platform.

FIG. 110 is a diagram illustrating a settlement authority clearing transactions based on measurements and contracts on the blockchain-based EnergyNet platform. In one embodiment, a settlement authority on the blockchain-based EnergyNet platform monitors the blockchain for new measurements that reference contract events that publicly designate it as the settlement authority. A settlement authority is responsible for reassigning NOP Token value from the contract to the public parties that it can confirm provided measured services. Each settlement authority reassigns this value via NOP tokens or other off network payment mechanisms. Settlement authorities typically retain a portion of the NOP token value as a transaction fee. Each settlement authority is required to have a computational rules engine capable of processing measurements by validating, verifying, and estimating any incomplete measurement and processing contracts by executing the rules in priority order as per contract terms. The settlement authority is ultimately responsible for executing all measurements against the contract terms and producing a final settlement event that assigns value from the contract to every participating providing measurement services. Each settlement authority implementation is unique and selected by the contract owner at will. Settlement authority implementations coordinate with Legacy Payment Network processors like ACH or bridge into alternative currency networks. In one embodiment, the settlement authorities are launched by the blockchain-based EnergyNet platform. In another embodiment, alternative settlement authorities are implemented to provide settlement and clearing services on the blockchain-based EnergyNet platform. Settlement authorities are selected by contract owners to be used for managing the contracts.

Figure 111:
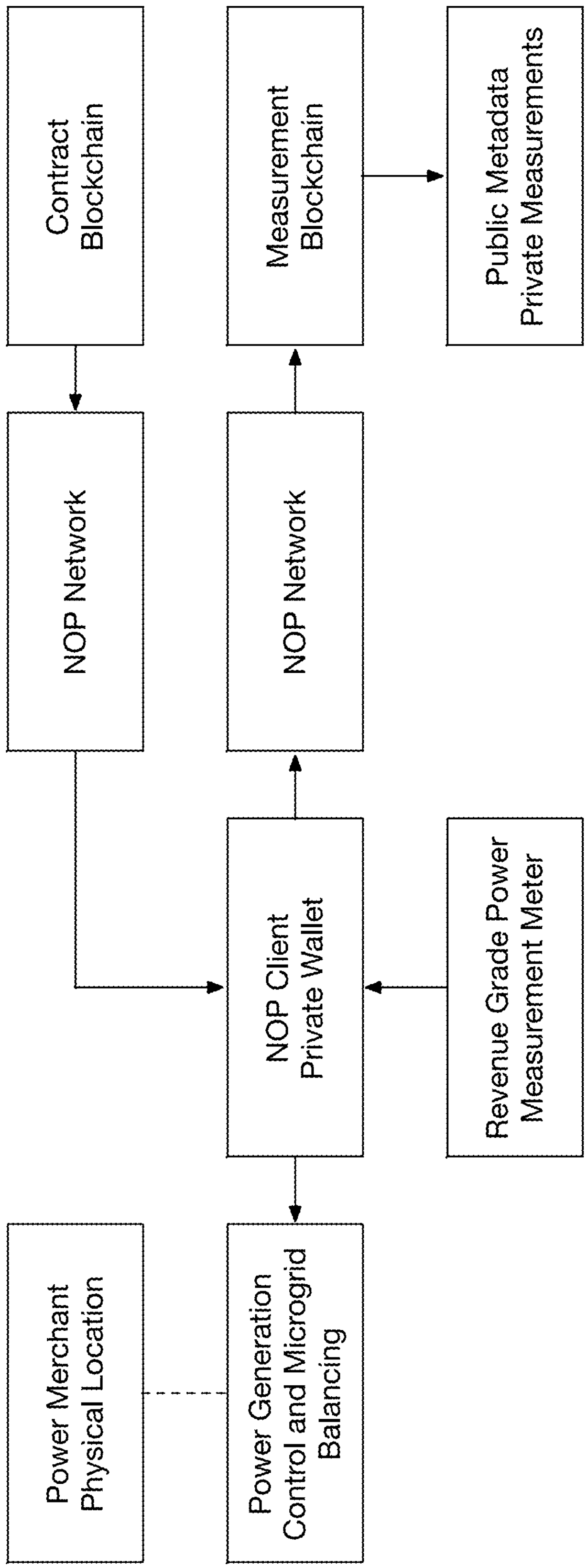
FIG. 111 is a diagram illustrating a power merchant controlling supply operations to meet contract conditions.

FIG. 111 is a diagram illustrating a power merchant controlling supply operations to meet contract conditions. In one embodiment, a power merchant is engaged in a contract to perform power delivery that meets certain terms and service conditions. The power merchant's physical client device controls the power production asset in a manner to deliver power that meets the contract's performance criteria (Example: discharging battery storage). To prove delivery, the power merchant's physical client device automatically publishes measurement information to the blockchain-based EnergyNet platform network. the measurement information is encrypted so that only privileged parties on the contract and the settlement authority can see private measurements. Contract events are created with enough value in them to pay the entire contract. This method ensures payment at the appropriate time.

As stated earlier, EnergyNet is a distributed platform, which can be white-labeled or genericized to operate under the brand of or by many different customers. EnergyNet is functional with most of the existing blockchain implementations, as EnergyNet is be viewed as an "application" from a blockchain perspective. Thus, two EnergyNet customers using different blockchain implementations can easily share cryptography protected information. Thus, the present invention systems and methods are focused on the functionality provided by the platform, and is not restricted or limited by the various blockchain implementations.

In one embodiment, the present invention is directed to systems and methods for financial settlement of transactions within an electric power grid network. A multiplicity of active grid elements are constructed and configured for electric connection and network-based communication over a blockchain-based platform. Each of the multiplicity of active grid elements comprises a computing component operatively coupled with a memory. The multiplicity of active grid elements are registered to actively participate within the electric power grid network. The multiplicity of active grid elements are operable to make peer-to-peer transactions based on their participation within the electric power grid by generating and executing a digital contract. The multiplicity of active grid elements are operable to generate messages autonomously and/or automatically within a predetermined time interval. The messages comprise energy related data and settlement related data. The energy related data of the multiplicity of active grid elements are based on measurement and verification. The energy related data and the settlement related data are validated and recorded on a distributed ledger with a time stamp and a geodetic reference. The multiplicity of active grid elements are selected from the group consisting of: smart appliances, smart meters, building control systems, sensors, storage devices, electric vehicles, wind turbines, solar panels, controllers, distribution elements, transmission elements necessary for grid operations and stability, and any other power consumption and/or generation devices. In one embodiment, the predetermined time interval is less than 15 minutes.

In one embodiment, the blockchain-based EnergyNet platform in the present invention is operable for crowdsourcing renewables. As an example, but not for limitation, participants buy and sell solar panels directly over the blockchain-based EnergyNet platform. Smart contracts are constructed and executed for crowdsourcing related transactions, and NOP tokens are be used in these crowdsourcing related transactions. Additionally, during the life of the renewable assets, participants can buy or sell their positions which creates liquidity for participants and opportunity for new participants after the initial renewable is installed.

Figure 112:
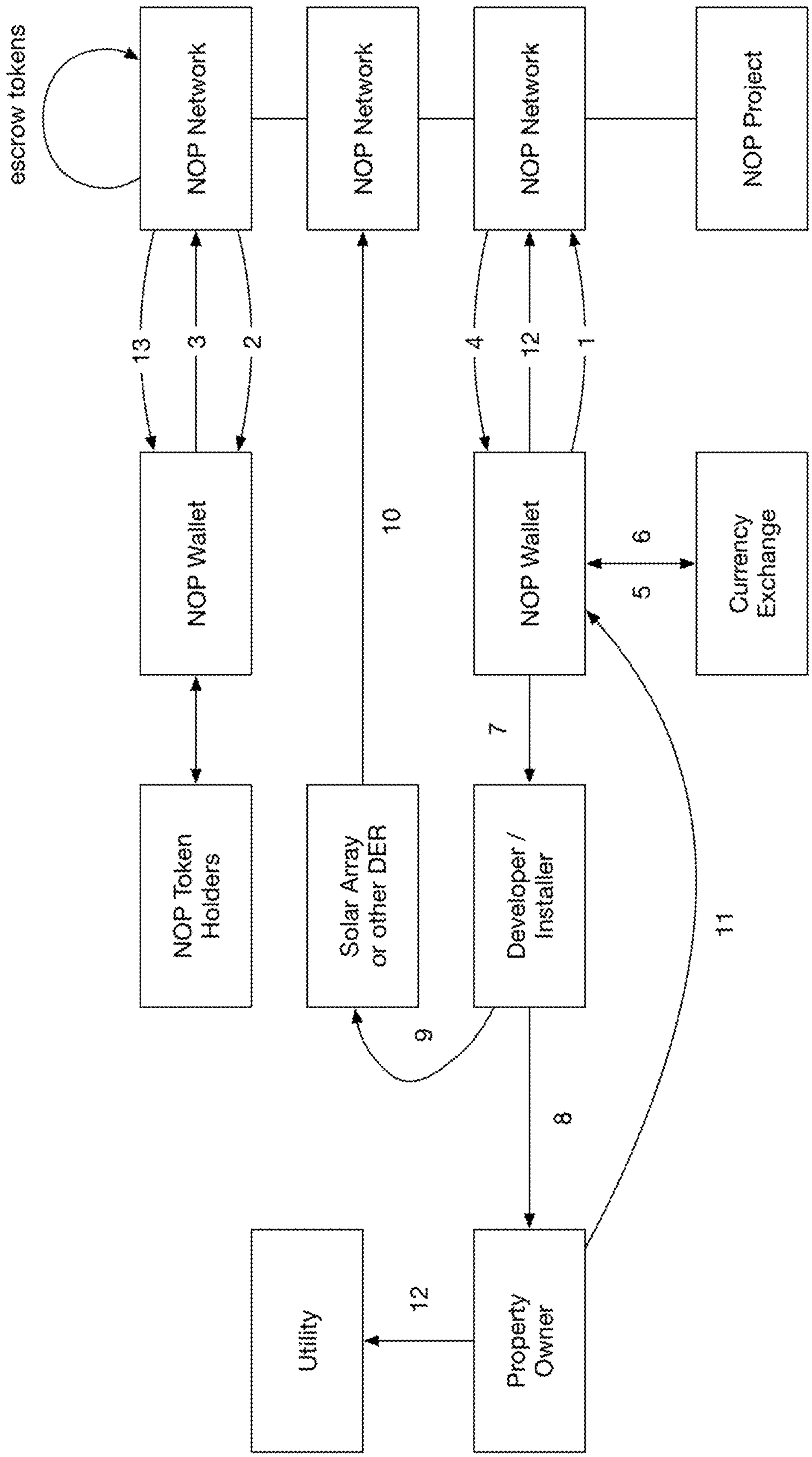
FIG. 112 is a diagram illustrating crowdsourcing renewable energy over the blockchain-based EnergyNet platform.

FIG. 112 is a diagram illustrating crowdsourcing renewable energy over the blockchain-based EnergyNet platform. The blockchain-based EnergyNet platform discovers and sources projects. Values are held in escrow until a project meets a funding objective. An installer contracts with a property owner. Service is not available until energy data is received onto the blockchain-based EnergyNet platform. Token investors receive tokens as distributed energy resources (DERs) perform. Token investors can sell ownership on an open exchange. A developer or installer (1) creates a project contract on the blockchain-based EnergyNet platform. The blockchain-based EnergyNet platform (2) reviews the project contract, and NOP token holders (3) allocate NOP tokens on the blockchain-based EnergyNet platform. The developer or installer (4) receivers all NOP tokens. The developer or installer can exchange (5) NOP tokens and (6) local currency with a currency exchange. All the NOP token are exchanged to (7) local currency to fund projects from the developer or installer. The developer or installer (8) contracts with an owner of property for construction. The owner of property receives (11) NOP tokens or local currency for compensation from the developer or installer, meanwhile (12) the owner of property maintains contract with local utility provider, for example for allowing export of power for local currency compensation. The developer or installer (9) sets up solar array or other DERs in the property. (10) Energy data from generation and usage from the solar array or other DERs are recorded on the blockchain-based EnergyNet platform.

In one embodiment, the blockchain-based EnergyNet platform in the present invention is operable for marketing. Energy related information recorded on the blockchain is retraceable, and is used for targeted advertisement. For example, HVAC product providers/contractors on the EnergyNet platform are able to identify low efficient HVAC units and send advertisement messages to the owners of the low efficient HVAC units, thereby having a better target. Meanwhile, advertisement messages including content information, sender information, and receiver information are recorded on the blockchain, which is auditable and verifiable, thereby eliminating frauds. For example, digital contracts can execute payments to brokers or recipients by advertisers based on the recipient receiving the information. Additional payments can be made based on recipient's action on that information (e.g., requesting more information, or purchasing a good or service).

Figure 113:
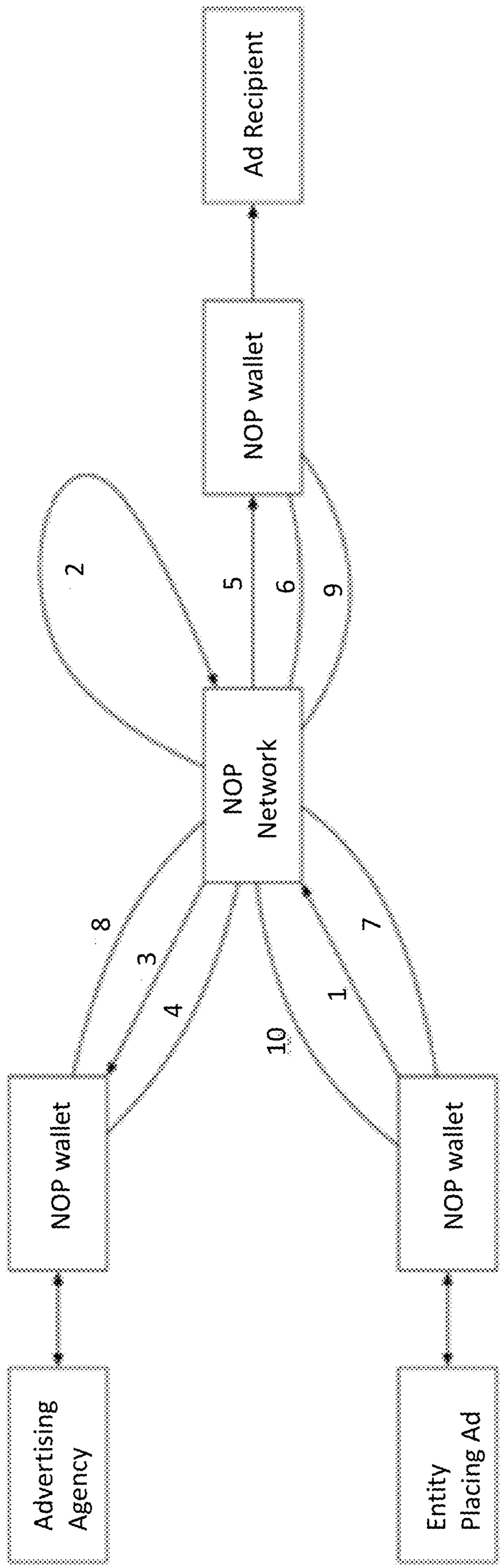
FIG. 113 is a diagram illustrating advertising over the blockchain-based EnergyNet platform.

FIG. 113 is a diagram illustrating advertising over the blockchain-based EnergyNet platform. A smart contract is used to secure the escrowed payment of NOP tokens to advertisers and viewers of advertisement. The blockchain-based EnergyNet platform provides verified receipt and execution (i.e., view, take actions) of ad contract. An advertisement placing entity (1) creates a contract in NOP tokens for placing advertisement; and (2) escrow NOP tokens over the blockchain-based EnergyNet platform. an advertising agency (3) accepts the contract and (4) produces the advertisement based on the contract. An advertisement receipt (5) reviews the advertisement and (6) acknowledges receipt of the advertisement. The advertising placing entity (7) receives view receipt; the advertising agency (8) receives NOP tokens; and the advertisement recipient also (9) receives NOP tokens. The advertisement placing entity then (10) updates its wallet for payment.

In one embodiment, the blockchain-based EnergyNet platform in the present invention is operable to provide a rating system, where the ratings are verifiable and cannot be faked. For example, smart appliance owners provide ratings for their appliances based on appliance performance data, which is recorded on the blockchain. These ratings are trustable as the performance data are retrievable and verifiable. These ratings provide valuable reference for potential buyers.

In one embodiment, the blockchain-based EnergyNet platform in the present invention is operable for multi-level marketing and distribution. Traditional intermediaries, such as Homeowner's Association (HOAs), brokers, Retail Energy Providers (REPs), become market participants on the EnergyNet platform providing services to different customers. For example, a digital contract is constructed when a homeowner adds renewable energy generation to their home (e.g., photovoltaic array), the HOA gets a percentage (e.g., 2%) of the sale of excess power back to the grid.

In one embodiment, the blockchain-based EnergyNet platform in the present invention is operable for secure peer-to-peer messaging. A user is able to create his own rules for message reception, for example, what types of messages the user wants or does not want to receive; and rules for sending messages, for example, if the messages are cryptographically secured or public. This capability enables users to manage their sharing of information from a single message to the entirety of their communication.

Figure 114:
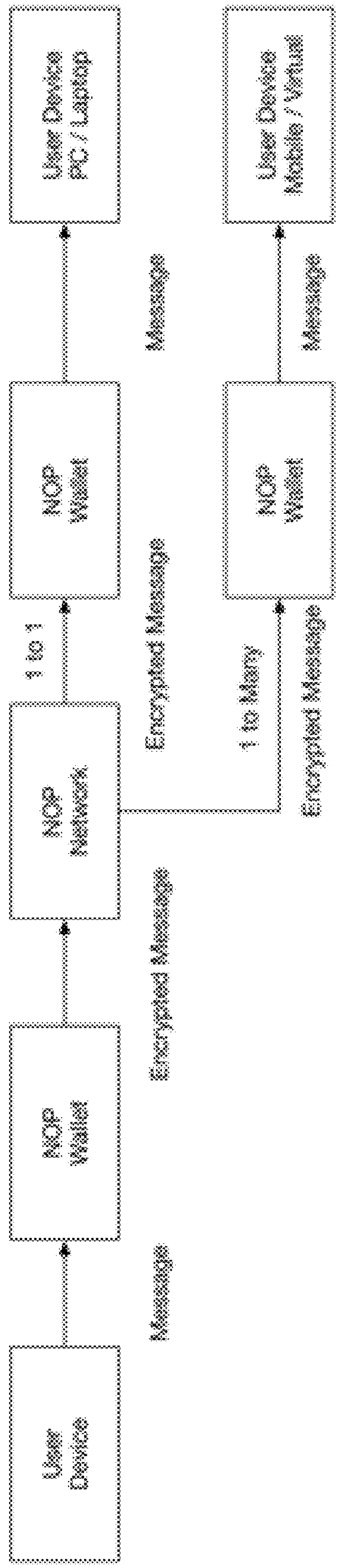
FIG. 114 is a diagram illustrating messaging over the blockchain-based EnergyNet platform.

FIG. 114 is a diagram illustrating messaging over the blockchain-based EnergyNet platform. The present invention enables a user with a device to send a private message to one other user or many other users via the blockchain-based EnergyNet platform. The only parties that are able to view the messages are the intended recipients who hold the private key to their public identities. Messages can carry any payload, similar to email MIME encoding headers. The cost of the messages in NOP tokens is proportional to the size, similar to adding more postage to a large package. Messages can be any form of digital contract, for example, personal texts, subscription news or software, video or multimedia.

In one embodiment, the blockchain-based EnergyNet platform in the present invention includes Artificial Intelligence (AI) algorithms. For example, but not for limitation, trading bots (i.e., digital robots) are created on the blockchain-based EnergyNet platform to facilitate automatic peer-to-peer trading.

In one embodiment, the blockchain-based EnergyNet platform in the present invention is also operable to host third-party applications, such as data warehousing, renewable energy credits, bill payments, shopping carts for energy parts, forecasting (e.g., prices, supply and demand), etc.

Certain modifications and improvements will occur to those skilled in the art upon a reading of the foregoing description. By way of example, communications alternatives will be understood to be covered under the present invention. As an example but not limitation, 5G communication may be used for messaging in the systems and methods of advanced energy settlements in an electric power grid in the present invention. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for financial settlement of transactions within an electric power grid network, comprising:

a multiplicity of active grid elements constructed and configured for electric connection and network-based communication over a blockchain-based platform, and at least one distributed computing device in network communication with the multiplicity of active grid elements;

at least one server communicatively connected to the electric power grid network configured to control the participation of the multiplicity of active grid elements in the electric power grid network based on predictive energy consumption data for the multiplicity of active grid elements;

wherein the multiplicity of active grid elements are registered to actively participate within the electric power grid network;

wherein the multiplicity of active grid elements are operable to make peer-to-peer transactions based on their participation within the electric power grid by executing a digital contract;

wherein the multiplicity of active grid elements are operable to generate messages that comprise energy related data and settlement related data based on measurement, verification, and aggregated revenue grade metrology data;

wherein the measurement and verification comply with standards defined by an operator;

wherein the energy related data are contained in encrypted data packets;

wherein the data packets are stored and coded into blocks on a blockchain on a node, each block including a timestamp and a geodetic reference for each data packet denoting when and where the data packet is generated;

wherein the data packet includes energy related data associated with corresponding grid elements and their intended active functioning within the electric power grid;

wherein a smart contract is generated between market participants; and wherein the smart contract automatically executes itself when market participants meet all the contract terms and a transaction between a first and second market participant are completed and recorded on the blockchain.

2. The system of claim 1, wherein the messages further comprise a priority, a security, and a transport route for the network-based communication.

3. The system of claim 2, wherein the priority is based upon factors associated with the electric power grid following a hierarchy of priority including grid reliability factors, grid stability factors, energy market-based factors, billing determinants, energy settlement factors, financial settlement factors, transmission factors, and revenue grade metrology.

4. The system of claim 1, wherein the energy related data comprises raw data, transformed data, status, change in state, and a unique grid element identifier.

5. The system of claim 4, wherein the raw data corresponds to active participation of the multiplicity of active grid elements in the electric power grid network.

6. The system of claim 1, wherein the settlement related data comprises payor, payee, transaction amount, transaction time, transaction method, contract term, rate, and capacity.

7. The system of claim 1, wherein the multiplicity of active grid elements are further operable to modify the digital contract.

8. The system of claim 1, wherein the multiplicity of active grid elements are operable to maintain the distributed ledger, and wherein each of the multiplicity of active grid elements stores a copy of the distributed ledger.

9. The system of claim 1, wherein the measurement and verification is provided by a smart meter or a revenue grade sub-meter.

10. The system of claim 1, wherein the participation comprises consuming electric power, producing electric power, and curtailing power consumption.

11. The system of claim 1, wherein the multiplicity of active grid elements includes at least one device selected from the group consisting of: smart appliances, smart meters, building control systems, sensors, storage devices, electric vehicles, wind turbines, solar panels, controllers, distribution elements, transmission elements necessary for grid operations and stability, and any other power consumption and/or generation devices.

12. The system of claim 1, wherein the messages further comprise attachment point information of the multiplicity of active grid elements to the electric power grid network.

13. The system of claim 1, wherein the blockchain-based platform is operable to issue proprietary cryptocurrency tokens.

14. The system of claim 13, wherein the multiplicity of active grid elements are rewarded with the proprietary cryptocurrency tokens by sharing energy related data, wherein the proprietary cryptocurrency tokens are operable to be used to make settlements for consuming, supplying, and curtailing power with micropayments at the grid level in real time or near real time.

15. The system of claim 1, wherein the settlement related data are cryptographically secured.

16. A method for financial settlement of transactions within an electric power grid network, comprising:

providing a multiplicity of active grid elements constructed and configured for electric connection and network-based communication over a blockchain-based platform, and at least one distributed computing device in network communication with the multiplicity of active grid elements;

providing at least one server communicatively connected to the electric power grid network configured to control the participation of the multiplicity of active grid elements in the electric power grid network based on predictive energy consumption data for the multiplicity of active grid elements;

the multiplicity of active grid elements registering with the electric power grid network for actively participating within the electric power grid network;

at least one active grid element generating and executing a digital contract for at least one transaction with at least one peer active grid element;

the at least one active grid element and the at least one peer active grid element generating messages that comprise energy related data and settlement related data, and wherein the energy related data are based on measurement and verification; and validating and recording the energy related data and the settlement related data on a distributed ledger with a time stamp and a geodetic reference;

wherein the energy related data are contained in encrypted data packets;

wherein the data packets are stored and coded into blocks on a blockchain on a node, each block including a timestamp and a geodetic reference for each data packet denoting when and where the data packet is generated;

the data packet includes energy related data associated with corresponding grid elements and their intended active functioning within the electric power grid;

wherein a smart contract is generated between market participants; and wherein the smart contract automatically executes itself when market participants meet all the contract terms and a transaction between a first and second market participant are completed and recorded on the blockchain.

17. The method of claim 16, wherein the energy related data comprises raw data, transformed data, status, change in state, and a unique grid element identifier.

18. The method of claim 16, wherein the settlement related data comprises payor, payee, transaction amount, transaction time, transaction method, contract term, rate, and capacity.

19. The method of claim 16, further comprising the blockchain-based platform issuing proprietary cryptocurrency tokens.

20. The method of claim 19, further comprising the at least one active grid element and the at least one peer active grid element earning the proprietary cryptocurrency tokens by sharing the energy related data, wherein the proprietary cryptocurrency tokens are operable to be used to make settlements for consuming, supplying, and curtailing power with micropayments at the grid level in real time or near real time.

* * * * *